US012614866B2

(12) United States Patent
Sato et al.

(10) Patent No.: US 12,614,866 B2
(45) Date of Patent: Apr. 28, 2026

(54) CONNECTOR WITH SUBSTRATE

(71) Applicant: JAPAN AVIATION ELECTRONICS INDUSTRY, LIMITED, Tokyo (JP)

(72) Inventors: Yukiko Sato, Tokyo (JP); Yukitaka Tanaka, Tokyo (JP); Gota Kameyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 342 days.

(21) Appl. No.: 18/140,108

(22) Filed: Apr. 27, 2023

(65) Prior Publication Data

US 2024/0079804 A1 Mar. 7, 2024

(30) Foreign Application Priority Data

Jul. 25, 2022 (JP) ................................ 2022-118179

(51) Int. Cl.

*H01R 12/70* (2011.01)
*H01R 12/71* (2011.01)
*H01R 13/516* (2006.01)

(52) U.S. Cl.

CPC ....... *H01R 12/7011* (2013.01); *H01R 12/716* (2013.01); *H01R 13/516* (2013.01)

(58) Field of Classification Search

CPC ............ H01R 12/7011; H01R 12/716; H01R 13/516; H01R 12/714; H01R 13/6582;

(Continued)

(56) References Cited

U.S. PATENT DOCUMENTS 6,846,115 B1 * 1/2005 Shang .................. G02B 6/4277 439/91
7,708,580 B2 * 5/2010 Yeh ...................... H05K 7/1053 439/331

(Continued)

FOREIGN PATENT DOCUMENTS

EP 3852201 A1 7/2021
JP 2000-012123 A 1/2000

(Continued)

OTHER PUBLICATIONS

Taiwan Intellectual Property Office, "Office Action with Search Report for Taiwanese Patent Application No. 112118551," Dec. 5, 2023.

*Primary Examiner* — Truc T Nguyen
(74) *Attorney, Agent, or Firm* — Kreative IP Management LLC; Fuiyeong Kim

(57) ABSTRACT

In a connector with substrate, a compression connector pressed against and connected to a connection target object and a substrate are attached via a cage. The connector with substrate includes a substrate; a cage fixed to the substrate; and a compression connector inserted into the cage and including contacts that are in contact with the substrate, a housing to which the contacts are fixed, and a cover shell that covers an upper surface portion of the housing. One of the cage and the compression connector includes a lock hole and another of the cage and the compression connector includes a lock piece that enters the lock hole to fix a position of the compression connector with respect to the cage, or the cage or the compression connector includes the lock hole and the lock piece.

7 Claims, 118 Drawing Sheets

(58) Field of Classification Search
CPC .... H01R 13/6594; H01R 12/79; H01R 12/75; H01R 13/502; H01R 13/73
See application file for complete search history.

(56) References Cited

U.S. PATENT DOCUMENTS

| | | | | | |
|---|---|---|---|---|---|
| 8,579,654 | B2 * | 11/2013 | Chen | H01R 13/6581 | 439/495 |
| 8,662,915 | B2 * | 3/2014 | Ueda | H01R 12/88 | 439/495 |
| 8,684,769 | B2 * | 4/2014 | Kao | H01R 13/6585 | 439/607.28 |
| 8,961,235 | B2 * | 2/2015 | Little | H01R 13/64 | 439/660 |
| 2004/0033717 | A1 * | 2/2004 | Peng | H01R 12/57 | 439/495 |
| 2006/0228952 | A1 | 10/2006 | Feldman et al. | | |
| 2007/0123089 | A1 * | 5/2007 | Nishio | H01R 13/639 | 439/342 |
| 2008/0020640 | A1 * | 1/2008 | Zhang | H01R 12/00 | 439/607.01 |
| 2009/0047839 | A1 * | 2/2009 | Wu | H01R 27/00 | 439/660 |
| 2009/0104796 | A1 * | 4/2009 | Yeh | H05K 7/1061 | 439/73 |
| 2010/0159728 | A1 * | 6/2010 | Wang | H01R 13/506 | 439/312 |
| 2011/0097932 | A1 * | 4/2011 | Aihara | H01R 13/4538 | 439/607.01 |
| 2015/0171536 | A1 * | 6/2015 | Kameda | H01R 12/774 | 439/329 |
| 2016/0198572 | A1 * | 7/2016 | Ishida | H01R 12/88 | 174/262 |
| 2019/0348784 | A1 * | 11/2019 | Yufu | H01R 13/6591 | |
| 2020/0067221 | A1 * | 2/2020 | Wang | H01R 13/502 | |
| 2021/0028572 | A1 * | 1/2021 | Little | H01R 12/71 | |
| 2021/0098915 | A1 * | 4/2021 | Tziviskos | H01R 12/79 | |
| 2022/0037834 | A1 | 2/2022 | Hsiao et al. | | |

FOREIGN PATENT DOCUMENTS

| | | | |
|---|---|---|---|
| JP | 2013125694 | A | 6/2013 |
| TW | M458696 | U | 8/2013 |
| TW | 202205748 | A | 2/2022 |

* cited by examiner

Prior Art

CONNECTOR WITH SUBSTRATE

CROSS-REFERENCE TO RELATED APPLICATION

The present application is based on and claims priority from Japanese Patent Application No. 2022-118179 filed on Jul. 25, 2022, the disclosure of which is hereby incorporated by reference herein in its entirety.

BACKGROUND OF THE INVENTION

Field of the Invention

The present invention relates to a connector with substrate.

Description of the Related Art

A connector of a compression type pressed against and connected to a connection target object such as a substrate has been publicly known. The structure of the connector of this type is disclosed in, for example, Japanese Patent Application Laid-Open No. 2000-12123 (Patent Literature 1). The connector of the compression type of the related art disclosed in Patent Literature 1 described below is configured as an electric connector (1) including a contact (20) including an elastic spring section (23) as shown in FIG. 113. In the electric connector (1), a plurality of contacts (20) are disposed in an arrayed state.

The contact (20) includes a substrate connecting section (22) solder-connected to a first circuit board (30) and a contact section (24) that is in contact with a second circuit board (40). The elastic spring section (23) having a spring property is provided between the substrate connecting section (22) and the contact section (24). The second circuit board (40) is pressed from the upward side of the contact (20) attached on the first circuit board (30) by solder-connection, whereby the elastic spring section (23) of the contact (20) exerts the spring property to generate a contact pressure between the second circuit board (40) and the contact (20). Note that reference numerals and signs concerning explanation of the related art document are distinguished from those in embodiments of the present invention by being parenthesized.

In the compression connector of the related art, screwing has been used for attachment (fixing) to the substrate.

However, when the compression connector is fixed to the substrate by the screwing, in general, a method of attaching nuts from a substrate surface on the opposite side of a connector mounting surface side on which the connector is mounted and tightening screws from the connector mounting surface side is adopted. In such a case of the related art, an operator needs to press the connector and the nuts with a hand or the like while tightening the screws. Thus, there is a problem that it is hard to do connector attaching (fixing) work. That is, since the nuts, which are separate components, are necessary besides the screws in a fixing structure for the compression connector and the substrate by the screwing of the related art, problems exist such as that the nuts are likely to be lost or work manhours increase.

That is, in the compression connector of the related art, it has been demanded to realize a configuration for performing secure attachment while improving workability of attachment in the attachment (fixing) to the substrate.

Accordingly, an object of the present invention is to realize a configuration with which, when a compression connector and a substrate are fixed, connector attaching (fixing) work is simple and the compression connector can be fixed to the substrate with a small motion.

SUMMARY OF THE INVENTION

A connector with substrate according to the present invention is a connector with substrate in which a connector of a compression type pressed against and connected to a connection target object and a substrate are attached via a cage, the connector with substrate including a compression connector including contacts that are in contact with the substrate, a housing to which the contacts are fixed, and a cover shell that covers an upper surface portion of the housing, wherein the compression connector is inserted into the cage fixed to the substrate, and a lock hole and a lock piece that enters the lock hole to fix a position of the compression connector with respect to the cage are formed in the compression connector or the cage.

That is, the connector with substrate according to the present invention includes a mechanism for attaching the connector of the compression type and the substrate via the cage. Since the cage can be attached on the substrate in advance, the cage is not dropped or lost unlike the screws and the nuts of the related art. In the connector with substrate according to the present invention, unlike with the related art, since a mechanism fixed by a latch is adopted, work manhours involving attachment are reduced and torque management for the screws is unnecessary. Further, in the related art, since the height of screw heads and a projection amount of screw distal ends and the nuts are present, apparatus dimensions are large. However, in the present invention, since the height of the connector upper surface and a projection amount from the substrate lower surface can be reduced, it is possible to achieve compactness of the entire apparatus.

In the connector with substrate according to the present invention, the lock hole can be formed in the cover shell included in the compression connector, in the cage, one or more pressing springs that press a top surface of the cover shell in a direction of the substrate can be present in a same direction as an arranging direction of the contacts, and one or more lock pieces that enter the lock hole formed in the cover shell to fix positions in a horizontal direction of the cage and the compression connector can be present in the cage.

In the connector with substrate according to the present invention, the cage can be formed from two members including a cage base and a cage cover, in the cage cover, one or more pressing springs that press a top surface of the cover shell in a direction of the substrate can be present in a same direction as an arranging direction of the contacts, the cage cover can rotate with respect to the cage base fixed to the substrate, and can include one or more lock pieces having a spring property that enter the lock hole formed in the cage base to fix the cage cover with respect to the cage base.

In the connector with substrate according to the present invention, the cage can include a cage top surface that receives contact reaction in a vertical direction applied from the compression connector in concert with the substrate and can include one or more lock holes that receive a lock claw formed in the lock piece included in the compression connector.

In the connector with substrate according to the present invention, the cage can include a bottom surface in which a hole for housing the contacts included in the compression connector is formed and include, on each of two surfaces erected in a third direction from the bottom surface, one or more lock holes that house a lock claw formed in each of a pair of lock pieces formed on two surface sides facing a first direction in the compression connector.

In the connector with substrate according to the present invention, the cage can be formed from two members including a cage base and a cage cover, and the cage cover can include a cage top surface that receives contact reaction in a vertical direction applied from the compression connector in concert with the substrate, a rotating section that rotates with respect to the cage base fixed to the substrate, and a lock hole that receives a lock claw formed in a lock piece included in the compression connector.

In the connector with substrate according to the present invention, the cage can include one or more lock holes that house a lock claw formed in a lock piece included in the compression connector.

In the connector with substrate according to the present invention, the cage can be formed from two members including a cage base and a cage cover, the cage base can be fixed to the substrate, the cage cover can rotate with respect to the cage base fixed to the substrate to be fixed to the cage base, and, in the cage cover, one or more pressing springs that press a top surface of the cover shell in a direction of the substrate can be present in a same direction as an arranging direction of the contacts and one or more lock holes into which a lock claw formed in a lock piece included in the cage base enters can be present.

In the connector with substrate according to the present invention, the compression connector can include a lock claw formed in a lock piece, the cage can include a lock hole in which the lock claw fits, and the fitting of the lock claw in the lock hole can be performed by sliding the compression connector in a first direction with respect to the cage.

Further, in the connector with substrate according to the present invention, the compression connector can include a bottom shell that covers a lower surface portion of the housing.

According to the present invention, it is possible to realize a structure in which, when the compression connector and the substrate are fixed, connector attaching (fixing) work is easy and the compression connector can be fixed to the substrate with a small motion. In particular, in the present invention, the compression connector only has to be installed with respect to the cage formed on the substrate in advance. Since a latch mechanism is adopted as attaching means, positioning and fixing are easy. Therefore, according to the present invention, it is possible to perform secure attachment while improving workability of attachment (fixing) of the compression connector to the substrate.

DETAILED DESCRIPTION OF THE PREFERRED EMBODIMENTS

Preferred embodiments for carrying out the present invention are explained below with reference to the drawings. Note that, in the figures, a first direction, a second direction, and a third direction are defined for convenience of explanation. In this specification, the first direction is the front-rear direction. In the figures, the front-rear direction is shown as an X direction. In particular, a forward direction is represented as a +X direction and a rearward direction is represented as a −X direction. In this specification, the second direction is the left-right direction. In the figures, the left-right direction is shown as a Y direction. In particular, the right direction is represented as a +Y direction and the left direction is represented as a −Y direction. Further, in this specification, the third direction is the up-down direction. In the figures, the up-down direction is shown as a Z direction. In particular, an upward direction is represented as +Z direction and a downward direction is represented as −Z direction. However, the X direction, which is the first direction, the Y direction, which is the second direction, and the Z direction, which is the third direction, defined in this specification do not limit directions at the time of use of connectors with substrate in the embodiments. The connectors with substrate in the embodiments can be used in all directions.

The embodiments described below do not limit the inventions according to the claims. Not all of combinations of characteristics explained in the embodiments are essential for the solution of the invention.

First Embodiment

Figure 1:
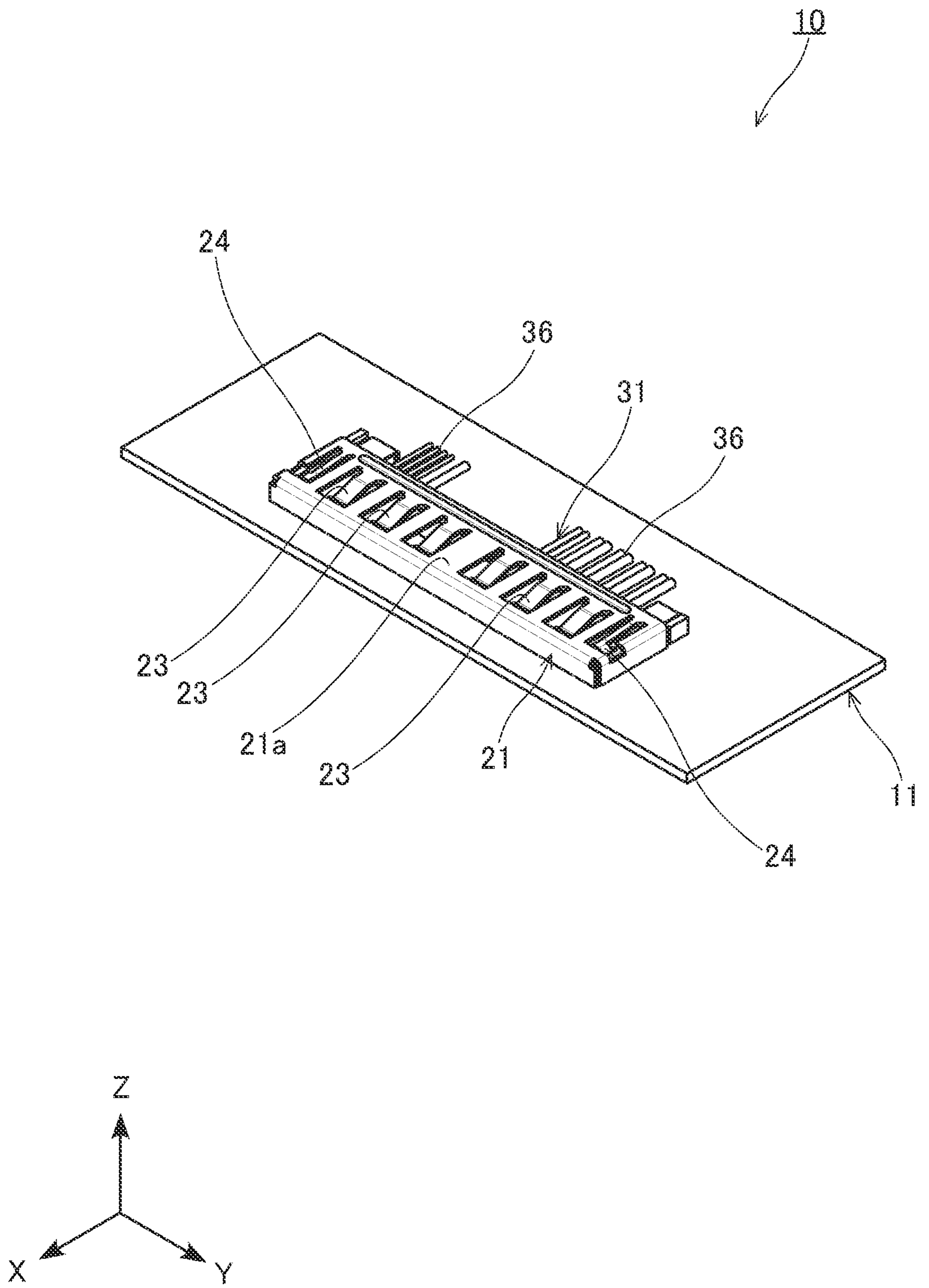
FIG. 1 is an exterior perspective view of a connector with substrate according to a first embodiment viewed from the front upper right.
Figure 2:
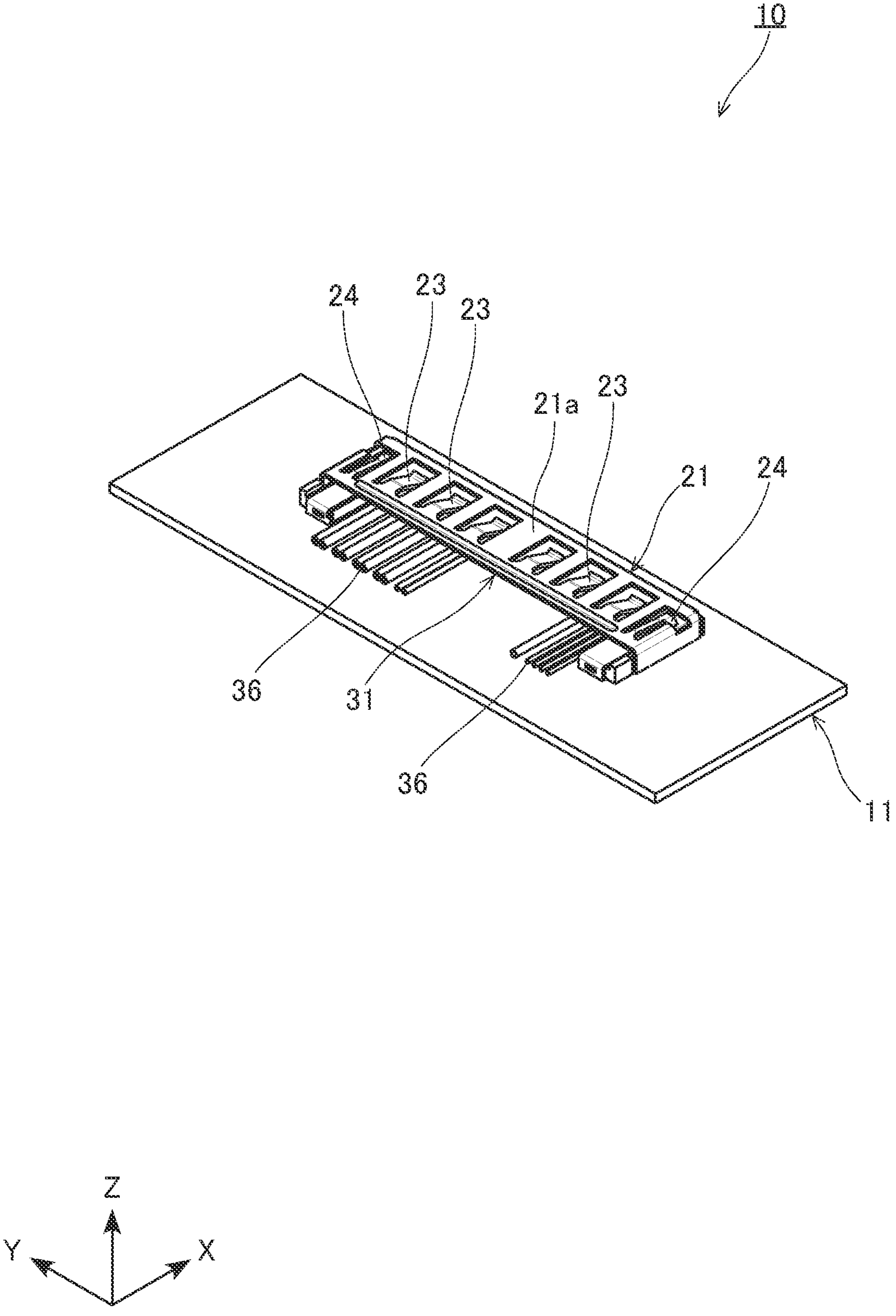
FIG. 2 is an exterior perspective view of the connector with substrate according to the first embodiment viewed from the rear upper left.

A configuration of a connector with substrate 10 according to a first embodiment is explained with reference to FIGS. 1 to 16. The connector with substrate 10 according to the first embodiment includes, as shown in FIGS. 1 to 3, a substrate 11, a cage 21 installed on the upper surface of the substrate 11, and a compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 3:
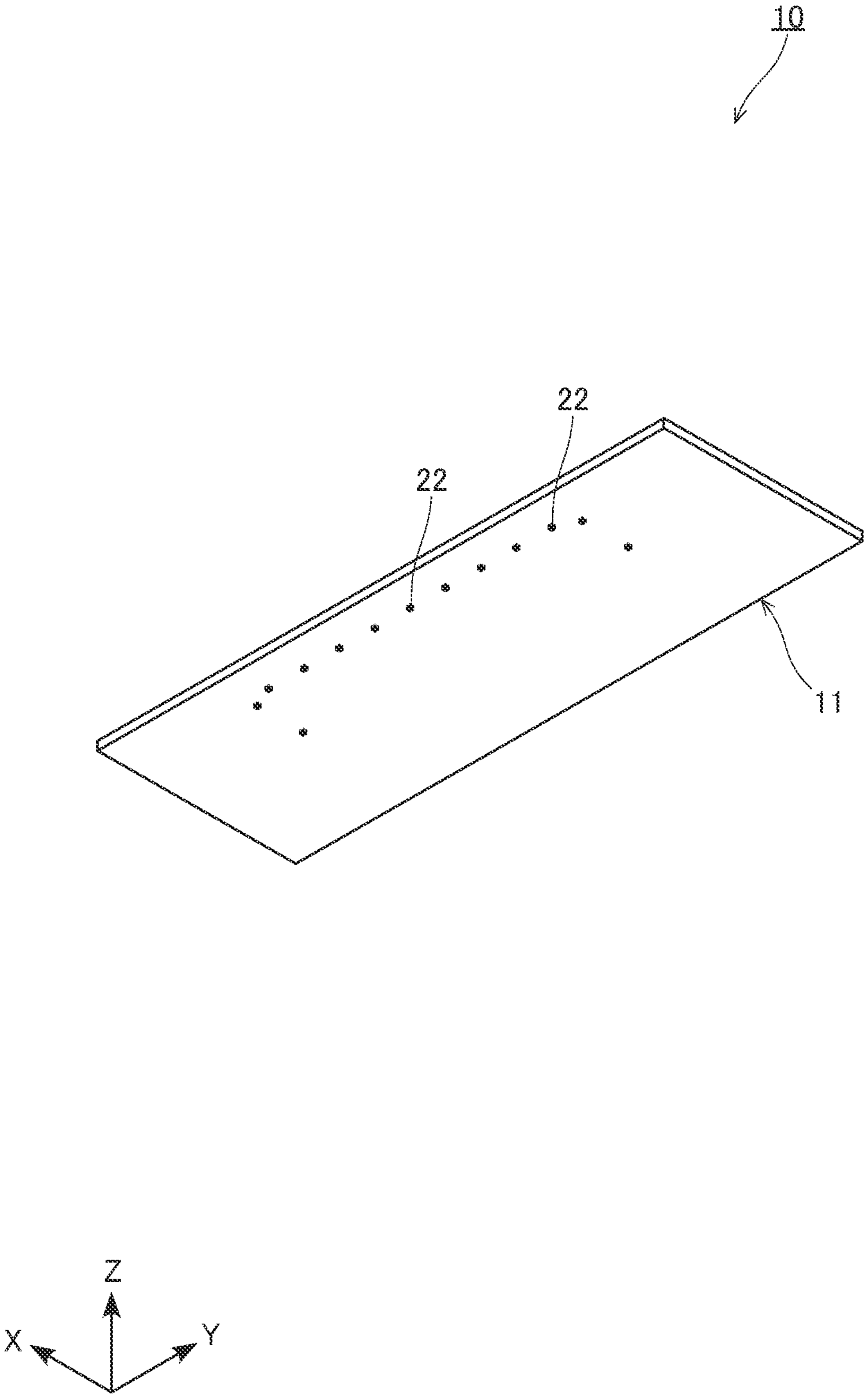
FIG. 3 is an exterior perspective view of the connector with substrate according to the first embodiment viewed from the front lower right.

A plurality of attachment holes (not shown) are formed in the substrate 11 (see FIG. 3). A plurality of leg sections 22 included in the cage 21 explained below are inserted into the plurality of (in the first embodiment, assumed to be thirteen) attachment holes (not shown) to fix the cage 21 to the substrate 11.

As shown in FIGS. 11 to 16, the cage 21 is a member formed by pressing and bending a flat metal plate material and includes a cage top surface 21*a* forming an upper surface and a vertical front surface 21*b*, a vertical right side surface 21*c*, and a vertical left side surface 21*d* formed as the vertical surface of the present invention by being bent vertically from the front and the left and right side surfaces of the cage top surface 21*a*. A region surrounded by the cage top surface 21*a*, the vertical front surface 21*b*, the vertical right side surface 21*c*, the vertical left side surface 21*d*, and the upper surface of the substrate 11 is a region where the compression connector 31 is housed and installed.

The plurality of (in the first embodiment, thirteen) leg sections 22 are formed on the lower end faces of the vertical front surface 21*b*, the vertical right side surface 21*c*, and the vertical left side surface 21*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. As a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

On the cage top surface 21*a*, a plurality of (in the first embodiment, six) pressing springs 23 curving in the direction of the substrate 11 and having a spring property are formed. When the compression connector 31 is not housed in the region surrounded by the cage top surface 21*a*, the vertical front surface 21*b*, the vertical right side surface 21*c*, and the vertical left side surface 21*d* configuring the cage 21 and the upper surface of the substrate 11, the pressing springs 23 are disposed to project into the region (see FIG. 14). When the compression connector 31 is inserted into and installed in the region surrounded by the cage top surface 21*a*, the vertical front surface 21*b*, the vertical right side surface 21*c*, and the vertical left side surface 21*d* configuring the cage 21 and the upper surface of the substrate 11, the pressing springs 23 can press a top surface 34*a* of a cover shell 34 configuring the upper surface side of the compression connector 31 in the direction of the substrate 11. Since the six pressing springs 23 included in the cage 21 in the first embodiment are formed side by side in the left-right direction of the cage top surface 21*a*, the six pressing springs 23 can press the entire region of the top surface 34*a* of the cover shell 34 configuring the upper surface side of the compression connector 31 explained below.

Further, in the positions of the left and right ends of the cage top surface 21*a*, one lock piece 24 on each of the left and the right, that is, two lock pieces 24 in total that enter lock holes 37 formed in the cover shell 34 configuring the upper surface side of the compression connector 31 explained below to restrict movement in the horizontal direction of the cage 21 and the compression connector 31 are formed.

Figure 16:
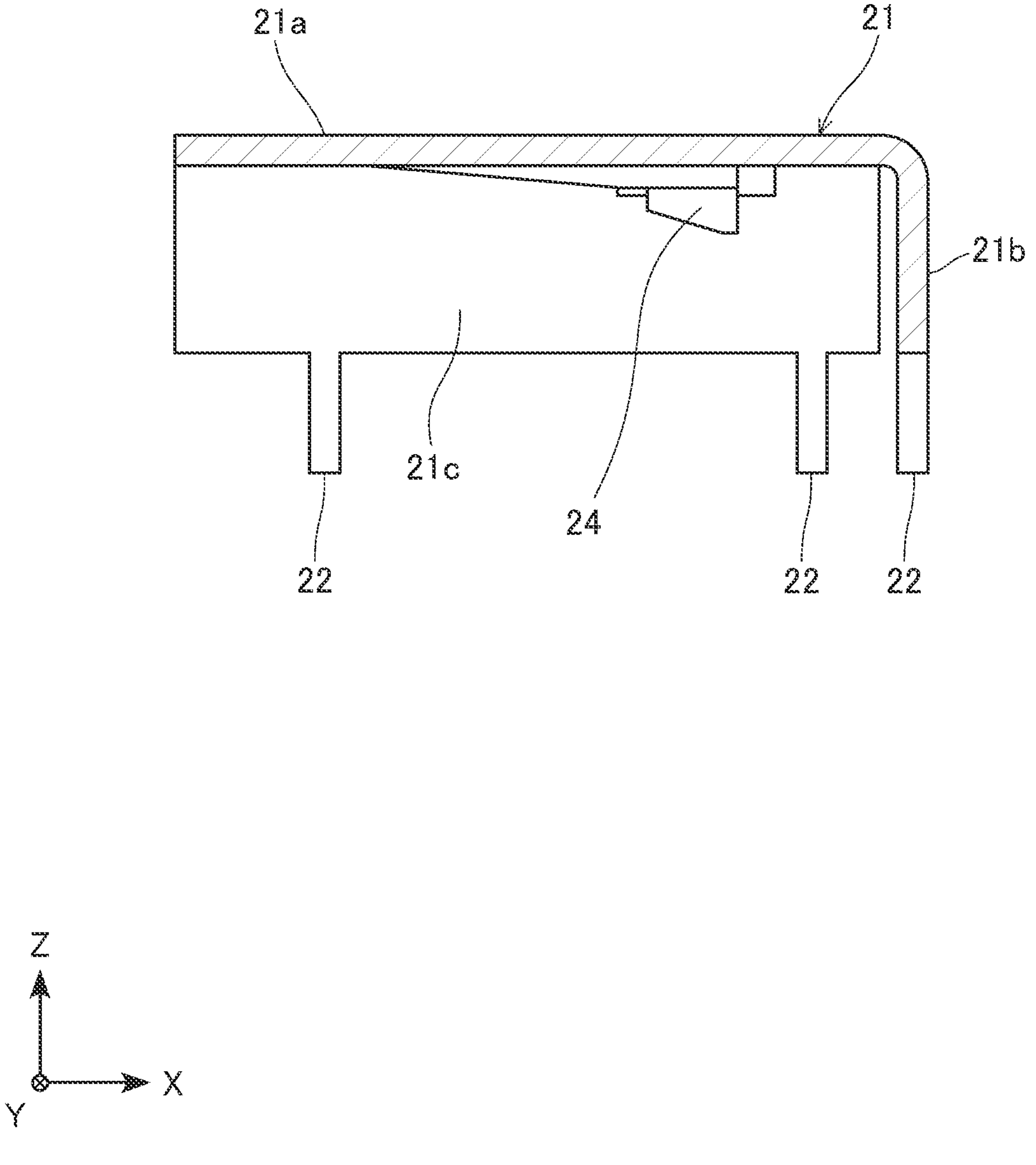
FIG. 16 is a longitudinal sectional view taken along line 16-16 in FIG. 13.

As shown in FIG. 16 more in detail, the lock pieces 24 have an exterior shape having a slope shape in a side view and are formed to gradually change to a wedge shape having a slope projecting to the substrate 11 side from an opened rear side toward the vertical front surface 21*b* in the cage 21. The wedge shape of the lock pieces 24 is a shape for not hindering an inserting motion of the compression connector 31 inserted from the rear side of the cage 21 toward the front and is a shape for gradually lifting the lock pieces 24 upward when the compression connector 31 is inserted into the inside of the cage 21. Further, when the lock pieces 24 fit in the lock holes 37 formed in the cover shell 34 configuring the upper surface side of the compression connector 31 explained below, the lock pieces 24 exert a function of slip-off prevention for preventing the compression connector 31 from slipping off the cage 21.

The compression connector 31 includes, as shown in FIGS. 6 to 10, contacts 32 that are in contact with the substrate 11, a housing 33 to which the contacts 32 are fixed, a cover shell 34 that covers the upper surface portion of the housing 33, and a bottom shell 35 that covers the lower surface portion of the housing 33.

Figure 7:
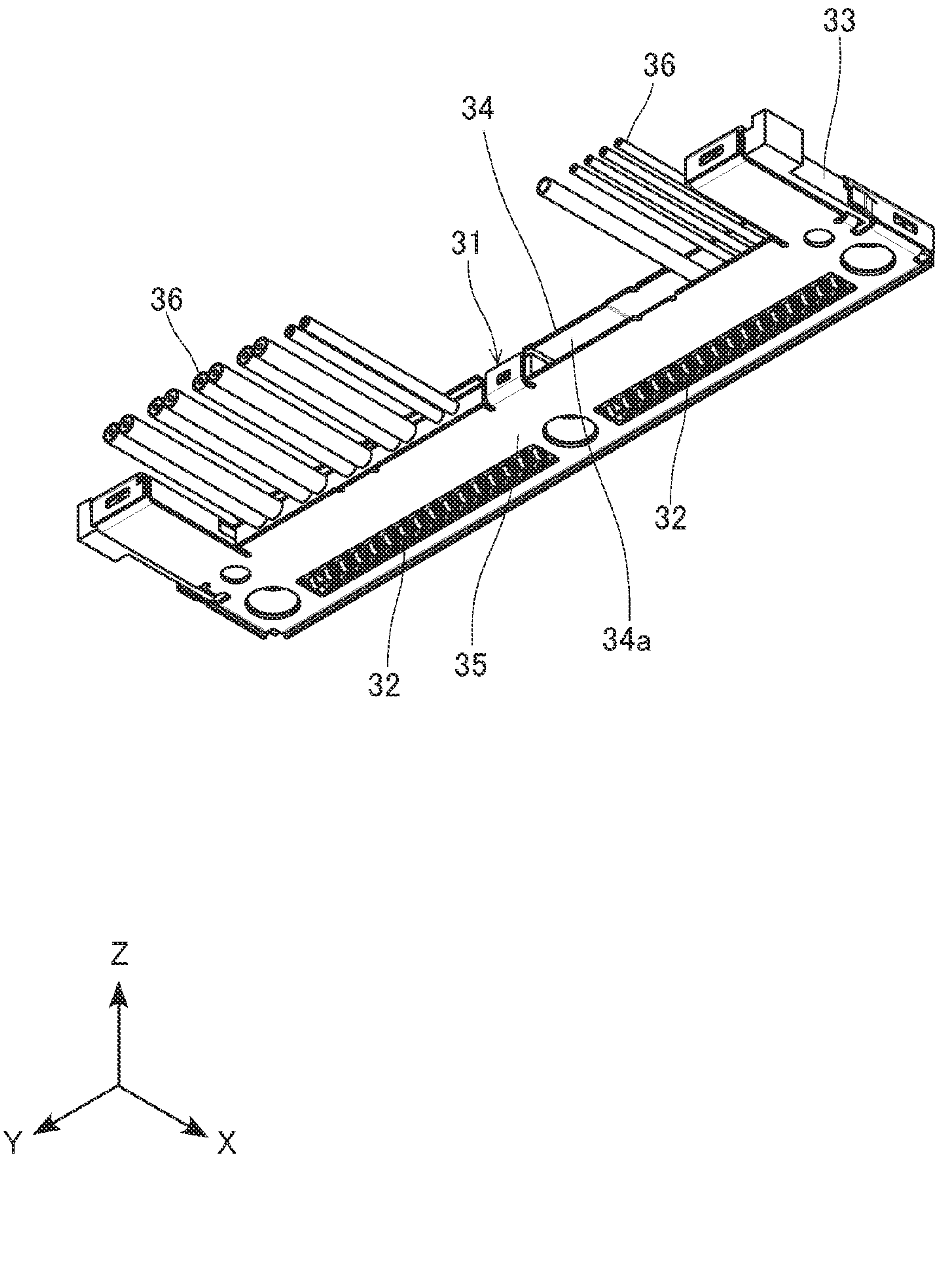
FIG. 7 is an exterior perspective view of the compression connector according to the first embodiment viewed from the rear lower left.
Figure 8:
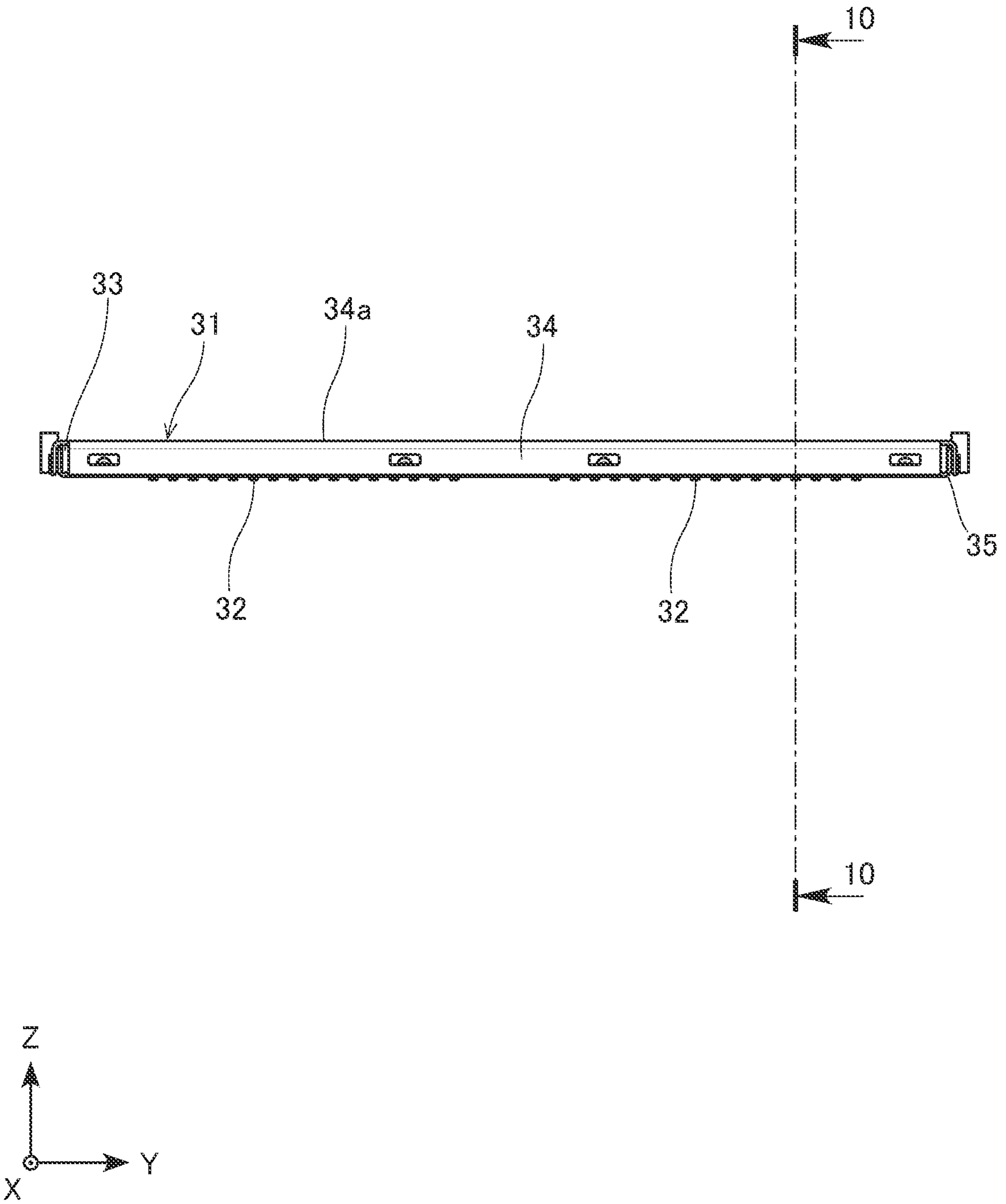
FIG. 8 is a front view of the compression connector according to the first embodiment.
Figure 9:
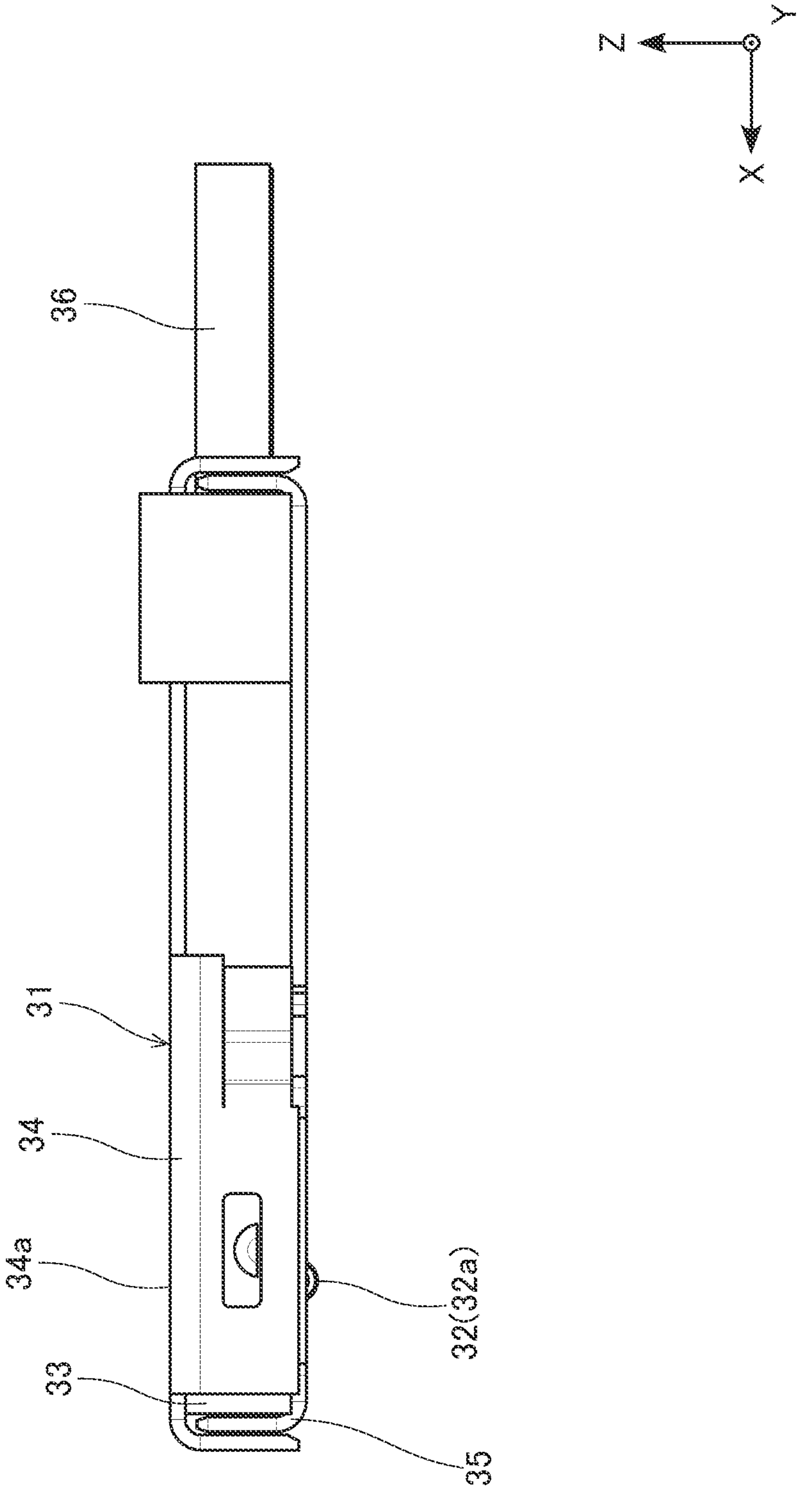
FIG. 9 is a right side view of the compression connector according to the first embodiment.

As shown in, in particular, FIGS. 7 and 8, a plurality of contacts 32 are disposed to be laterally arranged in the left-right direction.

Figure 10:
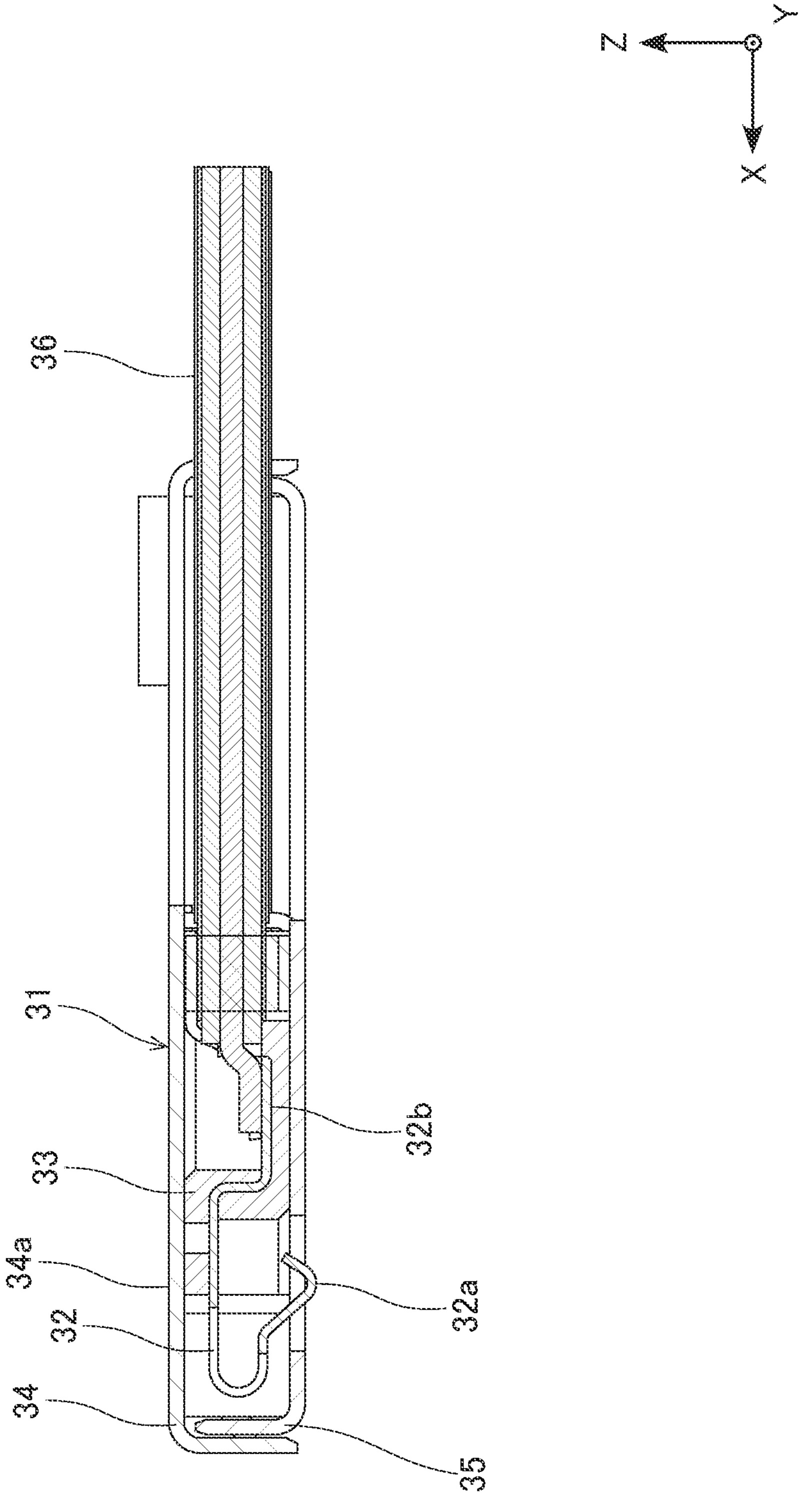
FIG. 10 is a longitudinal sectional view taken along line 10-10 in FIG. 8.
Figure 11:
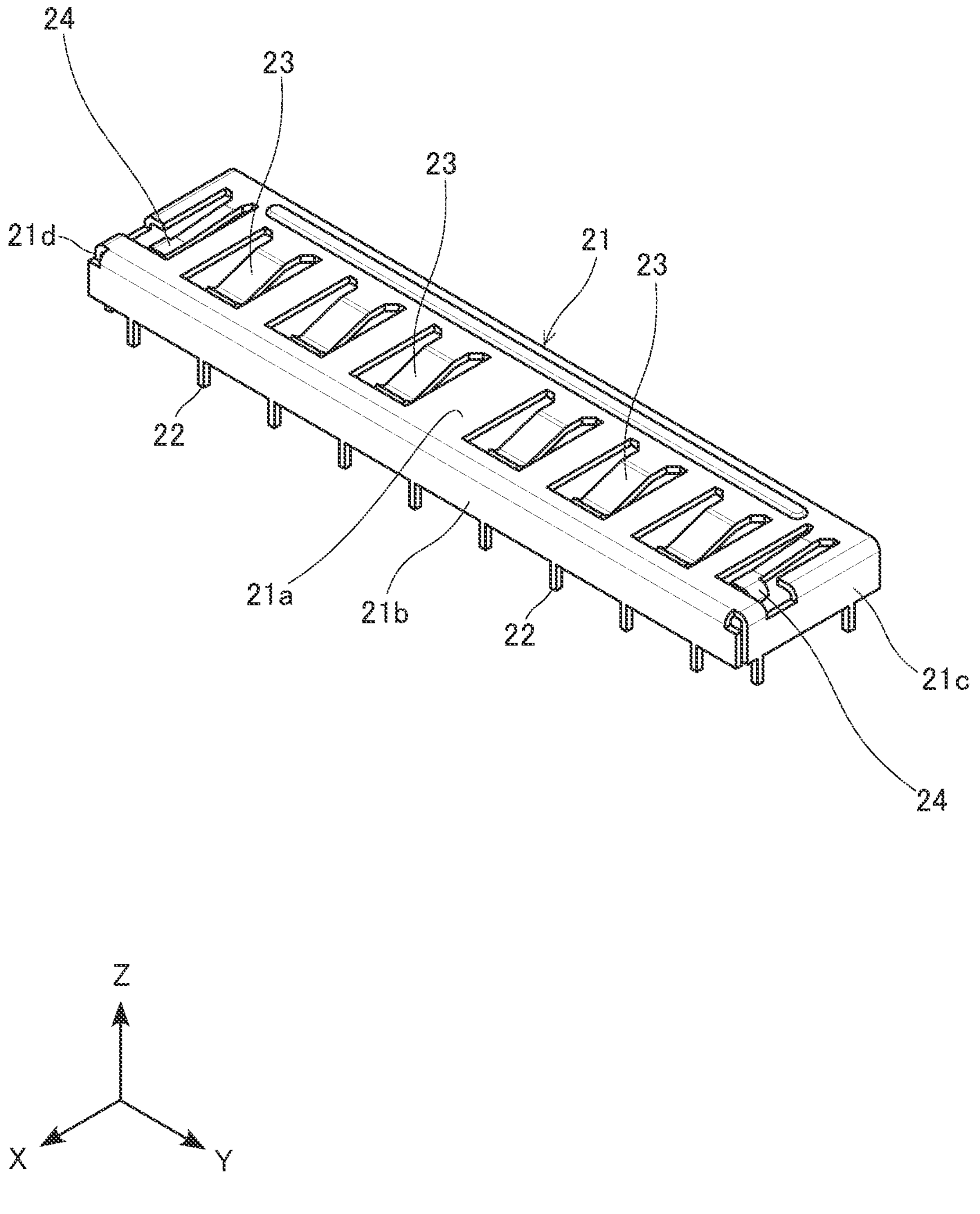
FIG. 11 is an exterior perspective view of the cage included in the connector with substrate according to the first embodiment viewed from the front upper right.
Figure 12:
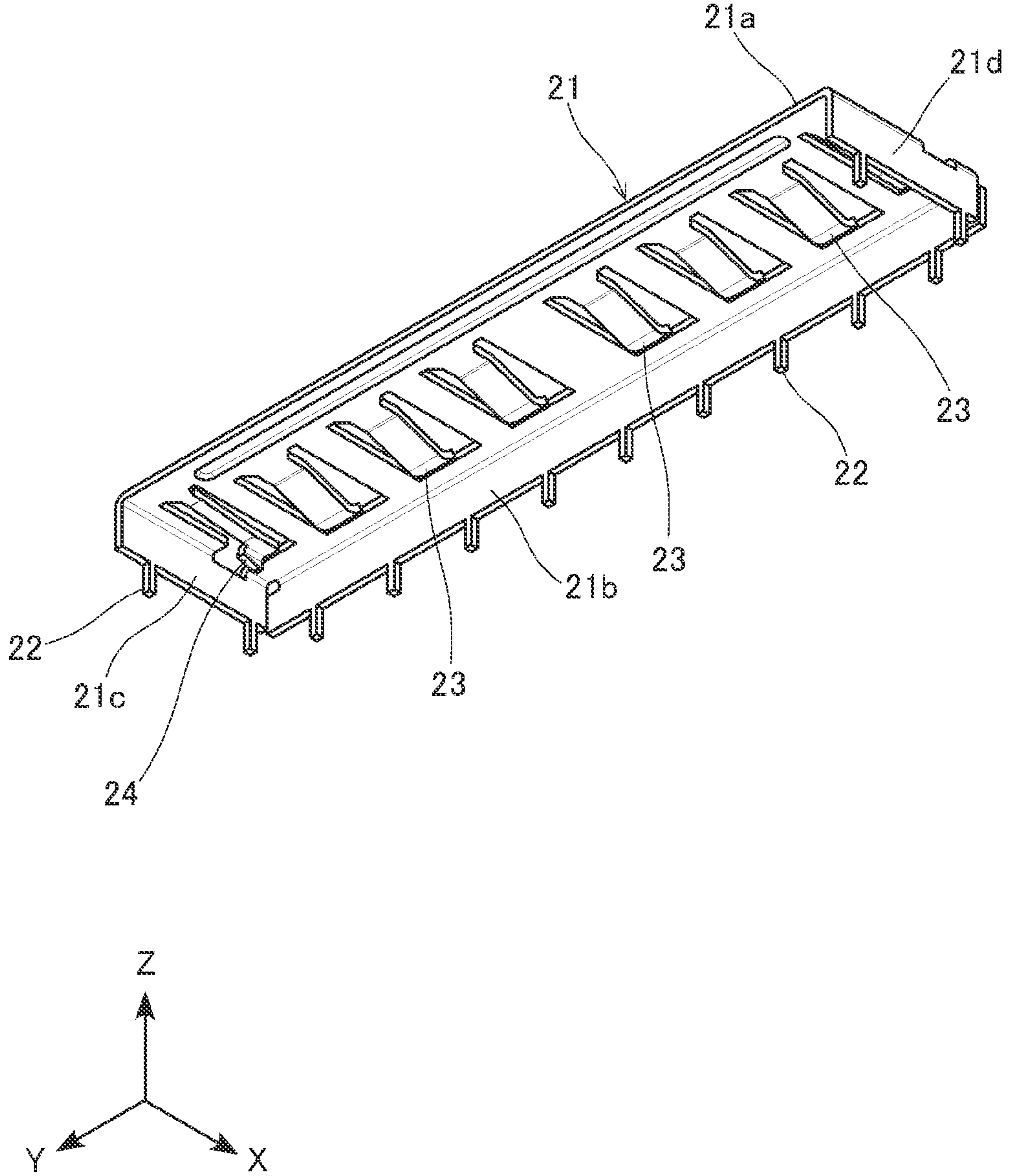
FIG. 12 is an exterior perspective view of the cage included in the connector with substrate according to the first embodiment viewed from the rear lower left.
Figure 13:
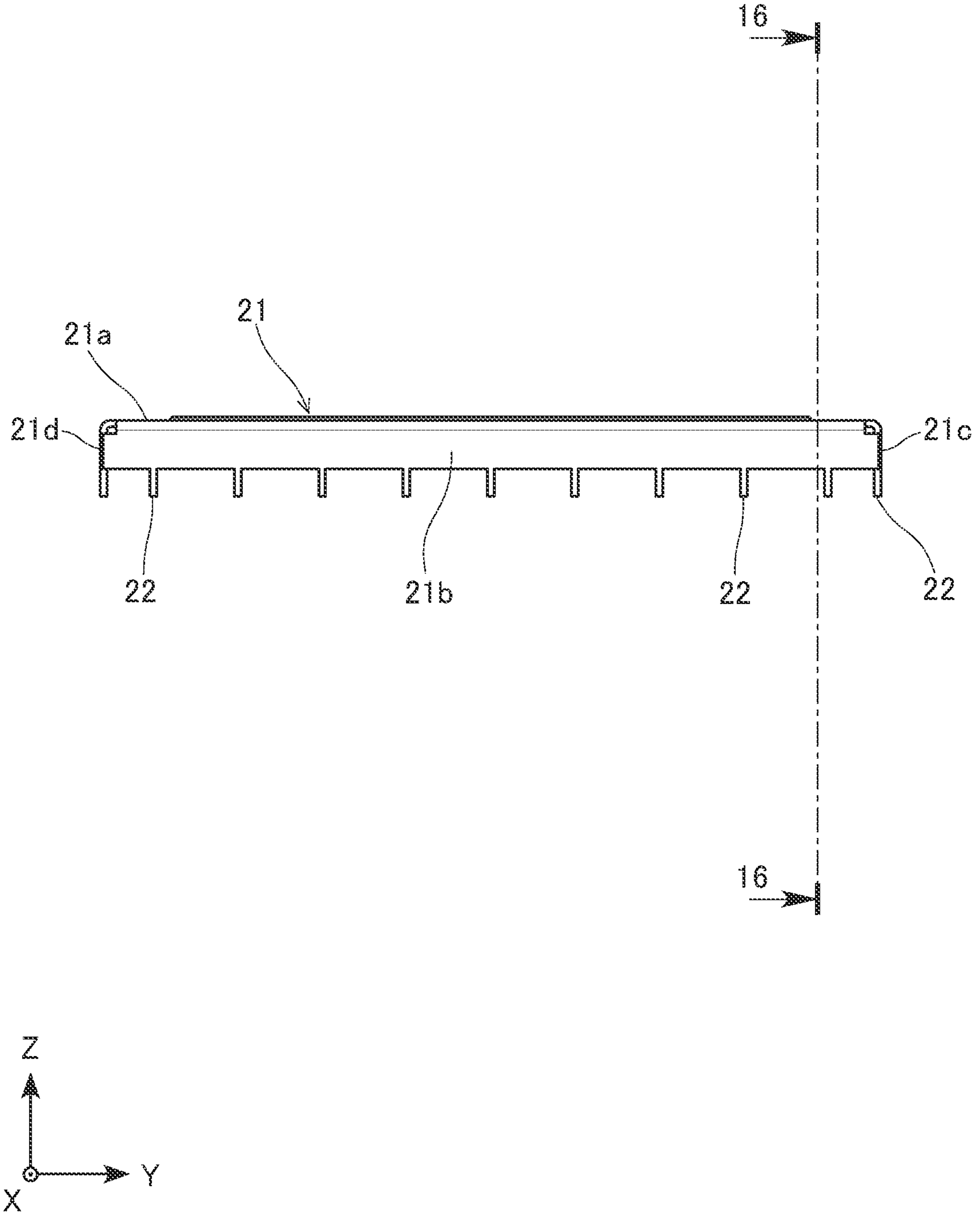
FIG. 13 is a front view of the cage included in the connector with substrate according to the first embodiment.
Figure 14:
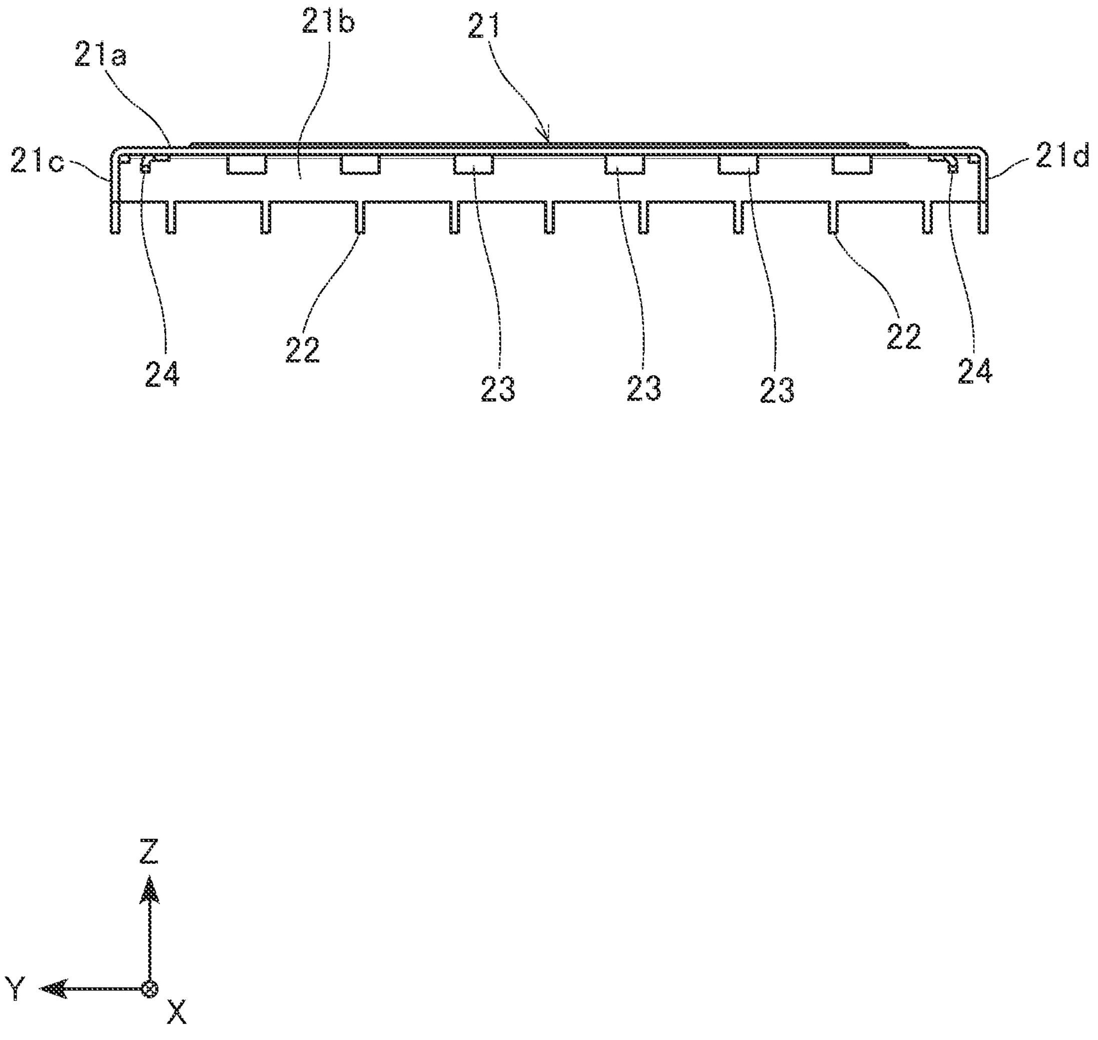
FIG. 14 is a rear view of the cage included in the connector with substrate according to the first embodiment.
Figure 15:
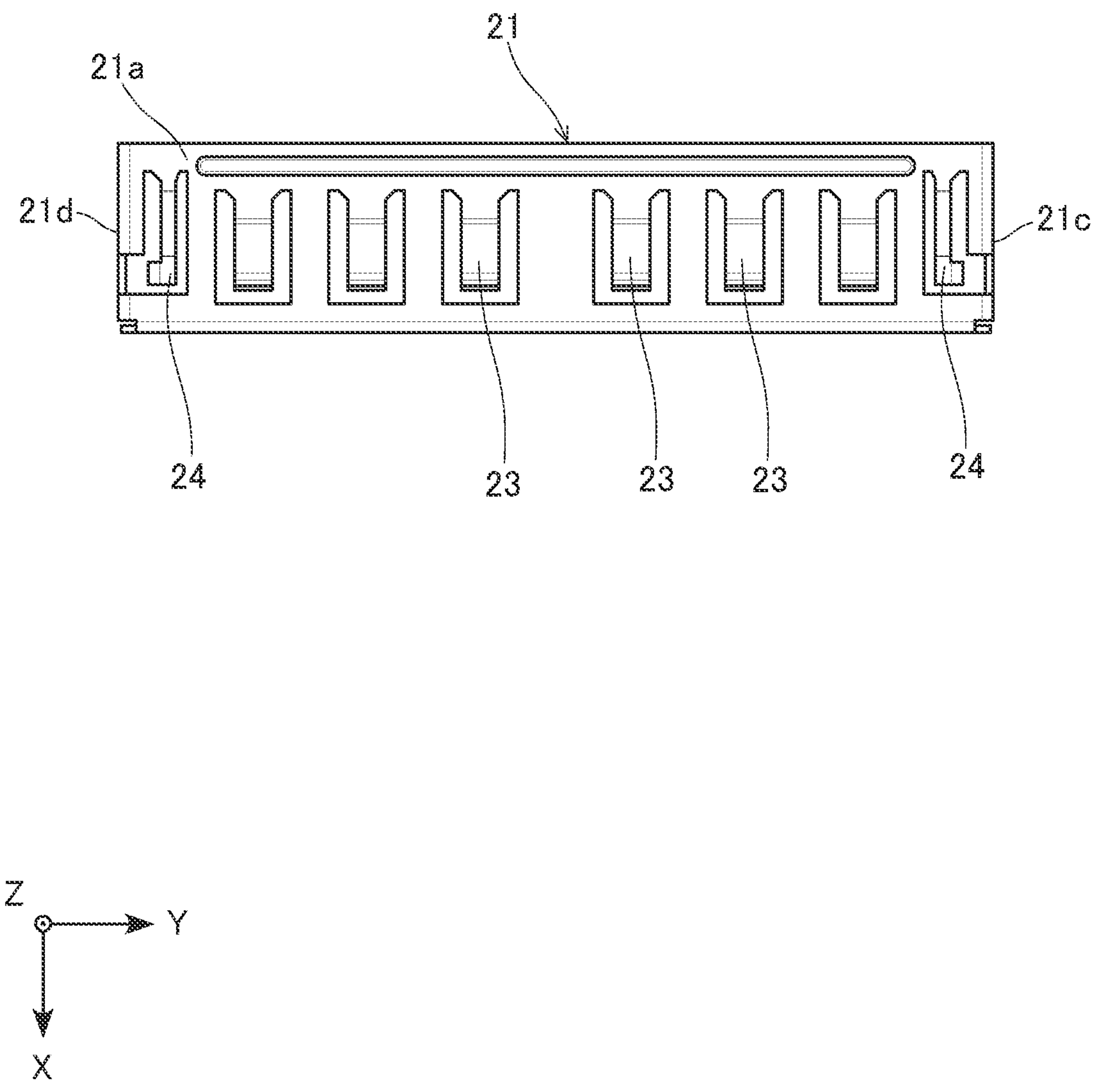
FIG. 15 is a top view of the cage included in the connector with substrate according to the first embodiment.

Each of the plurality of contacts 32 is fixed to the housing 33 as shown in FIG. 10. A front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 10). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, a rear end portion 32*b* of the contact 32 has a linear shape extending straight. As shown in FIG. 10, an electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

The lock holes 37 are formed at both the left and right ends of the top surface 34*a* of the cover shell 34 that covers the upper surface portion of the housing 33. Two lock holes 37 in total are formed one each at the left and right ends of the top surface 34*a* of the cover shell 34. The lock holes 37 are formed to, when the compression connector 31 is inserted into the inside of the cage 21, correspond to the positions where the lock pieces 24 are formed. Therefore, the lock pieces 24 are configured to be able to fit in the lock holes 37.

Note that, concerning the members configuring the compression connector 31 in the first embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 10 according to the first embodiment is explained above. Subsequently, a method of attaching the compression connector 31 to and a method of detaching the compression connector 31 from the substrate 11 attached with the cage 21 configuring the connector with substrate 10 according to the first embodiment are explained.

Figure 4:
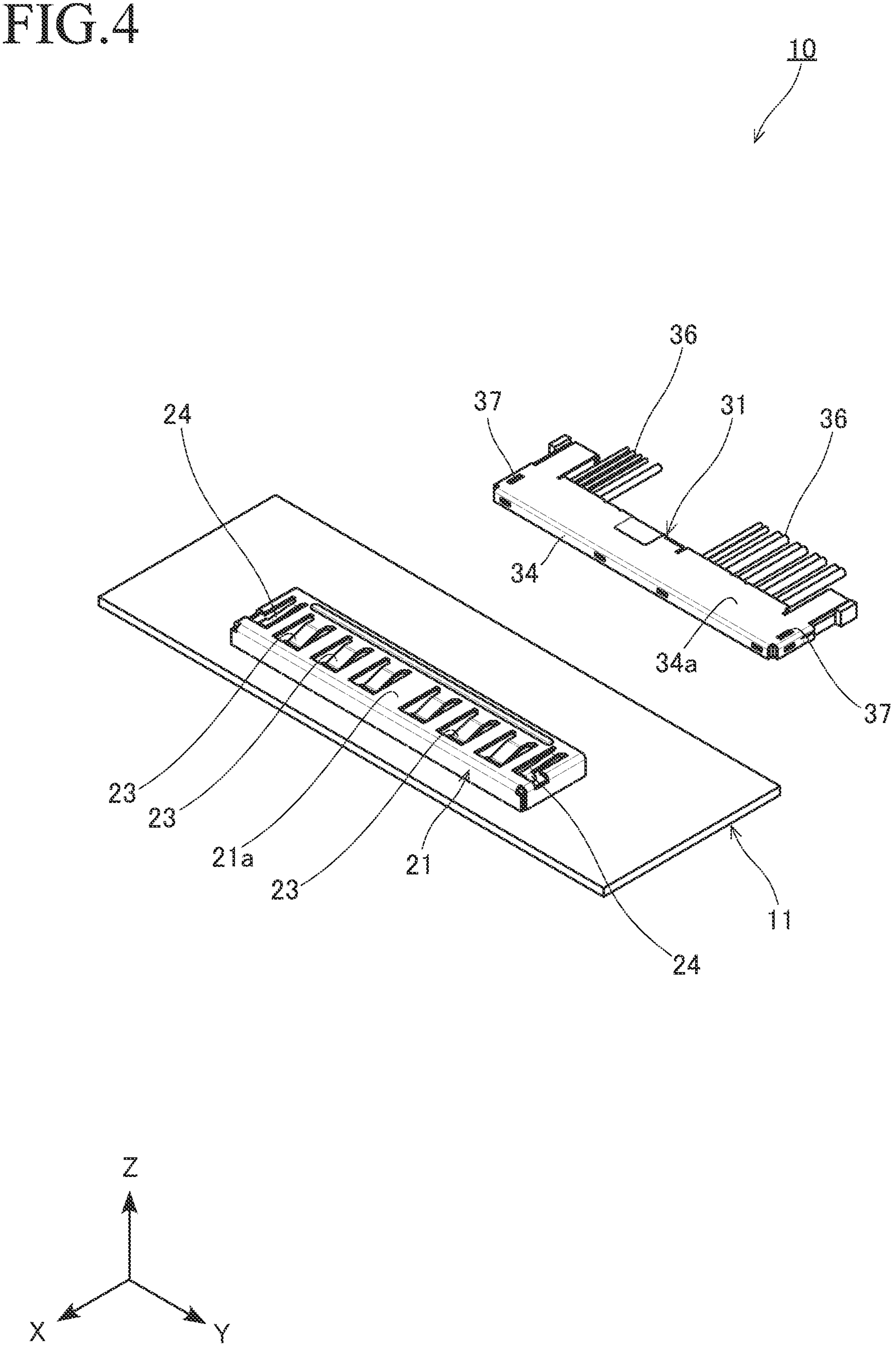
FIG. 4 is an exterior perspective view of a state in which a compression connector is detached from a substrate attached with a cage in the connector with substrate according to the first embodiment, the state being viewed from the front upper right.
Figure 5:
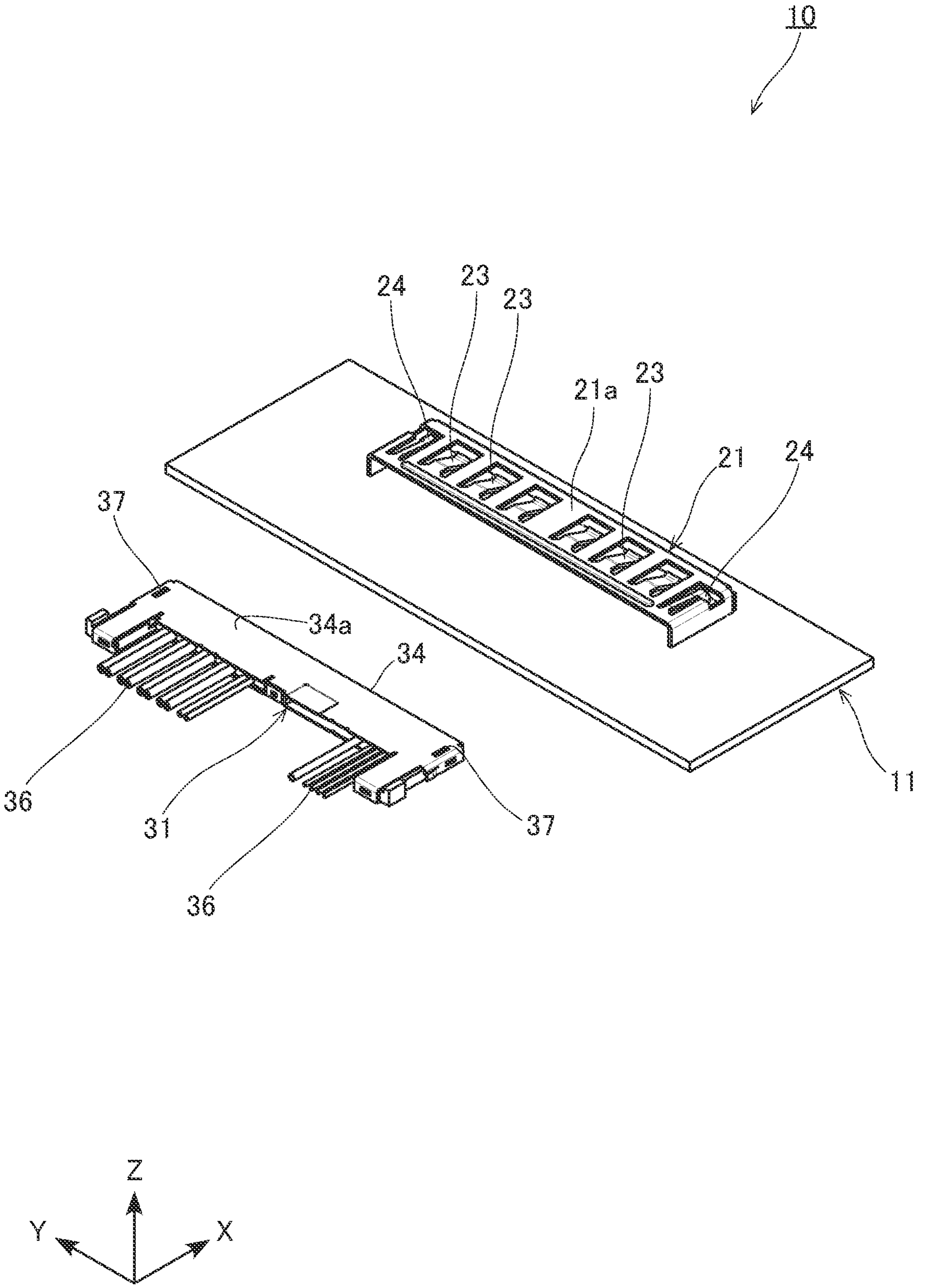
FIG. 5 is an exterior perspective view of the state in which the compression connector is detached from the substrate attached with the cage in the connector with substrate according to the first embodiment, the state being viewed from the rear upper left.
Figure 6:
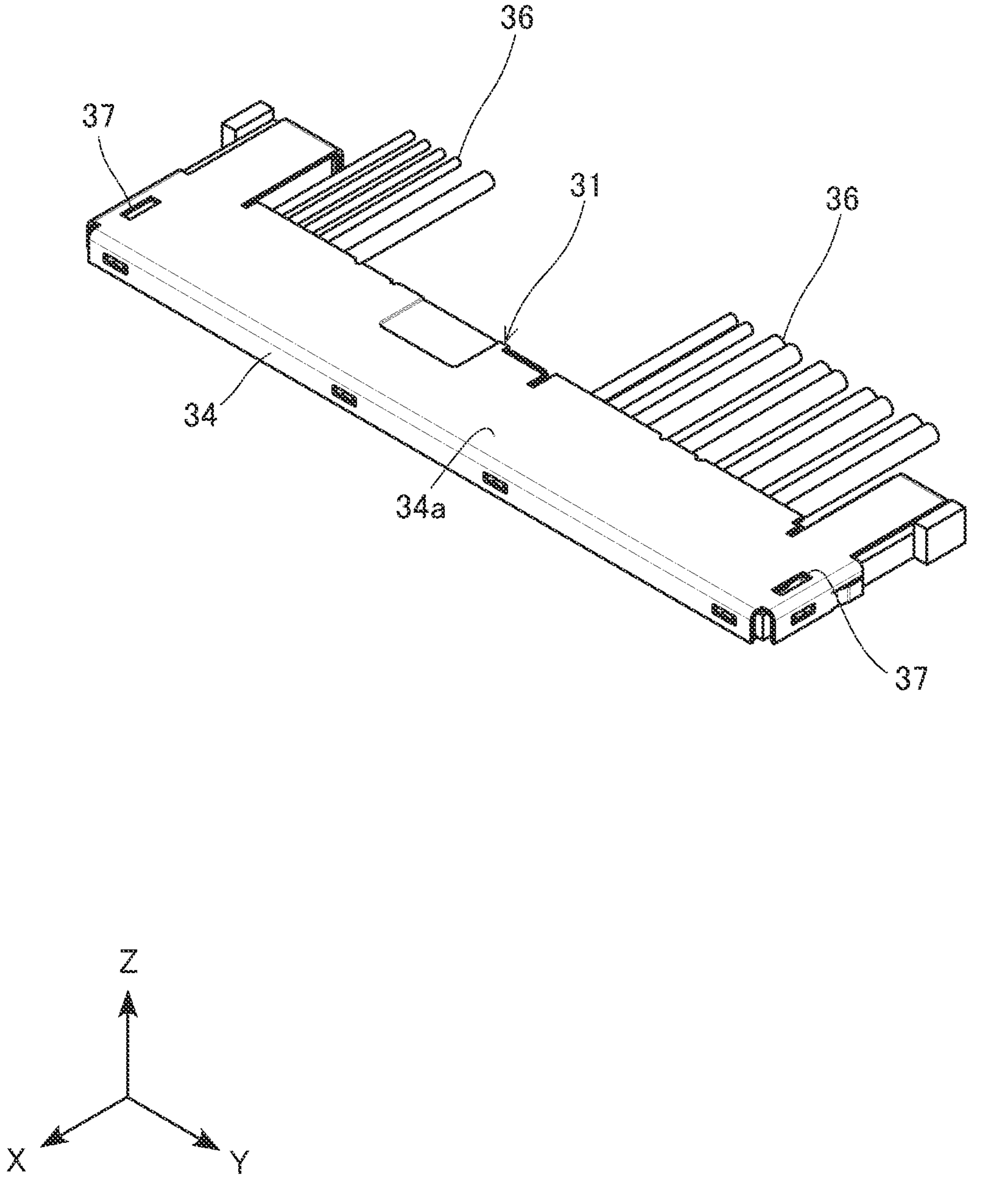
FIG. 6 is an exterior perspective view of the compression connector according to the first embodiment viewed from the front upper right.

When the compression connector 31 is attached to the substrate 11 attached with the cage 21, the compression connector 31 is moved in the horizontal direction to be directed in the forward direction (the +X direction) from a state shown in FIGS. 4 and 5. When the compression connector 31 is inserted into the cage 21, the compression connector 31 is inserted into the region surrounded by the cage top surface 21*a*, the vertical front surface 21*b*, the vertical right side surface 21*c*, and the vertical left side surface 21*d* configuring the cage 21 and the upper surface of the substrate 11 while pushing up the protrudingly arranged six pressing springs 23 in the upward direction (the +Z direction). Therefore, since force based on the spring elasticity exerted by the six pressing springs 23 acts in the downward direction (the −Z direction), the six pressing springs 23 press the top surface 34*a* of the cover shell 34 configuring the upper surface side of the compression connector 31 in the direction of the substrate 11.

At this time, the compression connector 31 inserted into the substrate 11 attached with the cage 21 applies, to the substrate 11, contact reaction in the vertical direction applied by the plurality of contacts 32 included in the compression connector 31. However, the contact reaction in the vertical direction applied by the plurality of contacts 32 is offset by force based on the spring elasticity exerted by the six pressing springs 23 and is received by, in particular, the cage top surface 21*a* configuring the upper surface of the cage 21 in the cage 21 that houses the compression connector 31. Therefore, the stable fixed state of the compression connector 31 to the substrate 11 is maintained.

Note that the six pressing springs 23 included in the cage 21 in the first embodiment are formed side by side in the left-right direction of the cage top surface 21*a*. This disposition configuration is the same direction as the arranging direction of the plurality of contacts 32. Therefore, since the six pressing springs 23 can exert the force based on the spring elasticity uniformly against the contact reaction applied from the plurality of contacts 32, it is possible to suitably press the entire region of the top surface 34*a* of the cover shell 34 configuring the upper surface side of the compression connector 31.

Further, when the compression connector 31 is horizontally moved in the forward direction (the +X direction) with respect to the substrate 11 attached with the cage 21, the two lock pieces 24 formed in the positions of the left and right ends of the cage top surface 21*a* are gradually lifted upward by the action of the wedge shape. When the compression connector 31 is further inserted, the lock pieces 24 fit in the lock holes 37 formed in the cover shell 34 configuring the upper surface side of the compression connector 31. When the lock pieces 24 fit in the lock holes 37, the lock pieces 24 exert the function of the slip-off prevention for preventing the compression connector 31 from slipping off the cage 21. Therefore, fixing of the position of the compression connector 31 with respect to the cage 21 is realized.

On the other hand, when the compression connector 31 is detached from the substrate 11 attached with the cage 21, a user only has to horizontally move the compression connector 31 in the rearward direction (the −X direction) in a state in which the two lock pieces 24 formed in the positions of the left and right ends of the cage top surface 21*a* is lifted. In this case, the function of the slip-off prevention for the compression connector 31 by the lock pieces 24 is released and the contact reaction in the vertical direction applied by the plurality of contacts 32 included in the compression connector 31 is offset by the force based on the spring elasticity exerted by the six pressing springs 23 formed on the cage top surface 21*a* of the cage 21. Therefore, it is possible to easily horizontally move the compression connector 31 in the rearward direction (the −X direction). By horizontally moving the compression connector 31 in the rearward direction (the −X direction) in this way and completely pulling out the compression connector 31 from the substrate 11 attached with the cage 21, it is possible to detach the compression connector 31 from the substrate 11 attached with the cage 21.

As explained above, in the connector with substrate 10 according to the first embodiment, the lock holes 37 formed in the cover shell 34 configuring the upper surface side of the compression connector 31 and the lock pieces 24 formed in the positions of the left and right ends of the cage top surface 21*a* configuring the cage 21 are formed and the lock pieces 24 enter the lock holes 37. Therefore, it is possible to fix the position in the horizontal direction of the compression connector 31 with respect to the cage 21. Since the plurality of pressing springs 23 that press the top surface 34*a* of the cover shell 34 in the direction of the substrate 11 are formed in the same direction as the arranging direction of the contacts 32, when the compression connector 31 is inserted into and installed in the region surrounded by the cage top surface 21*a*, the vertical front surface 21*b*, the vertical right side surface 21*c*, and the vertical left side surface 21*d* configuring the cage 21 and the upper surface of the substrate 11, the pressing springs 23 can press the entire region of the top surface 34*a* of the cover shell 34 configuring the upper surface side of the compression connector 31 in the direction of the substrate 11. Therefore, a stable fixed state of the compression connector 31 to the substrate 11 is maintained. That is, with the connector with substrate 10 according to the first embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the first embodiment. Various changes or improvements can be added to the first embodiment.

For example, in the first embodiment explained above, as an example, the six pressing springs 23 are formed in the cage top surface 21*a* configuring the cage 21. However, as the number of pressing springs according to the present invention, any number can be selected if the number is equal to or larger than one.

For example, in the first embodiment explained above, as an example, the two lock holes 37 are formed in the cover shell 34 configuring the upper surface side of the compression connector 31 and the two lock pieces 24 in total are formed one each in the positions of the left and right ends of the cage top surface 21*a* configuring the cage 21. However, positions where the lock hole and the lock piece according to the present invention are formed may be opposite. That is, the lock hole may be formed on the cage side and the lock piece may be formed on the compression connector side. Further, the number of each of lock holes and lock pieces according to the present invention can be optionally selected if the number is equal to or larger than one.

The configuration of the connector with substrate 10 according to the first embodiment is explained above with reference to FIGS. 1 to 16. Subsequently, a connector with substrate 100 according to a second embodiment, which is another form example that the connector with substrate according to the present invention can take, is explained with reference to FIGS. 17 to 25A and 25B. Note that, in the following explanation, members that are the same as or similar to the members explained in the first embodiment above are denoted by the same reference numerals and signs and explanation of the members is sometimes omitted.

Second Embodiment

Figure 17:
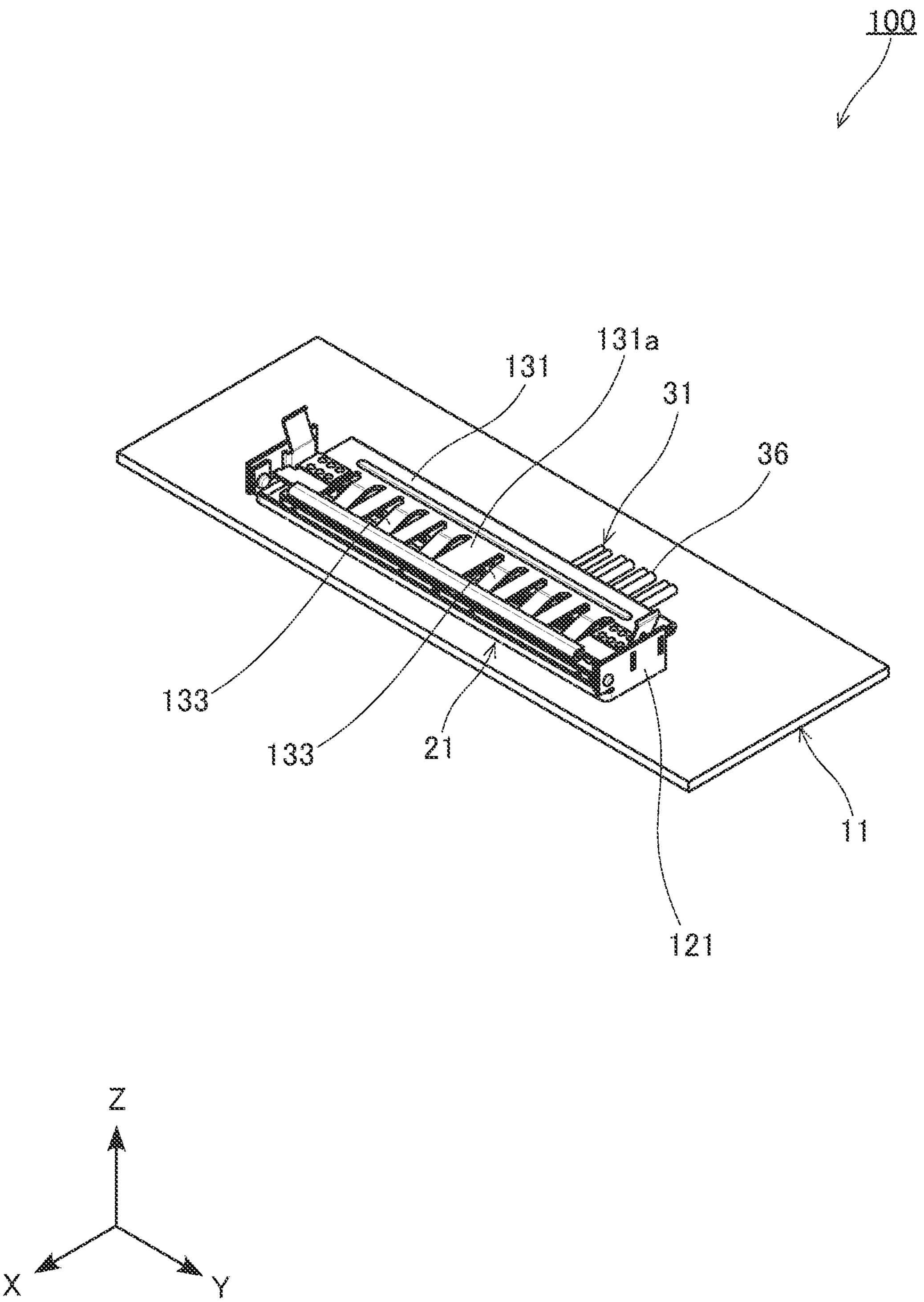
FIG. 17 is an exterior perspective view of a connector with substrate according to a second embodiment viewed from the front upper right.
Figure 18:
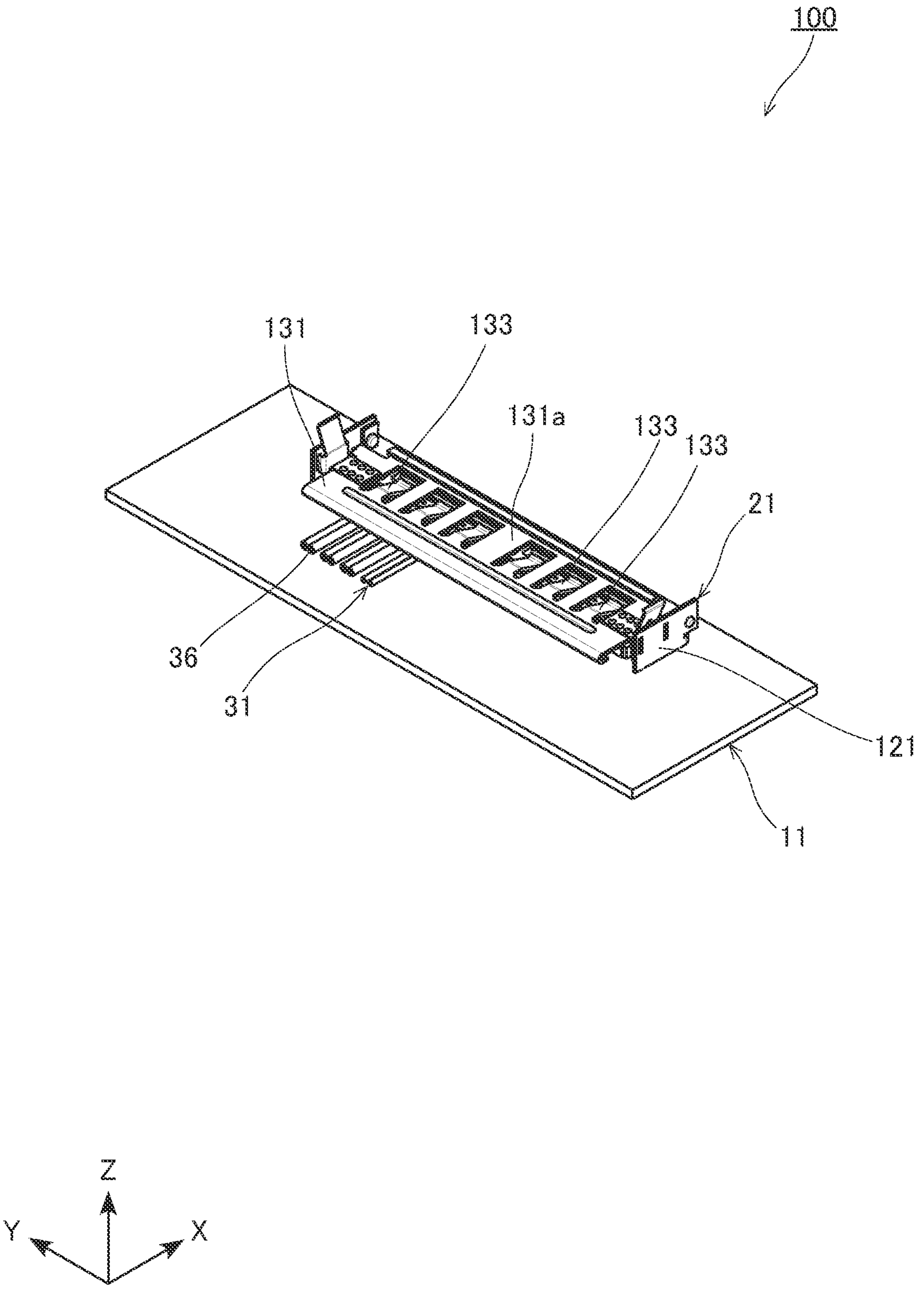
FIG. 18 is an exterior perspective view of the connector with substrate according to the second embodiment viewed from the rear upper left.

A configuration of the connector with substrate 100 according to the second embodiment is explained with reference to FIGS. 17 to 25A and 25B. The connector with substrate 100 according to the second embodiment includes, as shown in FIGS. 17 to 19, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 19:
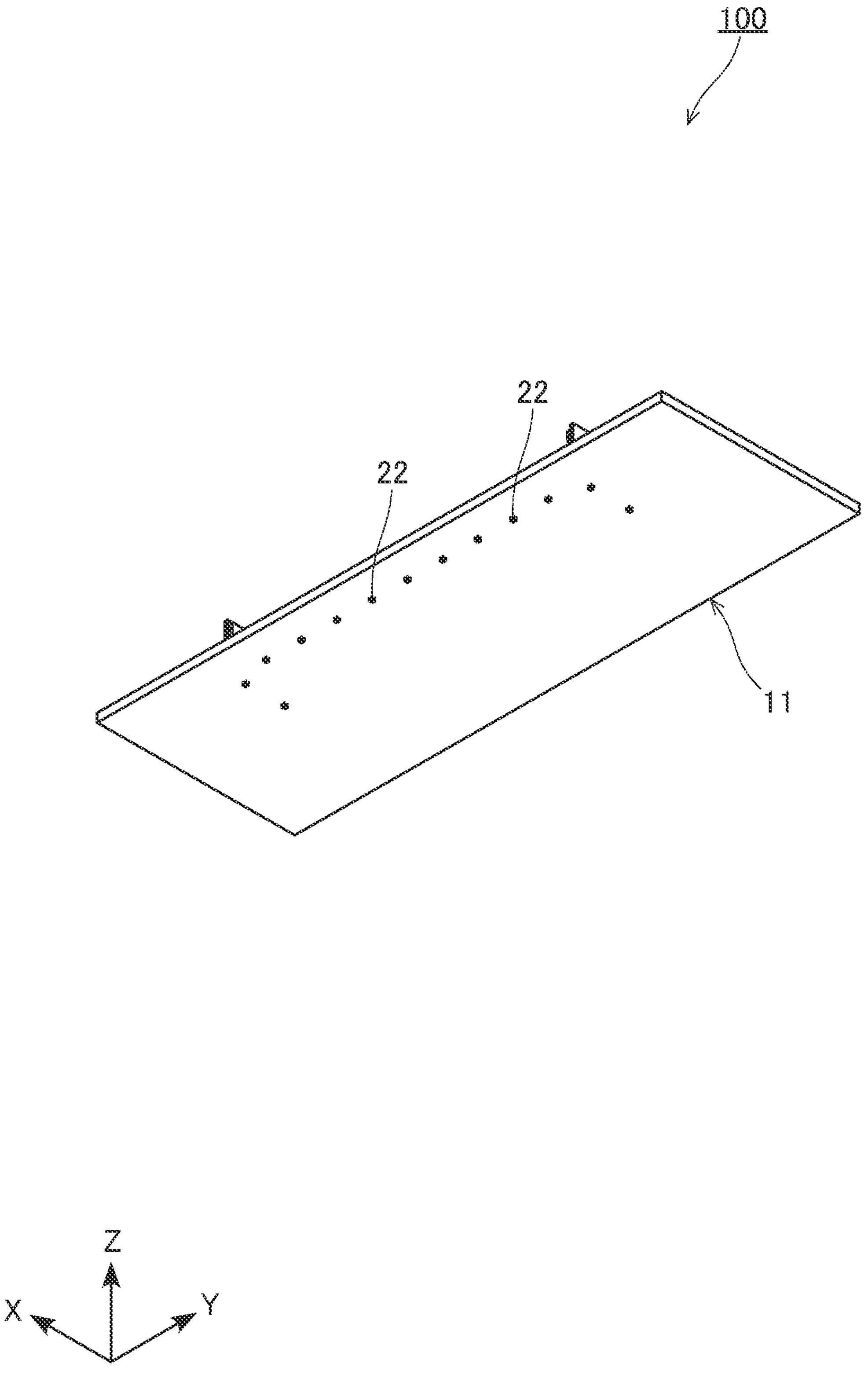
FIG. 19 is an exterior perspective view of the connector with substrate according to the second embodiment viewed from the front lower right.

A plurality of attachment holes (not shown) are formed in the substrate 11 (see FIG. 19). The plurality of leg sections 22 included in the cage 21 explained below are inserted into the plurality of (in the second embodiment, assumed to be thirteen) attachment holes (not shown) to fix the cage 21 to the substrate 11.

As shown in FIGS. 22 to 25A and 25B, the cage 21 according to the second embodiment is configured by two members including a cage base 121 and a cage cover 131.

The plurality of (in the second embodiment, thirteen) leg sections 22 are formed in the cage base 121. The leg sections 22 are formed as shaft-like members extending downward from the bottom surface side of the cage base 121. The plurality of leg sections 22 are inserted into the plurality of attachment holes (not shown) formed in the substrate 11, whereby secure fixing of the substrate 11 and the cage base 12 is implemented. As a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

The cage cover 131 rotates with respect to the cage base 121 fixed to the substrate 11. In a state in which the cage cover 131 is opened with respect to the cage base 121 (see a state shown in FIG. 25A), the compression connector 31 explained below can be installed in and taken out from the substrate 11. In a state in which the cage cover 131 is closed with respect to the cage base 121 (a state shown in FIG. 25B), the compression connector 31 can be housed and installed in a region surrounded by the cage cover 131, the cage base 121, and the upper surface of the substrate 11.

On a cage top surface 131*a* of the cage cover 131, a plurality of (in the second embodiment, six) pressing springs 133 curving in the direction of the substrate 11 and having a spring property are formed. Curving portions of the pressing springs 133 project from the cage top surface 131*a* when the cage cover 131 is in an opened state, that is, external force is not applied to the pressing springs 133. When the compression connector 31 is housed in the cage base 121 fixed to the substrate 11 and the cage cover 131 is changed to a closed state from that state, the six pressing springs 133 press the top surface 34*a* of the cover shell 34 configuring the upper surface side of the compression connector 31 in the direction of the substrate 11. Since the six pressing springs 133 included in the cage 21 in the second embodiment are formed side by side in the left-right direction of the cage top surface 131*a*, the pressing springs 133 can press the entire region of the top surface 34*a* of the cover shell 34 configuring the upper surface side of the compression connector 31 explained below.

Further, four lock holes 127 in total are formed two each on the left and the right in the positions of the left and right ends of the cage base 121. On the other hand, in the positions of the left and right ends of the cage cover 131, four lock pieces 134 in total having a spring property that enter the lock holes 127 formed in the cage base 121 to fix the cage cover 131 to the cage base 121 are formed two each on the left and the right. The four lock holes 127 and the four lock pieces 134 are configured such that, in a state in which the cage cover 131 is closed with respect to the cage base 121, the lock pieces 134 enter the lock holes 127 in four positions.

Figure 25A:
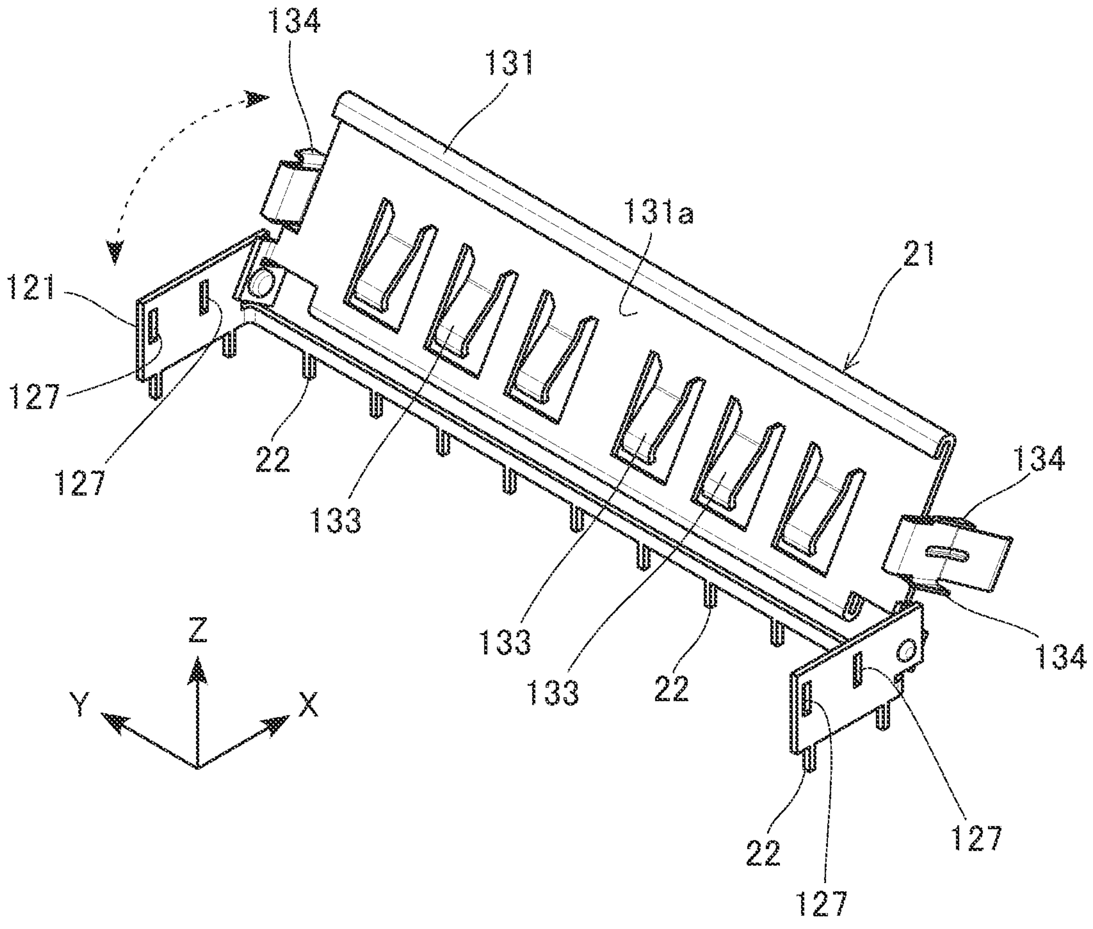
FIGS. 25A and 25B are diagrams for explaining an operation state of the cage included in the connector with substrate according to the second embodiment, FIG. 25A showing, about a cage base and a cage cover configuring the cage, a state in which the cage cover is opened and FIG. 25B showing, about the cage base and the cage cover configuring the cage, a state in which the cage cover is closed.
Figure 25B:
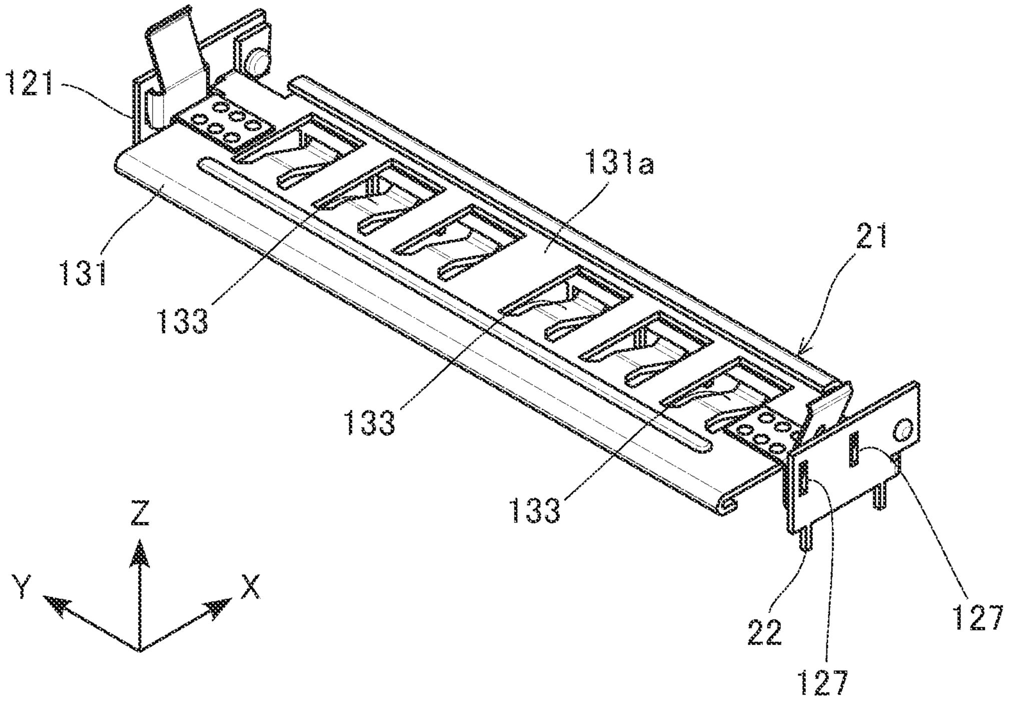

Further, as shown more in detail in FIGS. 25A and 25B and the like, the lock pieces 134 have an external shape having a slope shape and are formed to be a wedge shape having a slope gradually projecting to left and right outer sides from the lower side toward the upper side in a state in which the cage cover 131 is closed with respect to the cage base 121. The wedge shape of the lock pieces 134 is a shape for not hindering an inserting operation at the time when the lock pieces 134 are inserted into the lock holes 127. When the lock pieces 134 once fit in the lock holes 127, the lock pieces 134 exert a function of slip-off prevention for preventing the lock pieces 134 from slipping off the lock holes 127.

Note that the compression connector 31 according to the second embodiment has the same configuration as the configuration of the compression connector 31 in the first embodiment explained above except that the lock holes 37 formed in the cover shell 34 configuring the upper surface side of the compression connector 31 are absent and the shape of the housing 33 is different. Therefore, explanation of the compression connector 31 is omitted.

The configuration of the connector with substrate 100 according to the second embodiment is explained above. Subsequently, a method of attaching the compression connector 31 to and a method of detaching the compression connector 31 from the substrate 11 attached with the cage 21 configuring the connector with substrate 100 according to the second embodiment are explained.

When the compression connector 31 is attached to the substrate 11 attached with the cage 21, the compression connector 31 is moved in the vertical direction to be directed in the downward direction (the −Z direction) from the state shown in FIGS. 20, 21, and 25A and 25B, that is, the state in which the cage cover 131 is opened with respect to the cage base 121. After the compression connector 31 is disposed in the position of the cage base 121, the cage cover 131 is rotated to close the upper surface of the cage base 121 fixed to the substrate 11. At this time, the four lock pieces 134 are also rotated and moved by the rotating motion of the cage cover 131 and respectively enter the four lock holes 127. When the lock pieces 134 enter the lock holes 127, the closing motion of the cage cover 131 with respect to the cage base 121 is completed, whereby the compression connector 31 is housed in the region surrounded by the cage cover 131, the cage base 121, and the upper surface of the substrate 11.

In a state in which the compression connector 31 is housed in the region surrounded by the cage cover 131, the cage base 121, and the upper surface of the substrate 11, the six pressing springs 133 formed on the cage top surface 131*a* of the cage cover 131 exert force based on the spring elasticity in the downward direction (the −Z direction). Therefore, the six pressing springs 133 press the top surface 34*a* of the cover shell 34 configuring the upper surface side of the compression connector 31 in the direction of the substrate 11.

At this time, the compression connector 31 inserted into the substrate 11 attached with the cage 21 applies, to the substrate 11, contact reaction in the vertical direction applied by the plurality of contacts 32 included in the compression connector 31. However, the contact reaction in the vertical direction applied by the plurality of contacts 32 is offset by the force based on the spring elasticity exerted by the six pressing springs 133 and is received by, in particular, the cage cover 131 configuring the upper surface of the cage 21 in the cage 21 that houses the compression connector 31. Therefore, a stable fixed state of the compression connector 31 to the substrate 11 is maintained.

Note that the six pressing springs 133 included in the cage cover 131 in the second embodiment are formed side by side in the left-right direction of the cage top surface 131*a*. This disposition configuration is the same direction as the arranging direction of the plurality of contacts 32. Therefore, since the six pressing springs 133 can exert the force based on the spring elasticity uniformly against the contact reaction applied from the plurality of contacts 32, it is possible to suitably press the entire region of the top surface 34*a* of the cover shell 34 configuring the upper surface side of the compression connector 31.

Further, the contact reaction is finally received by the cage base 121 fixed to the upper surface of the substrate 11 and the cage cover 131 fixed via the lock pieces 134 fit in the lock holes 127 included in the cage base 121. Therefore, a secure fixed state of the compression connector 31 to the substrate 11 attached with the cage 21 is realized.

Figure 20:
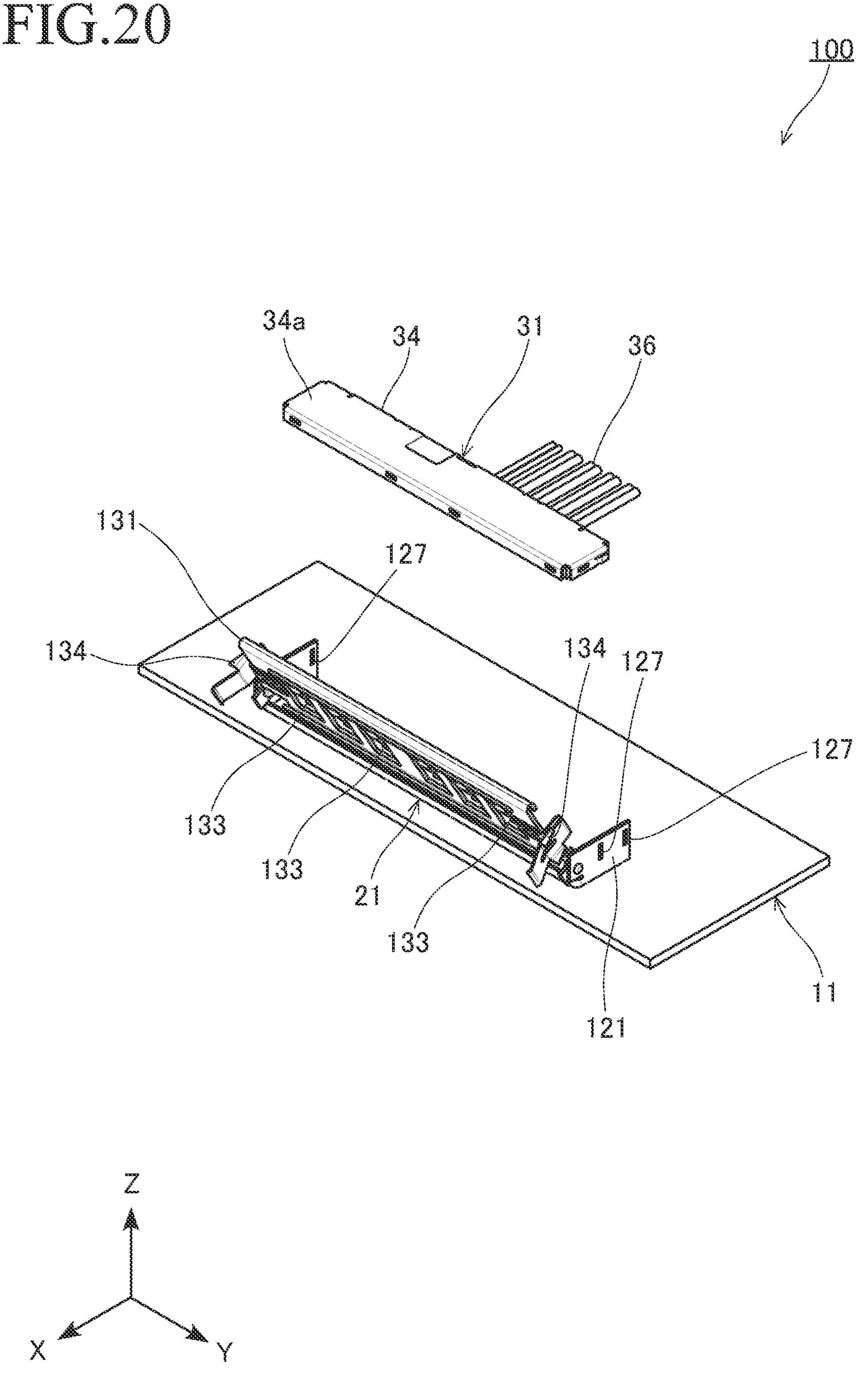
FIG. 20 is an exterior perspective view of a state in which a compression connector is detached from a substrate attached with a cage in the connector with substrate according to the second embodiment, the state being viewed from the front upper right.
Figure 21:
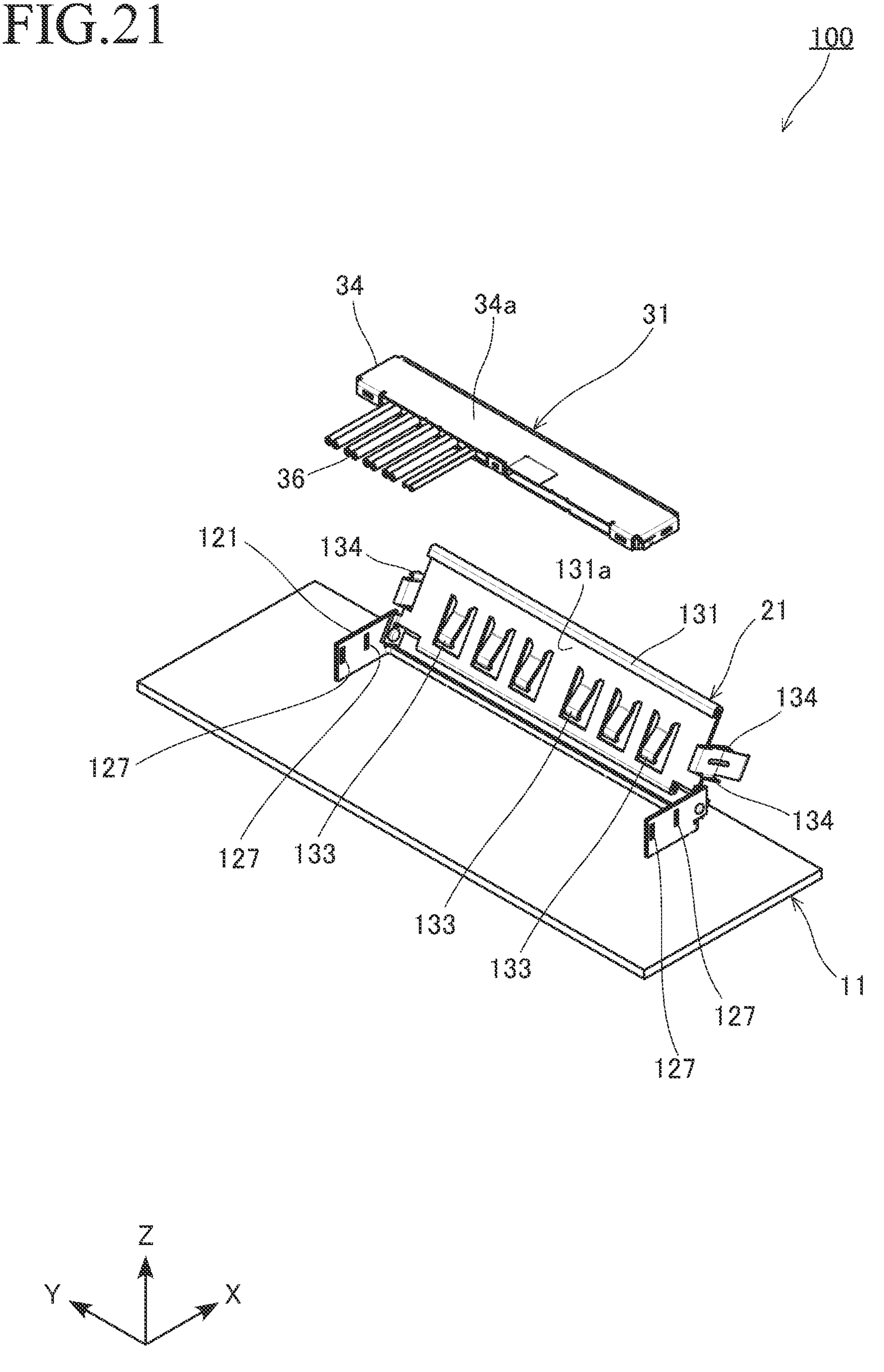
FIG. 21 is an exterior perspective view of the state in which the compression connector is detached from the substrate attached with the cage in the connector with substrate according to the second embodiment, the state being viewed from the rear upper left.
Figure 22:
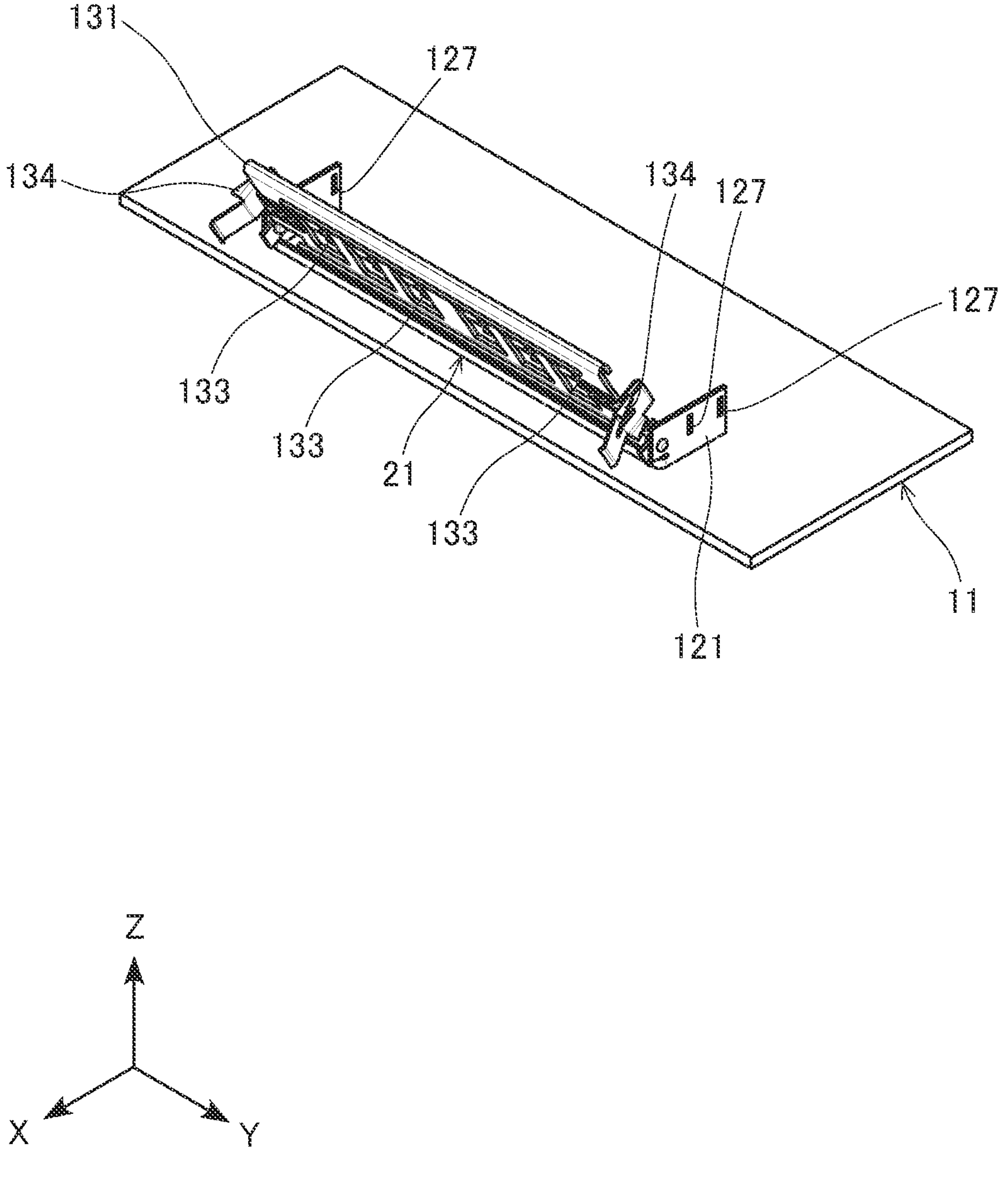
FIG. 22 is an exterior perspective view of the substrate attached with the cage included in the connector with substrate according to the second embodiment viewed from the front upper right.
Figure 23:
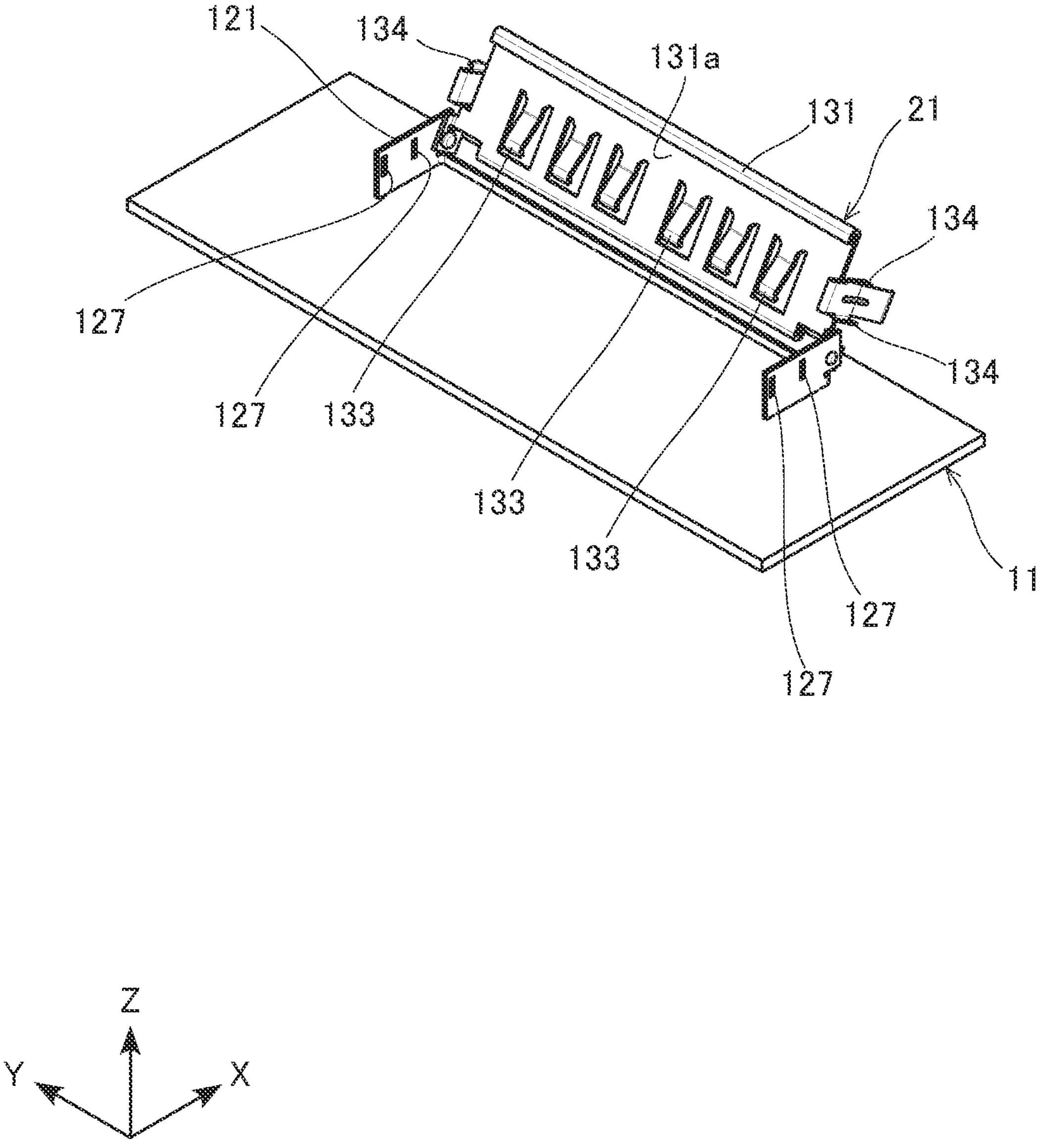
FIG. 23 is an exterior perspective view of the substrate attached with the cage included in the connector with substrate according to the second embodiment viewed from the rear upper left.
Figure 24:
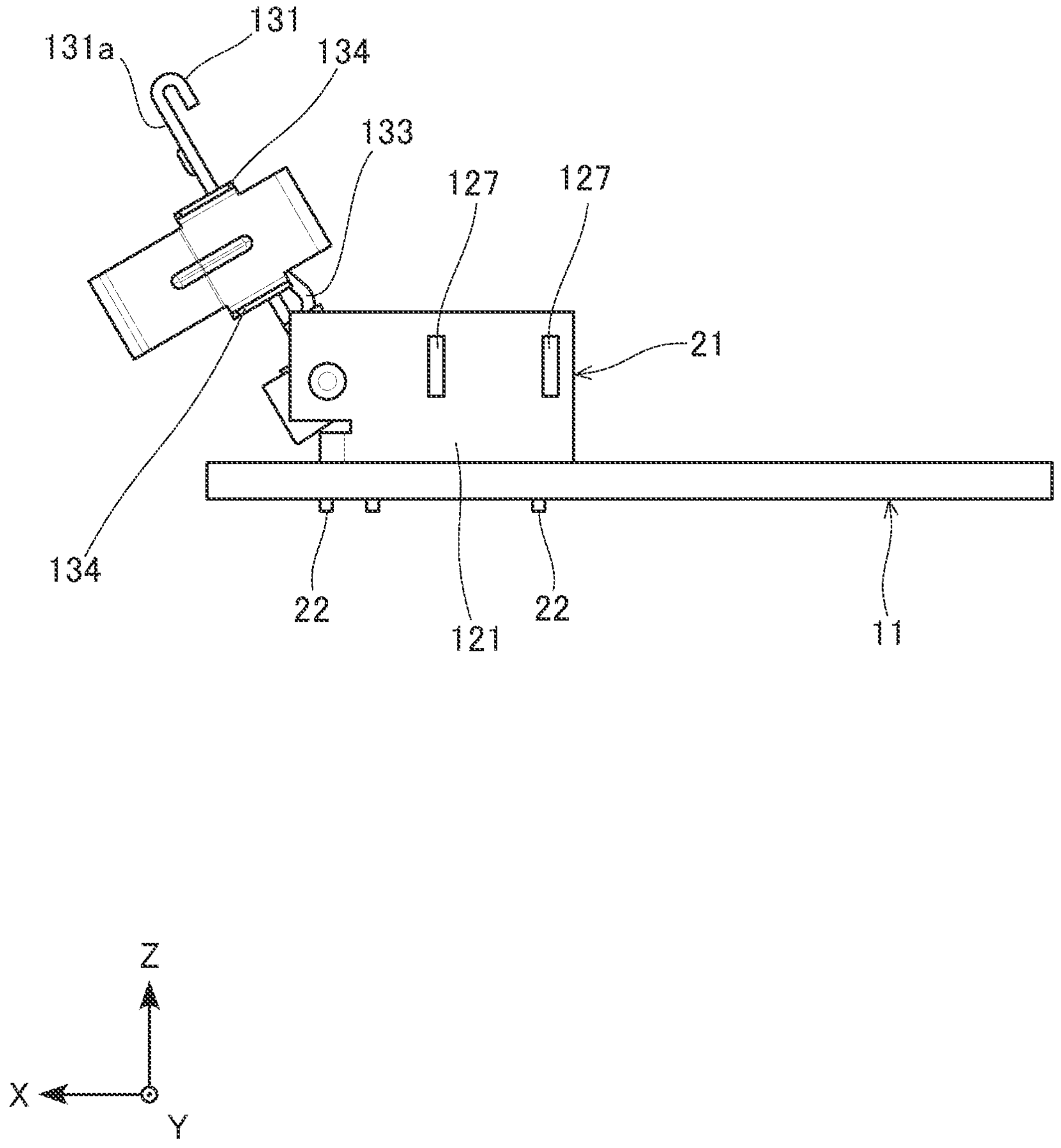
FIG. 24 is a right side view of the cage included in the connector with substrate according to the second embodiment.

On the other hand, when the compression connector 31 is detached from the substrate 11 attached with the cage 21, a user operates the lock pieces 134 to pull out the lock pieces 134 fit in the lock holes 127 and releases a constraint state of the cage cover 131 with respect to the cage base 121. The user rotates the cage cover 131 and releases the upper surface of the cage base 121 fixed to the substrate 11. That is, by opening the cage cover 131 with respect to the cage base 121 (see a state shown in FIG. 25A), it is possible to detach the compression connector 31 as shown in FIGS. 20 and 21.

As explained above, in the connector with substrate 100 according to the second embodiment, the connector with substrate 100 includes the cage cover 131 that rotates with respect to the cage base 121 fixed to the substrate 11. The lock pieces 134 formed in the cage cover 131 fit in the lock holes 127 formed in the cage base 121. Therefore, it is possible to securely fix the compression connector 31 disposed in the region surrounded by the cage cover 131, the cage base 121, and the upper surface of the substrate 11. Since the plurality of pressing springs 133 that press the top surface 34*a* of the cover shell 34 in the direction of the substrate 11 are formed in the cage cover 131 in the same direction as the arranging direction of the contacts 32, when the compression connector 31 is inserted and installed in the region surrounded by the cage cover 131 and the cage base 121 configuring the cage 21 and the upper surface of the substrate 11, the pressing springs 133 can press the entire region of the top surface 34*a* of the cover shell 34 configuring the upper surface side of the compression connector 31 in the direction of the substrate 11. Therefore, with the connector with substrate 100 according to the second embodiment, a stable fixed state of the compression connector 31 to the substrate 11 is maintained. That is, with the connector with substrate 100 according to the second embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the second embodiment. Various changes or improvements can be added to the second embodiment.

For example, in the second embodiment explained above, as an example, the six pressing springs 113 are formed in the cage cover 131 configuring the cage 21. However, as the number of pressing springs according to the present invention, any number can be selected if the number is equal to or larger than one.

For example, in the second embodiment explained above, as an example, the four lock holes 127 in total are formed two each in the left and right positions of the cage base 121 and the four lock pieces 134 in total are formed two each in the positions of the left and right ends of the cage top surface 131*a* configuring the cage cover 131. However, positions where the lock hole and the lock piece according to the present invention are formed may be opposite. That is, the lock hole may be formed on the cage cover side and the lock piece may be formed on the cage base side. Further, the number of each of lock holes and lock pieces according to the present invention can be optionally selected if the number is equal to or larger than one.

The configuration of the connector with substrate 100 according to the second embodiment is explained above with reference to FIGS. 17 to 25A and 25B. Subsequently, a connector with substrate 200 according to a third embodiment, which is another form example that the connector with substrate according to the present invention can take, is explained with reference to FIGS. 26 to 39. Note that, in the following explanation, members that are the same as or similar to the members explained in the first and second embodiments above are denoted by the same reference numerals and signs and explanation of the members is sometimes omitted.

Third Embodiment

Figure 26:
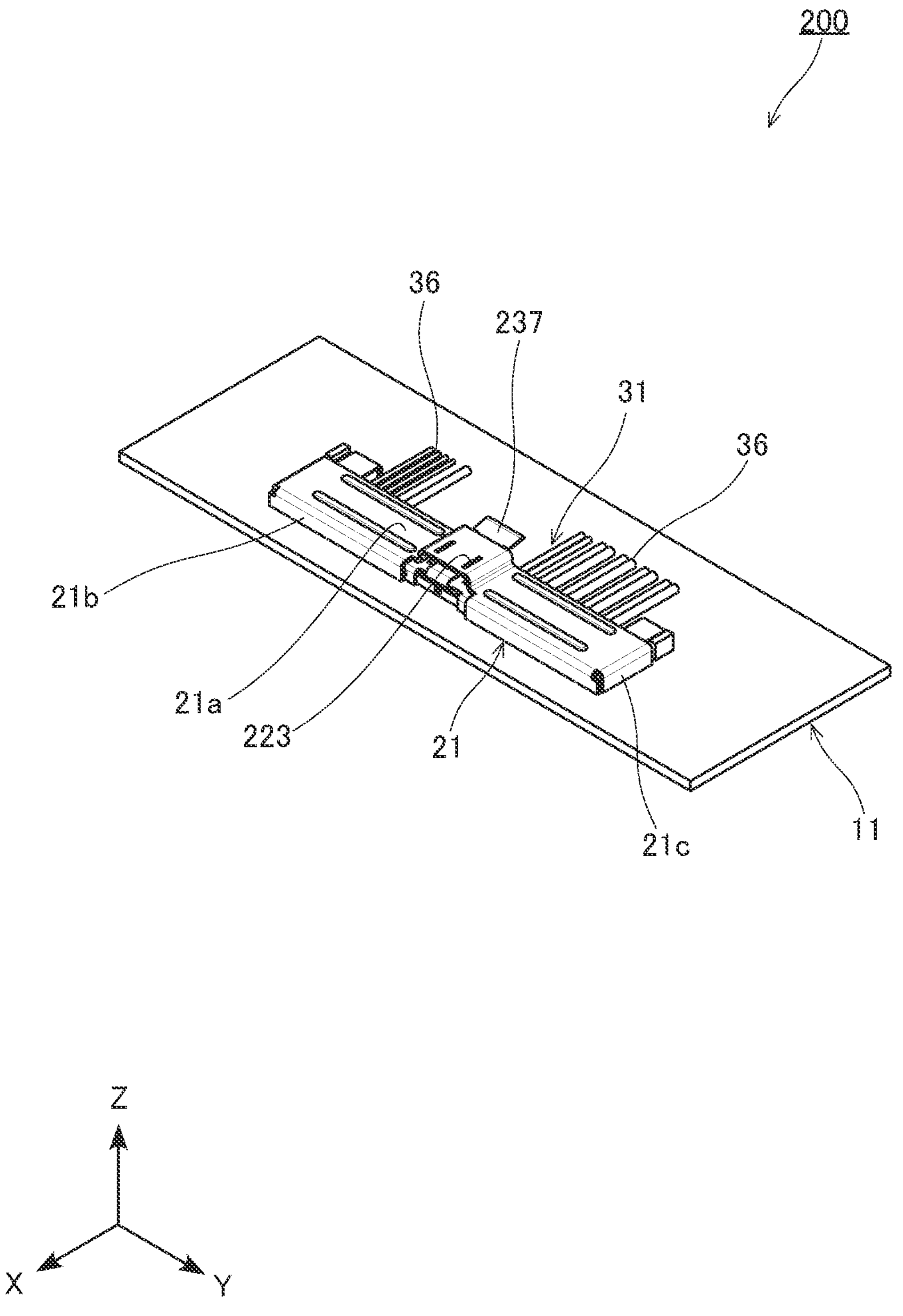
FIG. 26 is an exterior perspective view of a connector with substrate according to a third embodiment viewed from the front upper right.
Figure 27:
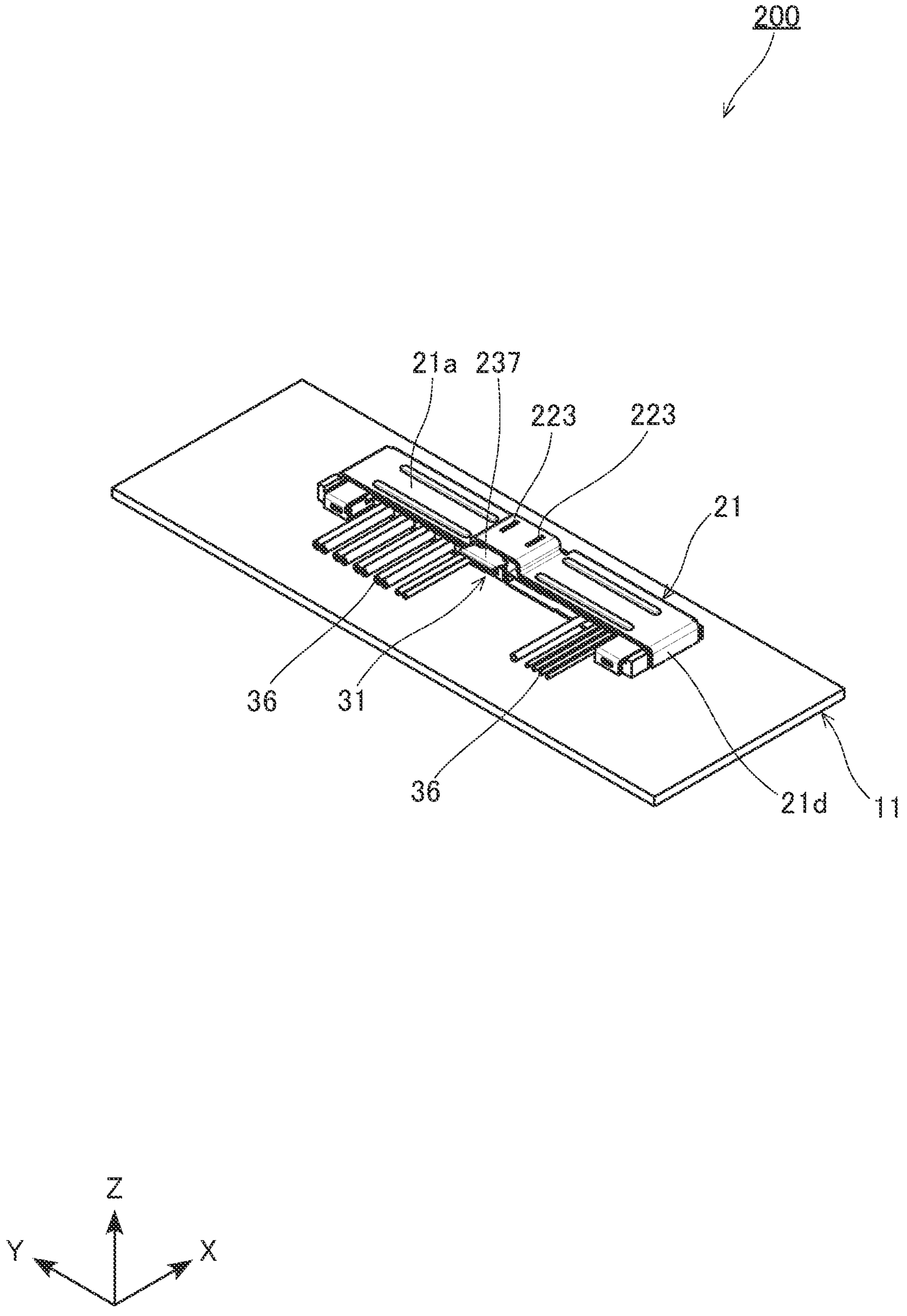
FIG. 27 is an exterior perspective view of the connector with substrate according to the third embodiment viewed from the rear upper left.

A configuration of the connector with substrate 200 according to the third embodiment is explained with reference to FIGS. 26 to 39. The connector with substrate 200 according to the third embodiment includes, as shown in FIGS. 26 to 28, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 28:
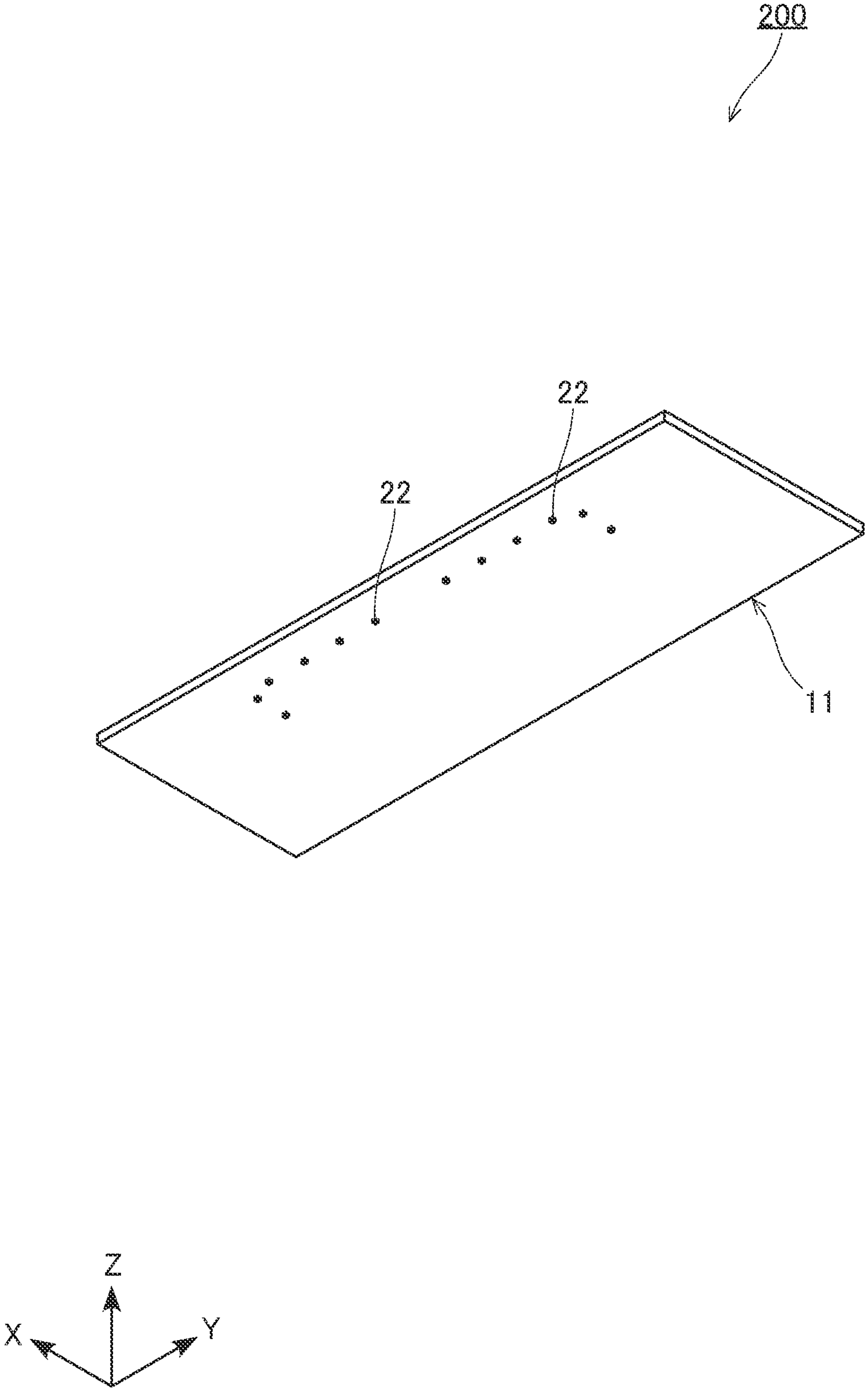
FIG. 28 is an exterior perspective view of the connector with substrate according to the third embodiment viewed from the front lower right.

A plurality of attachment holes (not shown) are formed in the substrate 11 (see FIG. 28). The plurality of leg sections 22 included in the cage 21 explained below are inserted into the plurality of (in the third embodiment, assumed to be twelve) attachment holes (not shown) to fix the cage 21 to the substrate 11.

Figure 38:
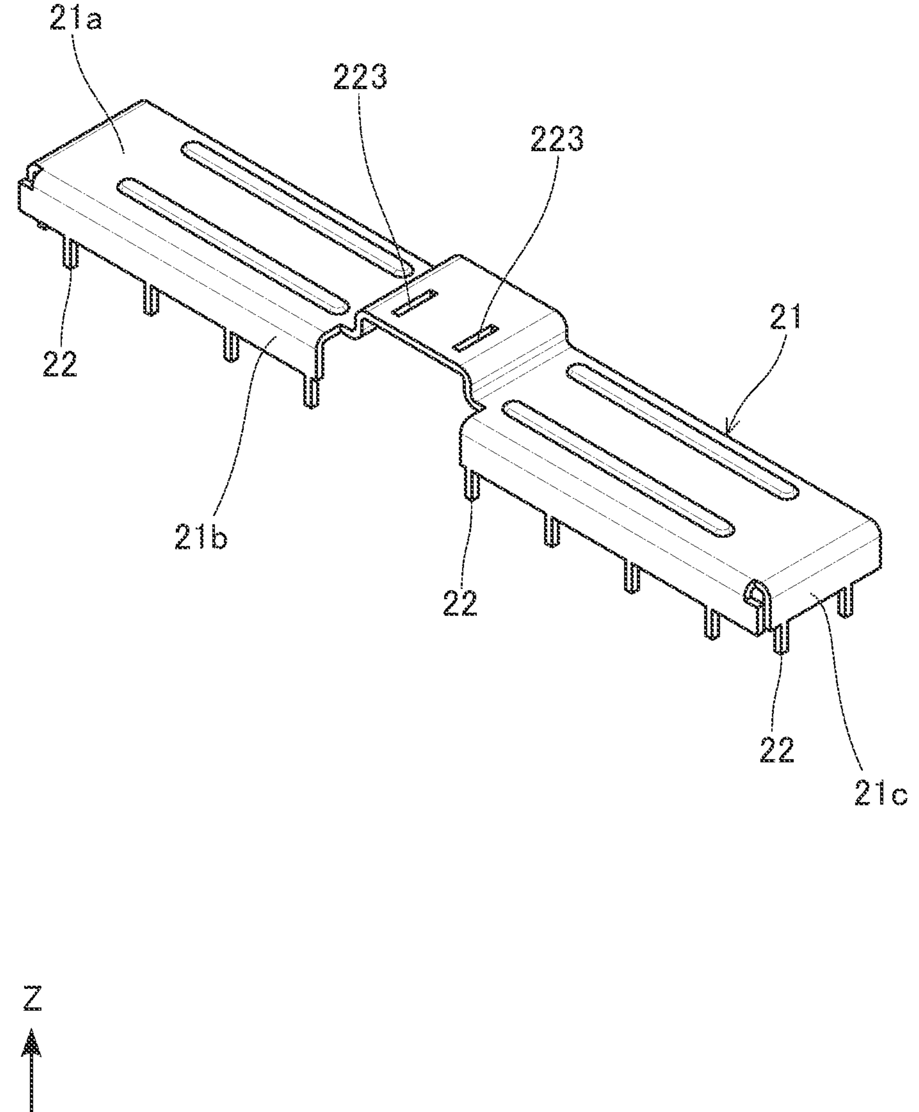
FIG. 38 is an exterior perspective view of the cage included in the connector with substrate according to the third embodiment viewed from the front upper right.
Figure 38:
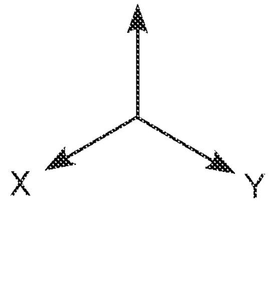
Figure 39:
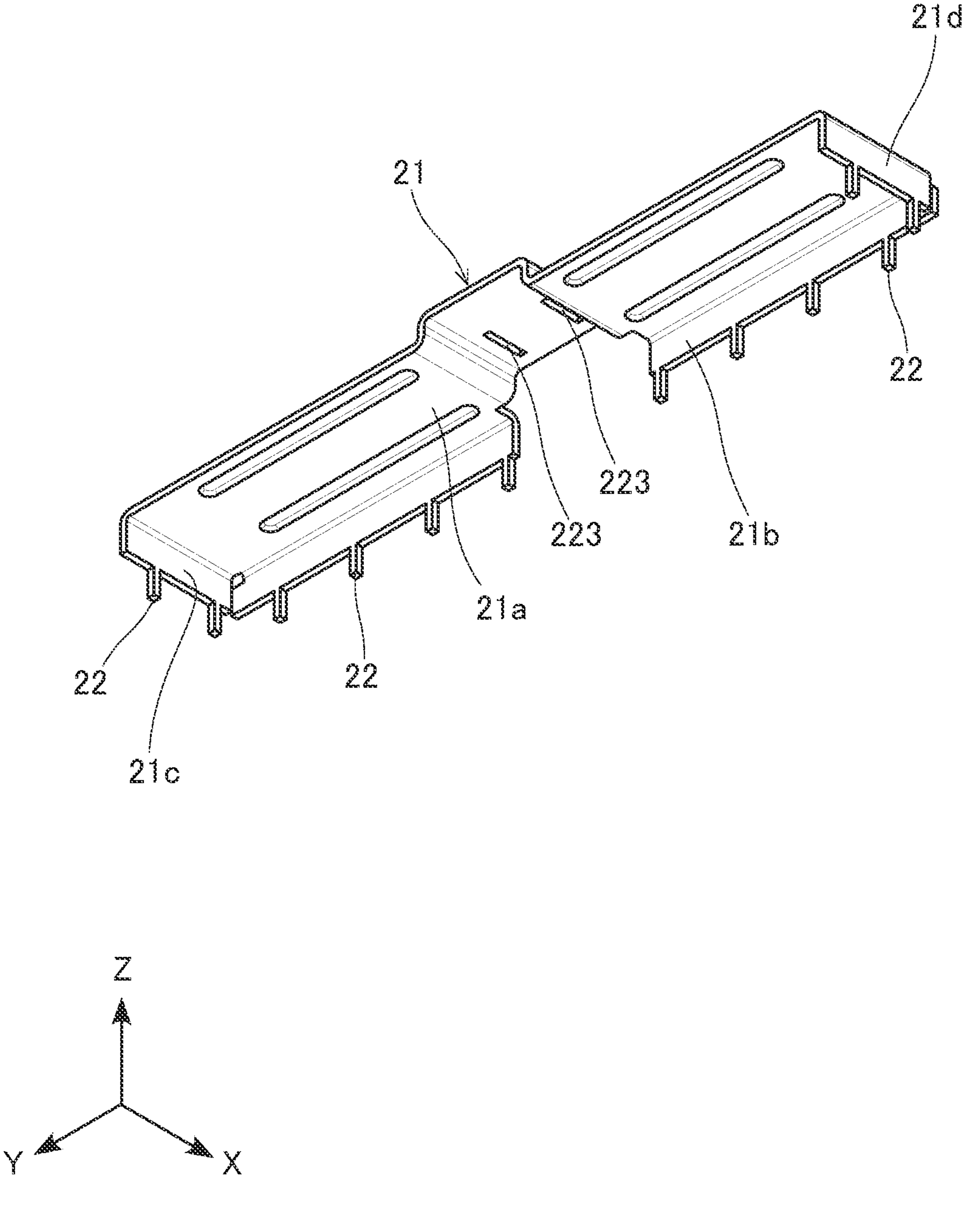
FIG. 39 is an exterior perspective view of the cage included in the connector with substrate according to the third embodiment viewed from the rear lower left.

As shown in FIGS. 38 and 39, the cage 21 is a member formed by pressing and bending a flat metal plate material and includes the cage top surface 21*a* forming an upper surface and the vertical front surface 21*b*, the vertical right side surface 21*c*, and the vertical left side surface 21*d* formed as the vertical surface of the present invention by being bent vertically from the front and the left and right side surfaces of the cage top surface 21*a*. A region surrounded by the cage top surface 21*a*, the vertical front surface 21*b*, the vertical right side surface 21*c*, the vertical left side surface 21*d*, and the upper surface of the substrate 11 is a region where the compression connector 31 is housed and installed.

The plurality of (in the third embodiment, twelve) leg sections 22 are formed on the lower end faces of the vertical front surface 21*b*, the vertical right side surface 21*c*, and the vertical left side surface 21*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. Note that, as a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

On the other hand, the cage top surface 21*a* is a part that receives contact reaction in the vertical direction applied from the compression connector 31 in concert with the substrate 11 when the compression connector 31 is housed and installed in the cage 21 and the substrate 11. The center of the cage top surface 21*a* in the third embodiment has a shape swelled in a convex shape upward. Further, two lock holes 223 that lock claws 238 formed in a lock piece 237 included in the compression connector 31 explained below enter are formed in the convex part in the center. The lock claw 238 formed in the lock piece 237 included in the compression connector 31 explained below fits in each of the two lock holes 223, whereby movement in the horizontal direction of the compression connector 31 with respect to the cage 21 can be restricted.

The compression connector 31 includes, as shown in FIGS. 31 to 37, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 33:
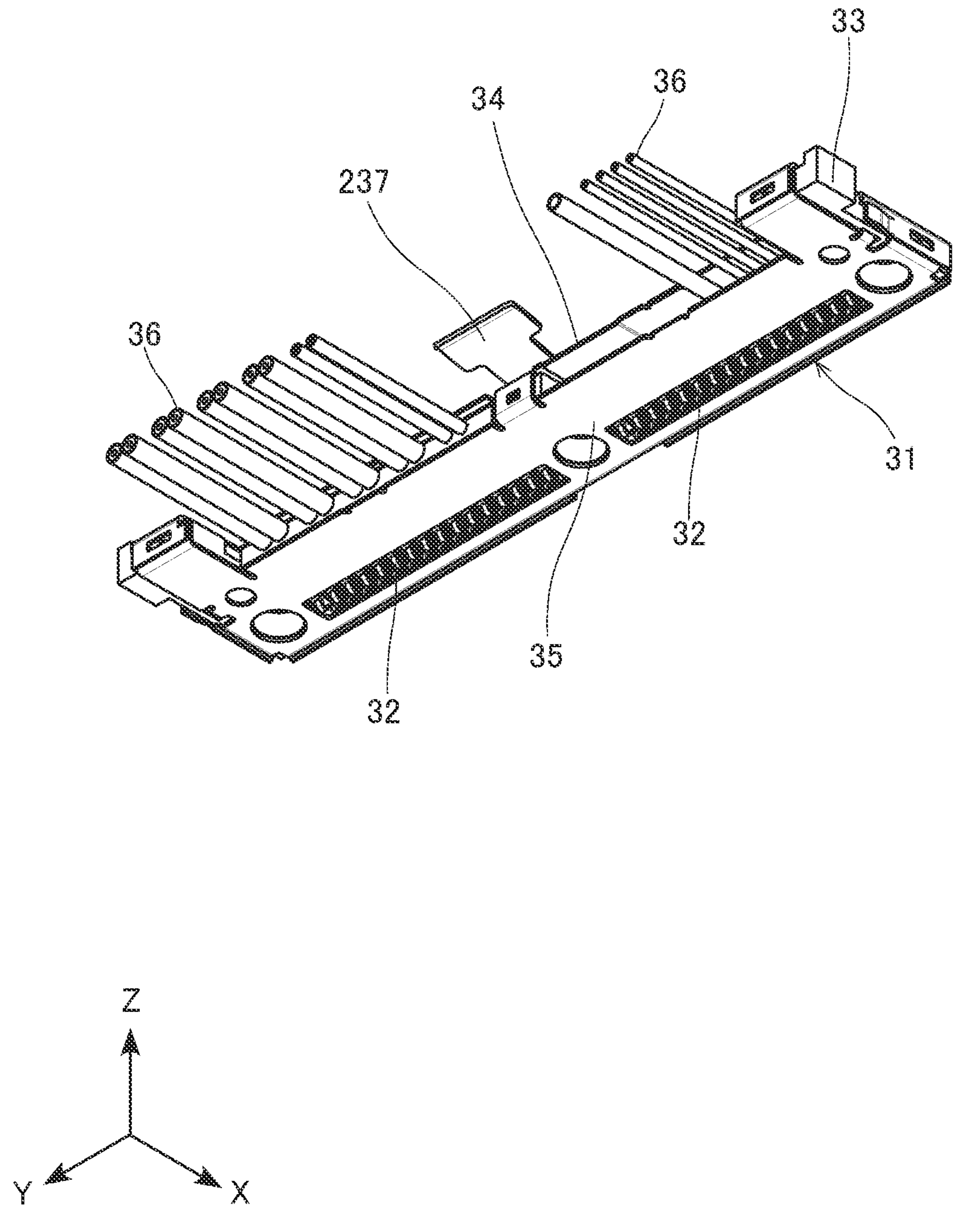
FIG. 33 is an exterior perspective view of the compression connector according to the third embodiment viewed from the rear lower left.
Figure 34:
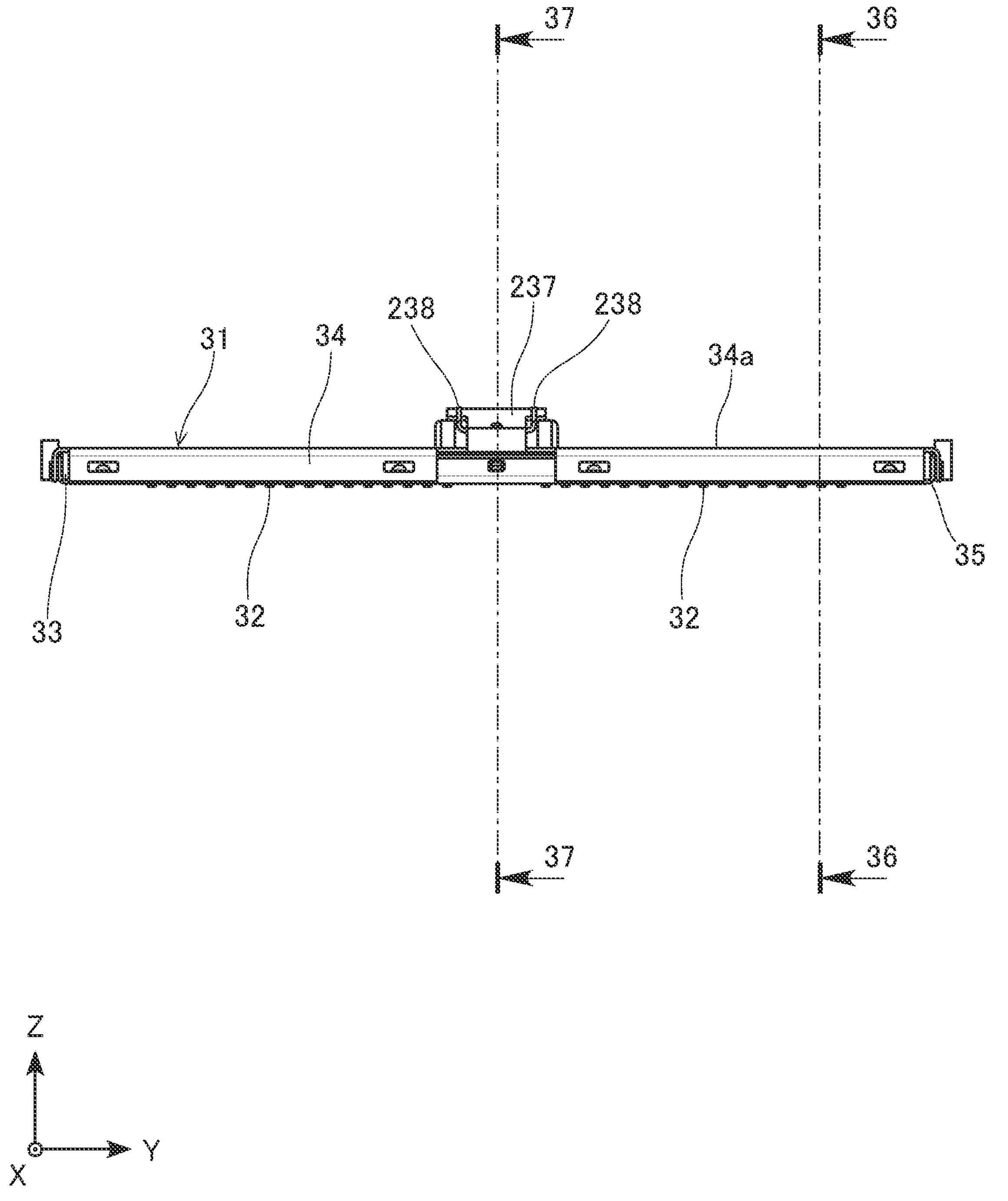
FIG. 34 is a front view of the compression connector according to the third embodiment.

As shown in, in particular, FIGS. 33 and 34, the plurality of contacts 32 are disposed to be laterally arranged in the left-right direction.

Figure 36:
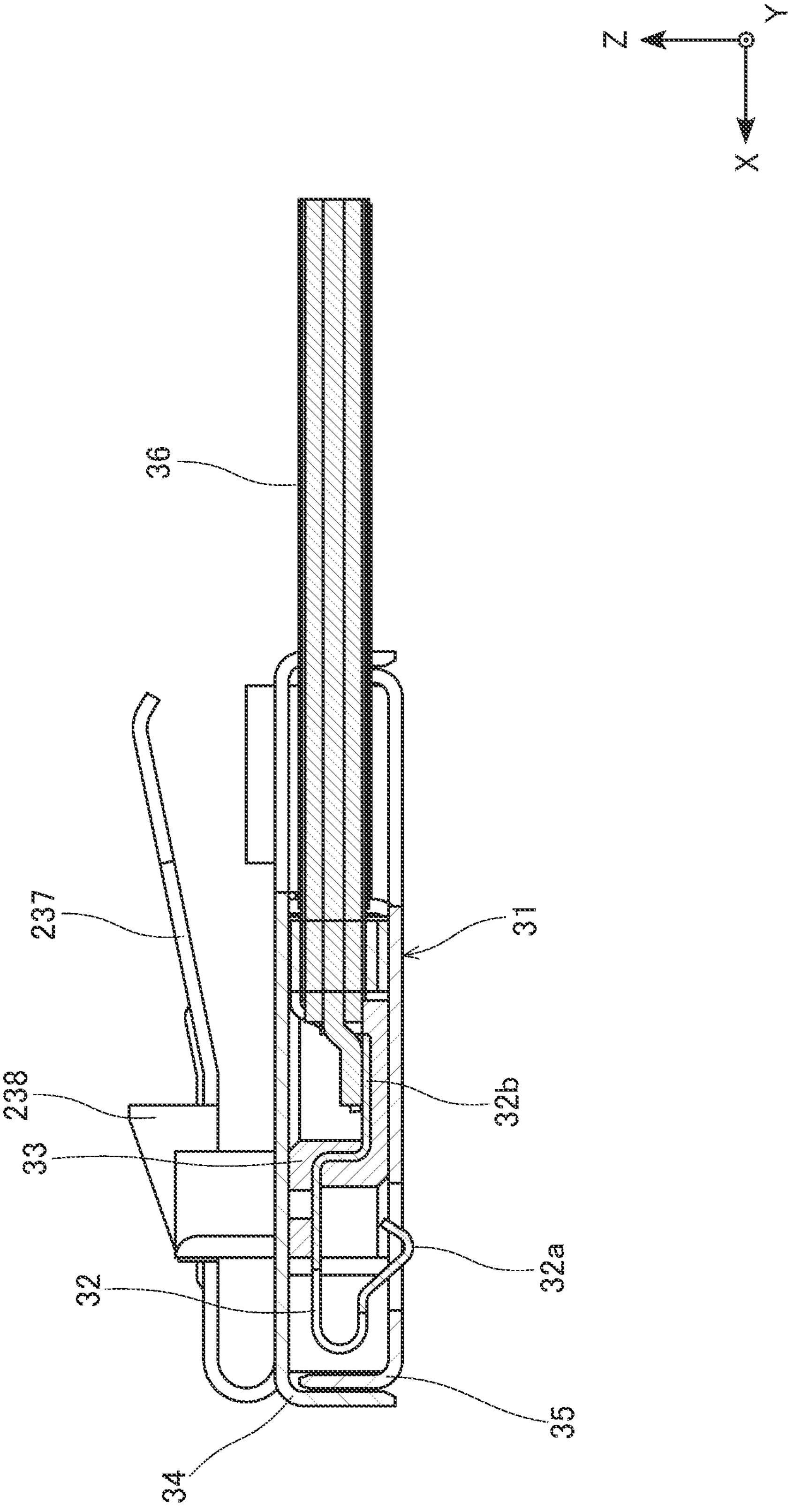
FIG. 36 is a longitudinal sectional view taken along line 36-36 in FIG. 34.

Each of the plurality of contacts 32 is fixed to the housing 33 as shown in FIG. 36. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 36). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 36, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Figure 35:
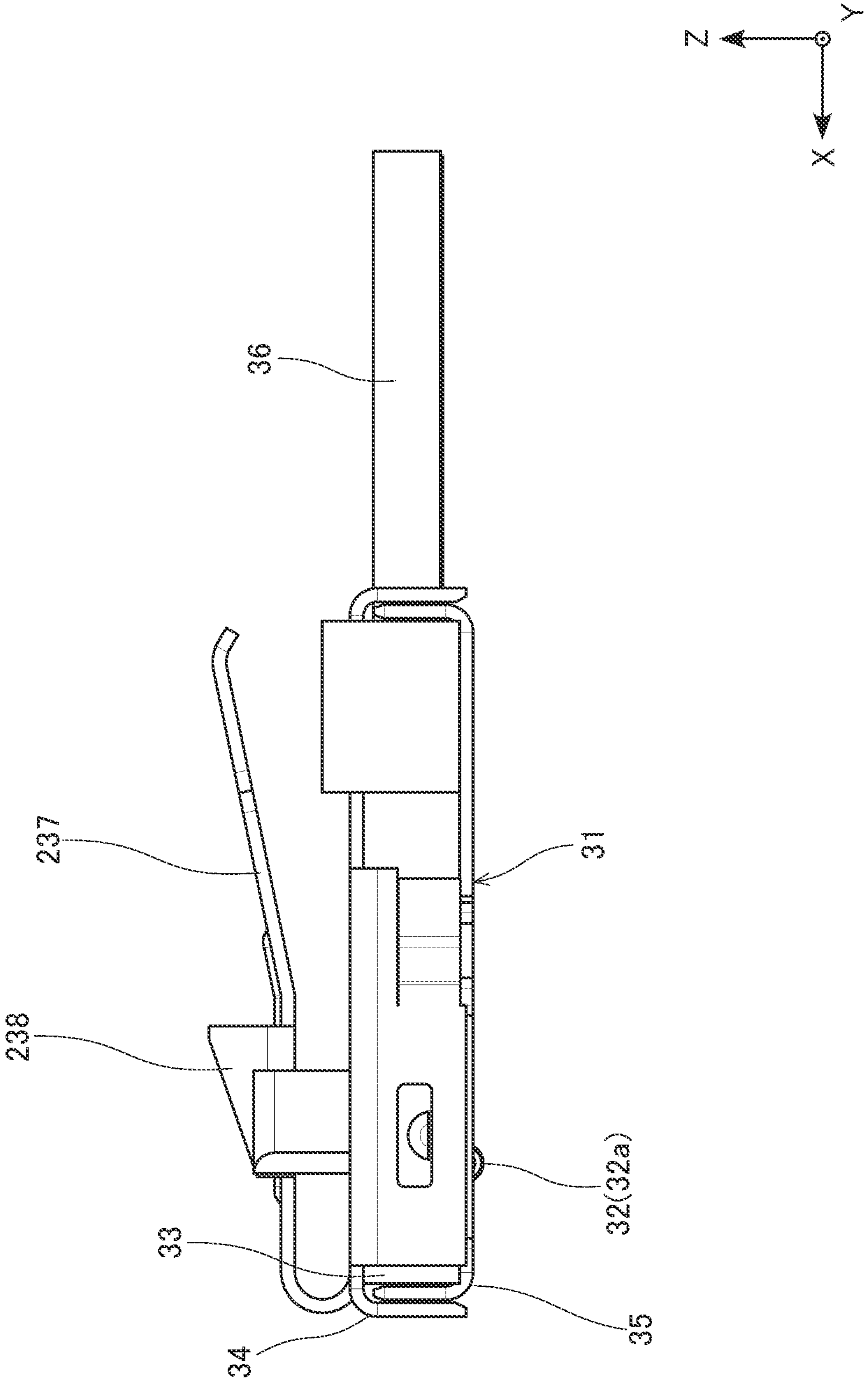
FIG. 35 is aright side view of the compression connector according to the third embodiment.
Figure 37:
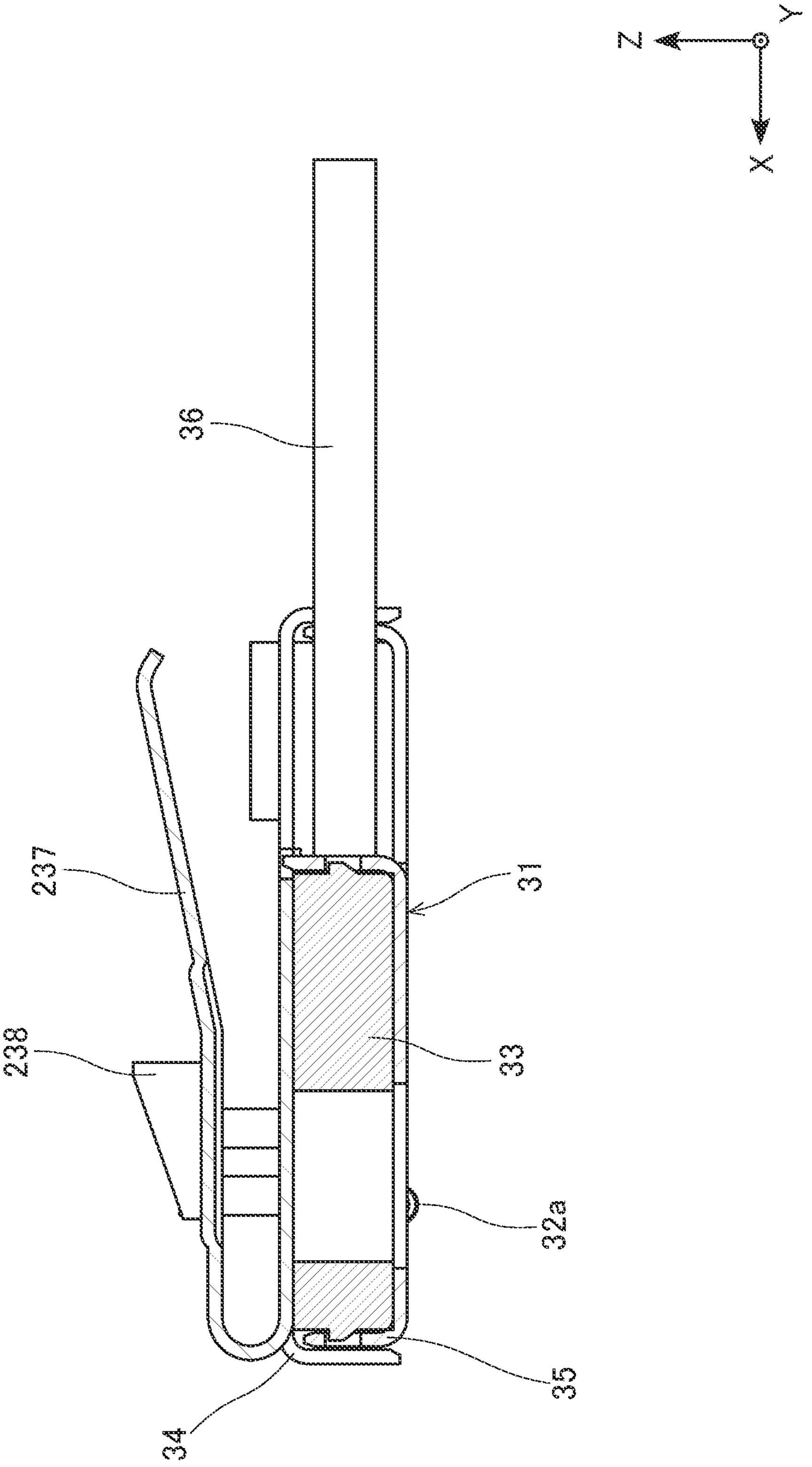
FIG. 37 is a longitudinal sectional view taken along line 37-37 in FIG. 34.

The lock piece 237 formed to curve upward from the front and further curve rearward and extend rearward is formed in the center position of the top surface 34*a* of the cover shell 34 that covers the upper surface portion of the housing 33. As shown in FIGS. 35 to 37, the lock piece 237 is formed in a substantially J shape in a side view.

Further, two lock claws 238 extending upward from left and right side surfaces are formed in the lock piece 237 according to the third embodiment. As shown more in detail in FIG. 37 and the like, the lock claws 238 have an exterior shape having a slope shape in a side view and is formed to be a wedge shape having a slope gradually having a larger projection amount upward from the front side to the rear side in the compression connector 31. The wedge shape of the lock claws 238 is a shape for not hindering an inserting motion of the compression connector 31 inserted from the rear side of the cage 21 toward the front and is a shape gradually bending downward because the lock claws 238 come into contact with the cage top surface 21*a* when the compression connector 31 is inserted into the inside of the cage 21. When the compression connector 31 is further inserted into the inside of the cage 21 from this state, each of the two lock claws 238 enters each of the two lock holes 223 formed in the cage top surface 21*a*.

When each of the two lock claws 238 formed in the lock piece 237 included in the compression connector 31 fits in each of the two lock holes 223 formed in the cage top surface 21*a*, the lock piece 237 bent downward is released from constraint by the cage top surface 21*a*. Therefore, the lock piece 237 returns to the original shape formed in the substantially J shape in the side view. Since this state is a state in which the lock claws 238 completely fit in the lock holes 223, movement in the horizontal direction of the compression connector 31 with respect to the cage 21 is restricted. That is, the lock claws 238 and the lock holes 223 can exert, by cooperating, a function of slip-off prevention for preventing the compression connector 31 from slipping off the cage 21.

Note that, concerning the members configuring the compression connector 31 in the third embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 200 according to the third embodiment is explained above. Subsequently, a method of attaching the compression connector 31 to and a method of detaching the compression connector 31 from the substrate 11 attached with the cage 21 configuring the connector with substrate 200 according to the third embodiment are explained.

Figure 29:
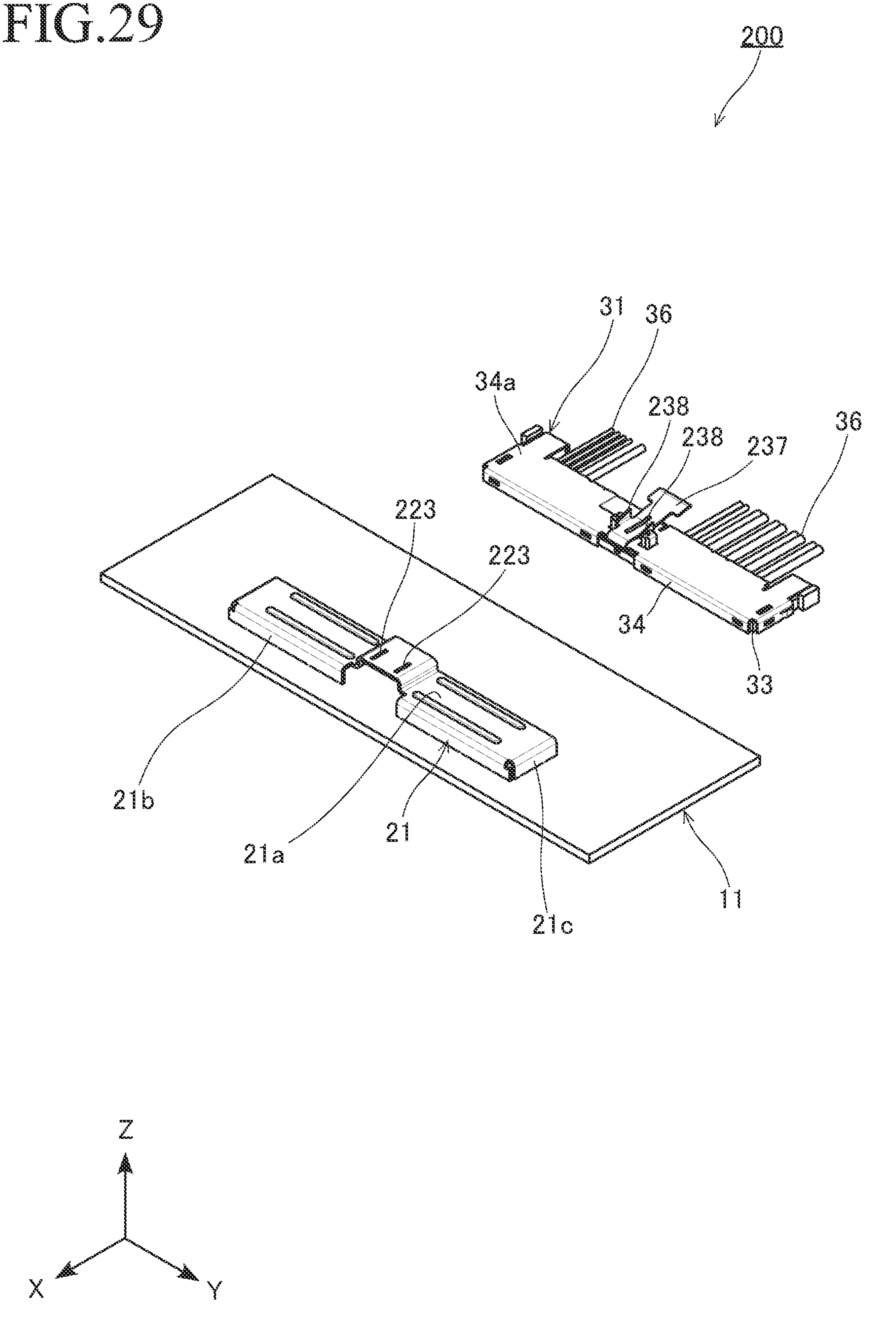
FIG. 29 is an exterior perspective view of a state in which a compression connector is detached from a substrate attached with a cage in the connector with substrate according to the third embodiment, the state being viewed from the front upper right.
Figure 30:
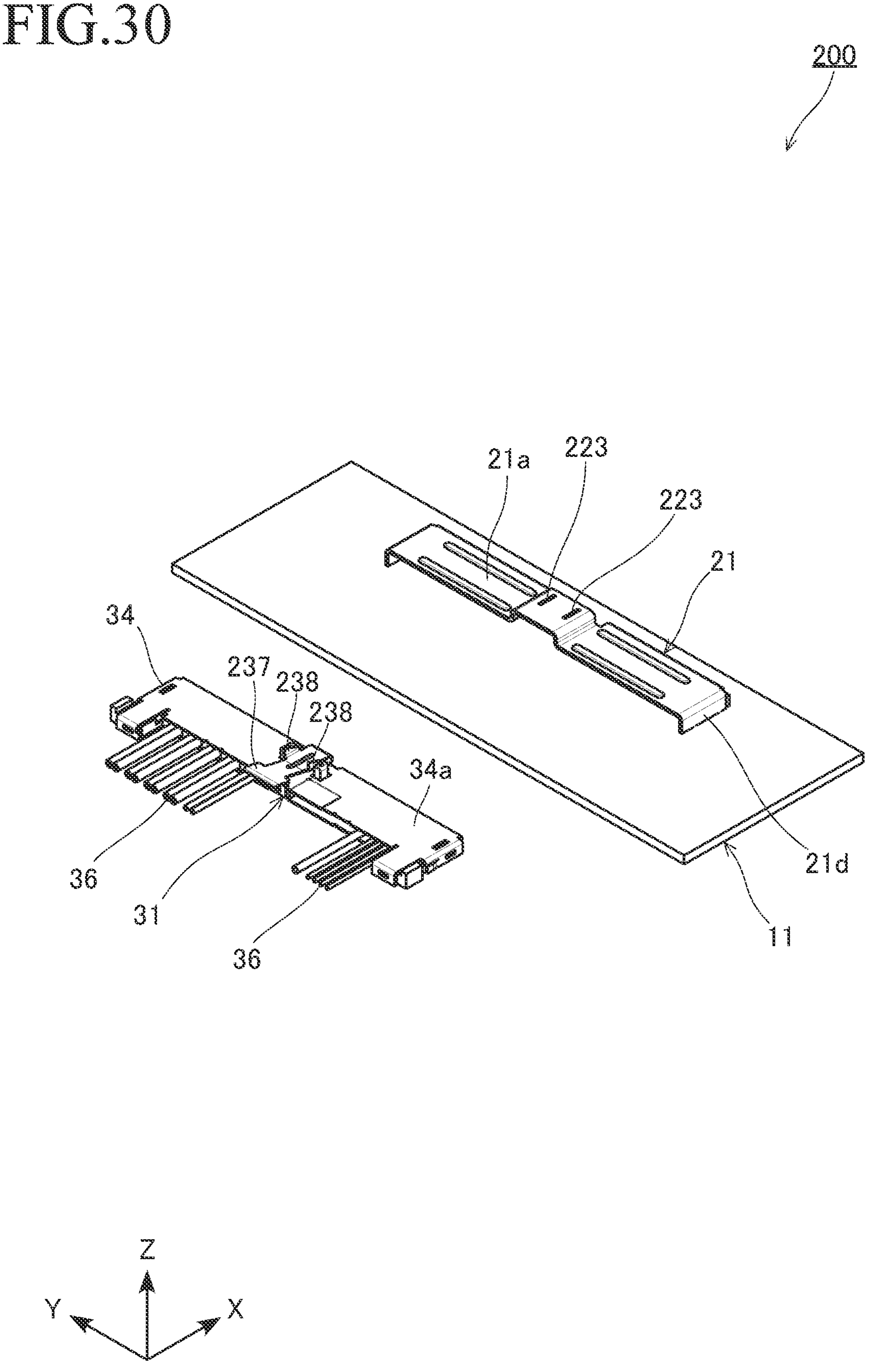
FIG. 30 is an exterior perspective view of the state in which the compression connector is detached from the substrate attached with the cage in the connector with substrate according to the third embodiment, the state being viewed from the rear upper left.
Figure 31:
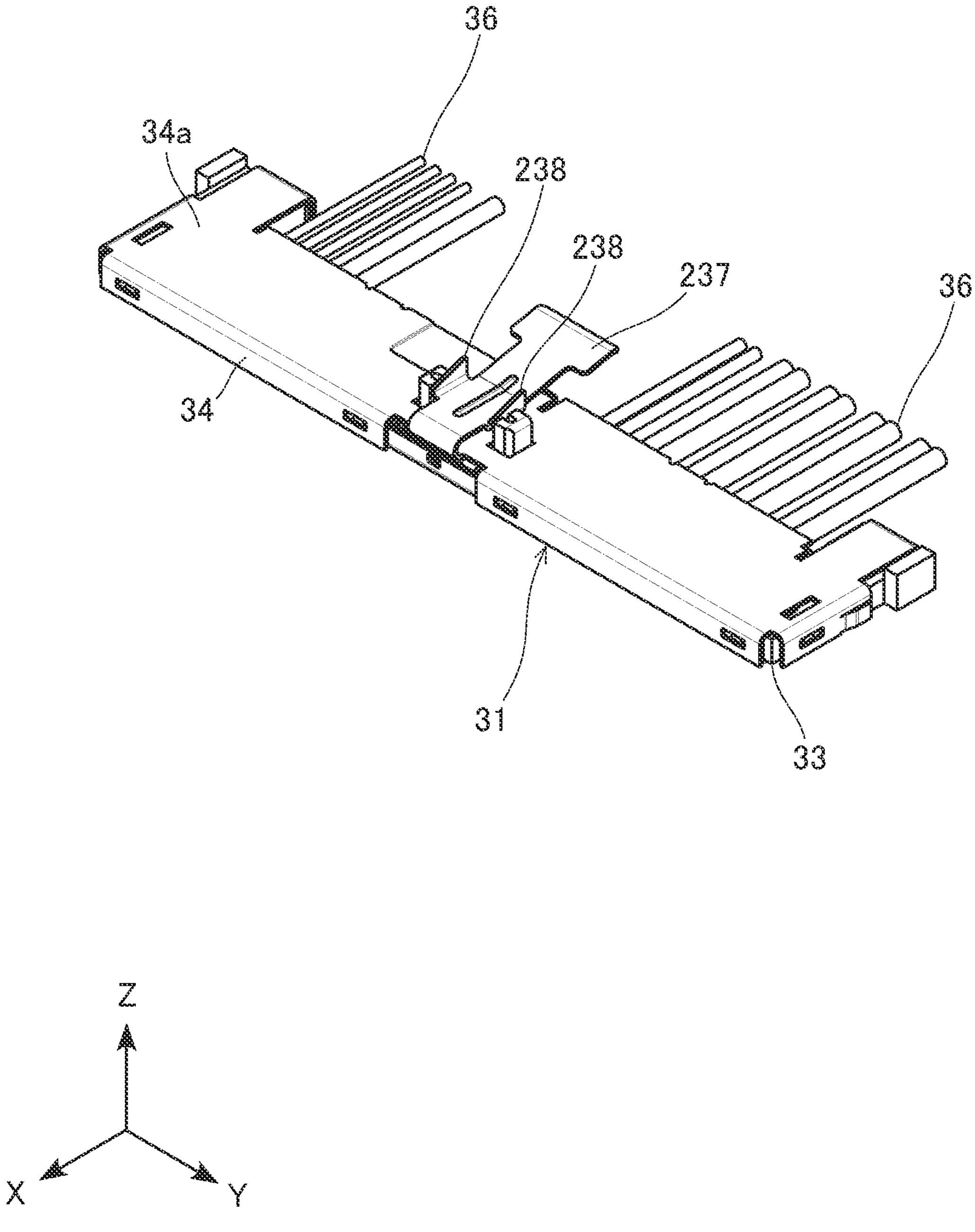
FIG. 31 is an exterior perspective view of the compression connector according to the third embodiment viewed from the front upper right.
Figure 32:
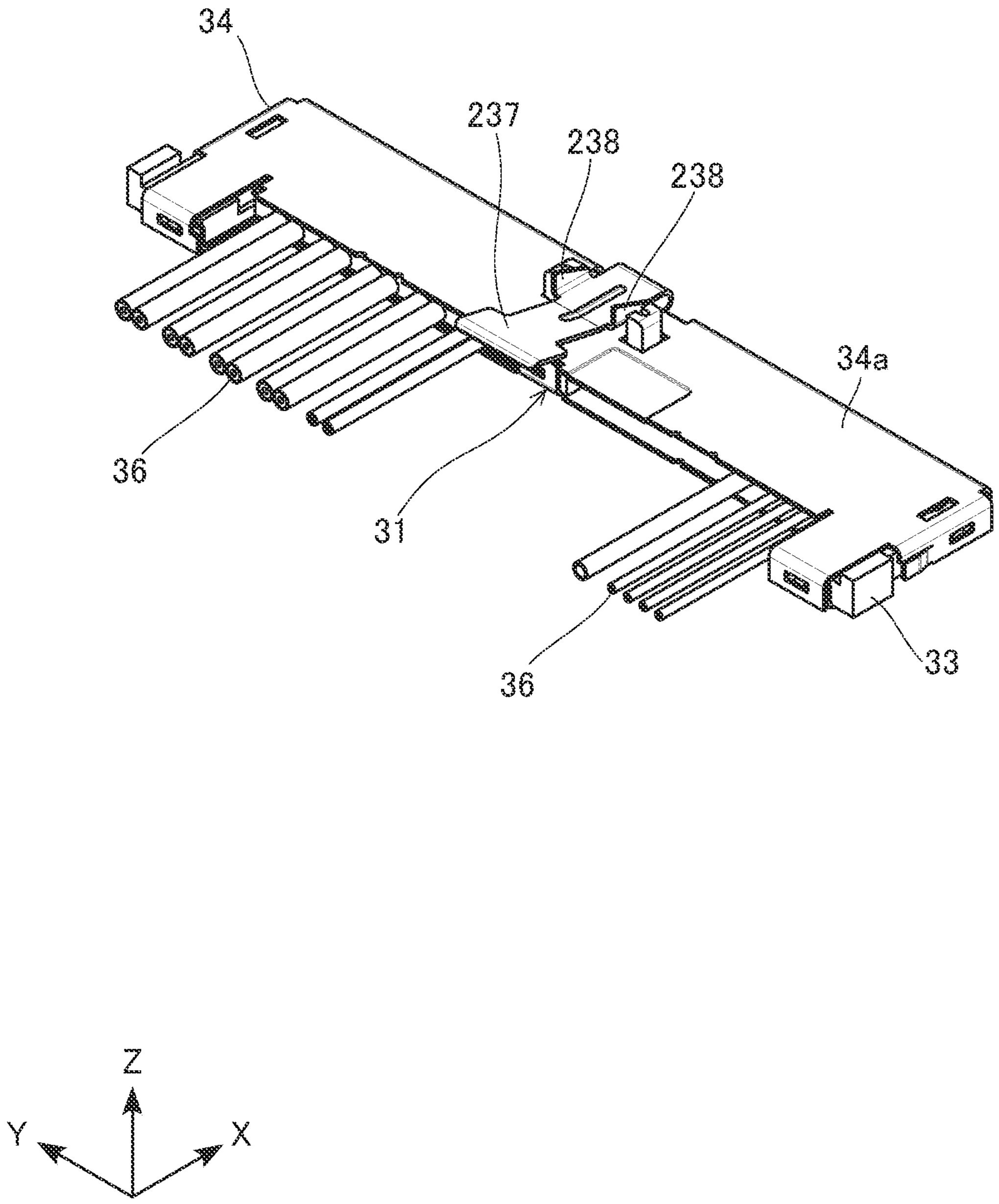
FIG. 32 is an exterior perspective view of the compression connector according to the third embodiment viewed from the rear upper left.

When the compression connector 31 is attached to the substrate 11 attached with the cage 21, the compression connector 31 is moved in the horizontal direction to be directed in the forward direction (the +X direction) from a state shown in FIGS. 29 and 30. When the compression connector 31 is inserted into the region surrounded by the cage top surface 21*a*, the vertical front surface 21*b*, the vertical right side surface 21*c*, and the vertical left side surface 21*d* configuring the cage 21 and the upper surface of the substrate 11, the compression connector 31 applies, to the substrate 11, contact reaction in the vertical direction applied by the plurality of contacts 32 included in the compression connector 31. However, since the contact reaction in the vertical direction applied by the plurality of contacts 32 is received by, in particular, the cage top surface 21*a* configuring the upper surface of the cage 21 in the cage 21 that houses the compression connector 31. Therefore, a stable fixed state of the compression connector 31 to the substrate 11 is maintained.

Further, when the compression connector 31 is moved in the horizontal direction to be directed in the forward direction (the +X direction) and inserted into the substrate 11 attached with the cage 21, the two lock claws 238 formed in the lock piece 237 formed in the cover shell 34 of the compression connector 31 come into contact with the cage top surface 21*a* configuring the cage 21 to gradually bend downward and sink. When the compression connector 31 is further inserted into the inside of the cage 21 from this state, each of the two lock claws 238 formed in the lock piece 237 enters each of the two lock holes 223 formed in the cage top surface 21*a*.

When each of the two lock claws 238 formed in the lock piece 237 included in the compression connector 31 completely fits in each of the two lock holes 223 formed in the cage top surface 21*a*, since the lock claw 238 has the wedge shape, movement in the horizontal direction (in particular, movement in the −X direction) of the compression connector 31 with respect to the cage 21 is restricted.

On the other hand, when the compression connector 31 is detached from the substrate 11 attached with the cage 21, a user can release the fit state of the two lock claws 238 and the two lock holes 223 by pushing the lock piece 237 in the downward direction (the −Z direction). When the compression connector 31 is horizontally moved in the rearward direction (the −X direction) in such a release state, the compression connector 31 can be smoothly detached from the substrate 11 attached with the cage 21.

Note that, since the contact reaction in the vertical direction applied by the plurality of contacts 32 included in the compression connector 31 is received by the cage top surface 21*a* of the cage 21, it is easy to horizontally move the compression connector 31 in the rearward direction (the −X direction). By horizontally moving the compression connector 31 in the rearward direction (the −X direction) in this way and completely pulling out the compression connector 31 from the substrate 11 attached with the cage 21, it is possible to detach the compression connector 31 from the substrate 11 attached with the cage 21.

As explained above, in the connector with substrate 200 according to the third embodiment, the two lock claws 238 formed in the lock piece 237 included in the cover shell 34 configuring the upper surface side of the compression connector 31 and the two lock holes 223 formed in the cage top surface 21*a* configuring the cage 21 are prepared and the lock claws 238 enter the lock holes 223, whereby the position in the horizontal direction of the compression connector 31 can be fixed with respect to the cage 21. Since the cage 21 can stably receive the contact reaction applied to the top surface 34*a* of the cover shell 34 from the contact 32, a stable fixed state of the compression connector 31 to the substrate 11 is maintained. That is, with the connector with substrate 200 according to the third embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the third embodiment. Various changes or improvements can be added to the third embodiment.

For example, in the third embodiment explained above, as an example, the two lock holes 223 are formed in the cage top surface 21*a* configuring the cage 21, the lock piece 237 is formed in the cover shell 34 configuring the upper surface side of the compression connector 31, and the two lock claws 238 are formed in the lock piece 237. However, a member in which the lock hole and the lock piece attached with the lock claw according to the present invention are formed may be either the cage or the compression connector. That is, the lock hole may be formed on the compression connector side and the lock piece attached with the lock claw may be formed on the cage side. Further, as the number of each of lock holes and lock claws according to the present invention, any number can be selected if the number is equal to or larger than one.

The configuration of the connector with substrate 200 according to the third embodiment is explained above with reference to FIGS. 26 to 39. Subsequently, a connector with substrate 300 according to a fourth embodiment, which is another form example that the connector with substrate according to the present invention can take, is explained with reference to FIGS. 40 to 54. Note that, in the following explanation, members that are the same as or similar to the members explained in the first to third embodiment above are denoted by the same reference numerals and signs and explanation of the members is sometimes omitted.

Fourth Embodiment

Figure 40:
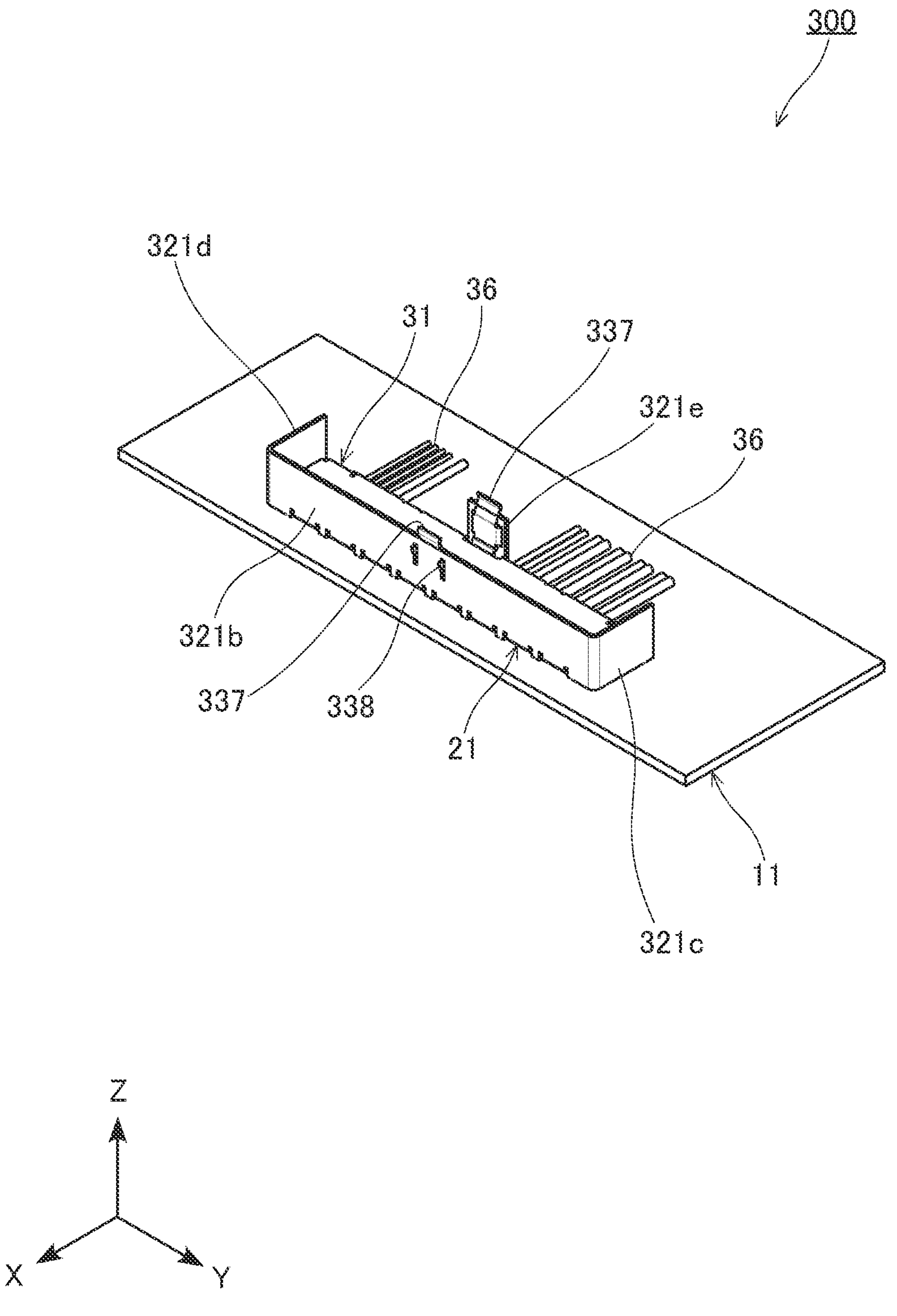
FIG. 40 is an exterior perspective view of a connector with substrate according to a fourth embodiment viewed from the front upper right.
Figure 41:
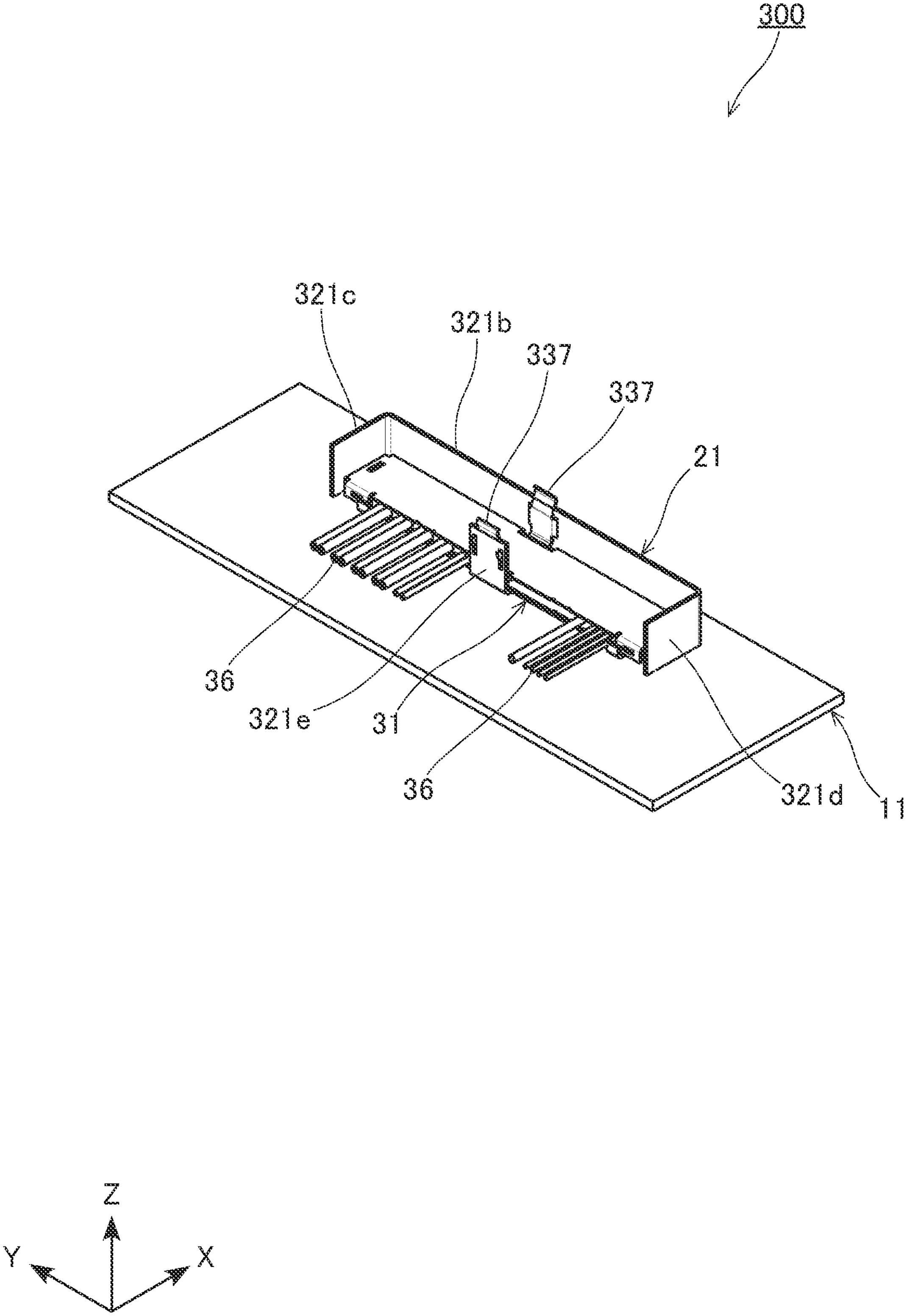
FIG. 41 is an exterior perspective view of the connector with substrate according to the fourth embodiment viewed from the rear upper left.

A configuration of the connector with substrate 300 according to the fourth embodiment is explained with reference to FIGS. 40 to 54. The connector with substrate 300 according to the fourth embodiment includes, as shown in FIGS. 40 to 42, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 42:
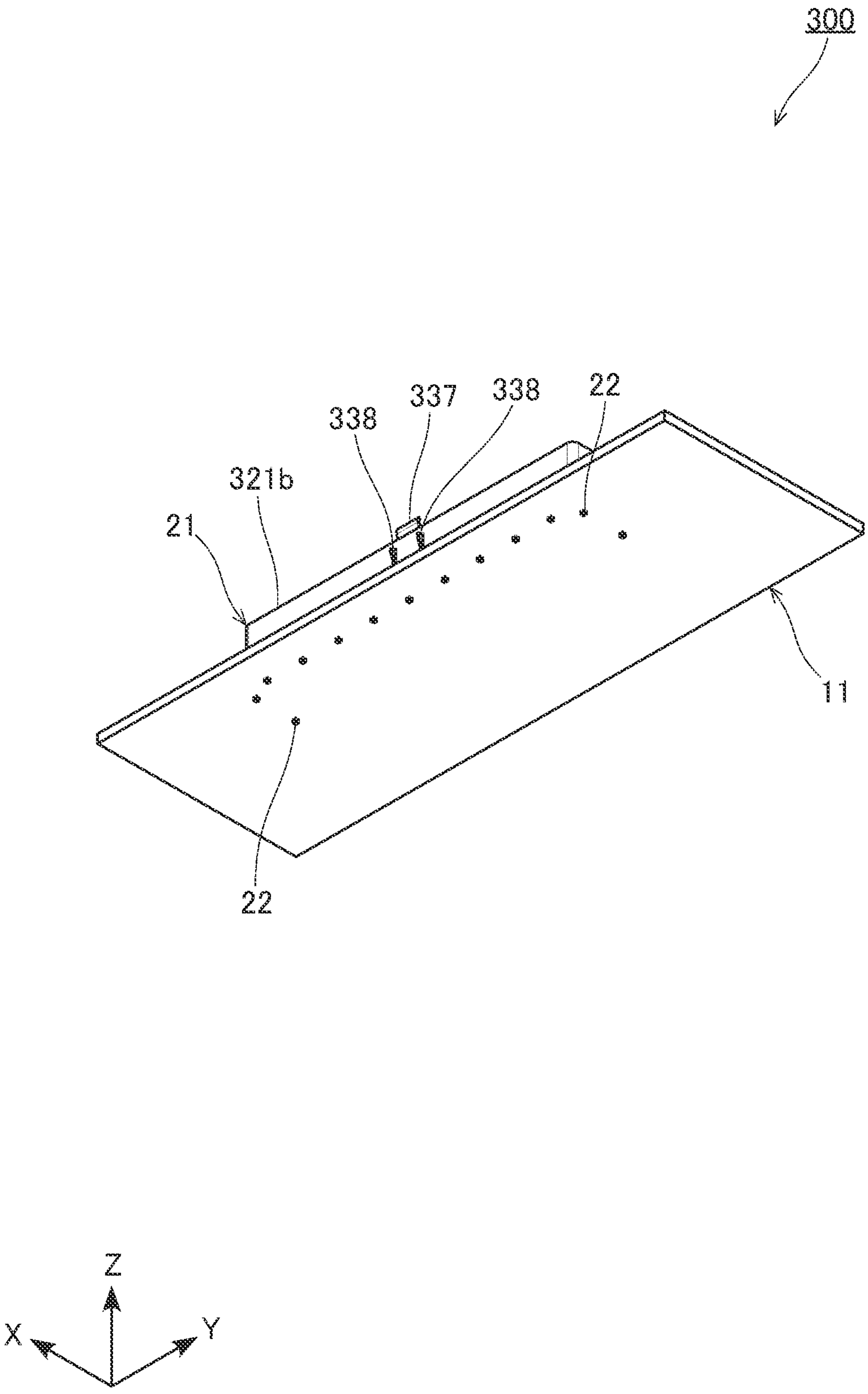
FIG. 42 is an exterior perspective view of the connector with substrate according to the fourth embodiment viewed from the front lower right.

A plurality of attachment holes (not shown) are formed in the substrate 11 (see FIG. 42). The plurality of leg sections 22 included in the cage 21 explained below are inserted into the plurality of (in the fourth embodiment, assumed to be thirteen) attachment holes (not shown) to fix the cage 21 to the substrate 11.

Figure 52:
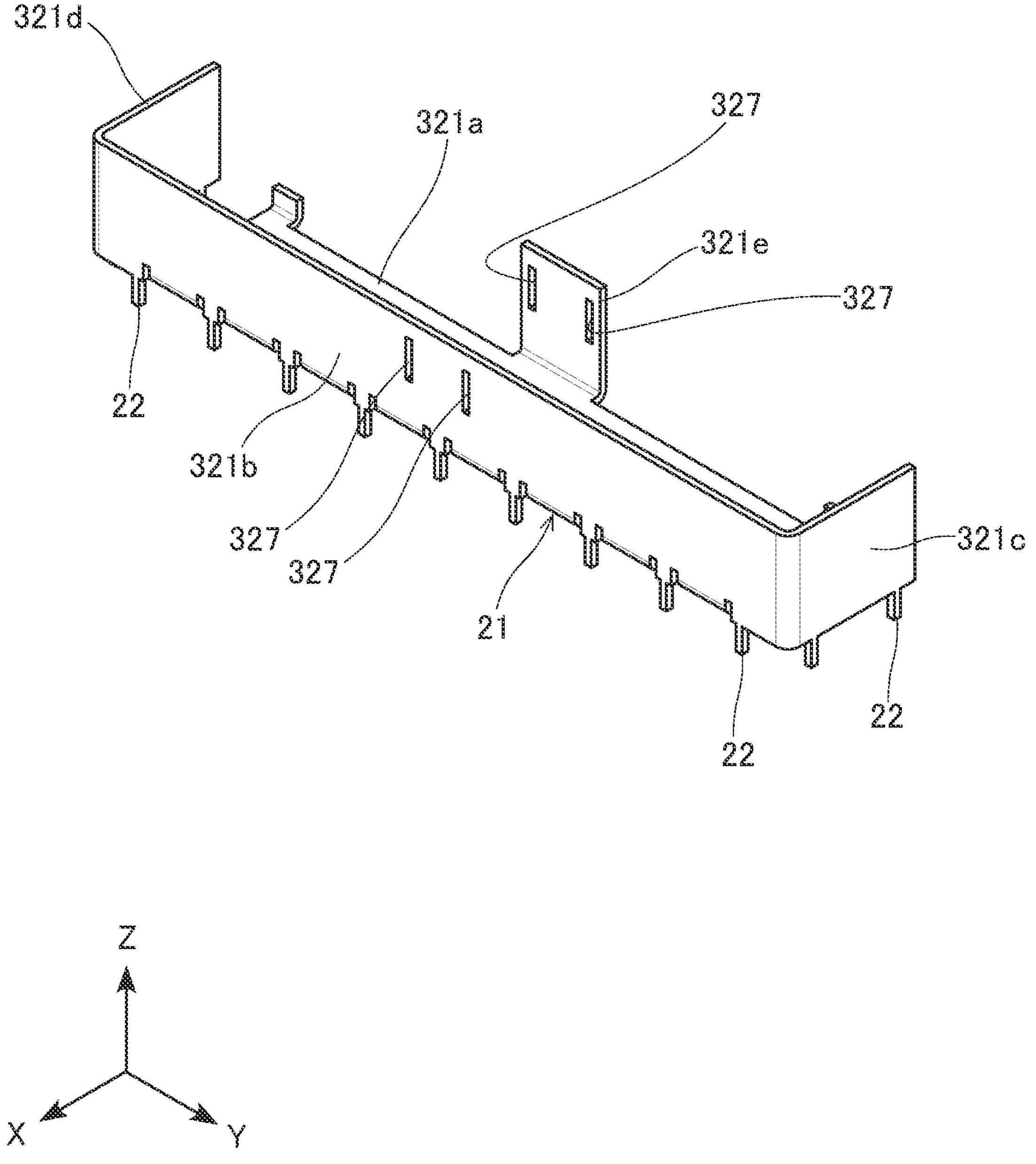
FIG. 52 is an exterior perspective view of the cage included in the connector with substrate according to the fourth embodiment viewed from the front upper right.
Figure 53:
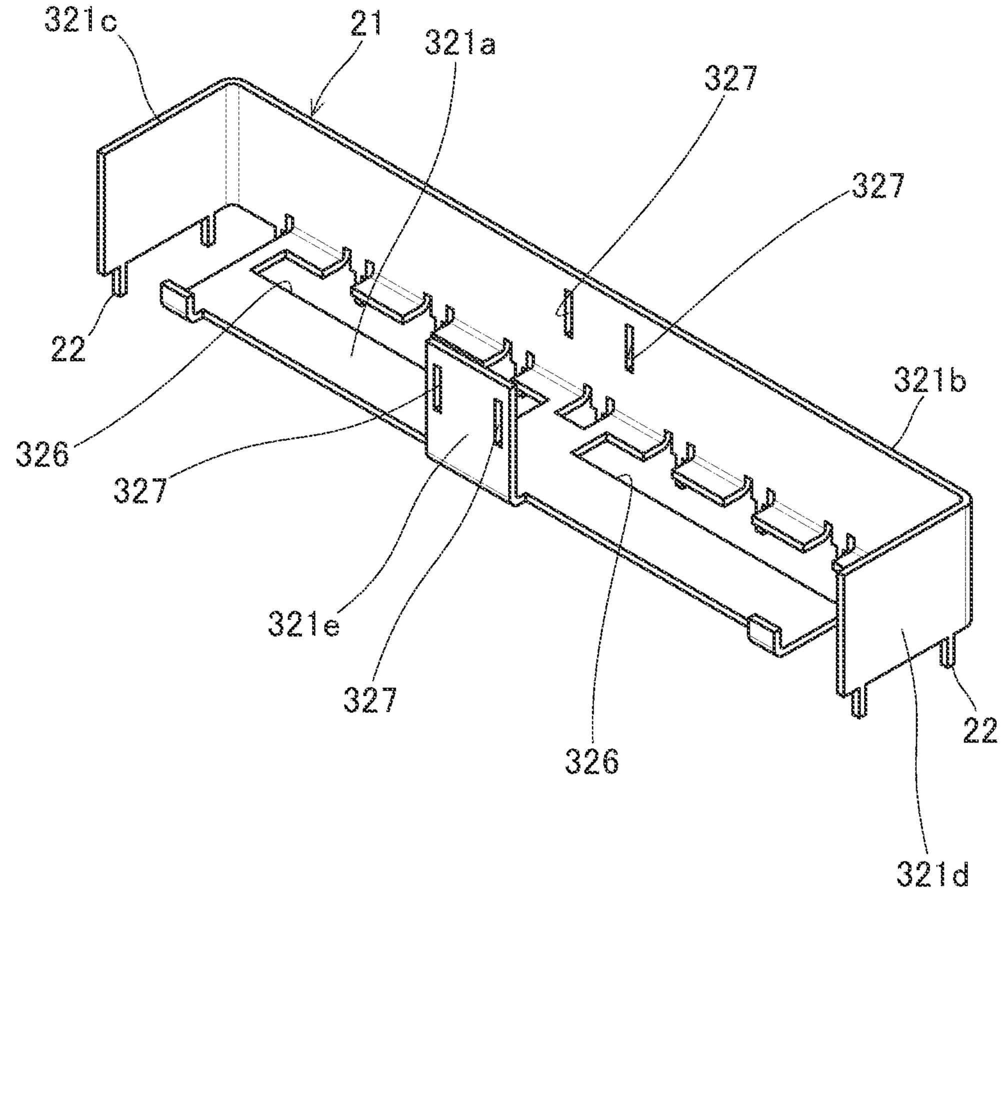
FIG. 53 is an exterior perspective view of the cage included in the connector with substrate according to the fourth embodiment viewed from the rear upper left.
Figure 54:
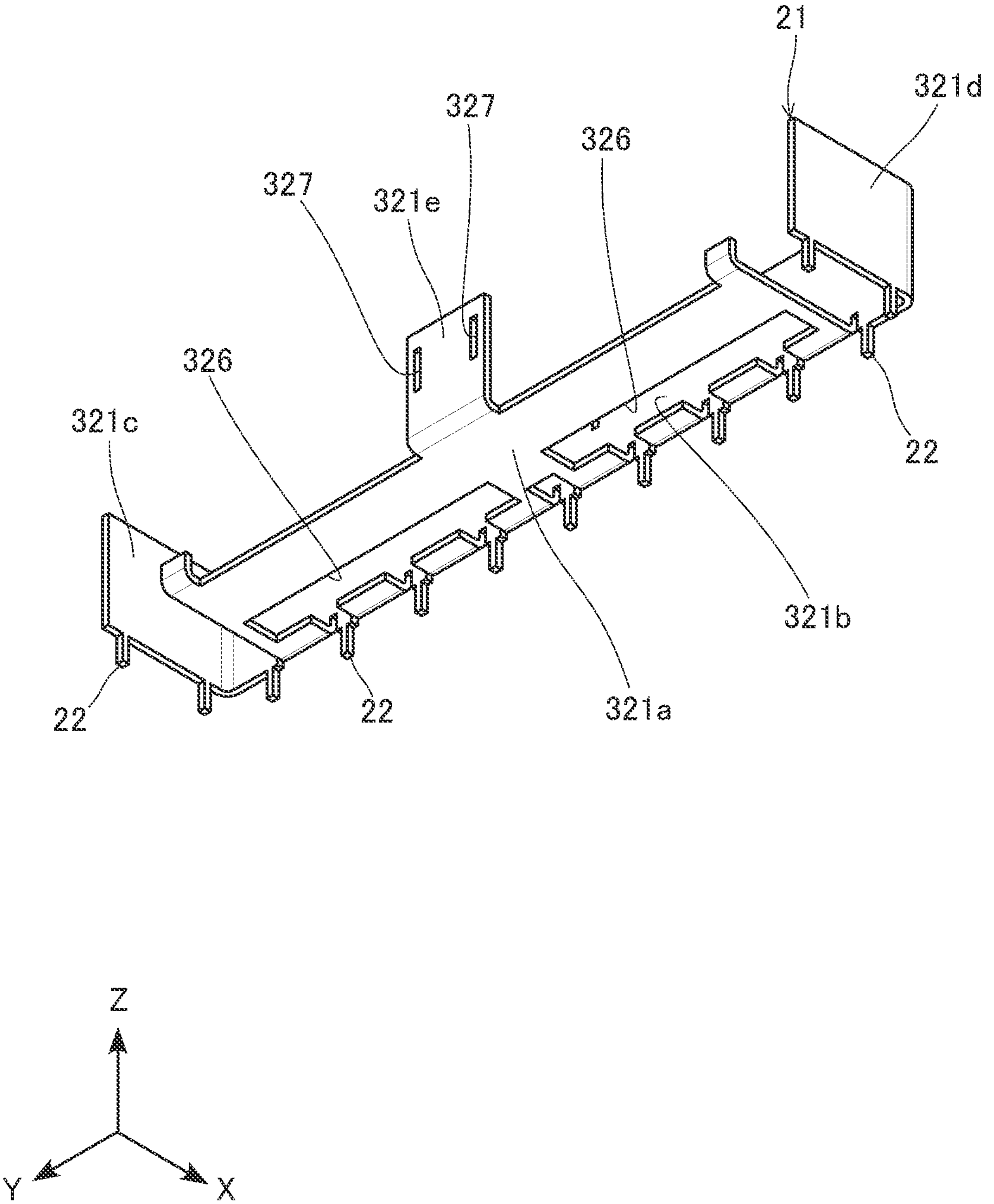
FIG. 54 is an exterior perspective view of the cage included in the connector with substrate according to the fourth embodiment viewed from the rear lower left.

As shown in FIGS. 52 to 54, the cage 21 is a member formed by pressing and bending a flat metal plate material and includes a cage bottom surface 321*a* forming the bottom surface of the present invention, a vertical front surface 321*b* and a vertical rear surface 321*e* formed as the vertical surface of the present invention by being bent vertically upward from the front and the rear of the cage bottom surface 321*a*, and a vertical right side surface 321*c* and a vertical left side surface 321*d* formed as the vertical surface of the present invention by bending the left and right ends of the vertical front surface 321*b* rearward. A region surrounded by the cage bottom surface 321*a*, the vertical front surface 321*b*, the vertical right side surface 321*c*, the vertical left side surface 321*d*, and the vertical rear surface 321*e* is a region where the compression connector 31 is housed and installed.

The plurality of (in the fourth embodiment, thirteen) leg sections 22 are formed on the lower end faces of the vertical front surface 321*b*, the vertical right side surface 321*c*, and the vertical left side surface 321*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. Note that, as a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

On the other hand, in the cage bottom surface 321*a*, a contact housing hole 326 functioning as the hole according to the present invention is formed in order to house the plurality of contacts 32 included in the compression connector 31 explained below. When the cage 21 is attached to the substrate 11, since the contact housing hole 326 is closed by the upper surface of the substrate 11, a groove having depth equivalent to the thickness of a metal flat plate configuring the cage bottom surface 321*a* is formed in a part where the contact housing hole 326 is formed. The plurality of contacts 32 are disposed in the position of the groove, whereby positioning of the compression connector 31 in the region surrounded by the cage bottom surface 321*a*, the vertical front surface 321*b*, the vertical right side surface 321*c*, the vertical left side surface 321*d*, and the vertical rear surface 321*e* configuring the cage 21 is performed.

Four lock holes 327 in total are formed two each in each of the vertical front surface 321*b* and the vertical rear surface 321*e* that are two surfaces erected in the +Z direction to be directed in the upward direction, which is the third direction, from the cage bottom surface 321*a* forming the bottom surface of the present invention. Lock claws 338 formed in each of a pair of lock pieces 337 formed on two surface sides facing the first direction in the compression connector 31 explained below are fit in the lock holes 327, whereby the lock holes 327 are used for fixing the compression connector 31 to the cage 21. That is, the lock holes 327 are formed as parts that receive, via the lock claws 338, contact reaction in the vertical direction applied from the compression connector 31 when the compression connector 31 is housed and installed in the cage 21 and the substrate 11. The lock holes 327 and the lock claws 338 can restrict, by cooperating, movement in the vertical direction of the compression connector 31 with respect to the cage 21.

The compression connector 31 includes, as shown in FIGS. 45 to 51, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 47:
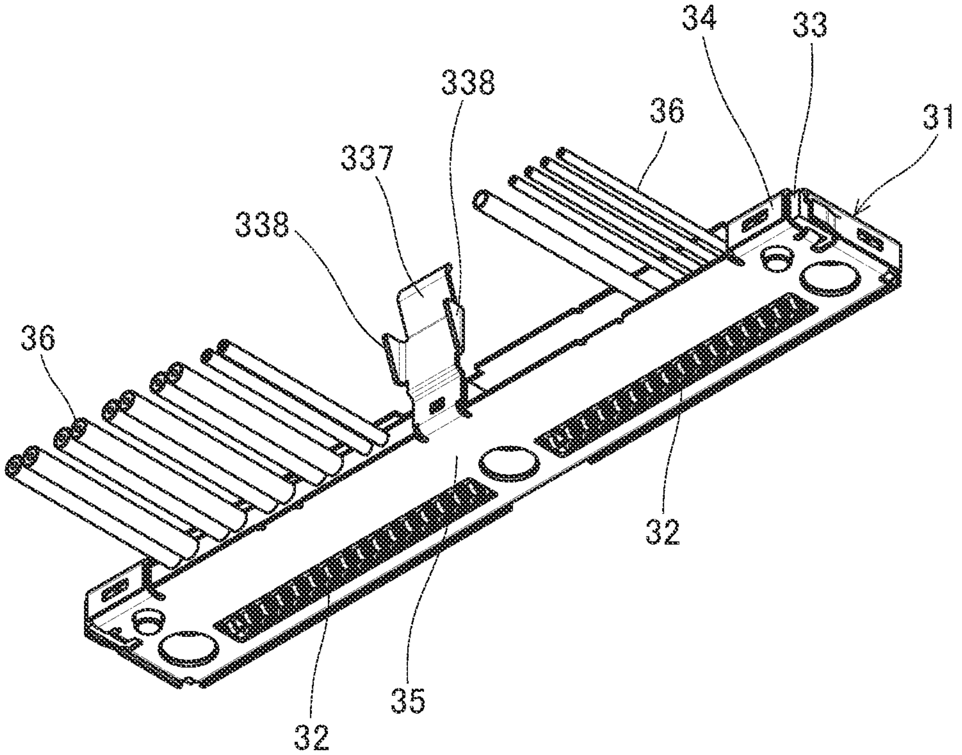
FIG. 47 is an exterior perspective view of the compression connector according to the fourth embodiment viewed from the rear lower left.
Figure 47:
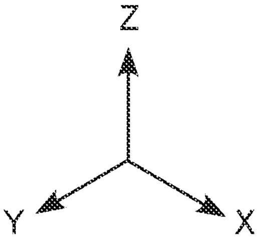
Figure 48:
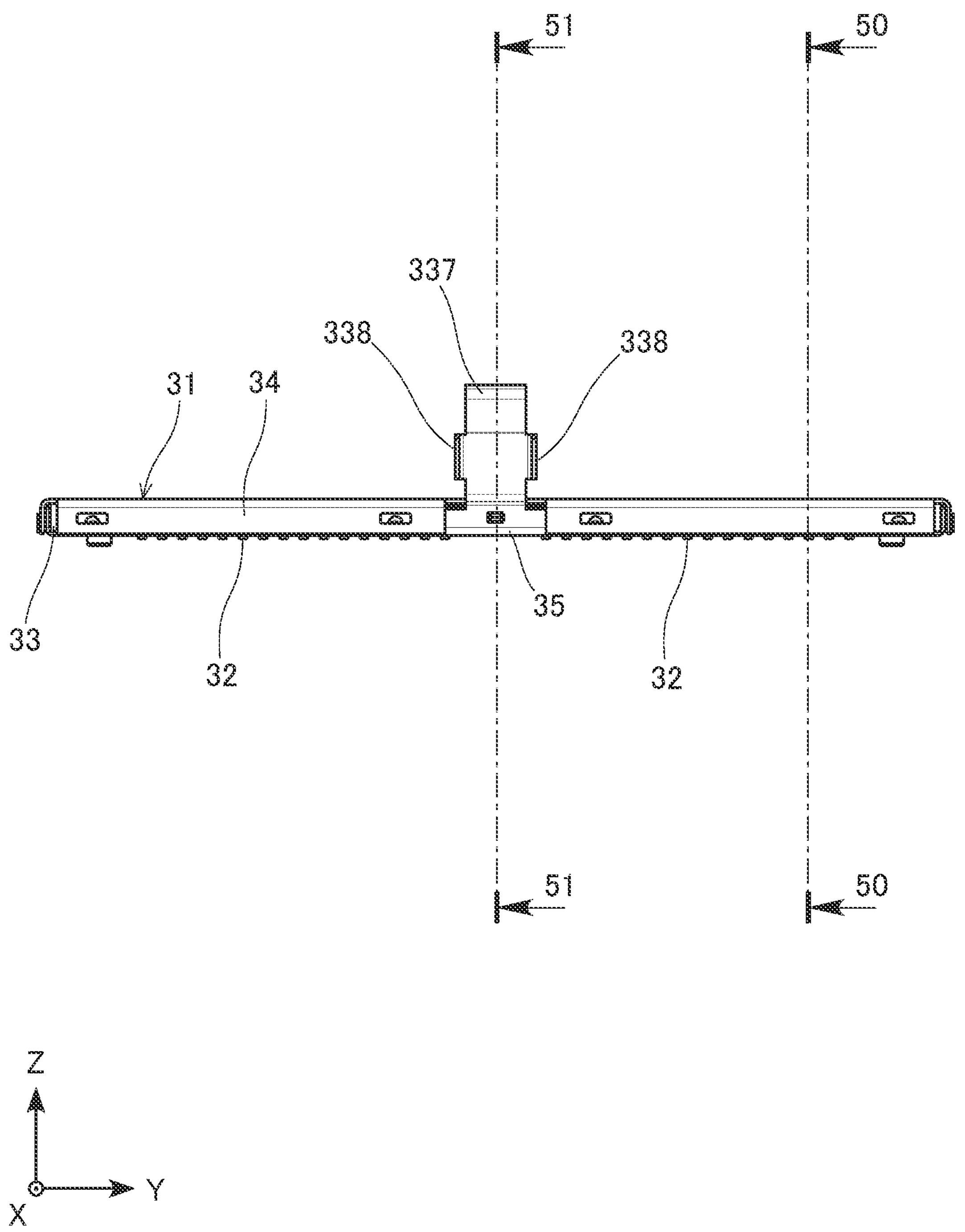
FIG. 48 is a front view of the compression connector according to the fourth embodiment.
Figure 49:
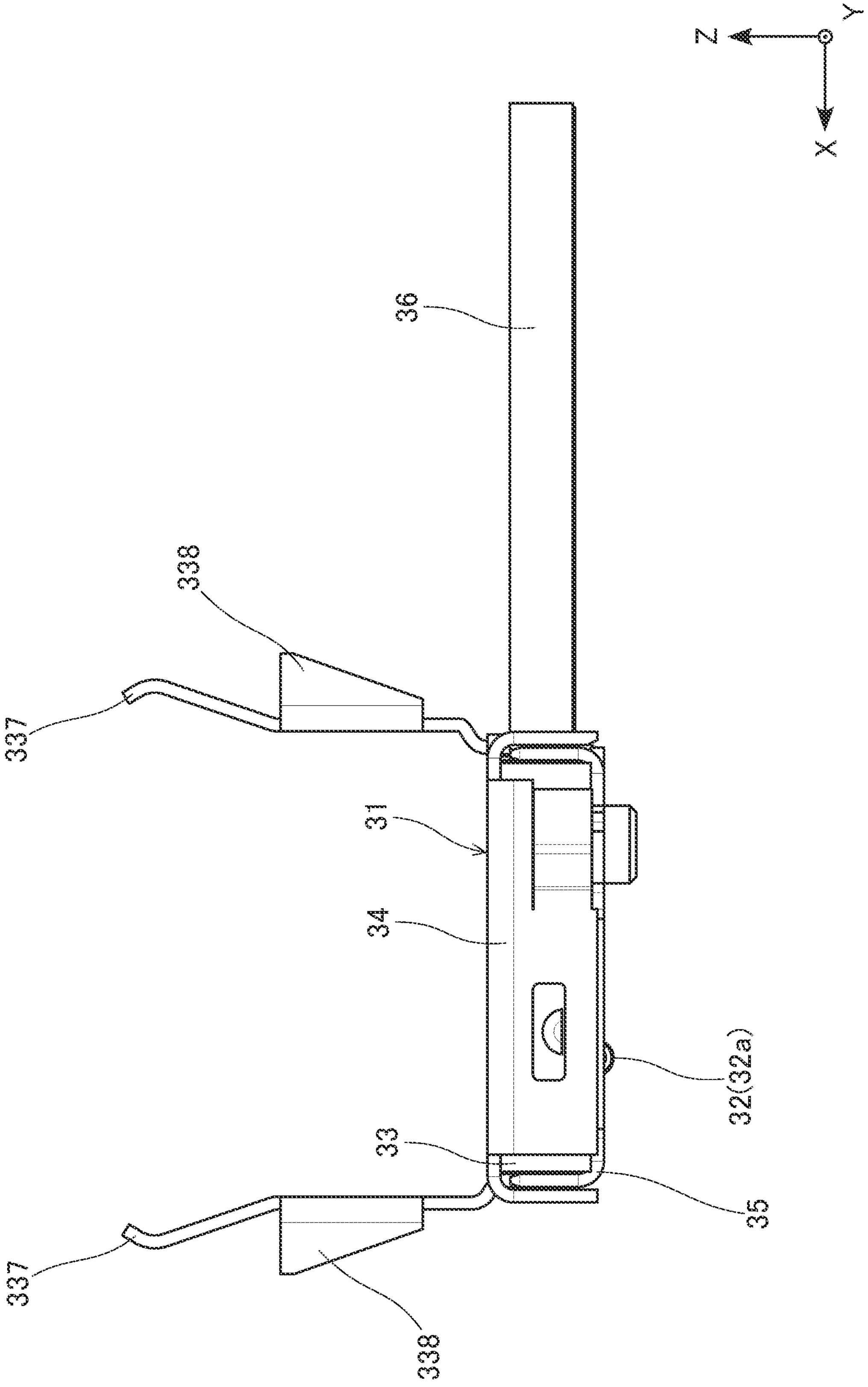
FIG. 49 is aright side view of the compression connector according to the fourth embodiment.

As shown in, in particular, FIGS. 47 and 48, the plurality of contacts 32 are disposed to be laterally arranged in the left-right direction.

Figure 50:
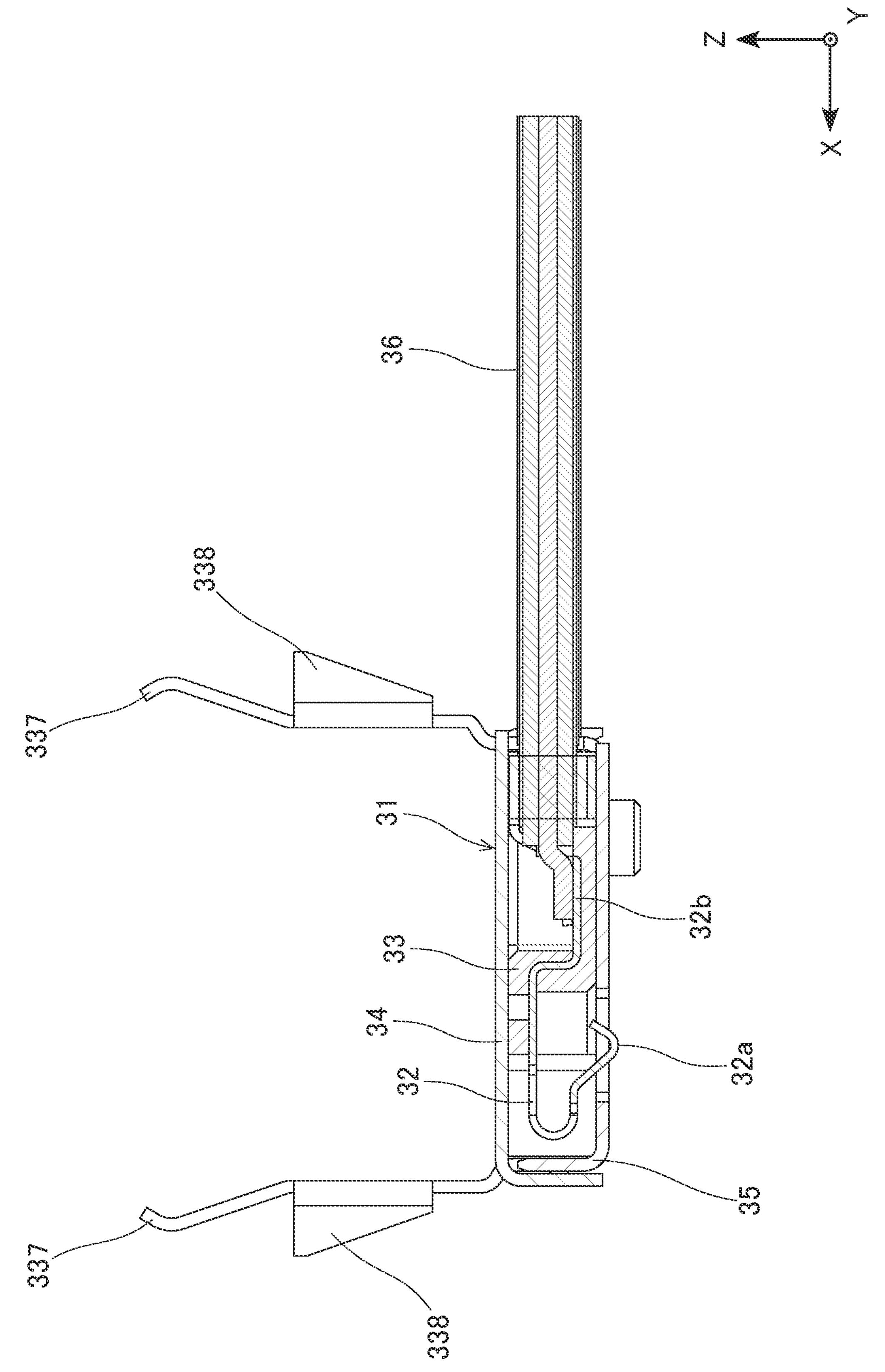
FIG. 50 is a longitudinal sectional view taken along line 50-50 in FIG. 48.
Figure 51:
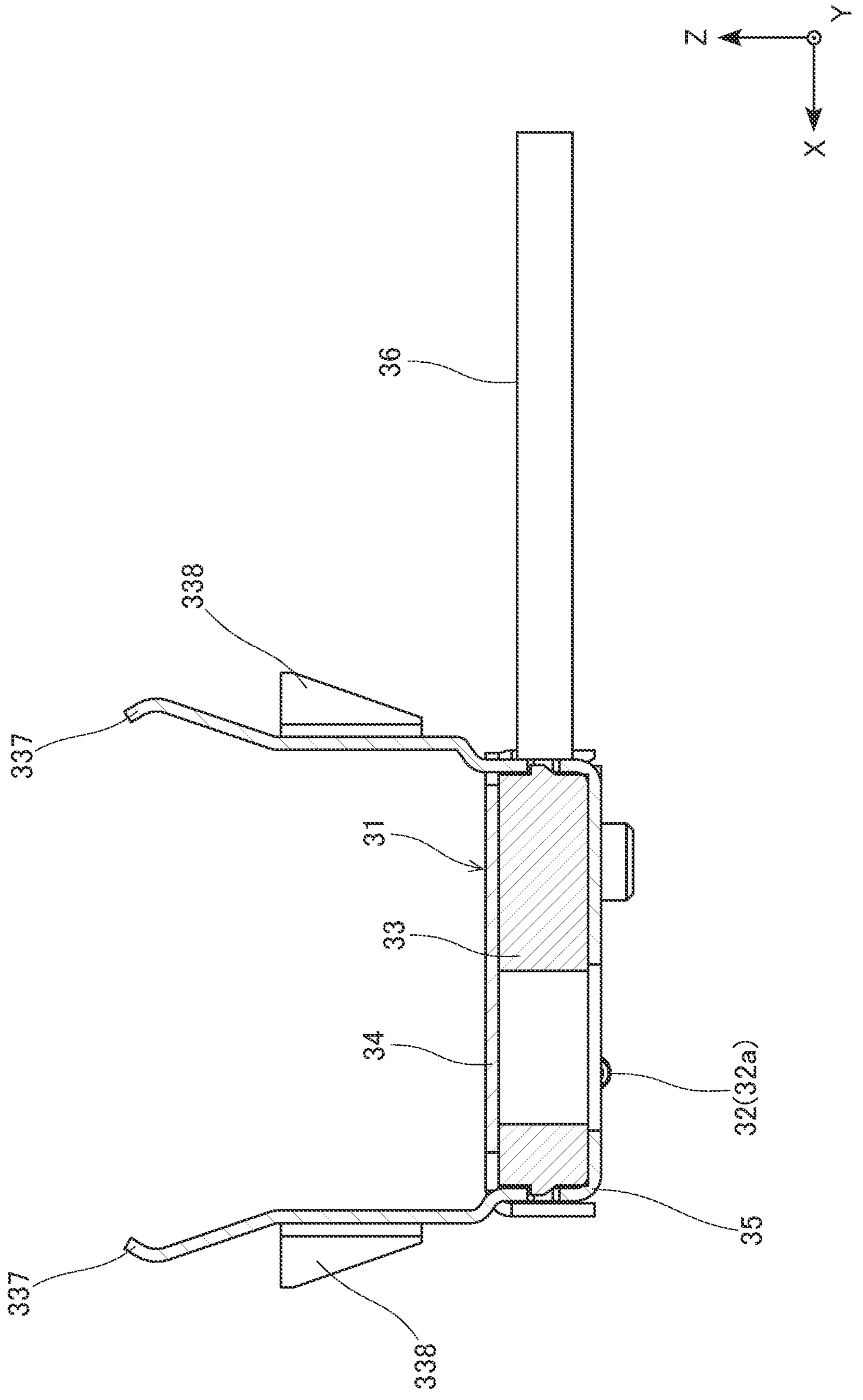
FIG. 51 is a longitudinal sectional view taken along line 51-51 in FIG. 48.

Each of the plurality of contacts 32 is fixed to the housing 33 as shown in FIG. 50. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 50). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the bottom surface position of the cage bottom surface 321*a* disposed below the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 50, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

In the compression connector 31 according to the fourth embodiment, the pair of lock pieces 337 are formed with respect to the center positions of the front and rear surfaces that are two surfaces facing the first direction (the X direction that is the front-rear direction) in the compression connector 31. The pair of lock pieces 337 is plate-like members erected upward from the center positions of the front and rear surfaces of the bottom shell 35. Further, four lock claws 338 in total are formed two each in each of the pair of lock pieces 337.

The lock claws 338 formed in the lock pieces 337 are formed as claw members extending outward from the front and rear surfaces. As shown more in detail in FIG. 50 and the like, the lock claws 338 have an exterior shape having a slope shape in a side view and are formed to have a wedge shape having a slope gradually having a larger projection amount outward from the lower side to the upper side in the compression connector 31. The wedge shape of the lock claws 338 is a shape that easily enters the lock holes 327 when the lock claws 338 move downward to be inserted into the lock holes 327. That is, the wedge shape of the lock claws 338 is a shape for not hindering an inserting motion of the compression connector 31 inserted downward from the upper side of the cage 21. The lock pieces 337 have a shape gradually bending inward because, when the compression connector 31 is inserted into the inside of the cage 21, the lock claws 338 come into contact with the vertical front surface 321*b* and the vertical rear surface 321*e* in which the lock holes 327 are formed. When the compression connector 31 is further inserted into the inside of the cage 21 from this state, the lock claws 338 completely enter the lock holes 327 formed in the vertical front surface 321*b* and the vertical rear surface 321*e*.

Each of the four lock claws 338 in total formed two each in each of the two lock pieces 337 included in the compression connector 31 fits in each of the four lock holes 327 in total respectively formed in each of the vertical front surface 321*b* and the vertical rear surface 321*e*, whereby the lock pieces 337 bent inward are released from constraint by the vertical front surface 321*b* and the vertical rear surface 321*e*. Therefore, the inward bent state is released and the lock pieces 337 return to the original shape. Since this state is a state in which the lock claws 338 completely fit in the lock holes 327, movement in the vertical direction of the compression connector 31 with respect to the cage 21 is restricted. That is, the lock claws 338 and the lock holes 327 can exert, by cooperating, a function of slip-off prevention for preventing the compression connector 31 from slipping off the cage 21.

Note that, concerning the members configuring the compression connector 31 in the fourth embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 300 according to the fourth embodiment is explained above. Subsequently, a method of attaching the compression connector 31 to and a method of detaching the compression connector 31 from the substrate 11 attached with the cage 21 configuring the connector with substrate 300 according to the fourth embodiment are explained.

Figure 43:
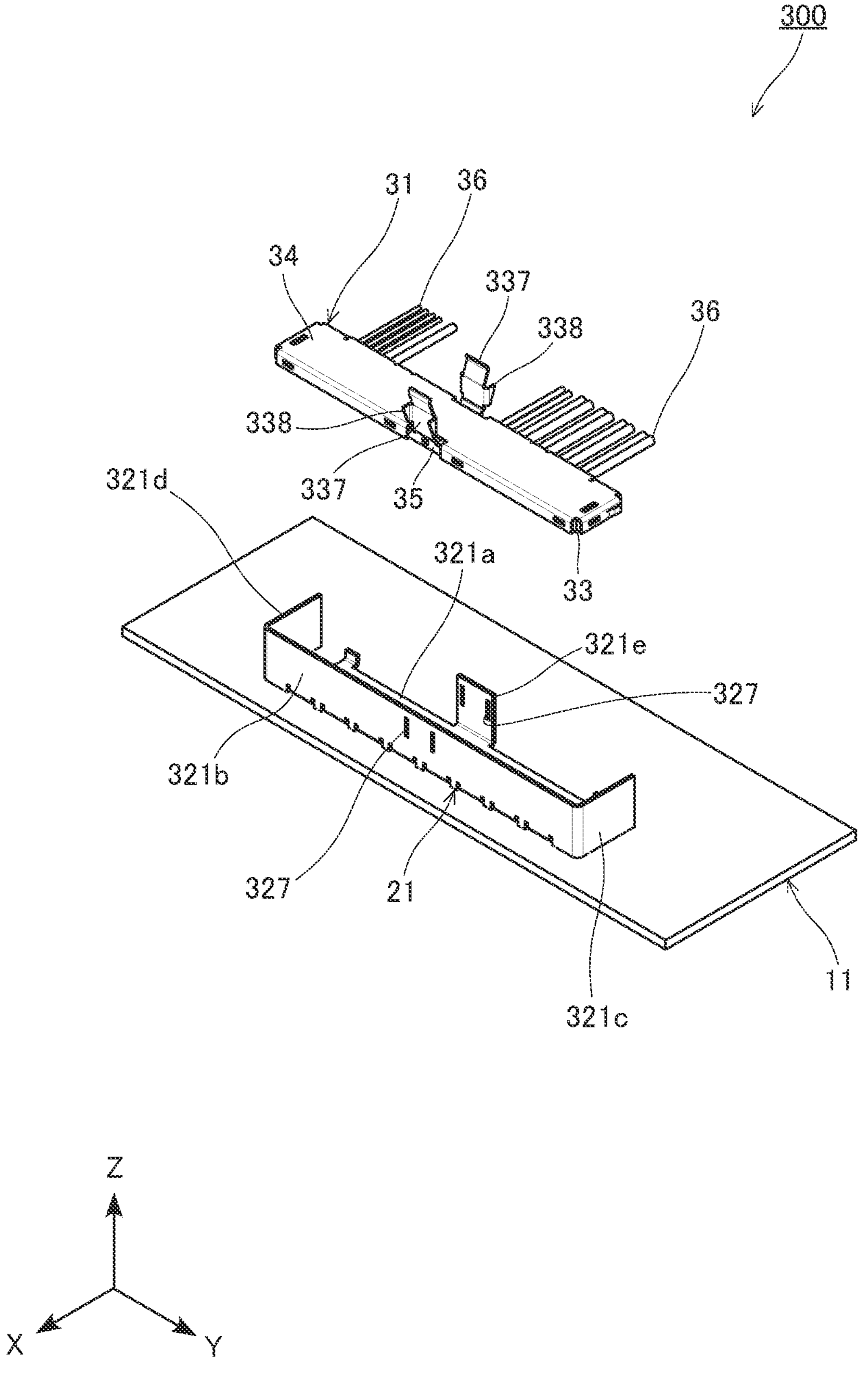
FIG. 43 is an exterior perspective view of a state in which a compression connector is detached from a substrate attached with a cage in the connector with substrate according to the fourth embodiment, the state being viewed from the front upper right.
Figure 44:
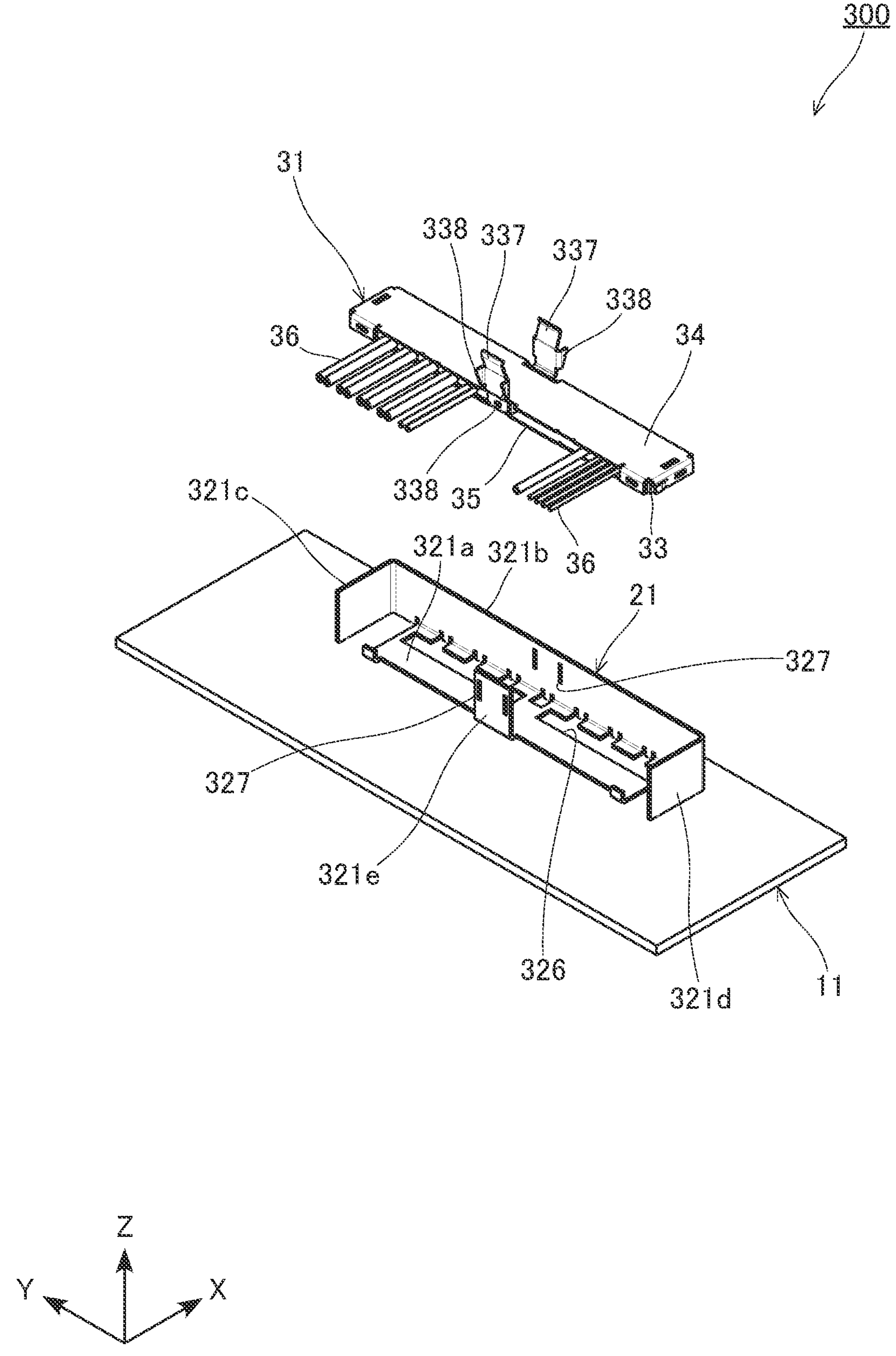
FIG. 44 is an exterior perspective view of the state in which the compression connector is detached from the substrate attached with the cage in the connector with substrate according to the fourth embodiment, the state being viewed from the rear upper left.
Figure 45:
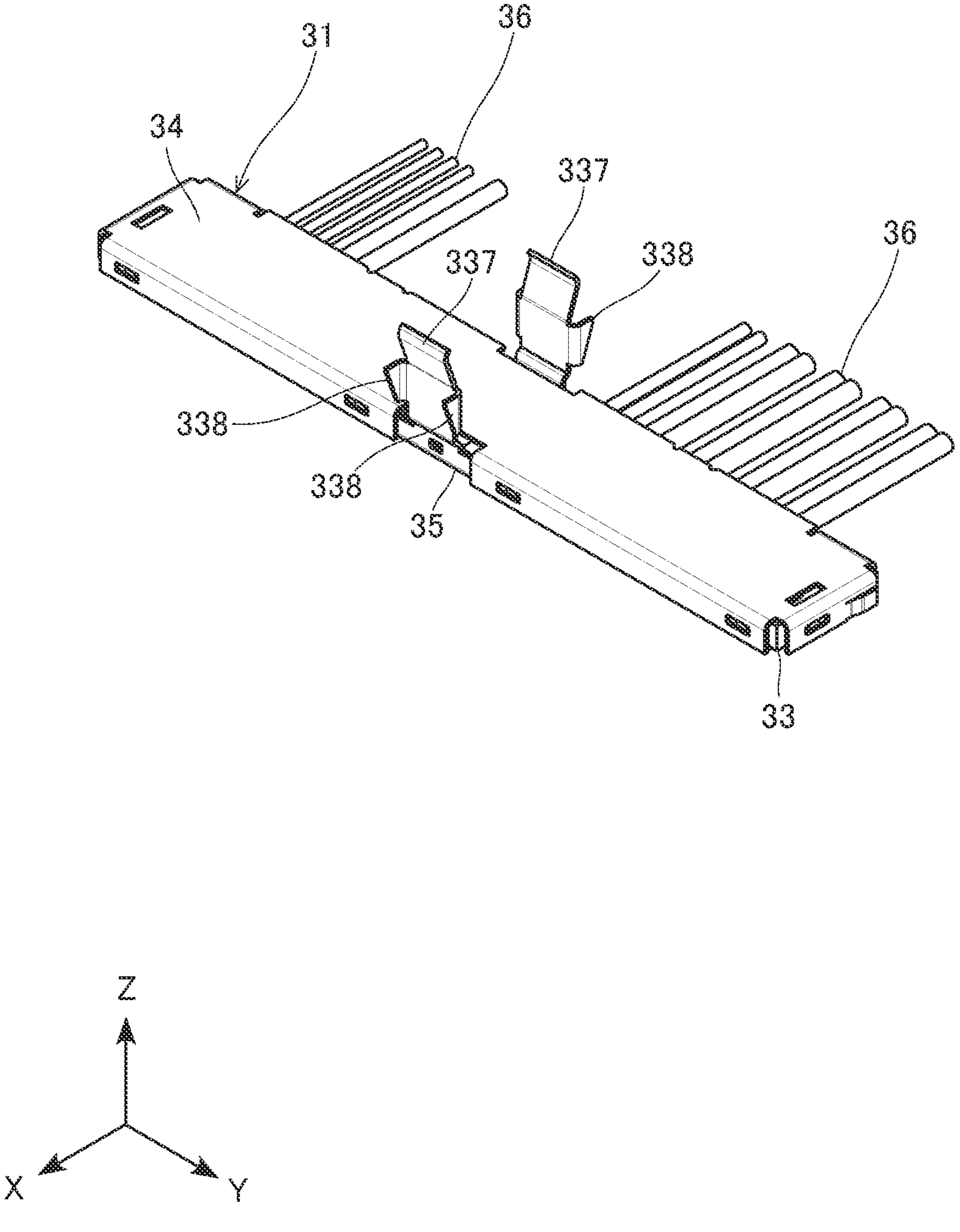
FIG. 45 is an exterior perspective view of the compression connector according to the fourth embodiment viewed from the front upper right.
Figure 46:
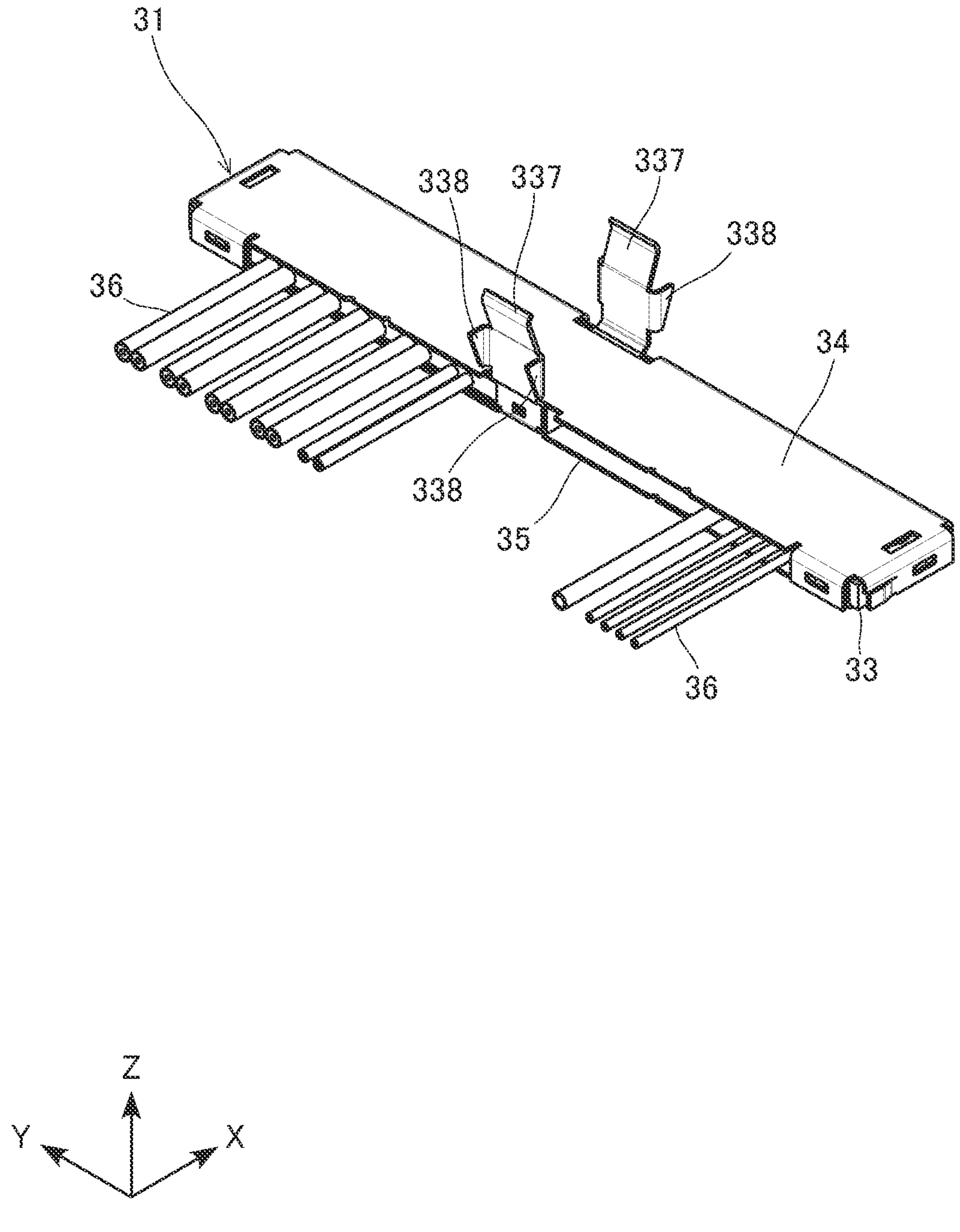
FIG. 46 is an exterior perspective view of the compression connector according to the fourth embodiment viewed from the rear upper left.

When the compression connector 31 is attached to the substrate 11 attached with the cage 21, the compression connector 31 is moved in the vertical direction to be directed in the downward direction (the −Z direction) from a state shown in FIGS. 43 and 44. When the compression connector 31 is inserted into the region surrounded by the cage bottom surface 321*a*, the vertical front surface 321*b*, the vertical right side surface 321*c*, the vertical left side surface 321*d*, and the vertical rear surface 321*e* configuring the cage 21, the compression connector 31 applies, to the substrate 11, contact reaction in the vertical direction applied by the plurality of contacts 32 included in the compression connector 31. Therefore, when the compression connector 31 is further inserted in the downward direction (the −Z direction) by applying force resisting contact reaction in the vertical direction applied by the plurality of contacts 32, the lock claws 338 formed in the lock pieces 337 formed in the bottom shell 35 of the compression connector 31 come into contact with the vertical front surface 321*b* and the vertical rear surface 321*e*, in which the lock holes 327 are formed, to gradually bend inward. When the compression connector 31 is further inserted into the inside of the cage 21 from this state, the lock claws 338 formed in the lock pieces 337 enter the lock holes 327 formed in each of the vertical front surface 321*b* and the vertical rear surface 321*e*.

When each of the four lock claws 338 in total formed in the pair of lock pieces 337 included in the compression connector 31 completely fits in each of the four lock holes 327 in total formed in the vertical front surface 321*b* and the vertical rear surface 321*e*, since the lock claw 338 has the wedge shape, movement in the vertical direction (movement in the +Z direction) of the compression connector 31 with respect to the cage 21 is restricted. In particular, since contact reaction in the vertical direction applied by the plurality of contacts 32 included in the compression connector 31 is applied to the substrate 11, the compression connector 31 always applies force in a direction of slipping off upward from the cage 21. However, since the lock claws 338 fit in the lock holes 327, the lock holes 327 and the lock claws 338 receive the contact reaction in concert.

On the other hand, when the compression connector 31 is detached from the substrate 11 attached with the cage 21, the user can release the fit state of the four lock claws 338 in total and the four lock holes 327 in total by pushing each of the pair of lock pieces 337 inward. When the compression connector 31 is vertically moved in the upward direction (the +Z direction) in such a release state, it is possible to smoothly detach the compression connector 31 from the substrate 11 attached with the cage 21.

Note that, since the lock holes 327 and the lock claws 338 receive, in concert, the contact reaction in the vertical direction applied by the plurality of contacts 32 included in the compression connector 31, if the fit state of the lock claws 338 and the lock holes 327 is released, it is possible to easily vertically move the compression connector 31 in the upward direction (the +Z direction). By vertically moving the compression connector 31 in the upward direction (the +Z direction) in this way and completely pull out the compression connector 31 from the substrate 11 attached with the cage 21, it is possible to detach the compression connector 31 from the substrate 11 attached with the cage 21.

As explained above, in the connector with substrate 300 according to the fourth embodiment, by fitting the lock claws 338 formed in each of the pair of lock pieces 337 formed on the two surface sides facing the first direction in the compression connector 31 in the lock holes 327 formed in the vertical front surface 321*b* and the vertical rear surface 321*e* configuring the cage 21, it is possible to fix the position in the vertical direction of the compression connector 31 with respect to the cage 21. Since the lock holes 327 and the lock claws 338 can receive the contact reaction in concert, a stable fixed state of the compression connector 31 to the substrate 11 is maintained. That is, with the connector with substrate 300 according to the fourth embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the fourth embodiment. Various changes or improvements can be added to the fourth embodiment.

For example, in the fourth embodiment explained above, as an example, the lock holes 327 are formed in the vertical front surface 321*b* and the vertical rear surface 321*e* configuring the cage 21 and the lock pieces 337 including the lock claws 338 are formed in the bottom shell 35 configuring the bottom surface side of the compression connector 31. However, a member in which the lock hole and the lock piece attached with the lock claw according to the present invention are formed may be either the cage or the compression connector. That is, the lock hole may be formed on the compression connector side and the lock piece attached with the lock claw may be formed on the cage side. Further, as the number of each of lock holes and lock claws according to the present invention, any number can be selected if the number is equal to or larger than one.

The configuration of the connector with substrate 300 according to the fourth embodiment is explained above with reference to FIGS. 40 to 54. Subsequently, a connector with substrate 400 according to a fifth embodiment, which is another form example that the connector with substrate according to the present invention can take, is explained with reference to FIGS. 55 to 69A and 69B. Note that, in the following explanation, members that are the same as or similar to the members explained in the first to fourth embodiment above are denoted by the same reference numerals and signs and explanation of the members is sometimes omitted.

Fifth Embodiment

Figure 55:
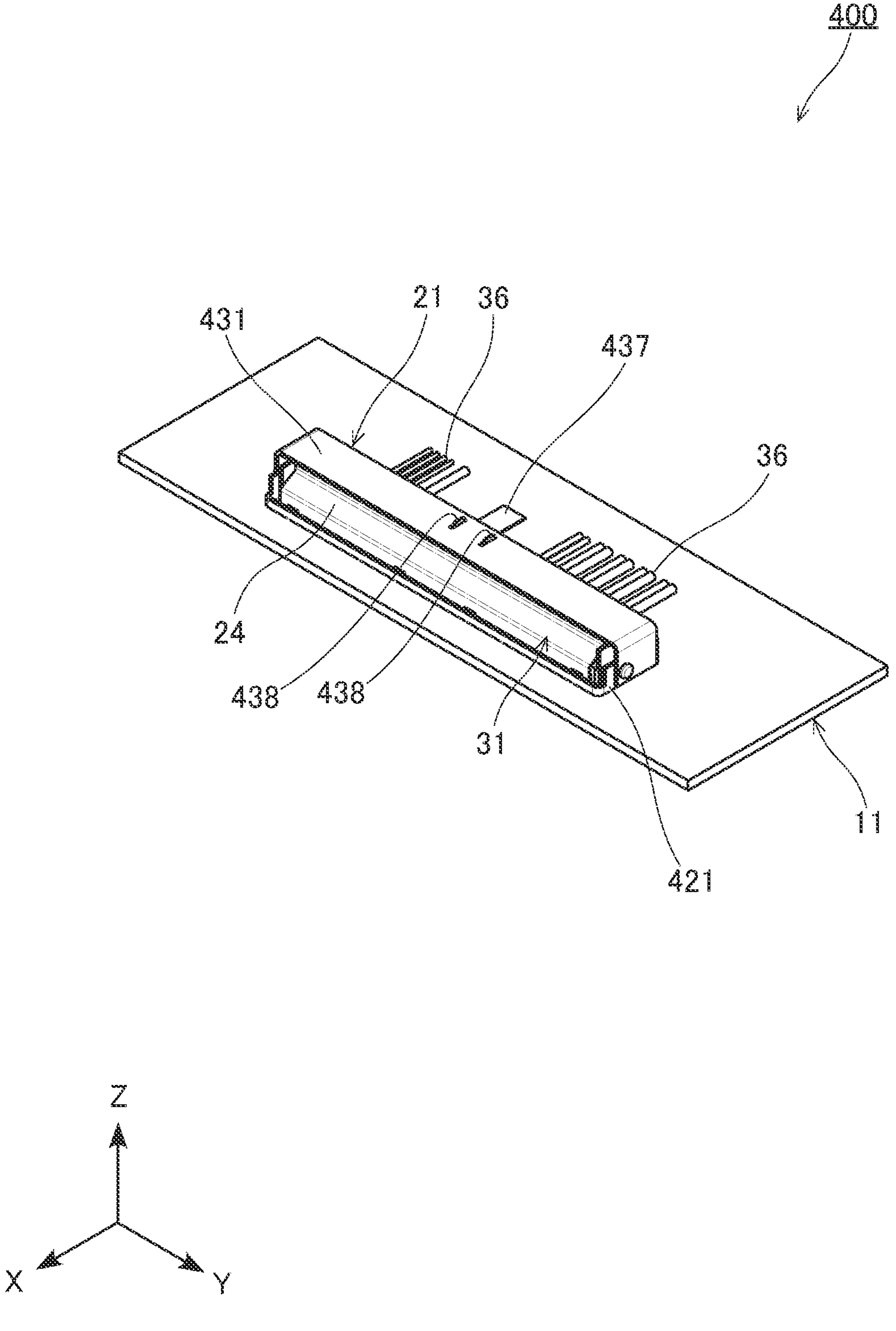
FIG. 55 is an exterior perspective view of a connector with substrate according to a fifth embodiment viewed from the front upper right.
Figure 56:
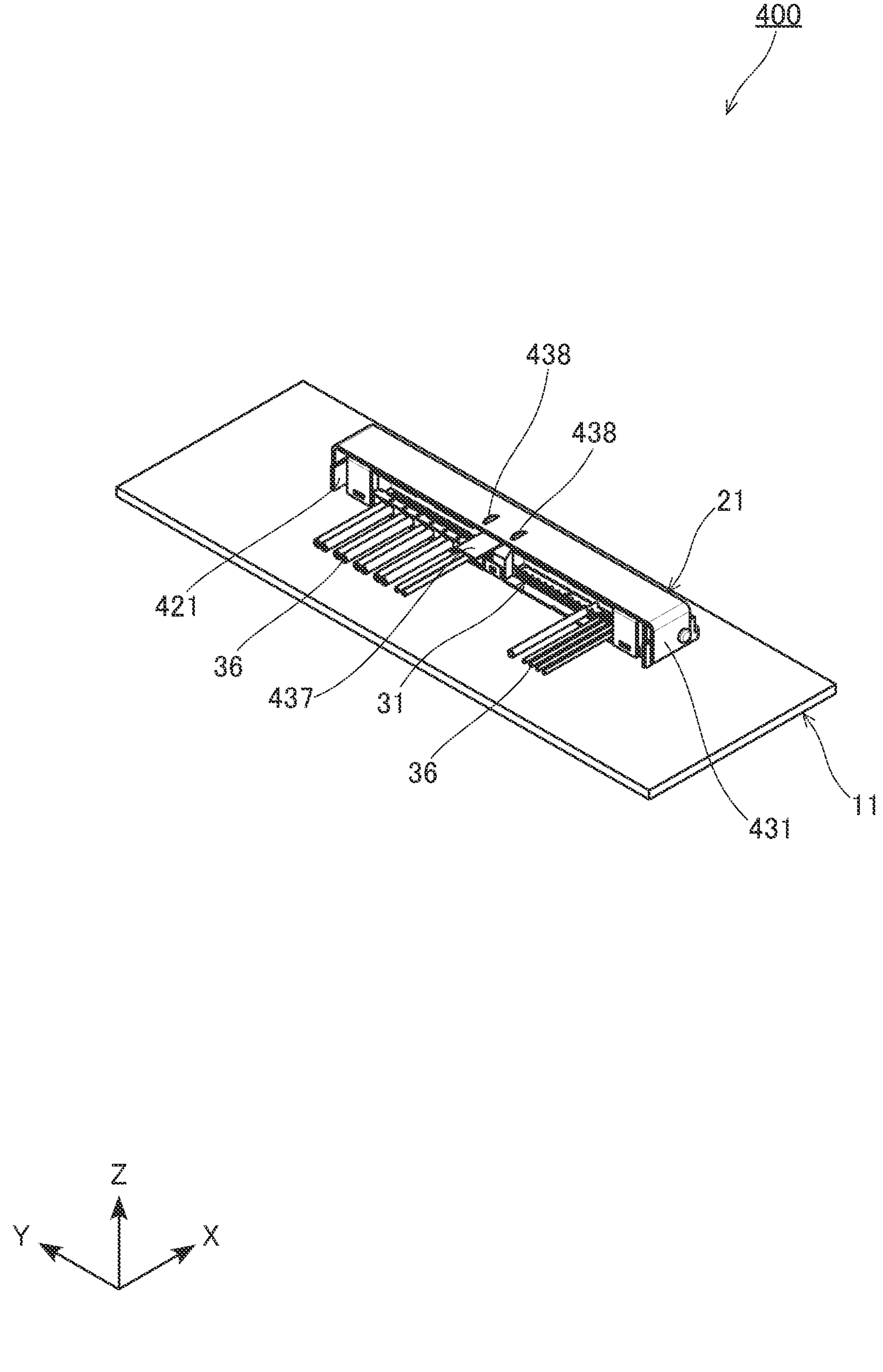
FIG. 56 is an exterior perspective view of the connector with substrate according to the fifth embodiment viewed from the rear upper left.

A configuration of the connector with substrate 400 according to the fifth embodiment is explained with reference to FIGS. 55 to 69A and 69B. The connector with substrate 400 according to the fifth embodiment includes, as shown in FIGS. 55 to 57, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 57:
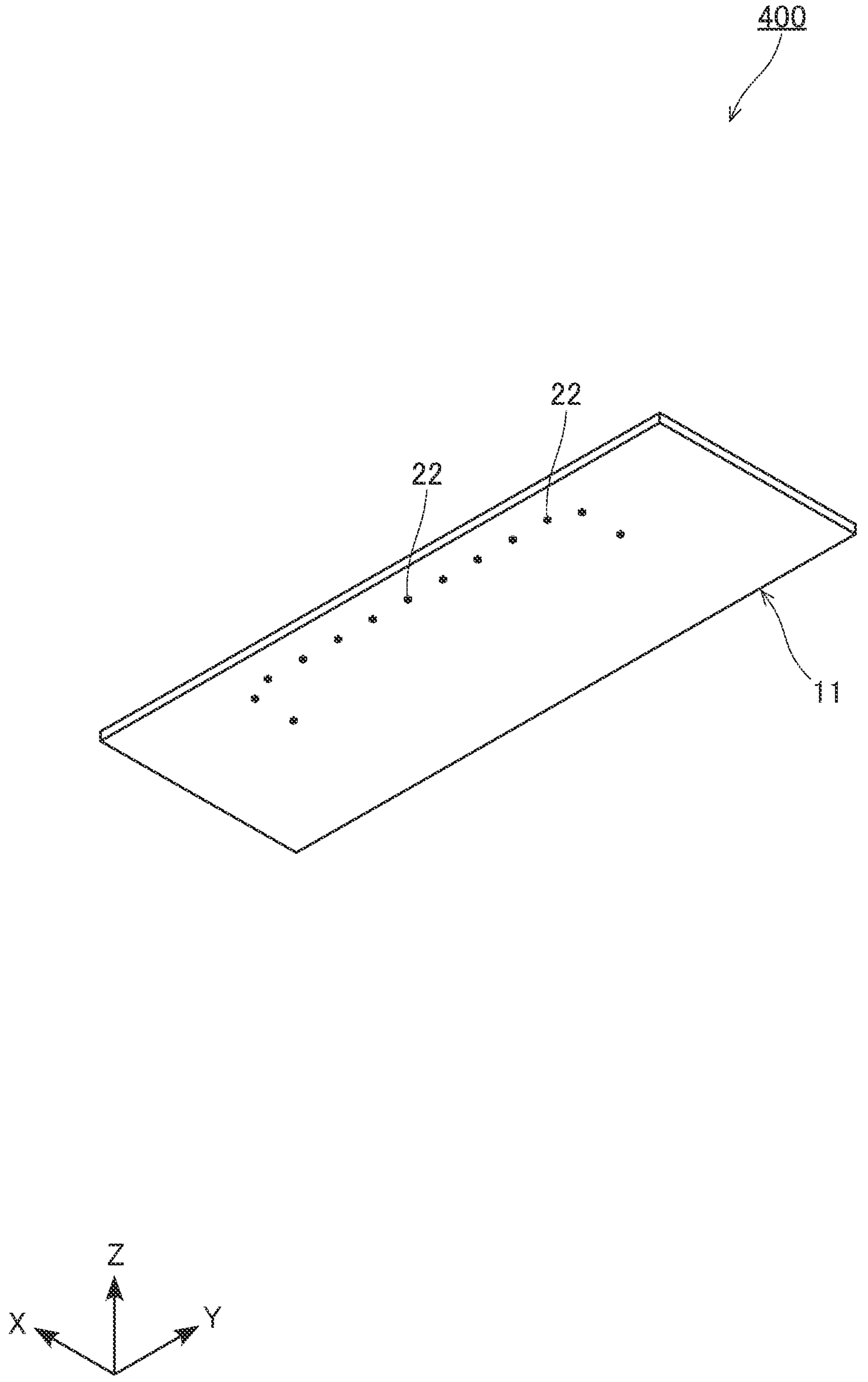
FIG. 57 is an exterior perspective view of the connector with substrate according to the fifth embodiment viewed from the front lower right.

A plurality of attachment holes (not shown) are formed in the substrate 11 (see FIG. 57). The plurality of leg sections 22 included in the cage 21 explained below are inserted into the plurality of (in the fifth embodiment, assumed to be thirteen) attachment holes (not shown) to fix the cage 21 to the substrate 11.

As shown in FIGS. 67 to 69A and 69B, the cage 21 is configured by two members including a cage base 421 and a cage cover 431.

The cage base 421 is a member formed by pressing and bending a flat metal plate material and is a member fixed and installed in the substrate 11. The cage base 421 according to the fifth embodiment includes a vertical front surface 421*b* configuring a front surface side and a vertical right side surface 421*c* and a vertical left side surface 421*d* formed by bending the left and right ends of the vertical front surface 421*b* rearward.

The plurality of (in the fifth embodiment, thirteen) leg sections 22 are formed on the lower end faces of the vertical front surface 421*b*, the vertical right side surface 421*c*, and the vertical left side surface 421*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. Note that, as a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

Figure 69A:
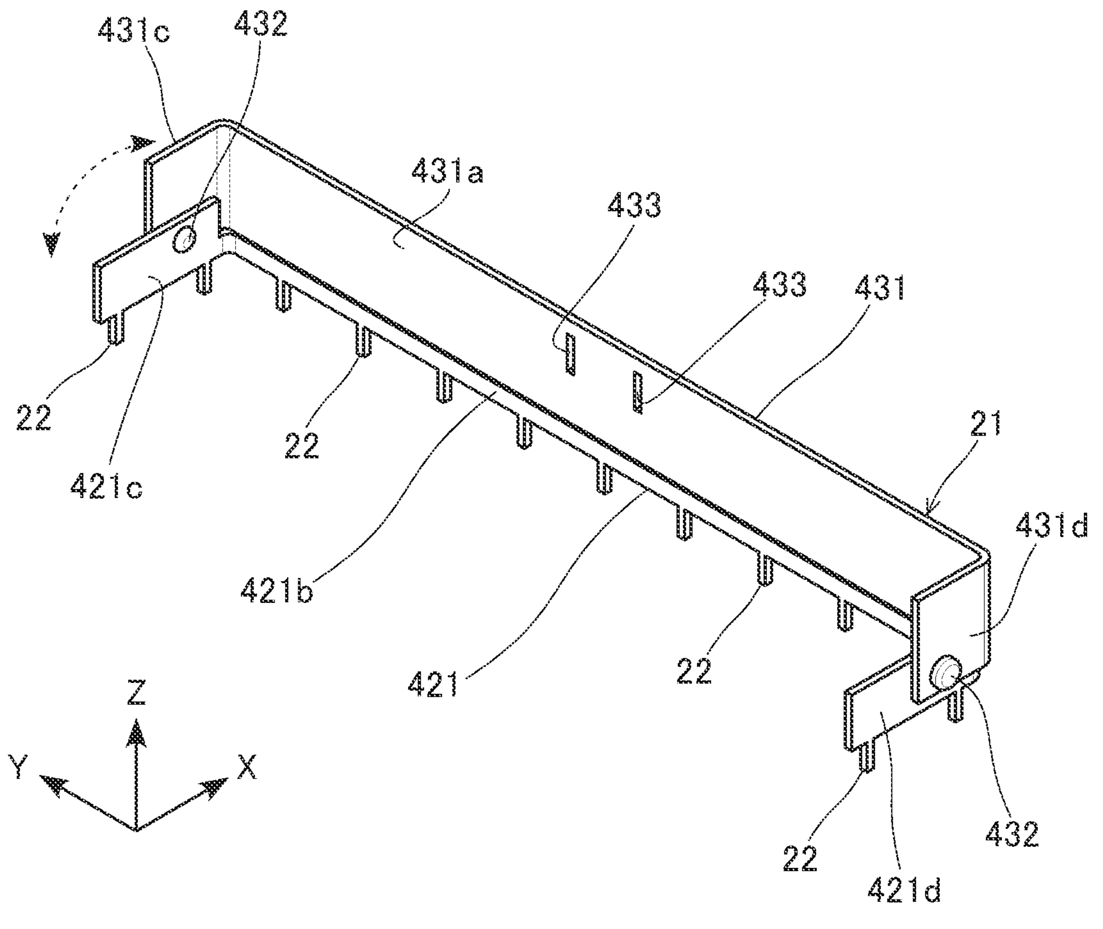
FIGS. 69A and 69B are diagrams for explaining an operation state of the cage included in the connector with substrate according to the fifth embodiment, FIG. 69A showing, about a cage base and a cage cover configuring the cage, a state in which the cage cover is opened and FIG. 69B showing, about the cage base and the cage cover configuring the cage, a state in which the cage cover is closed.
Figure 69B:
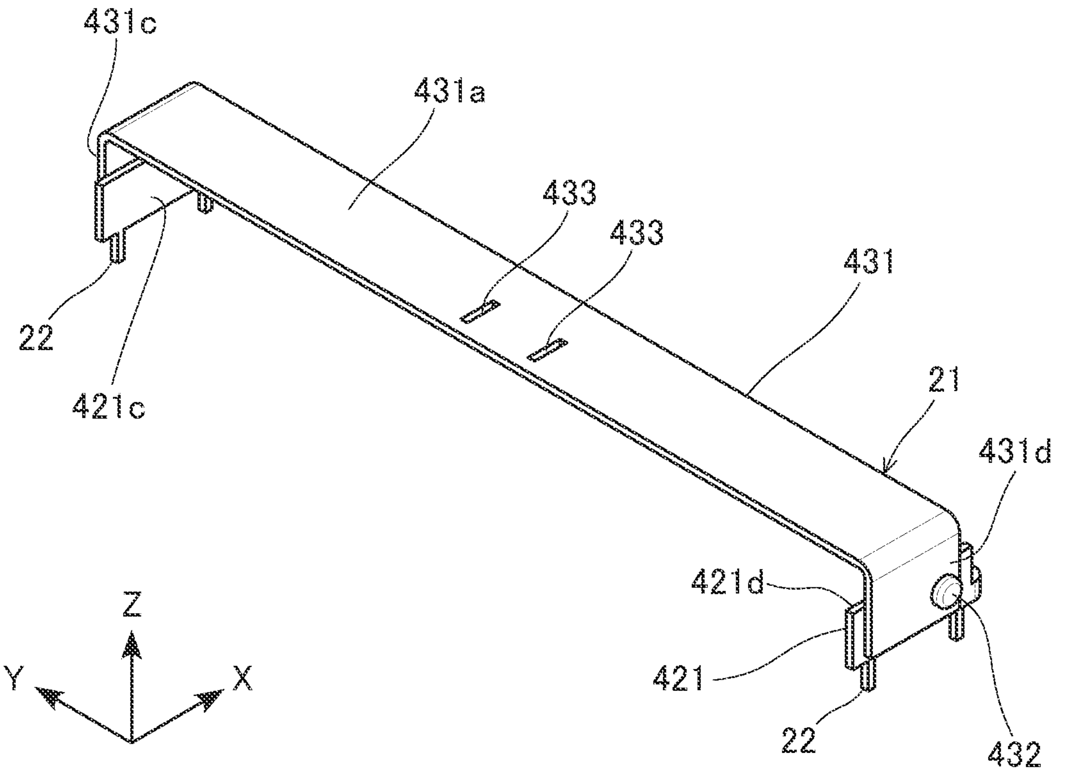

On the other hand, the cage cover 431 is a member rotatably attached to the cage base 421. As shown in FIG. 69B, the cage cover 431 according to the fifth embodiment includes a cage top surface 431*a* that covers the upper side of the cage base 421 in a state in which the upper side of the cage base 421 is closed and a cover right side surface 431*c* and a cover left side surface 431*d* formed by bending the left and right ends of the cage top surface 431*a* downward.

On the cover right side surface 431*c* and the cover left side surface 431*d*, rotating shafts 432, which are the rotating section of the present invention, are formed so that the cage cover 431 rotates with respect to the cage base 421. The cage cover 431 is configured to be able to rotate with respect to the cage base 421 fixed to the substrate 11.

Two lock holes 433 that receive lock claws 438 formed in a lock piece 437 included in the compression connector 31 explained below are formed in the cage top surface 431*a*. The lock claws 438 formed in the lock piece 437 formed in the compression connector 31 explained below fit in the two lock holes 433, whereby the lock holes 433 are used to restrict movement of the compression connector 31 with respect to the cage 21. That is, when the compression connector 31 is housed and installed in the cage 21 and the substrate 11, the lock holes 433 and the lock claws 438 can restrict, by cooperating, movement in the horizontal direction and the vertical direction of the compression connector 31 with respect to the cage 21.

Note that, as shown in FIG. 69B, in a state in which the cage cover 431 closes the upper side of the cage base 421, a region surrounded by the cage top surface 431*a*, the vertical front surface 421*b*, the vertical right side surface 421*c*, the vertical left side surface 421*d*, and the upper surface of the substrate 11 is a region where the compression connector 31 is housed and installed. Therefore, the cage top surface 431*a* is a surface that receives contact reaction in the vertical direction applied from the compression connector 31 in concert with the substrate 11.

The compression connector 31 includes, as shown in FIGS. 60 to 66, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 62:
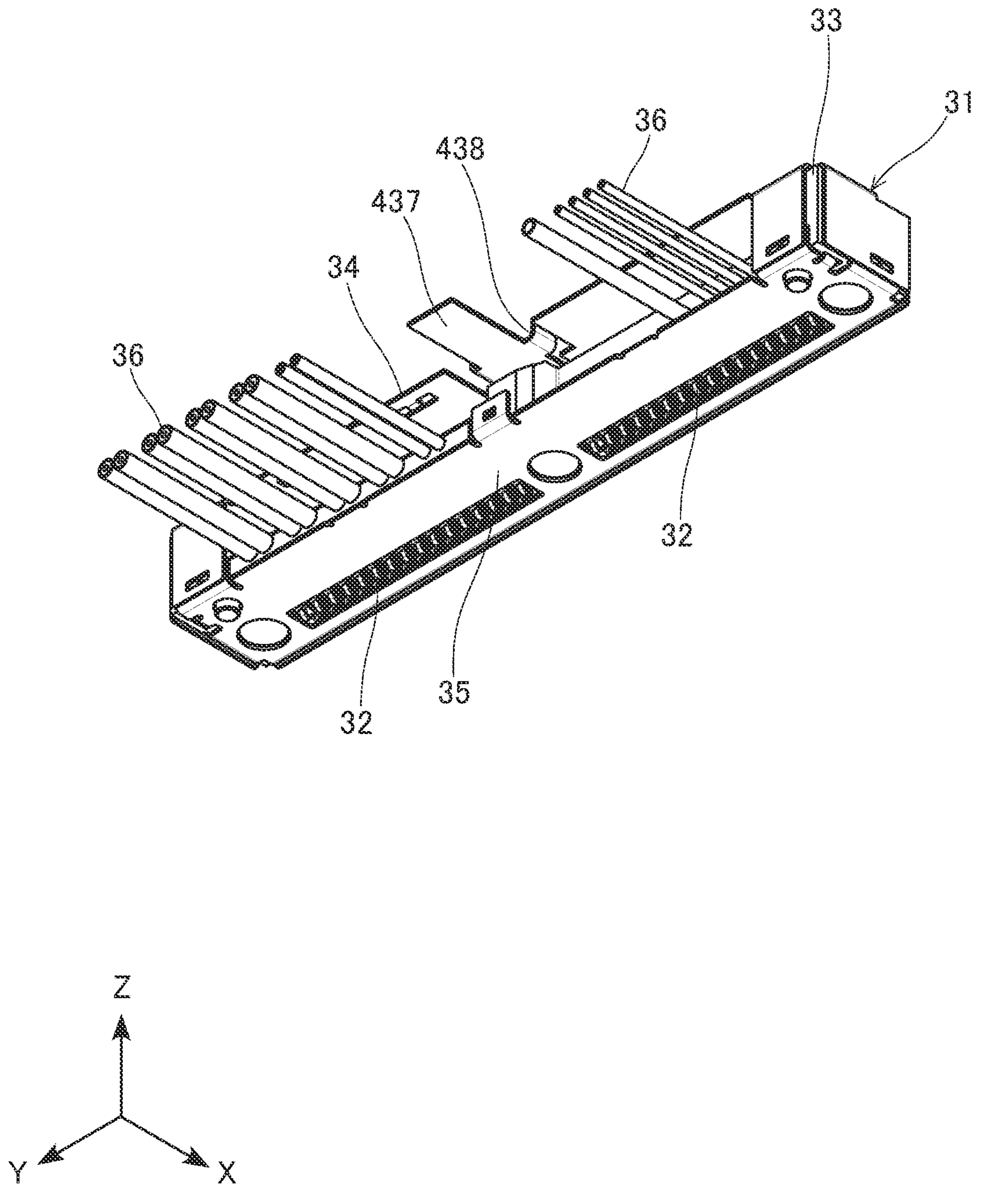
FIG. 62 is an exterior perspective view of the compression connector according to the fifth embodiment viewed from the rear lower left.
Figure 63:
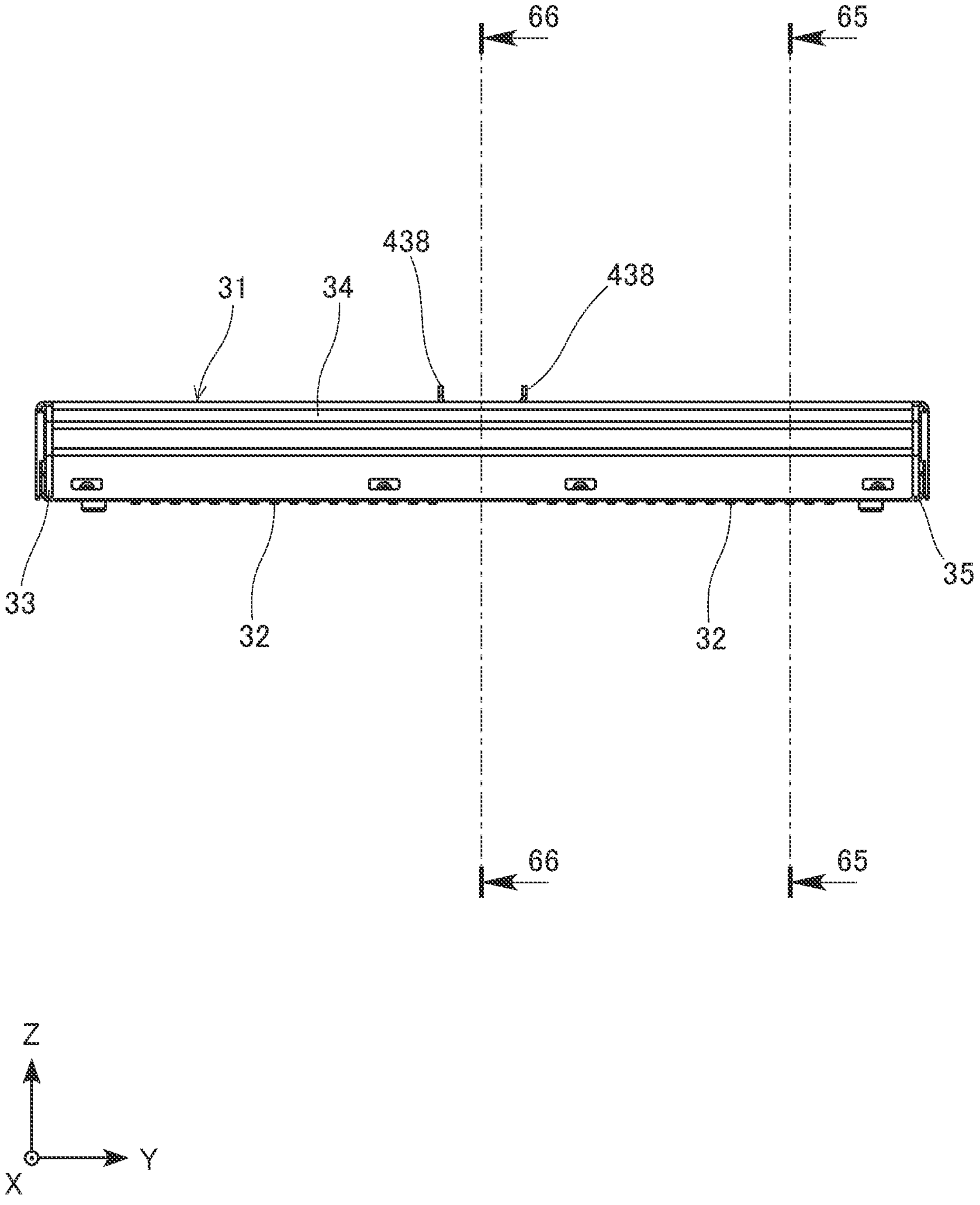
FIG. 63 is a front view of the compression connector according to the fifth embodiment.

As shown in, in particular, FIGS. 62 and 63, the plurality of contacts 32 are disposed to be laterally arranged in the left-right direction.

Figure 65:
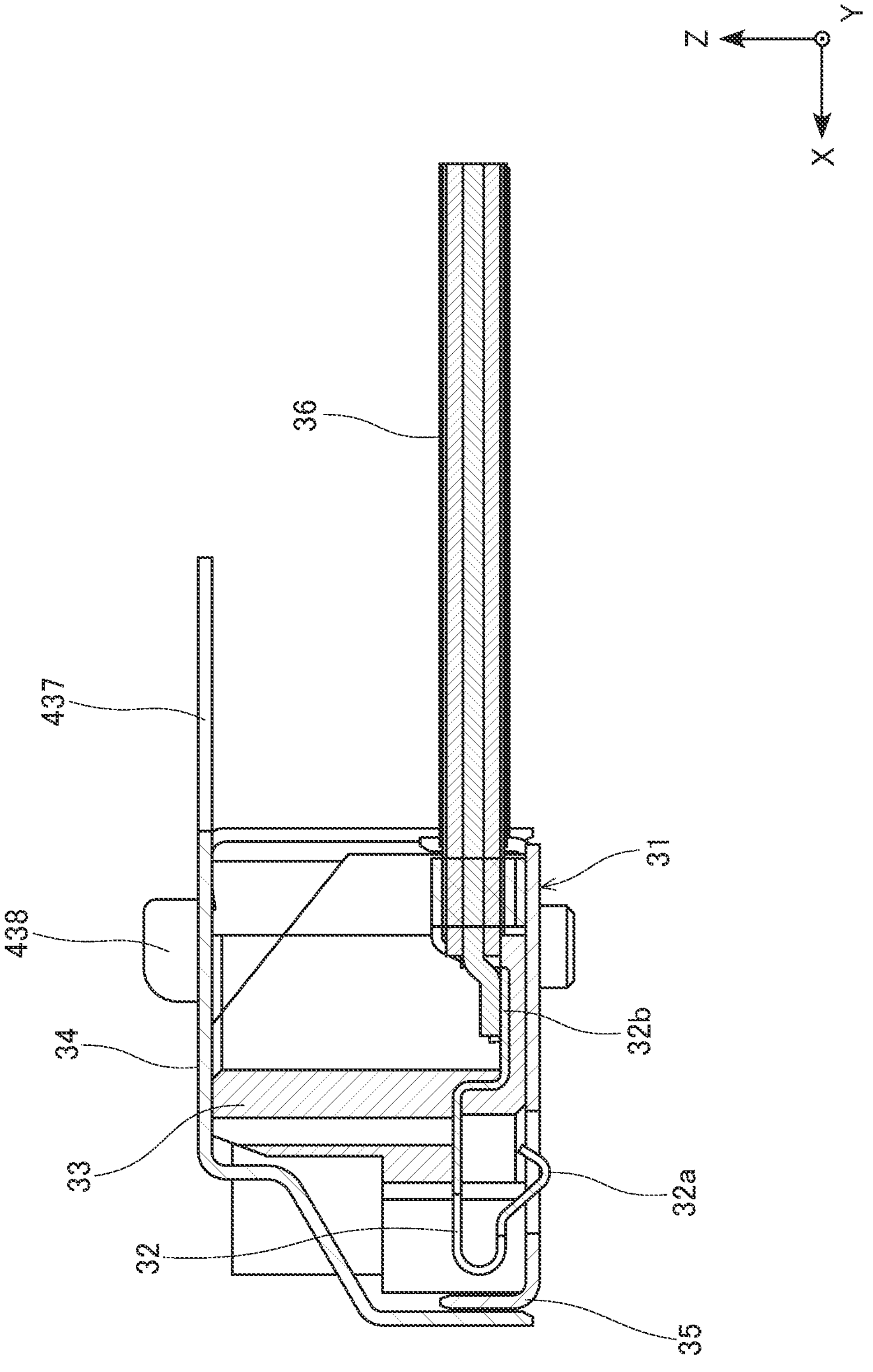
FIG. 65 is a longitudinal sectional view taken along line 65-65 in FIG. 63.
Figure 66:
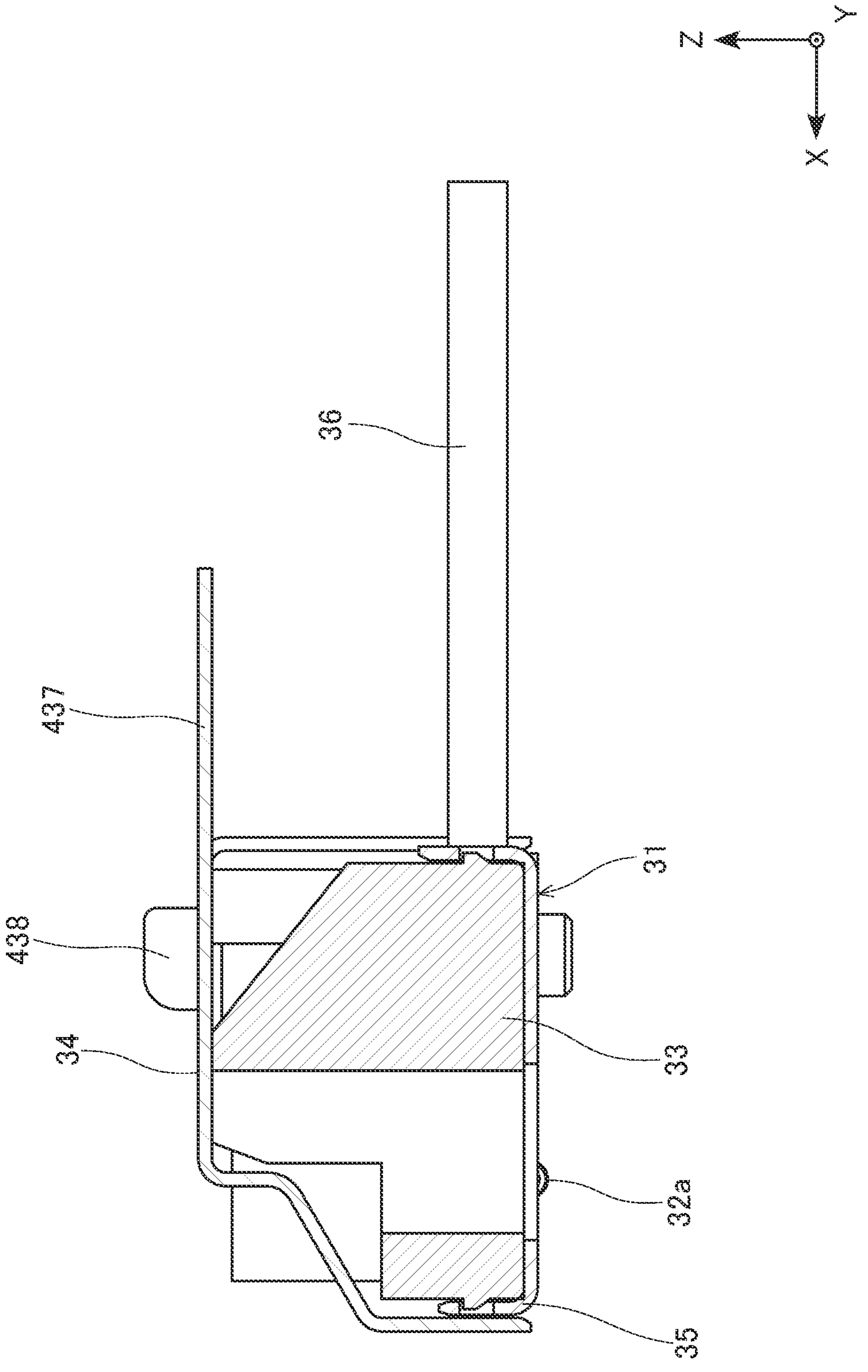
FIG. 66 is a longitudinal sectional view taken along line 66-66 in FIG. 63.
Figure 67:
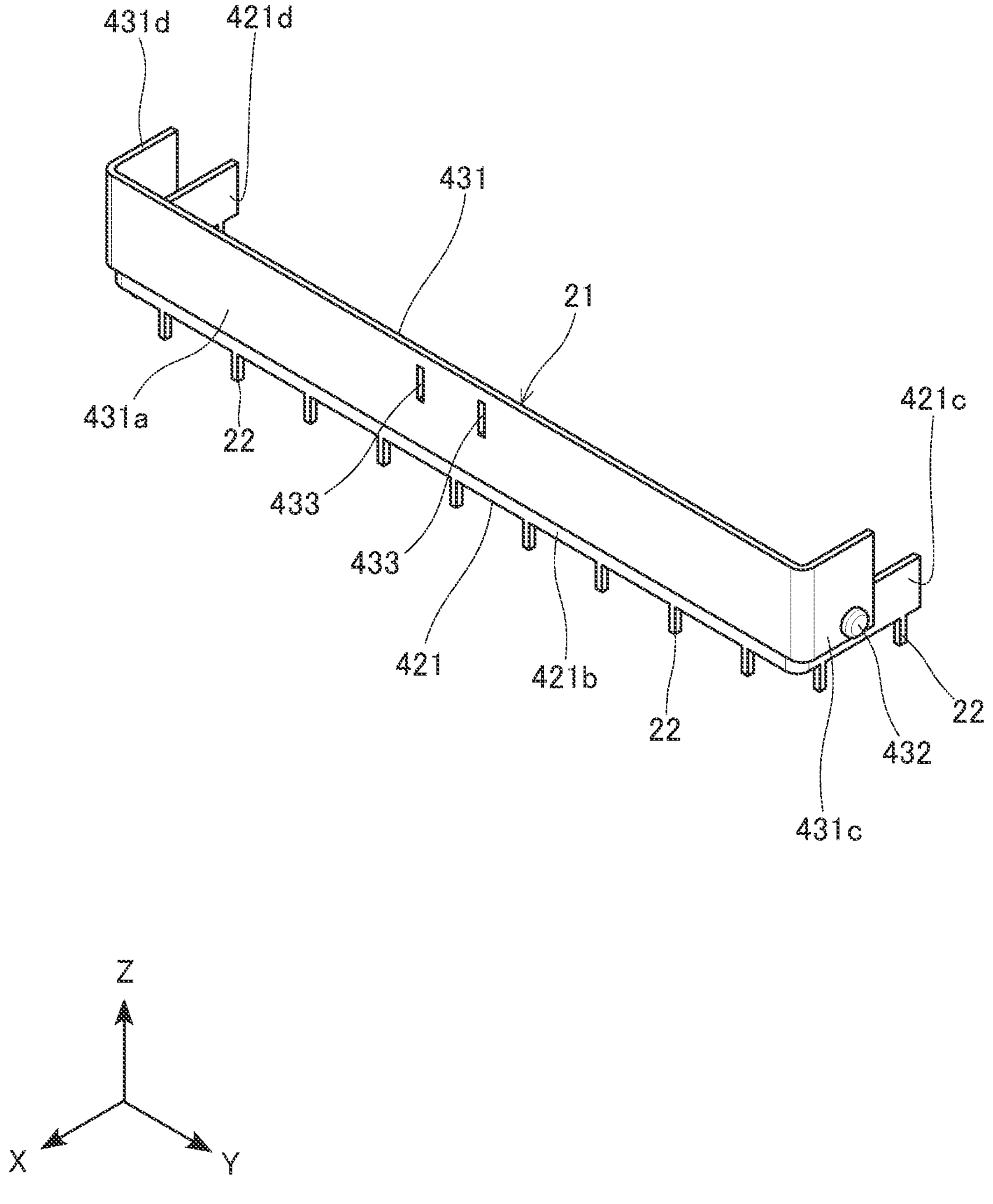
FIG. 67 is an exterior perspective view of the cage included in the connector with substrate according to the fifth embodiment viewed from the front upper right.
Figure 68:
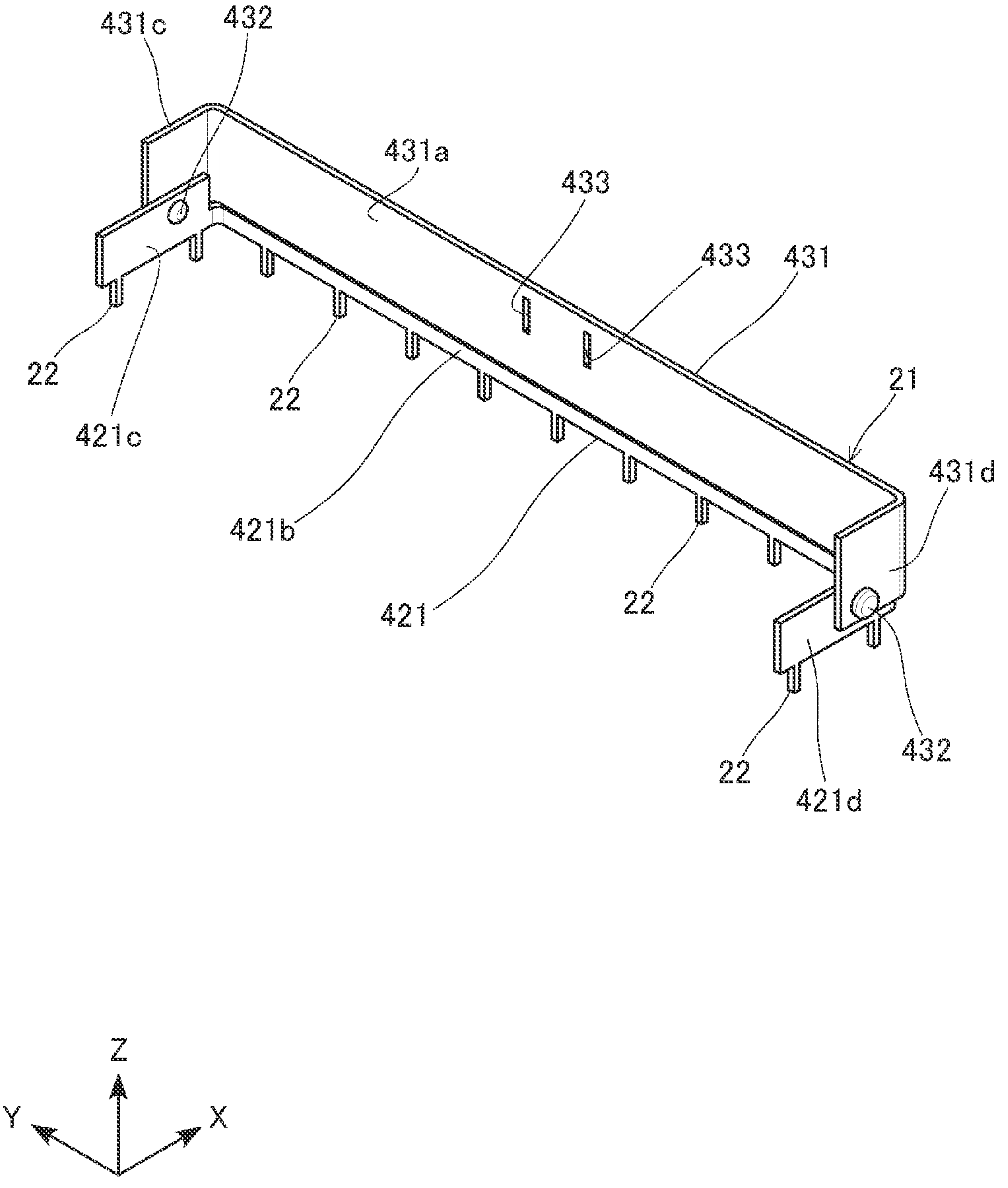
FIG. 68 is an exterior perspective view of the cage included in the connector with substrate according to the fifth embodiment viewed from the rear upper left.

Each of the plurality of contacts 32 is fixed to the housing 33 as shown in FIG. 65. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 65). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 65, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

In the compression connector 31 according to the fifth embodiment, one lock piece 437 is formed with respect to the center position of the cover shell 34 configuring the compression connector 31. The lock piece 437 is a plate-like member extending rearward from the center position of the upper surface of the cover shell 34. Further, in the lock piece 437, two lock claws 438 in total are formed one each on the left and the right.

Figure 64:
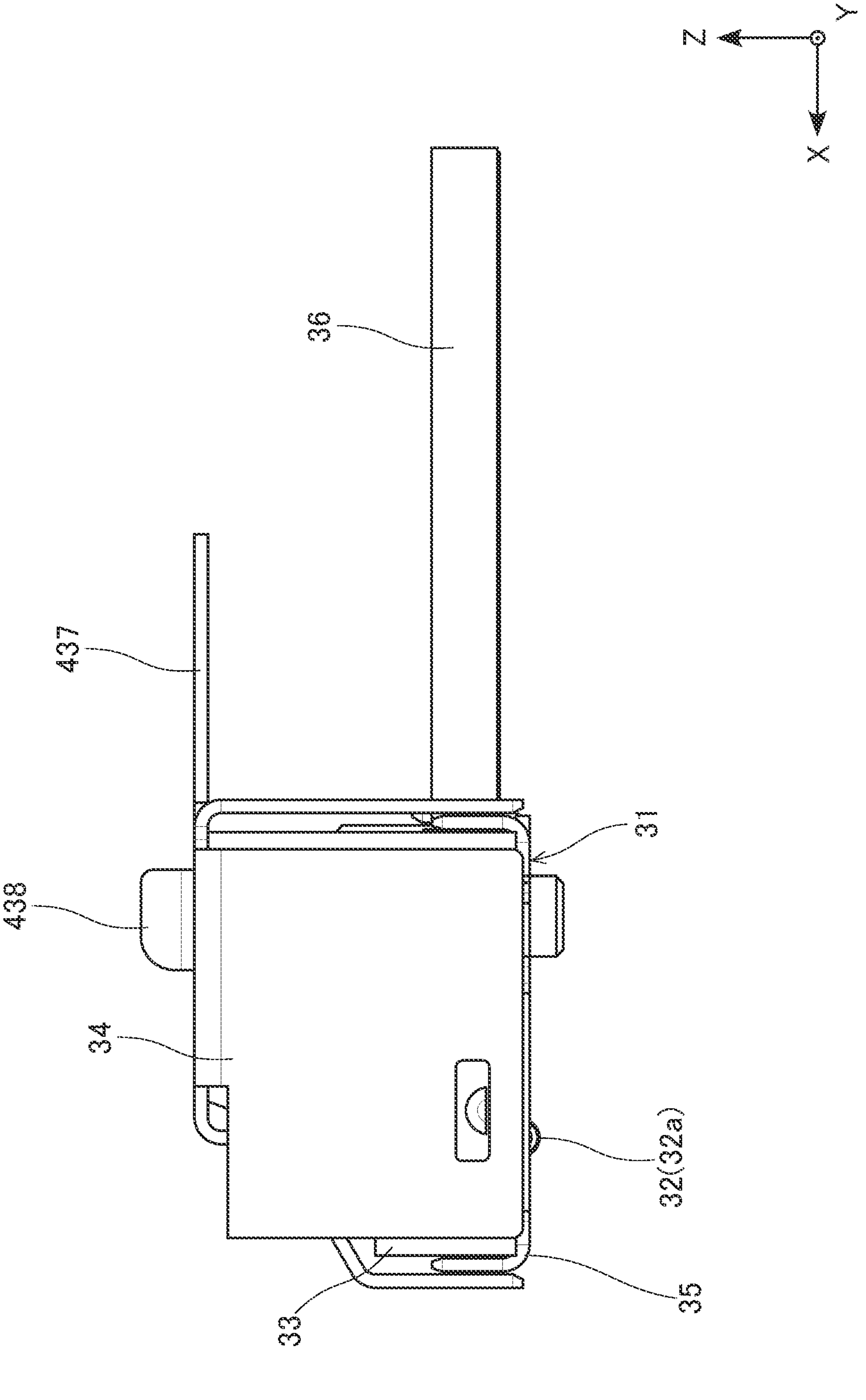
FIG. 64 is aright side view of the compression connector according to the fifth embodiment.

As shown more in detail in FIG. 64 and the like, the lock claw 438 formed in the lock piece 437 is formed as a plate-like member bent upward. The lock claw 438 can enter the lock hole 433 formed in the cage top surface 431*a*. More specifically, the lock claw 438 formed in the cover shell 34 of the compression connector 31 is configured to completely enter the lock hole 433 formed in the cage top surface 431*a* of the cage cover 431 when the cage cover 431 is set in an opened state with respect to the cage base 421 fixed to the substrate 11, the compression connector 31 is moved downward from above the cage base 421, and the cage cover 431 is closed in a state in which the bottom surface side of the compression connector 31 is in contact with the upper surface of the substrate 11.

Each of the two lock claws 438 formed in the lock piece 437 included in the compression connector 31 fits in each of the lock holes 433 formed in the cage top surface 431*a* of the cage cover 431, whereby the lock claw 438 and the lock hole 433 firmly fit with each other while applying frictional forces to each other. This state is a state in which the compression connector 31 housed and installed in the region surrounded by the cage top surface 431*a*, the vertical front surface 421*b*, the vertical right side surface 421*c*, the vertical left side surface 421*d*, and the upper surface of the substrate 11 is restricted from moving in the horizontal direction and the vertical direction. That is, the lock claw 438 and the lock hole 433 can exert, by cooperating with each other, a function of slip-off prevention for preventing the compression connector 31 from slipping off the cage 21.

Note that, concerning the members configuring the compression connector 31 in the fifth embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 400 according to the fifth embodiment is explained above. Subsequently, a method of attaching the compression connector 31 to and a method of detaching the compression connector 31 from the substrate 11 attached with the cage 21 configuring the connector with substrate 400 according to the fifth embodiment are explained.

Figure 58:
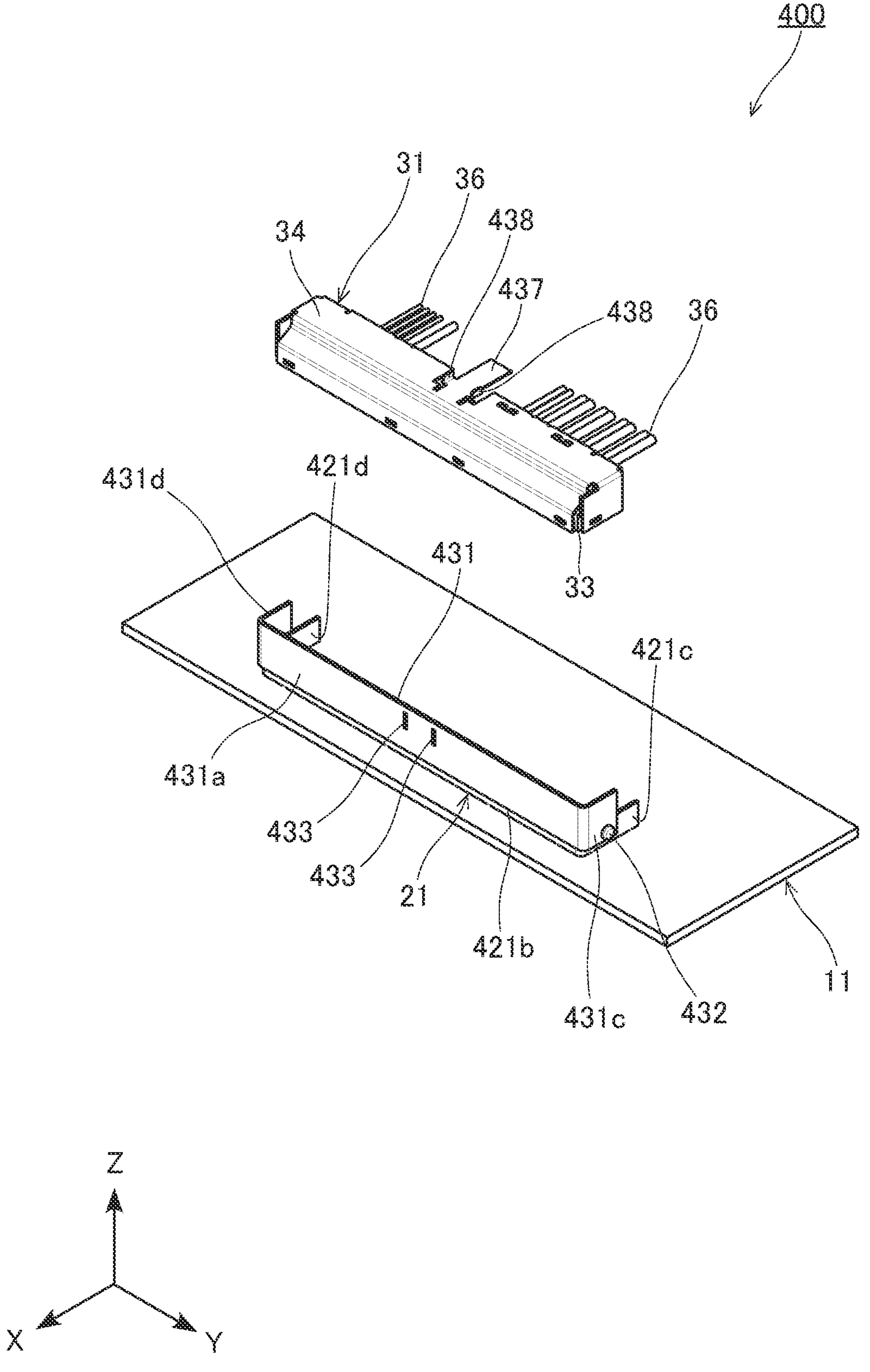
FIG. 58 is an exterior perspective view of a state in which a compression connector is detached from a substrate attached with a cage in the connector with substrate according to the fifth embodiment, the state being viewed from the front upper right.
Figure 59:
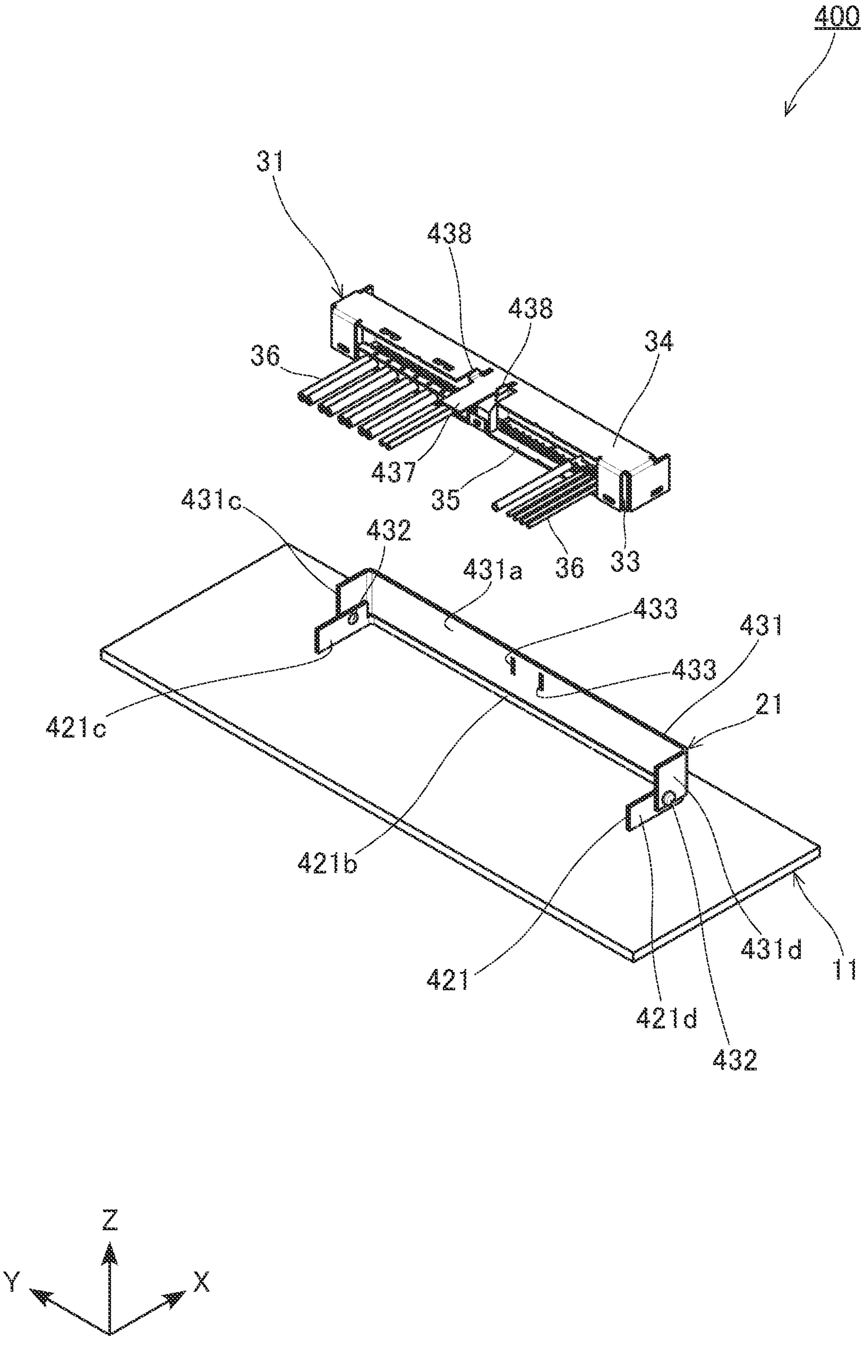
FIG. 59 is an exterior perspective view of the state in which the compression connector is detached from the substrate attached with the cage in the connector with substrate according to the fifth embodiment, the state being viewed from the rear upper left.
Figure 60:
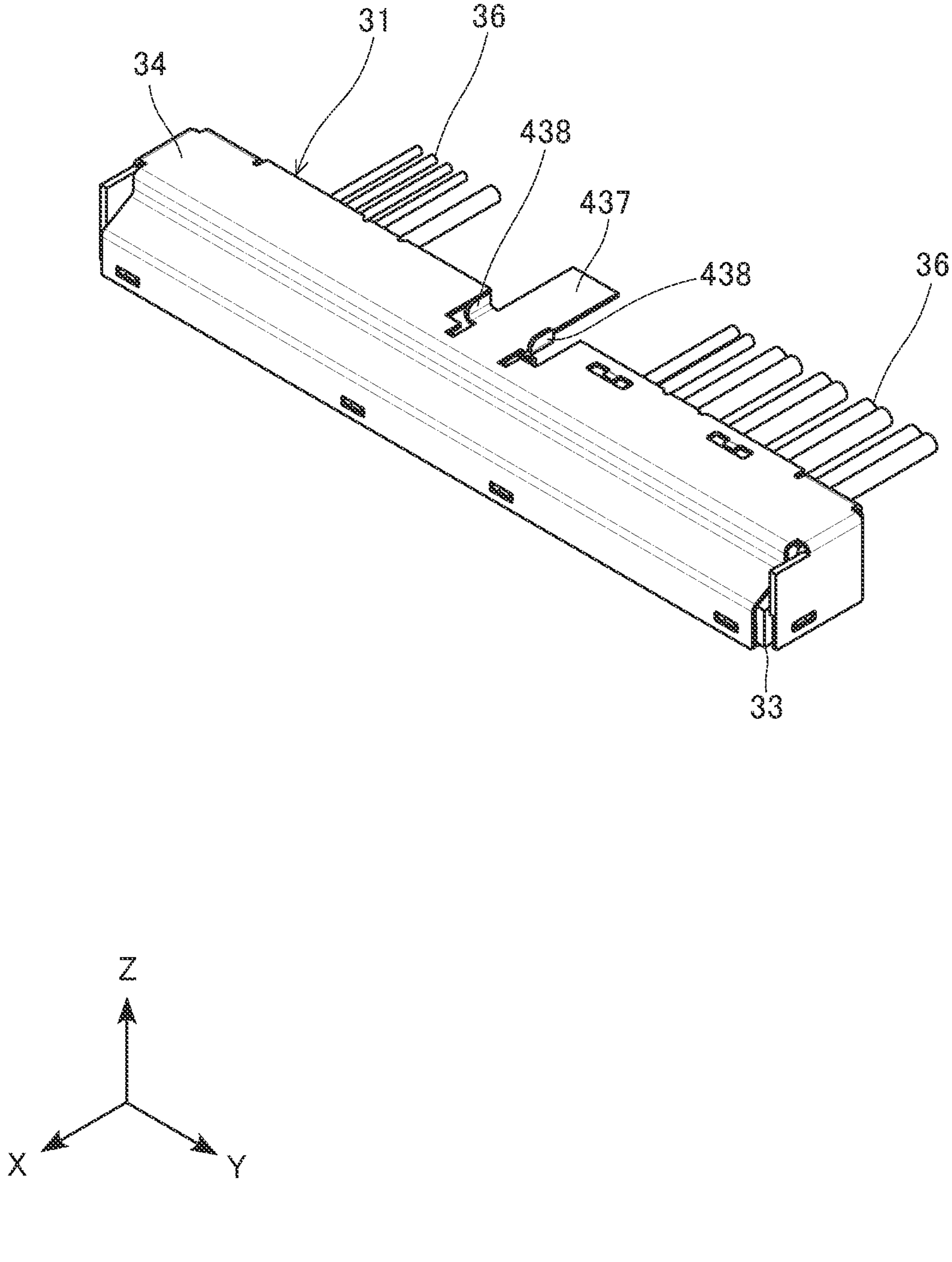
FIG. 60 is an exterior perspective view of the compression connector according to the fifth embodiment viewed from the front upper right.
Figure 61:
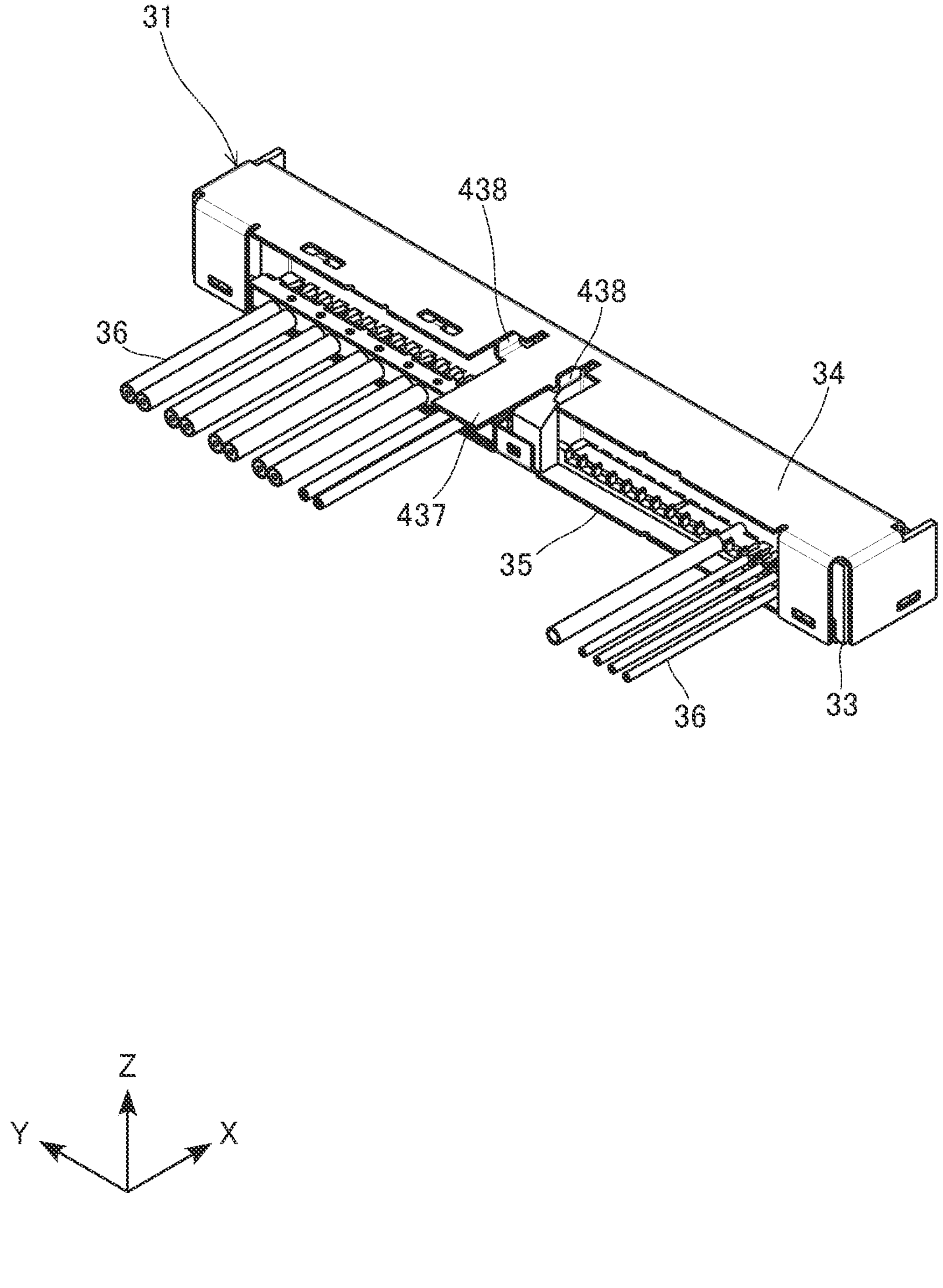
FIG. 61 is an exterior perspective view of the compression connector according to the fifth embodiment viewed from the rear upper left.

When the compression connector 31 is attached to the substrate 11 attached with the cage 21, as shown in FIGS. 58 and 59, the compression connector 31 is moved in the vertical direction to be directed in the downward direction (the −Z direction) from a state in which the cage cover 431 is opened with respect to the cage base 421 fixed to the substrate 11. When the compression connector 31 is lowered toward the region surrounded by the vertical front surface 421*b*, the vertical right side surface 421*c*, and the vertical left side surface 421*d* configuring the cage base 421 and the upper surface of the substrate 11 and is pressed against the upper surface of the substrate 11, the compression connector 31 applies, to the substrate 11, contact reaction in the vertical direction applied by the plurality of contacts 32 included in the compression connector 31. When the cage cover 431 is rotated and moved to close the upper surface side of the cage base 421 from this state, each of the two lock claws 438 formed in the lock piece 437 included in the compression connector 31 fits in each of the two lock holes 433 formed in the cage top surface 431*a* of the cage cover 431. Since the lock claw 438 and the lock hole 433 firmly fit with each other while applying frictional forces to each other, the cage top surface 431*a* of the cage cover 431 presses the upper side of the compression connector 31 in the downward direction (the −Z direction). This state is a state in which the compression connector 31 housed and installed in the region surrounded by the cage top surface 431*a*, the vertical front surface 421*b*, the vertical right side surface 421*c*, the vertical left side surface 421*d*, and the upper surface of the substrate 11 is restricted from moving in the horizontal direction and the vertical direction. The substrate 11 and the cage top surface 431*a* of the cage cover 431 receive the contact reaction in the vertical direction applied by the plurality of contacts 32 included in the compression connector 31.

On the other hand, when the compression connector 31 is detached from the substrate 11 attached with the cage 21, a user pushes the end portion on the rear side of the lock piece 437 in the downward direction (the −Z direction), which is the substrate side, the fit state of the lock claws 438 fit in the lock holes 433 is released. When the user rotates the cage cover 431 in an opening direction from the release state, the upper side of the cage base 421 is opened. When the compression connector 31 is vertically moved in the upward direction (the +Z direction) in such an opened state of the cage upper surface, the compression connector 31 can be smoothly detached from the substrate 11 attached with the cage 21.

As explained above, in the connector with substrate 400 according to the fifth embodiment, the compression connector 31 is disposed toward the region surrounded by the vertical front surface 421*b*, the vertical right side surface 421*c*, and the vertical left side surface 421*d* configuring the cage base 421 and the upper surface of the substrate 11 and, thereafter, the cage cover 431 is rotated to close the upper surface of the cage base 421, whereby each of the two lock claws 438 formed in the lock piece 437 included in the compression connector 31 is fit in each of the two lock holes 433 formed in the cage top surface 431*a* of the cage cover 431. It is possible to fix the positions in the horizontal direction and the vertical direction of the compression connector 31 with respect to the cage 21. At this time, since the upper surface of the substrate 11 and the cage top surface 431*a* of the cage cover 431 can receive contact reaction in concert, a stable fixed state of the compression connector 31 to the substrate 11 is maintained. That is, with the connector with substrate 400 according to the fifth embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the fifth embodiment. Various changes or improvements can be added to the fifth embodiment.

For example, in the fifth embodiment, as an example, the one lock piece 437 and the two lock claws 438 are formed in the cover shell 34 configuring the compression connector 31 and the two lock holes 433 are formed on the cage top surface 431*a* of the cage cover 431 configuring the cage 21. However, a member in which the lock hole and the lock piece attached with the lock claw according to the present invention are formed may be either the cage or the compression connector. That is, the lock hole may be formed on the compression connector side and the lock piece attached with the lock claw may be formed on the cage side. Further, as the number of each of lock holes and lock claws according to the present invention, any number can be selected if the number is equal to or larger than one.

The configuration of the connector with substrate 400 according to the fifth embodiment is explained above with reference to FIGS. 55 to 69A and 69B. Subsequently, a connector with substrate 500 according to a sixth embodiment, which is another form example that the connector with substrate according to the present invention can take, is explained with reference to FIGS. 70 to 84. Note that, in the following explanation, members that are the same as or similar to the members explained in the first to fifth embodiment above are denoted by the same reference numerals and signs and explanation of the members is sometimes omitted.

Sixth Embodiment

Figure 70:
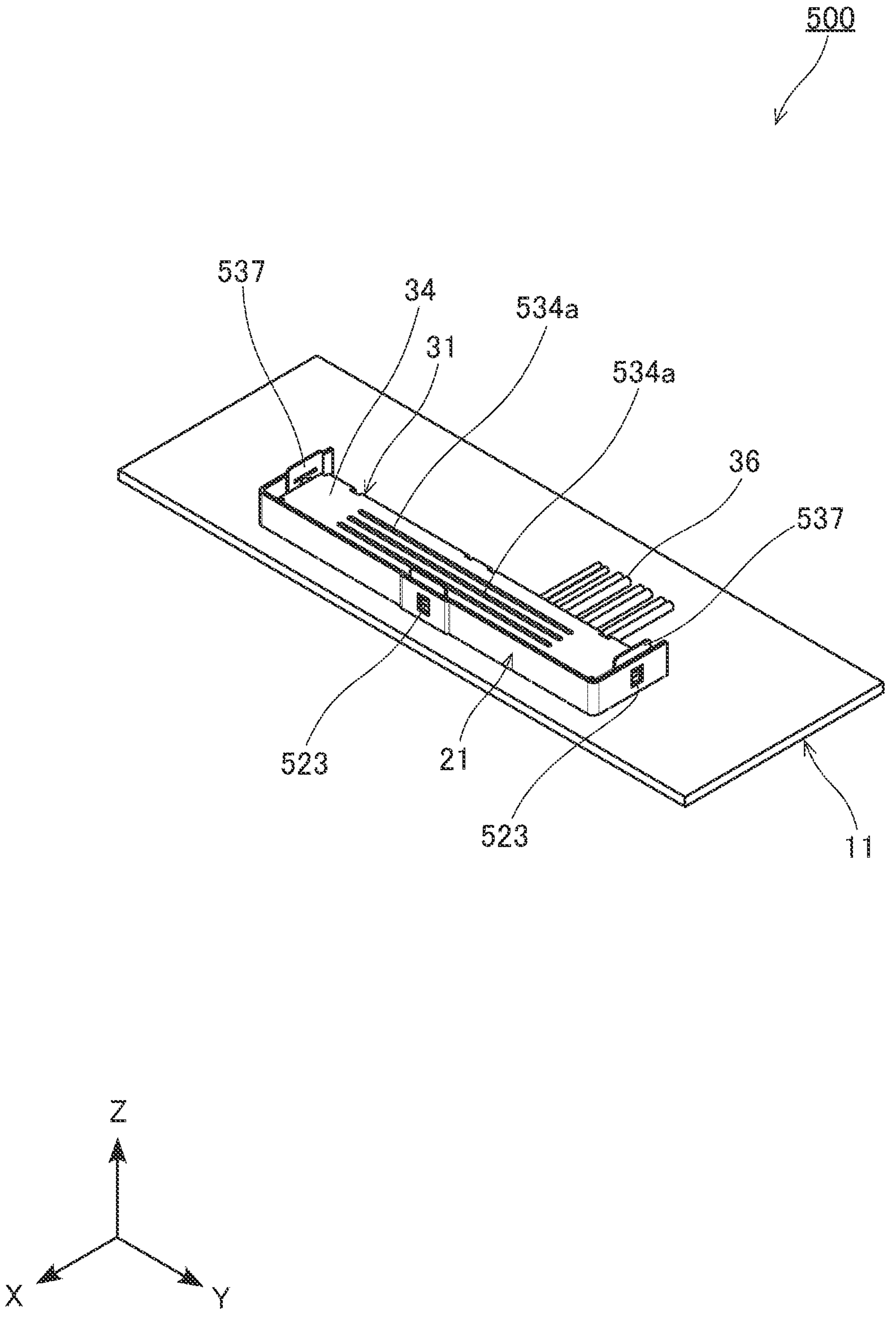
FIG. 70 is an exterior perspective view of a connector with substrate according to a sixth embodiment viewed from the front upper right.
Figure 71:
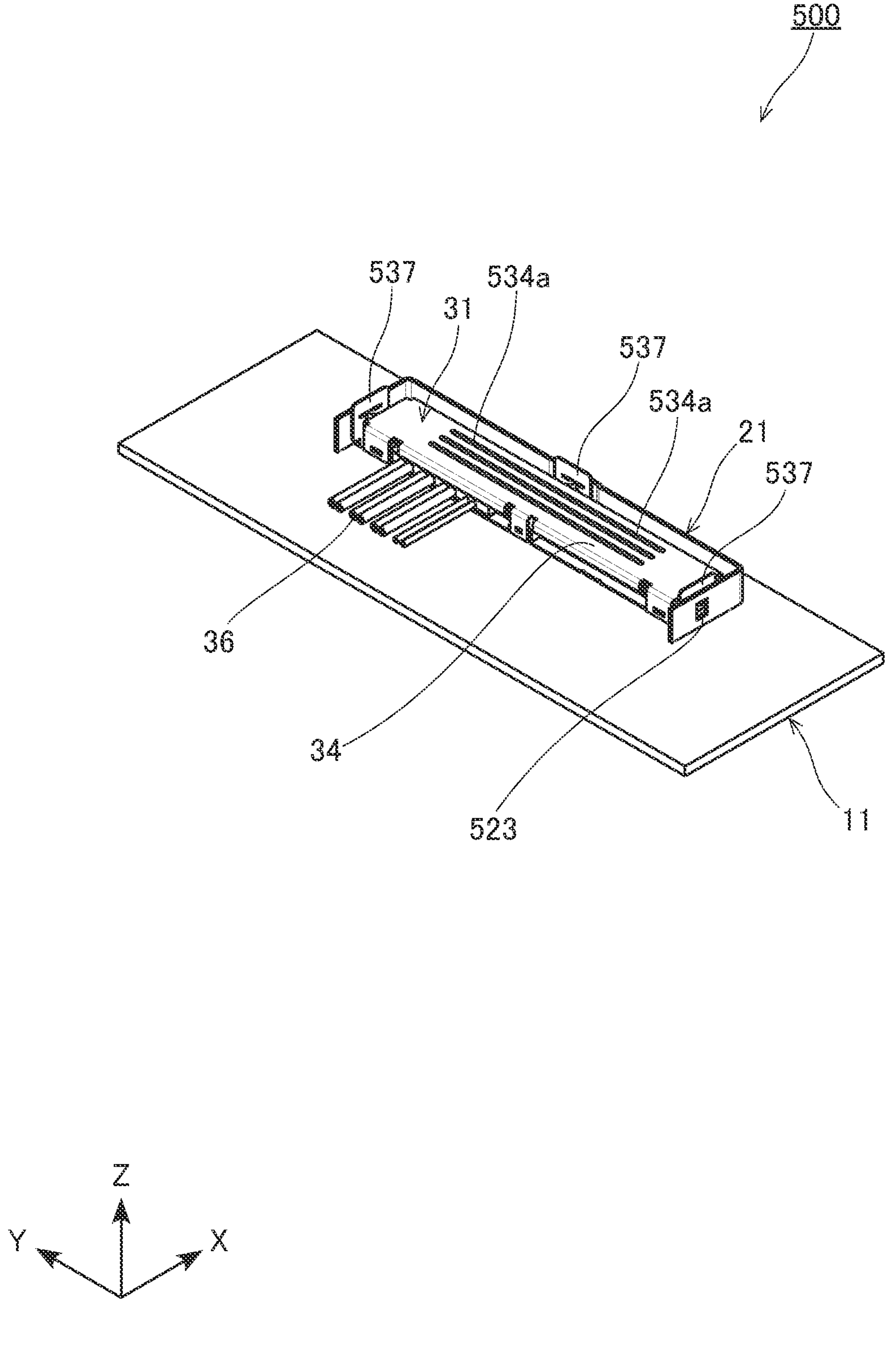
FIG. 71 is an exterior perspective view of the connector with substrate according to the sixth embodiment viewed from the rear upper left.

A configuration of the connector with substrate 500 according to the sixth embodiment is explained with reference to FIGS. 70 to 84. The connector with substrate 500 according to the sixth embodiment includes, as shown in FIGS. 70 to 72, the substrate 11, the cage 21 installed on the upper surface of the substrate 11, and the compression connector 31 attached to the substrate 11 via the cage 21.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 72:
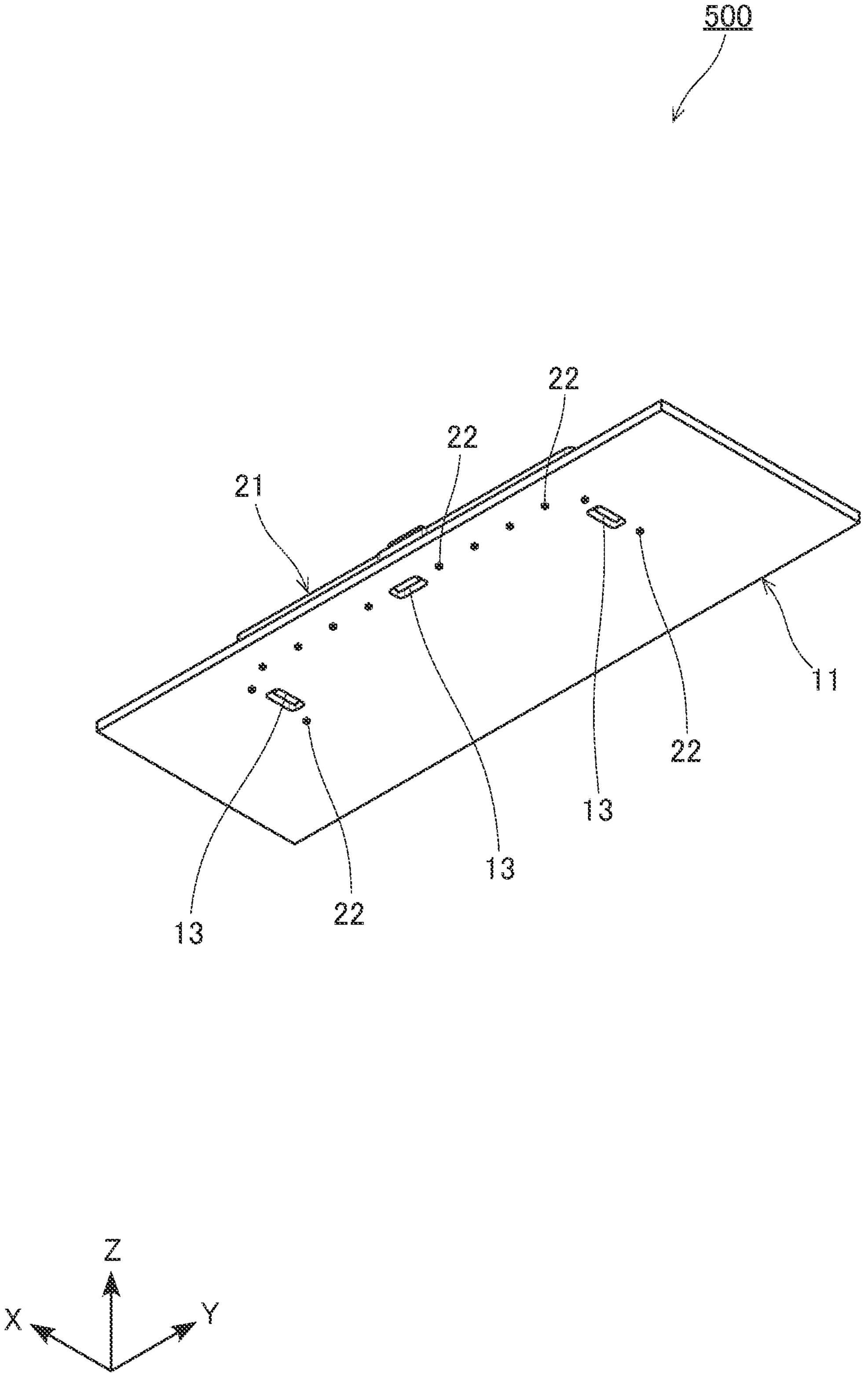
FIG. 72 is an exterior perspective view of the connector with substrate according to the sixth embodiment viewed from the front lower right.

As shown in, in particular, FIG. 72, a plurality of attachment holes (not shown) and a plurality of opening sections 13 are formed in the substrate 11. The plurality of leg sections 22 included in the cage 21 explained below are inserted into the plurality of (in the sixth embodiment, assumed to be twelve) attachment holes (not shown), whereby the cage 21 is fixed to the substrate 11. Since the plurality of (in the sixth embodiment, three) opening sections 13 are formed such that the end portions on the lower side of lock pieces 537 included in the compression connector 31 enter the opening sections 13 when the compression connector 31 explained below is fixed to the substrate 11, fixing connection of the substrate 11 and the compression connector 31 is not hindered by the presence of the opening sections 13.

The cage 21 is a member obtained by bending a flat metal member to be formed in a substantially channel-like shape. Twelve leg sections 22 are formed to extend downward on the bottom surface side of the cage 21. As explained above, the cage 21 is fixed to the substrate 11 by inserting the twelve leg sections 22 into the plurality of attachment holes (not shown) formed in the substrate 11.

In the cage 21, one lock hole 523 is formed in the front and three lock holes 523 in total are formed one each in the left and right directions. The three lock holes 523 are parts used to fix and hold the compression connector 31.

The compression connector 31 includes, as shown in FIGS. 76 to 82, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 78:
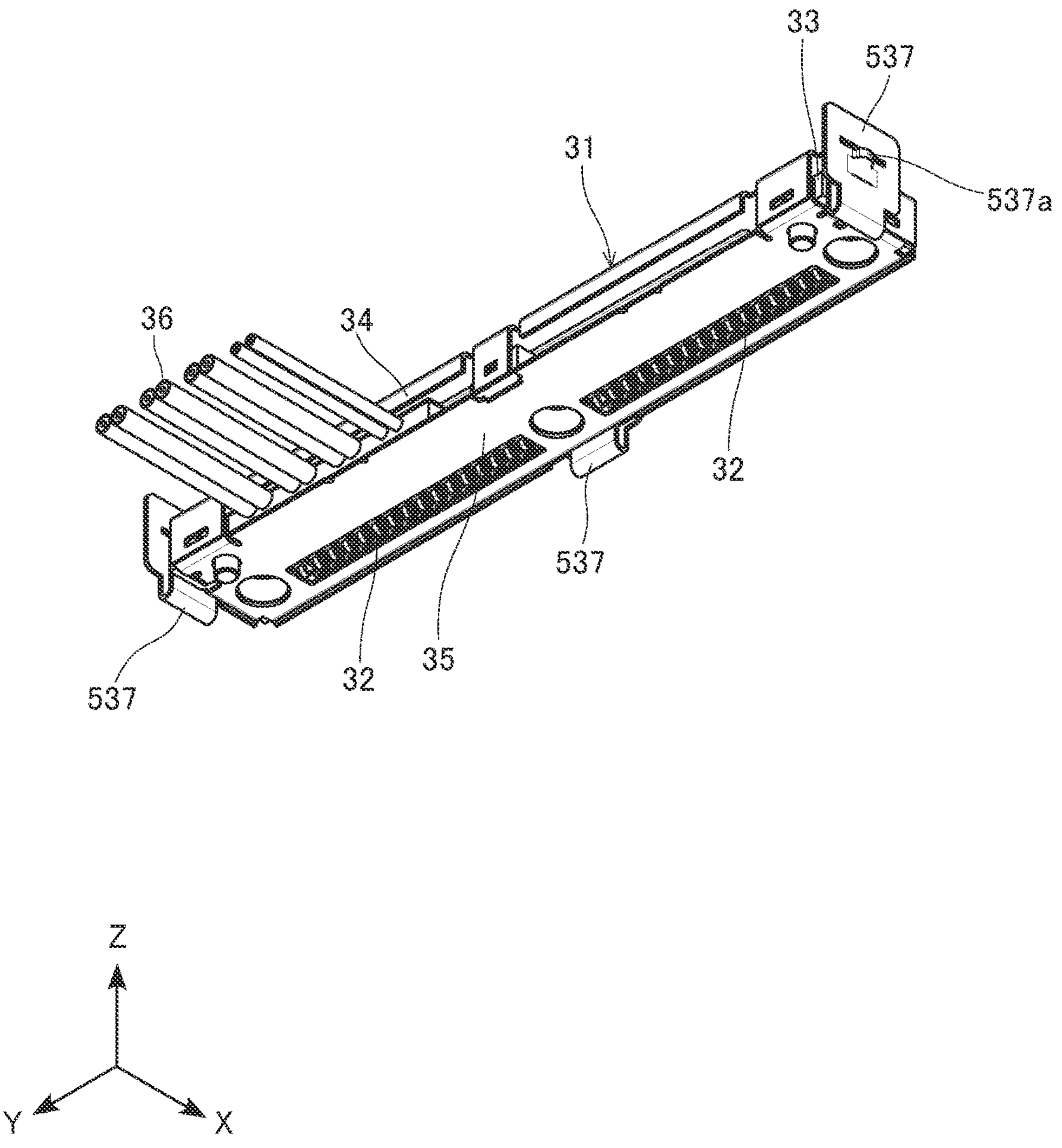
FIG. 78 is an exterior perspective view of the compression connector according to the sixth embodiment viewed from the rear lower left.
Figure 79:
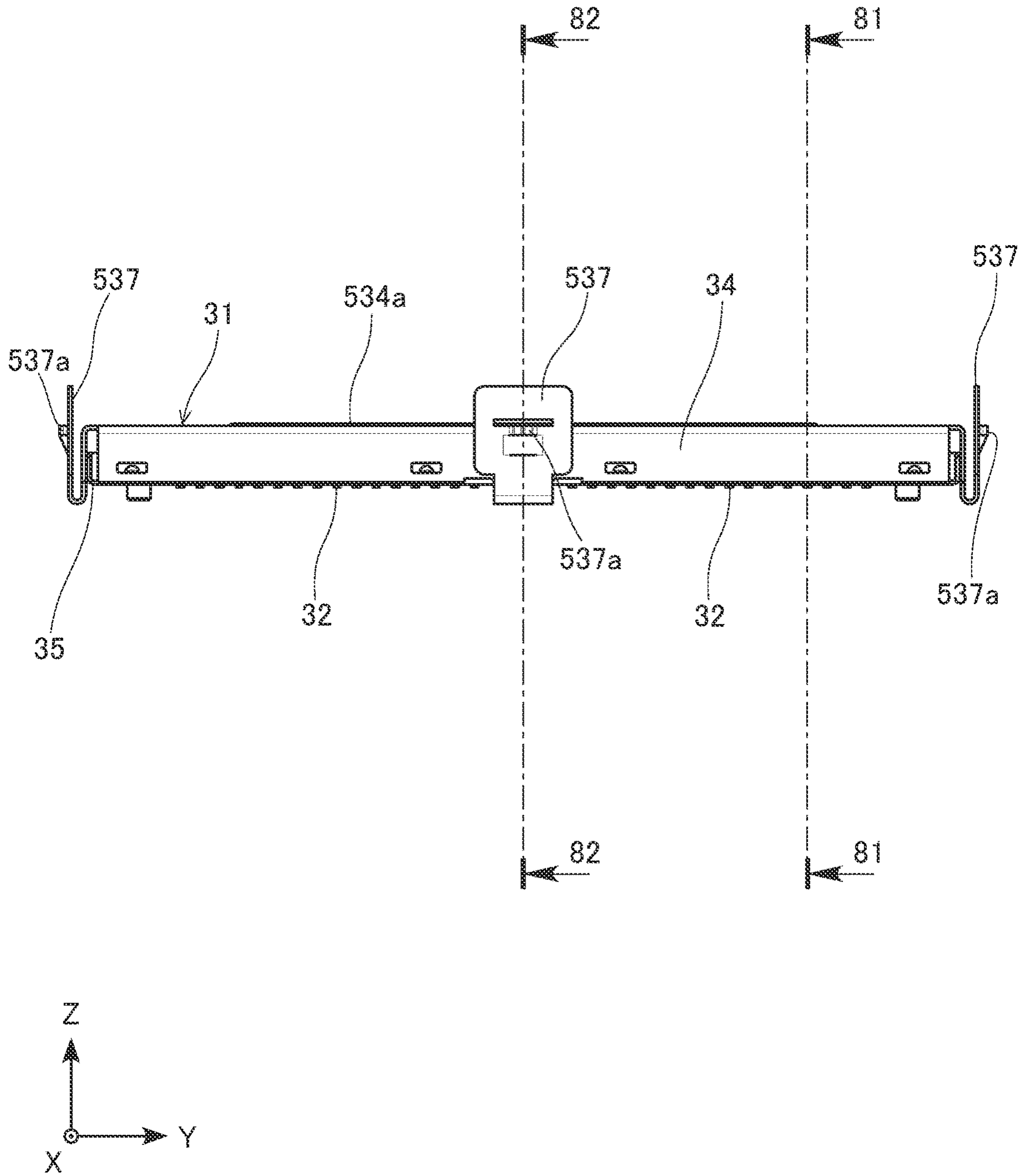
FIG. 79 is a front view of the compression connector according to the sixth embodiment.

As shown in, in particular, FIGS. 78 and 79, the plurality of contacts 32 are disposed to be laterally arranged in the left-right direction.

Figure 81:
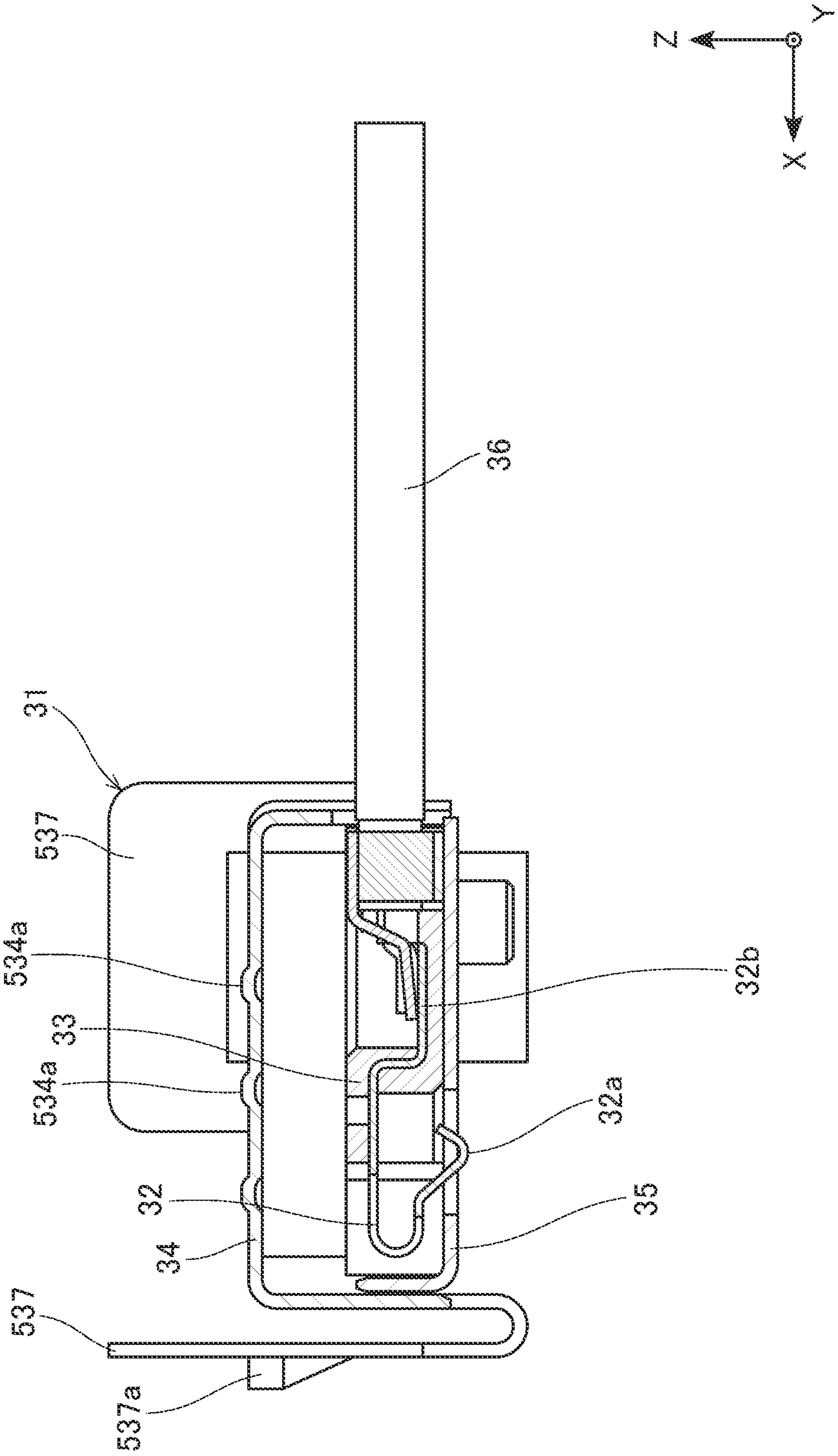
FIG. 81 is a longitudinal sectional view taken along line 81-81 in FIG. 79.
Figure 82:
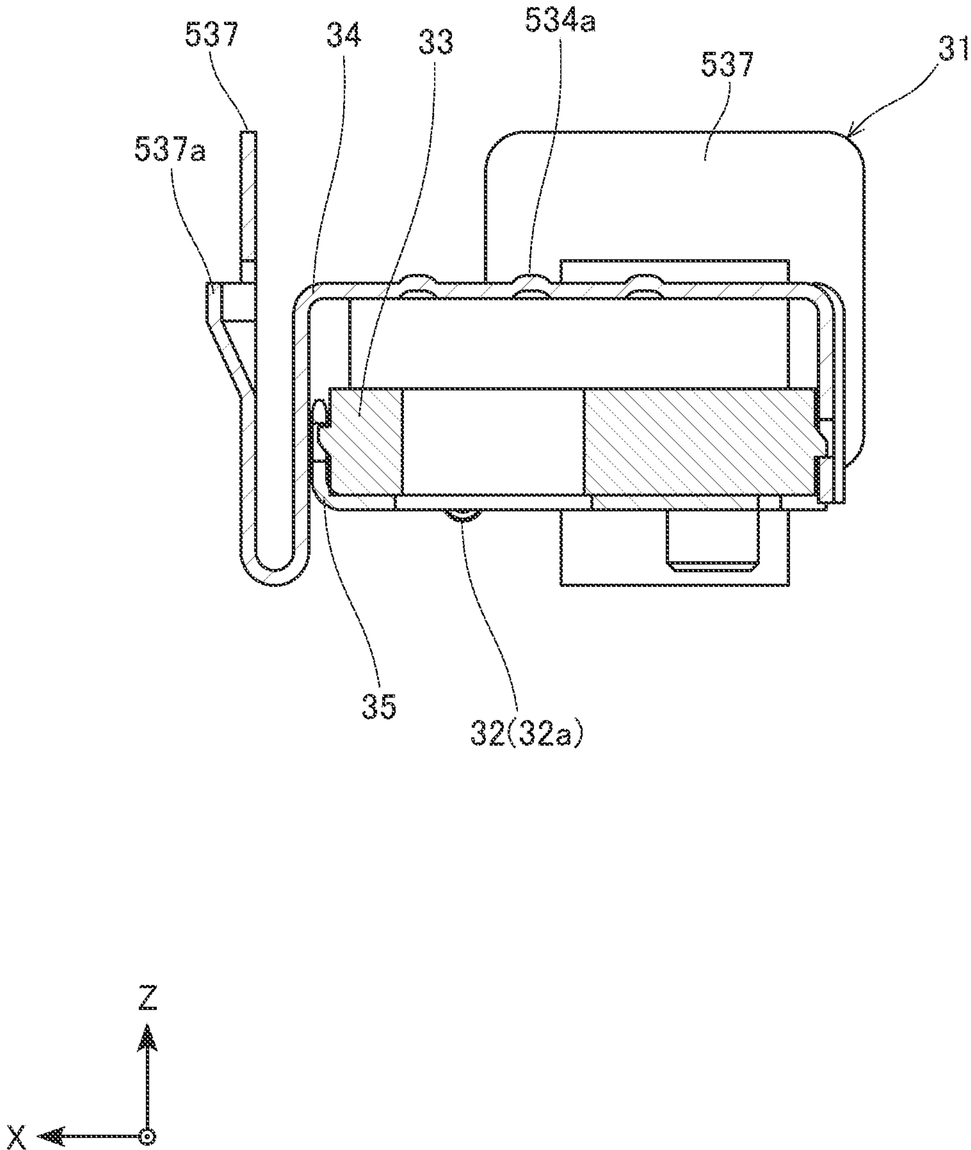
FIG. 82 is a longitudinal sectional view taken along line 82-82 in FIG. 79.
Figure 83:
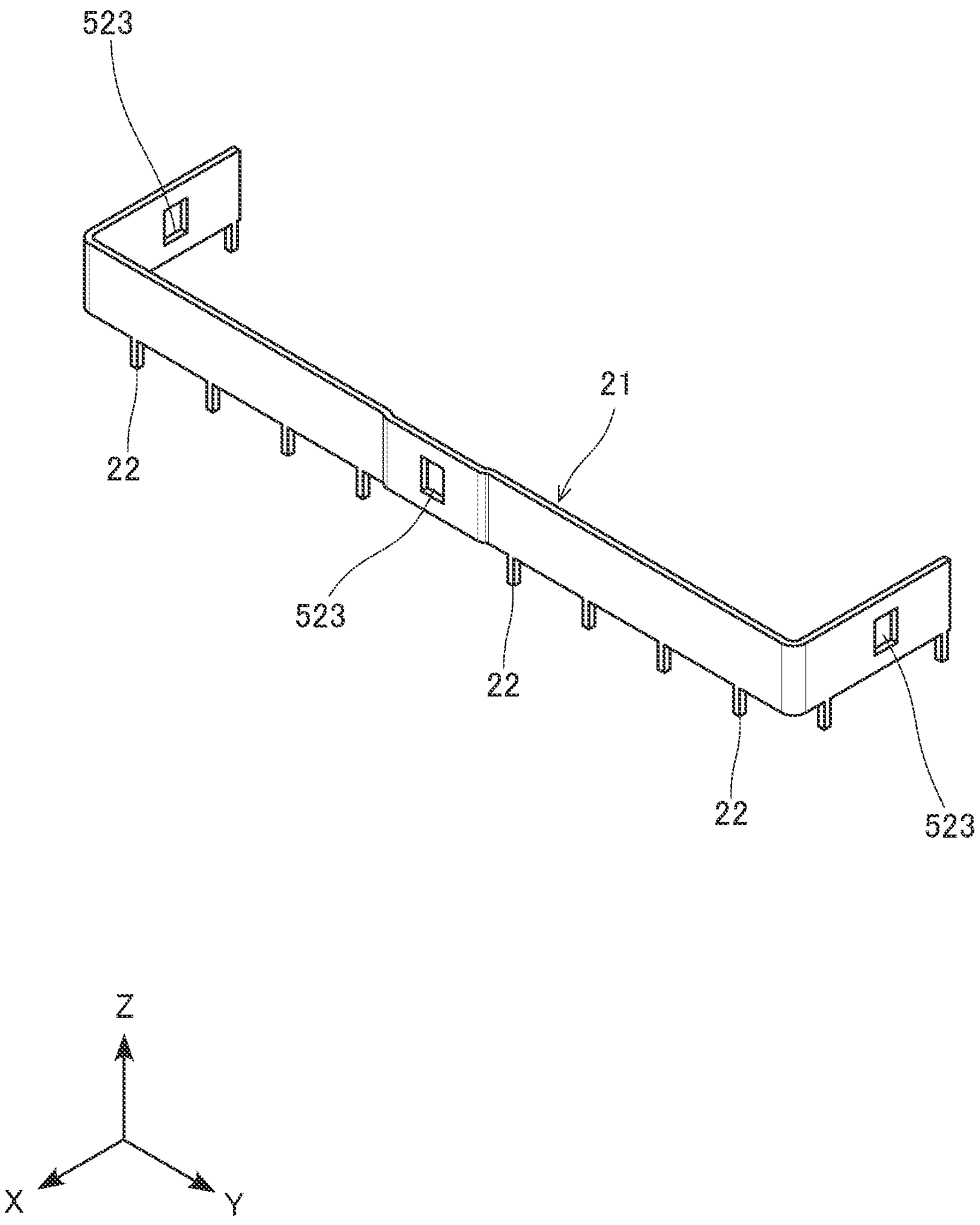
FIG. 83 is an exterior perspective view of the cage included in the connector with substrate according to the sixth embodiment viewed from the front upper right.
Figure 84:
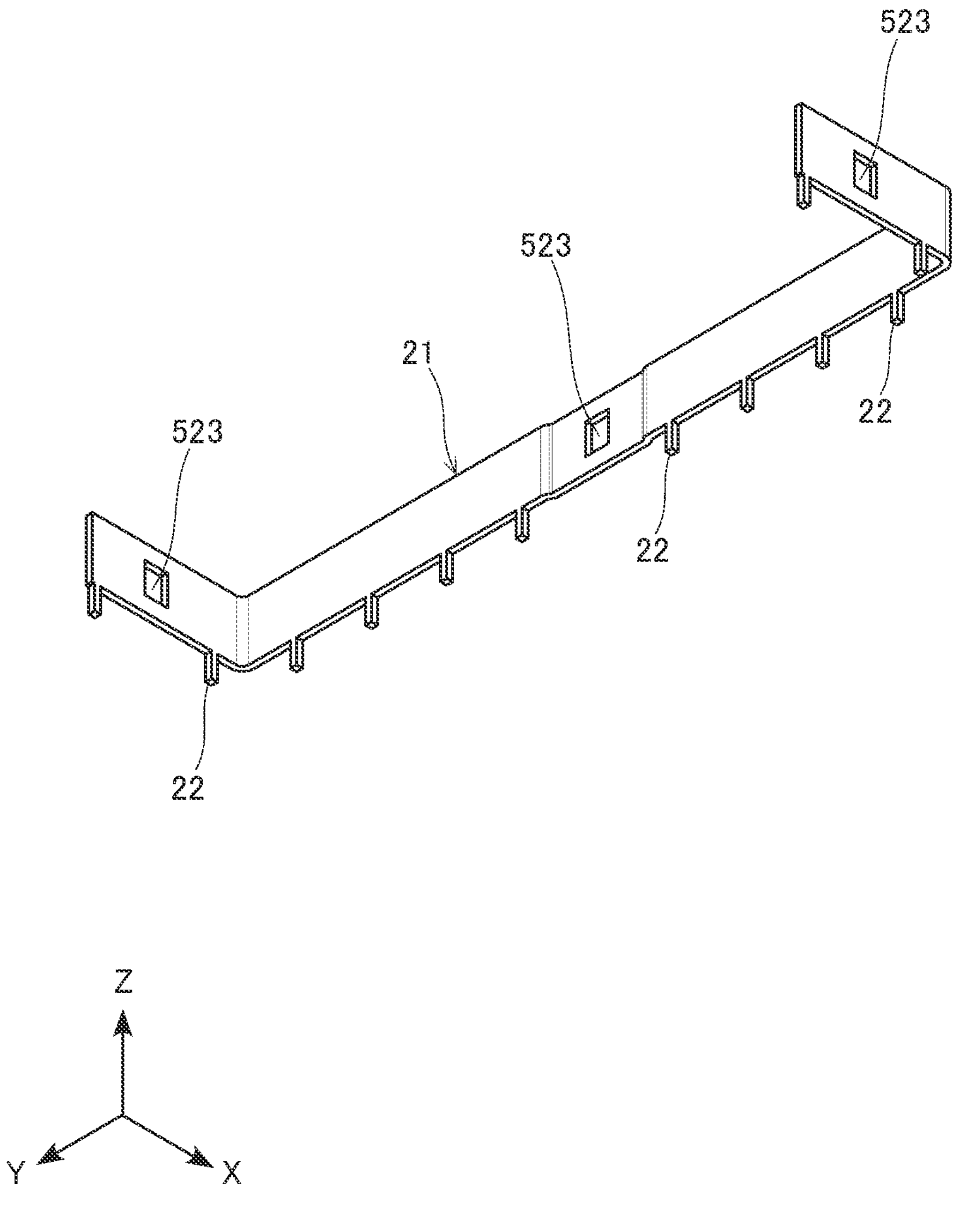
FIG. 84 is an exterior perspective view of the cage included in the connector with substrate according to the sixth embodiment viewed from the rear lower left.

Each of the plurality of contacts 32 is fixed to the housing 33 as shown in FIG. 81. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 81). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 81, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the sixth embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

In the cover shell 34 in the sixth embodiment, three lock pieces 537 are installed as shown in FIGS. 76 to 80 and the like. In the cover shell 34 in the sixth embodiment, among the three lock pieces 537, one lock piece 537 is disposed in the front center position of the cover shell 34, one lock piece 537 is disposed in a position closer to the right side rear of the cover shell 34, and one lock piece 537 is disposed in a position closer to the left side rear of the cover shell 34.

Figure 80:
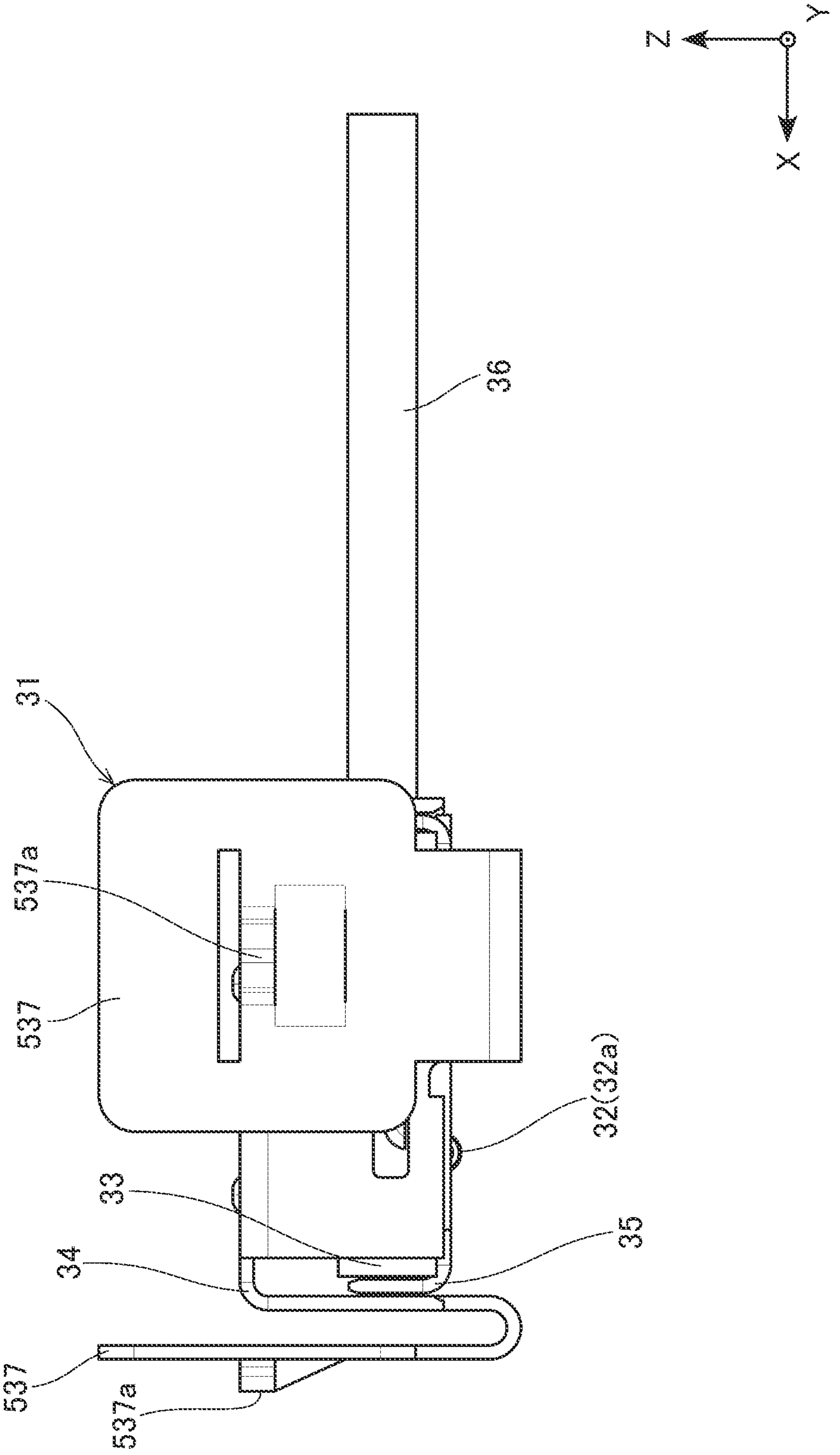
FIG. 80 is a right side view of the compression connector according to the sixth embodiment.

As shown in, in particular, FIGS. 79 and 80 and the like, the three lock pieces 537 have a shape bent in a substantially U shape, in parts extending downward from the front surface and the left and right side surfaces of the cover shell 34, and thereafter erected upward. In the center positions of the erected shape parts, lock claws 537*a* projecting outward in the lock pieces 537 are formed. The lower sides of the lock claws 537*a* are slopes and the upper sides of the lock claws 537*a* are formed in a cubic shape (see, in particular, FIGS. 79 to 82). That is, the lock claws 537*a* are formed to gradually project from the surfaces of the lock pieces 537 upward from the bottom positions. The three lock claws 537*a* are disposed in positions corresponding to formation positions of the three lock holes 523 formed in the cage 21 explained above. Therefore, when the compression connector 31 is moved in the −Z direction toward the cage 21 disposed on the upper surface of the substrate 11 and pressed against the cage 21, the lock claws 537*a* gradually enter the lock holes 523, with the lock pieces 537 being pushed to the cover shell 34 side, with force by the spring elasticity by the shape bent in the substantially U shape of the lock pieces 537 and action by the shape of the slopes on the lower sides of the lock claws 537*a*. Finally, an outward pressing force by the spring elasticity exerted by the lock pieces 537 acts, the lock claws 537*a* are completely fit in the lock holes 523, and engagement of the cover shell 34 with the cage 21 is realized. This state is a state in which the compression connector 31 is fixed to and held on the substrate 11.

Note that, in the sixth embodiment, when the compression connector 31 is fixed to and held on the substrate 11 attached with the cage 21, force in connection is applied to the cover shell 34. Since the cover shell 34 is formed by a thin metal plate having a shape long in the left-right direction, the cover shell 34 desirably has a structure for preventing deformation of the cover shell 34 itself when receiving force for connection fixing. Therefore, in the cover shell 34 according to the sixth embodiment, a plurality of lines of projections 534*a* extending in the left-right direction are formed on the upper surface. Strength against deformation of the cover shell 34 itself can be achieved by action of the shape of the plurality of lines of projections 534*a*.

The configuration of the connector with substrate 500 according to the sixth embodiment is explained above. Subsequently, a method of attaching the compression connector 31 to and a method of detaching the compression connector 31 from the substrate 11 attached with the cage 21 configuring the connector with substrate 500 according to the sixth embodiment are explained.

Figure 73:
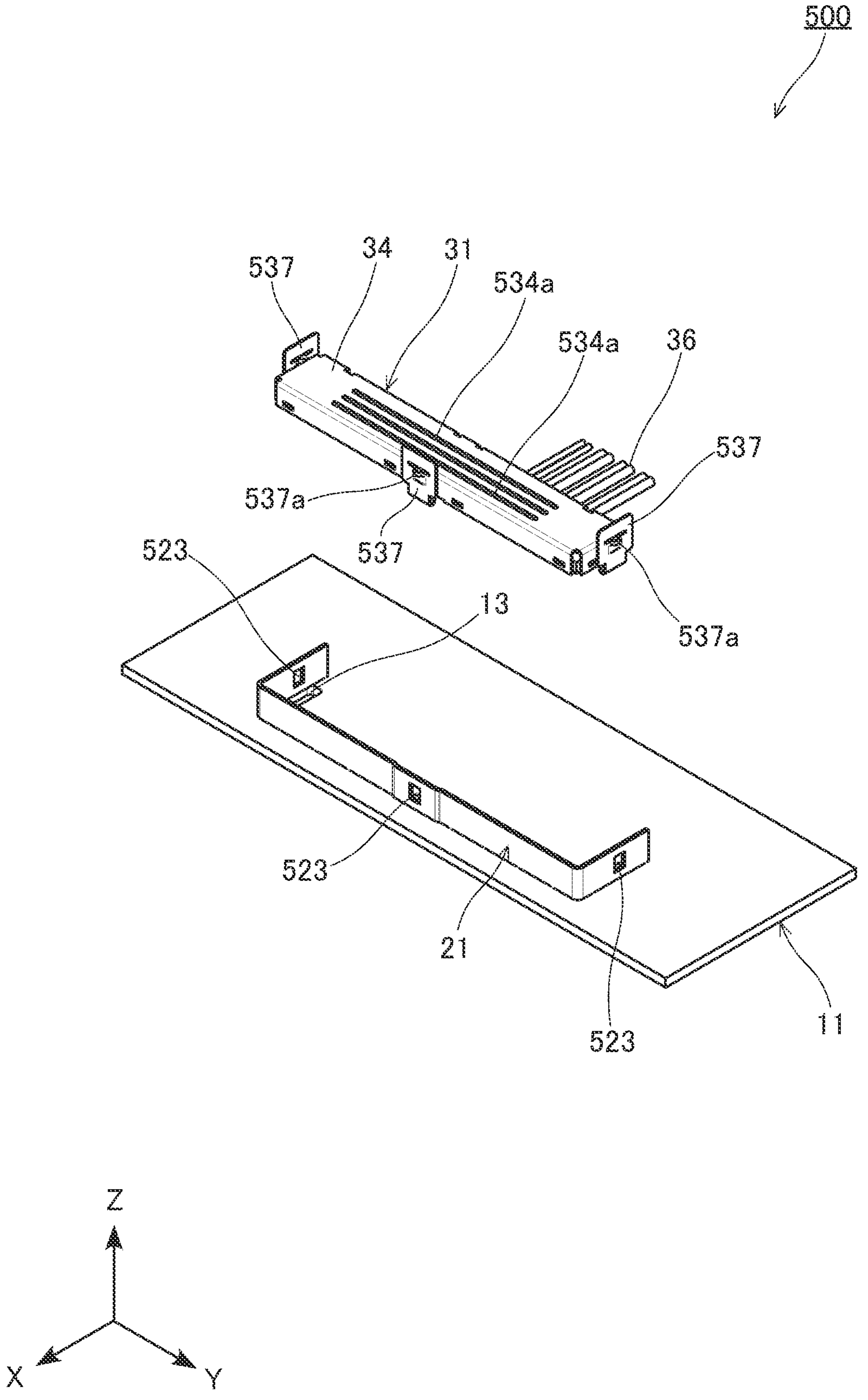
FIG. 73 is an exterior perspective view of a state in which a compression connector is detached from a substrate attached with a cage in the connector with substrate according to the sixth embodiment, the state being viewed from the front upper right.
Figure 74:
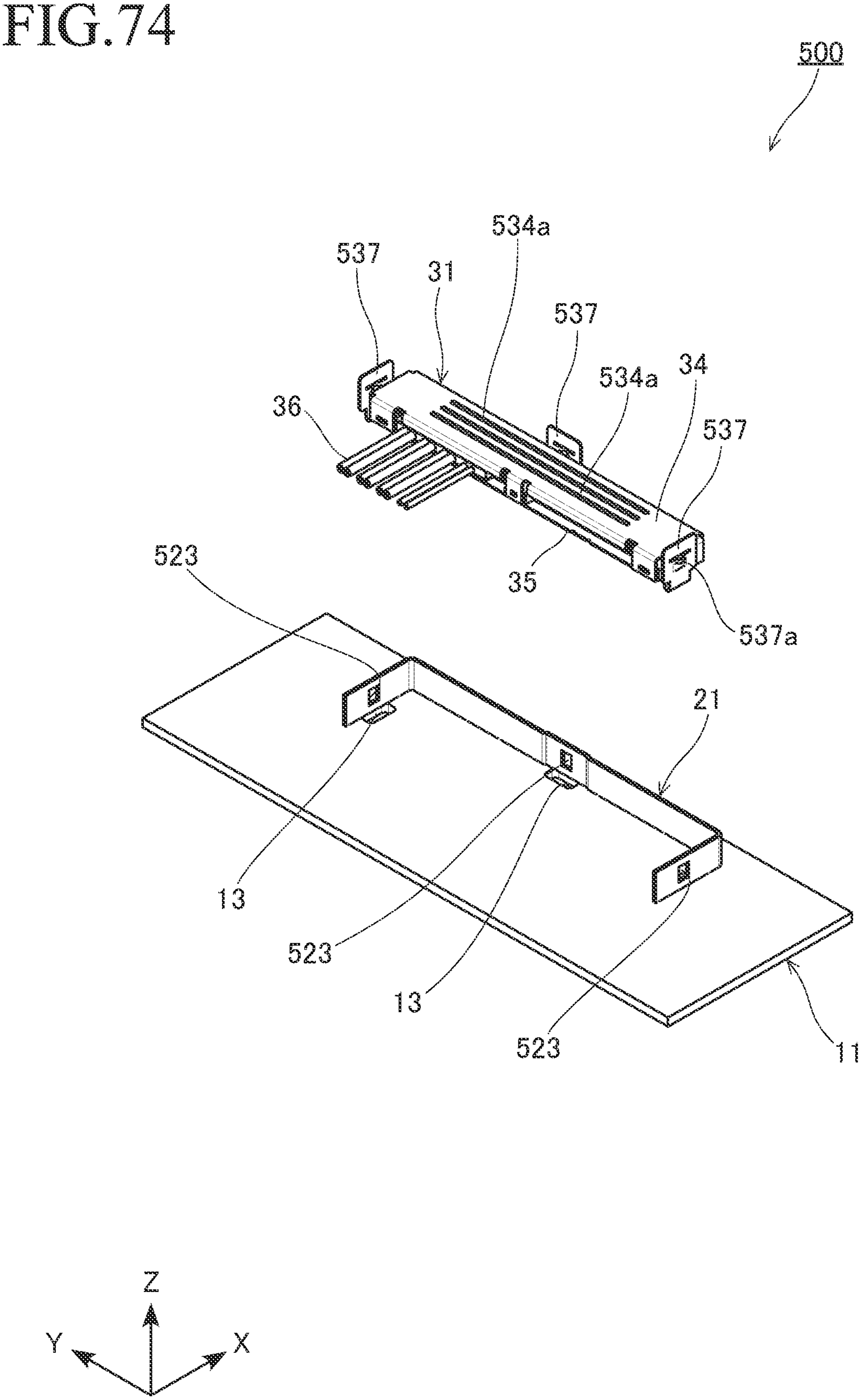
FIG. 74 is an exterior perspective view of the state in which the compression connector is detached from the substrate attached with the cage in the connector with substrate according to the sixth embodiment, the state being viewed from the rear upper left.
Figure 75:
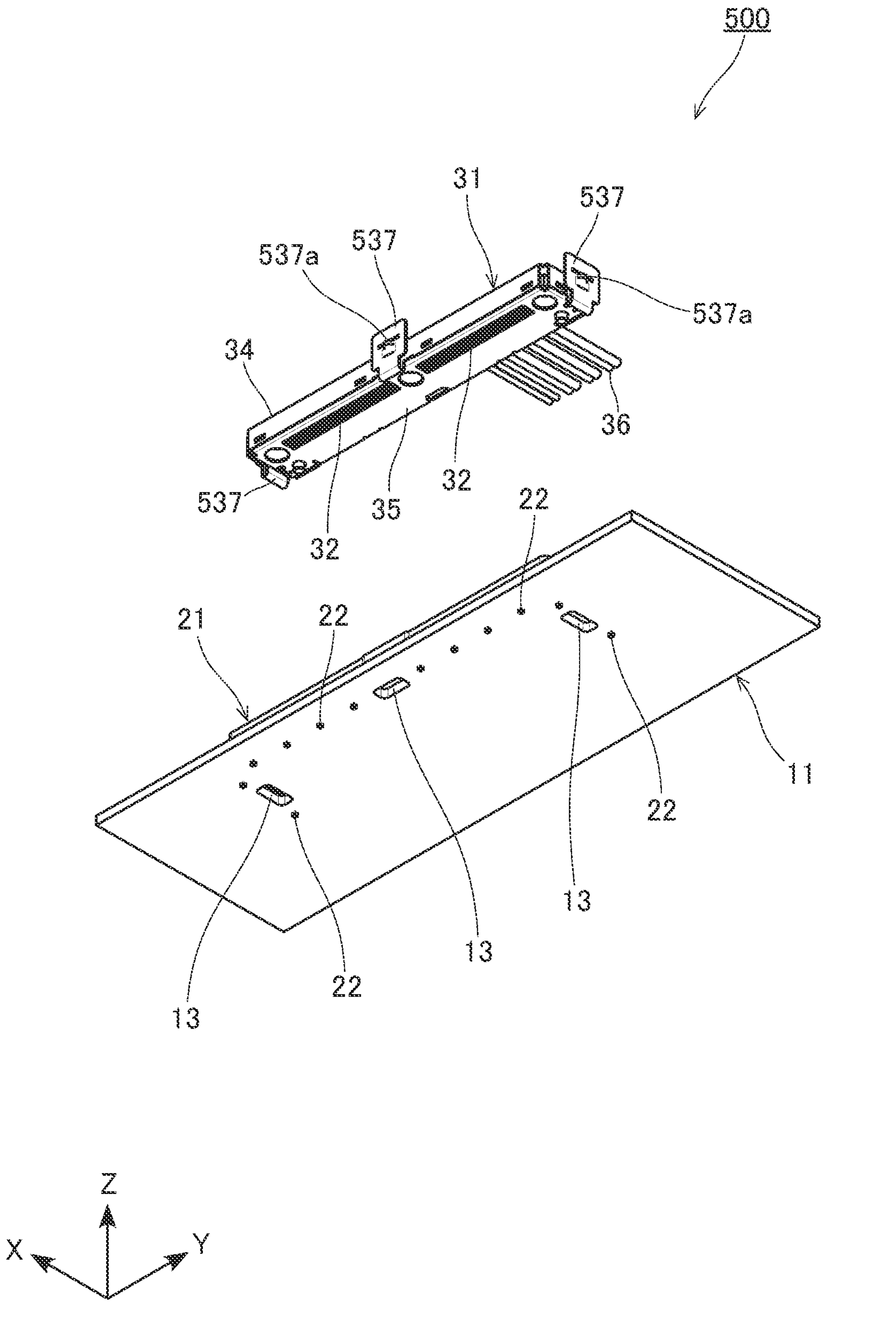
FIG. 75 is an exterior perspective view of the state in which the compression connector is detached from the substrate attached with the cage in the connector with substrate according to the sixth embodiment, the state being viewed from the front lower right.
Figure 76:
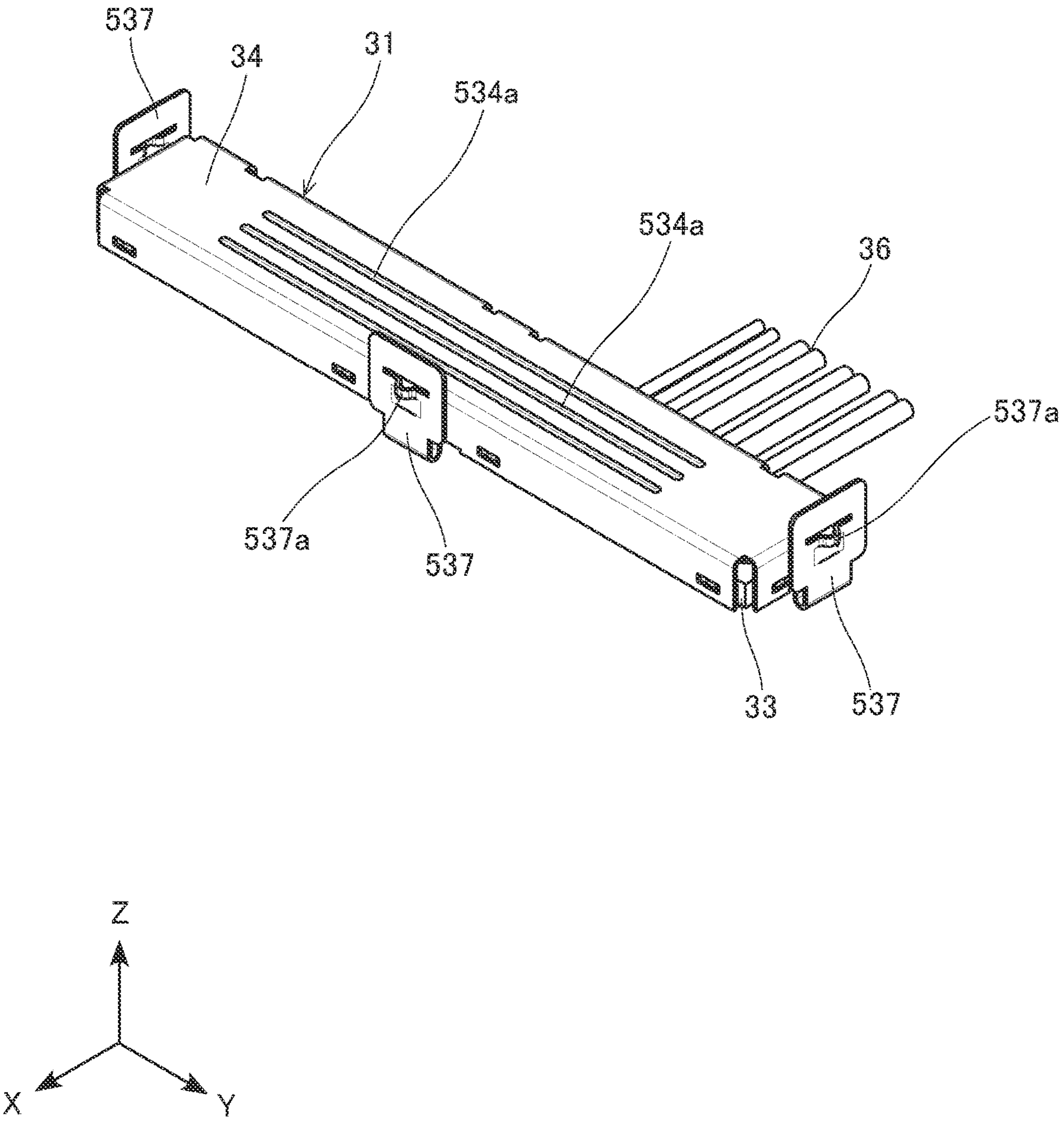
FIG. 76 is an exterior perspective view of the compression connector according to the sixth embodiment viewed from the front upper right.
Figure 77:
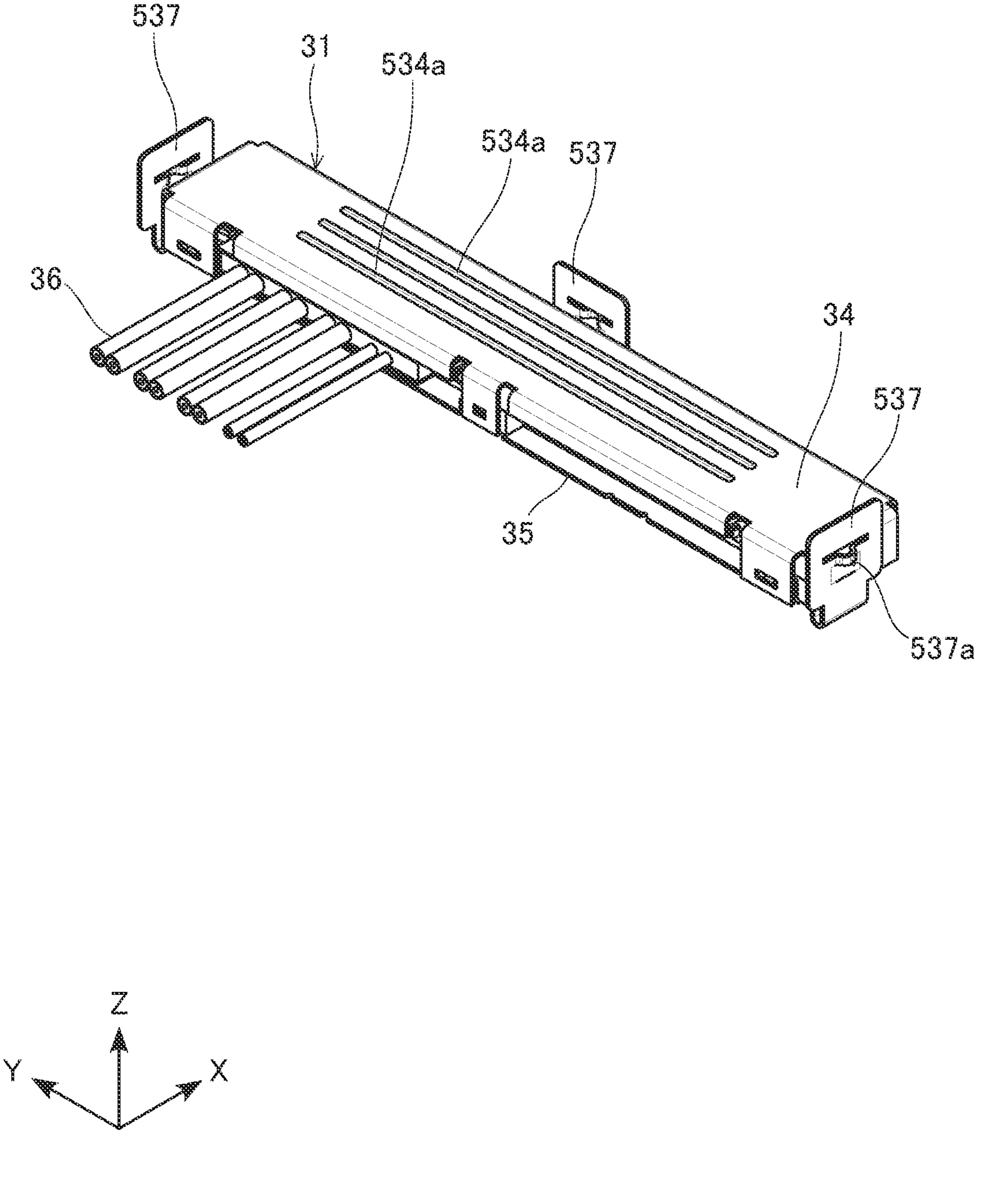
FIG. 77 is an exterior perspective view of the compression connector according to the sixth embodiment viewed from the rear upper left.

When the compression connector 31 is attached to the substrate 11 attached with the cage 21, as shown in FIGS. 73 to 75, the compression connector 31 is disposed above the cage 21 fixed to the substrate 11 and is moved in the vertical direction to be directed in the downward direction (the −Z direction). The compression connector 31 is lowered toward the inside of the cage 21 having the substantially channel-like shape in a top view and pressed against the upper surface of the substrate 11. In this pressing operation, the lock claws 537*a* formed in the lock pieces 537 come into contact with the inner wall surface of the cage 21 and descend while pressing the inner wall surface outward. At this time, the lock pieces 537 descend while being pushed to the cover shell 34 side with force of the spring elasticity by the shape bent in the substantially U shape of the lock pieces 537 and action by the shape of the slopes on the lower sides of the lock claws 537*a*, whereby the lock claws 537*a* gradually enter the lock holes 523. Finally, an outward pressing force by the spring elasticity exerted by the lock pieces 537 acts and the lock claws 537*a* are completely fit in the lock holes 523. A state in which the lock claws 537*a* are completely fit in the lock holes 523 is securely maintained by force by the spring elasticity exerted by the lock pieces 537 and force by material plasticity for maintaining the shape. Engagement of the cover shell 34 with the cage 21 is easily realized by pushing the compression connector 31 into the cage 21 as explained above. This state is a state in which the compression connector 31 is fixed to and held on the substrate 11 attached with the cage 21.

Note that, in the state in which the compression connector 31 is fixed to and held on the substrate 11 attached with the cage 21, the compression connector 31 applies, to the substrate 11, contact reaction in the vertical direction applied by the plurality of contacts 32 included in the compression connector 31. However, since the lock holes 523 and the lock claws 537*a* fit in the lock holes 523 receive the contact reaction in concert, the compression connector 31 is securely fixed to and held on the substrate 11 attached with the cage 21.

On the other hand, when the compression connector 31 is detached from the substrate 11 attached with the cage 21, the user pinches the three lock pieces 537 and tilts the lock pieces 537 to the inner side, whereby the fit state of the lock claws 537*a* in the lock holes 523 is released. When the compression connector 31 is vertically moved in the upward direction (the +Z direction) after creating such a release state, the compression connector 31 can be smoothly detached from the substrate 11 attached with the cage 21.

As explained above, in the connector with substrate 500 according to the sixth embodiment, the lock holes 523 that house the lock claws 537*a* formed in the lock pieces 537 included in the compression connection 31 are formed in the cage 21 and the lock claws 537*a* are fit in the lock holes 523 to fix the position in the vertical direction of the compression connection 31 with respect to the cage 21. At this time, since the lock holes 523 and the lock claws 537*a* fit in the lock holes 523 can receive contact reaction in concert, a stable fixed state of the compression connector 31 to the substrate 11 attached with the cage 21 is maintained. That is, with the connector with substrate 500 according to the sixth embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the sixth embodiment. Various changes or improvements can be added to the sixth embodiment.

For example, in the sixth embodiment explained above, the three lock pieces 537 are provided in the cover shell 34 configuring the compression connector 31 and the three lock claws 537*a* in total are formed one each in each of the three lock pieces 537. In the cage 21, the three lock holes 523 are formed to correspond to the formation positions of the three lock claws 537*a*. The three sets of the lock claws 537*a* and the lock holes 523 are fit with each other, whereby the stable fixed state of the compression connector 31 to the substrate 11 attached with the cage 21 is realized. However, the scope of the present invention is not limited to the form illustrated in the sixth embodiment. One or more sets of the lock claw and the lock hole of the present invention only have to be present. That is, in the present invention, the numbers of lock pieces in which lock claws are formed and lock holes can be optionally changed.

For example, in the sixth embodiment explained above, the configuration is explained in which the lock holes 523 are formed in the cage 21 and the lock pieces 537 including the lock claws 537*a* are formed in the cover shell 34 configuring the compression connector 31. However, in the present invention, the lock piece including the lock claw may be formed in the cage and the lock hole may be formed in the compression connector. That is, in the present invention, disposition positions of the lock piece in which the lock claw is formed and the lock hole can be optionally changed.

The configuration of the connector with substrate 500 according to the sixth embodiment is explained above with reference to FIGS. 70 to 84. Subsequently, a connector with substrate 600 according to a seventh embodiment, which is another form example that the connector with substrate according to the present invention can take, is explained with reference to FIGS. 85 to 97A and 97B. Note that, in the following explanation, members that are the same as or similar to the members explained in the first to sixth embodiments above are denoted by the same reference numerals and signs and explanation of the members is sometimes omitted.

Seventh Embodiment

Figure 85:
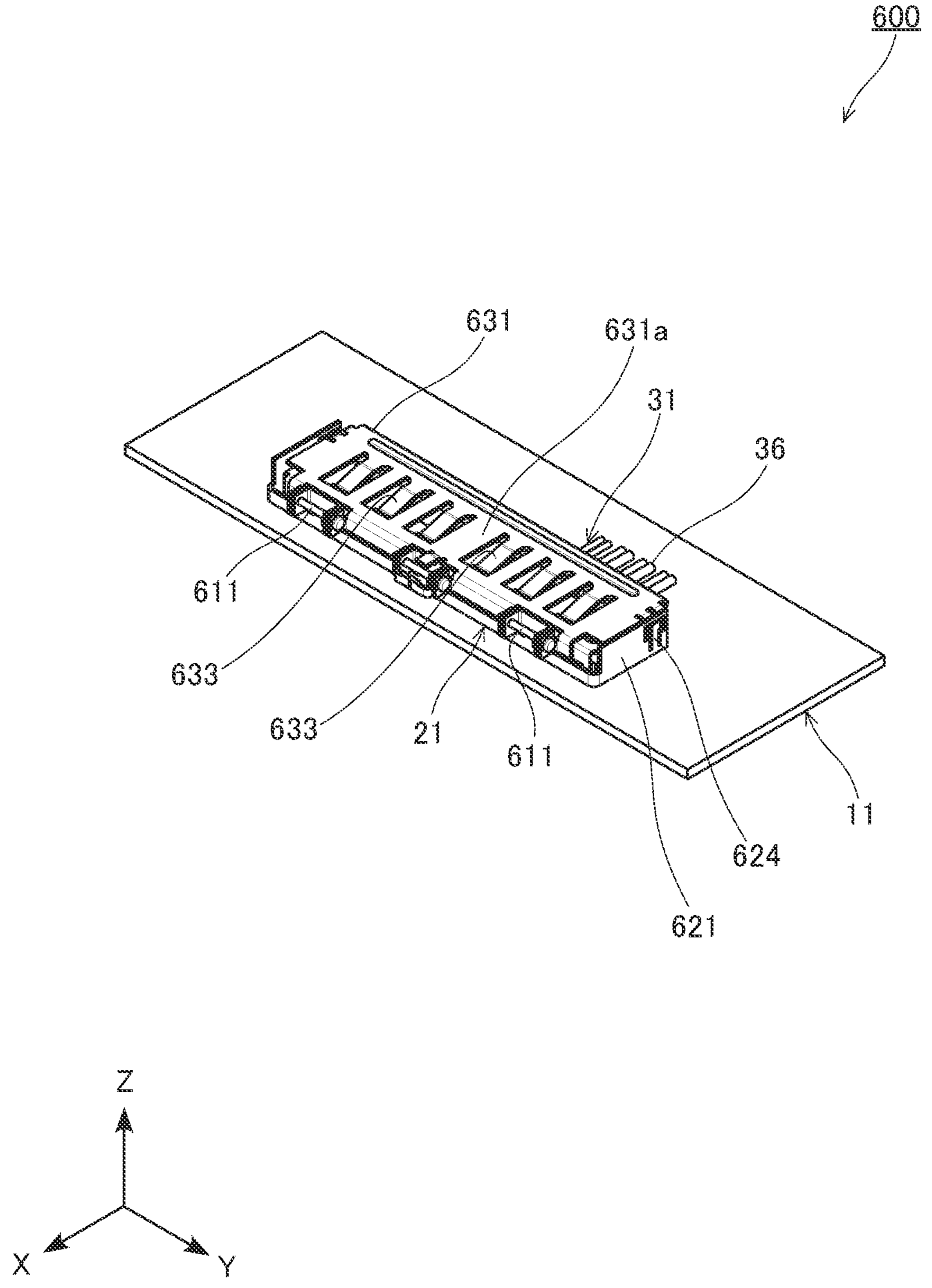
FIG. 85 is an exterior perspective view of a connector with substrate according to a seventh embodiment viewed from the front upper right.
Figure 86:
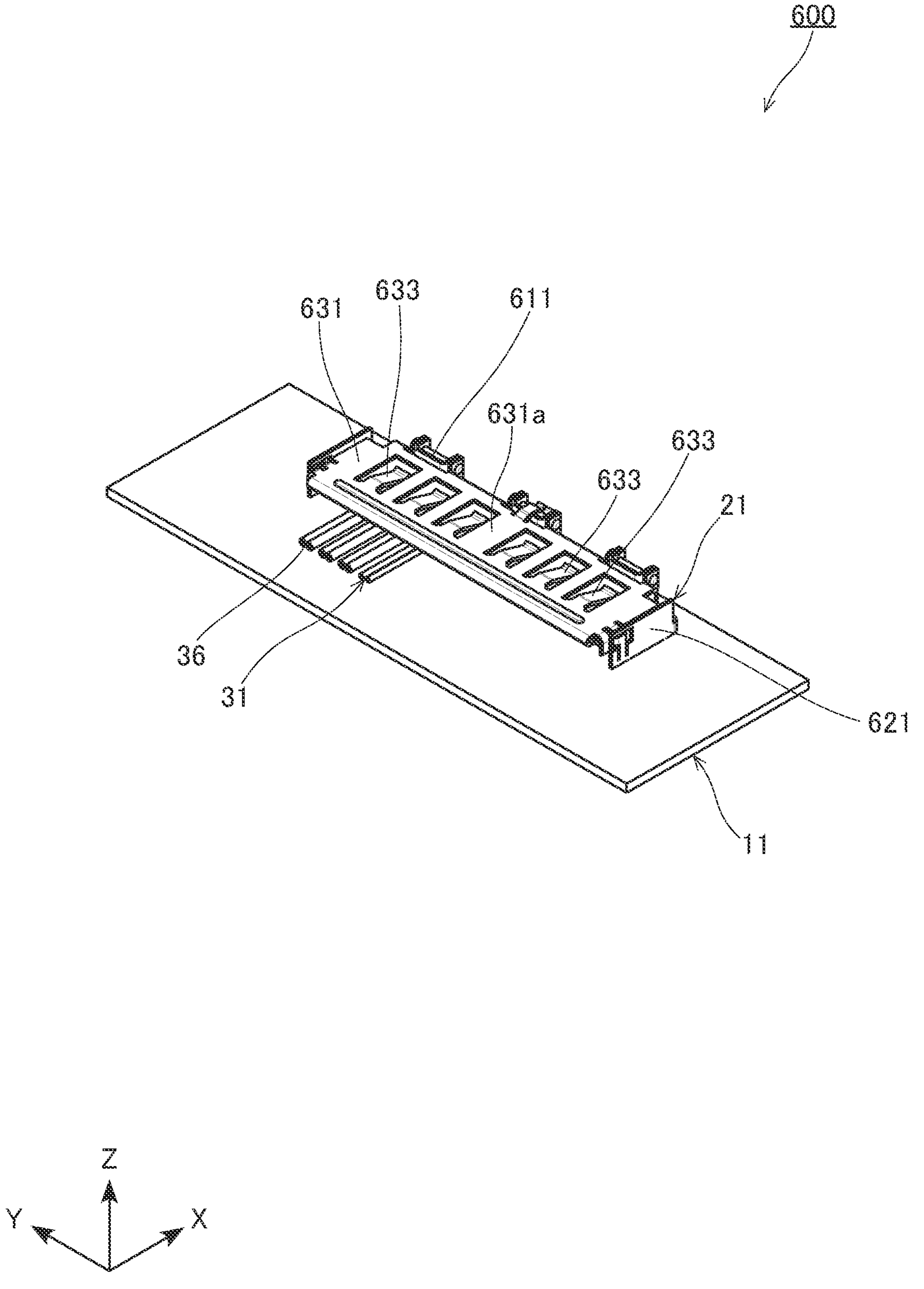
FIG. 86 is an exterior perspective view of the connector with substrate according to the seventh embodiment viewed from the rear upper left.

A configuration of the connector with substrate 600 according to the seventh embodiment is explained with reference to FIGS. 85 to 97A and 97B. The connector with substrate 600 according to the seventh embodiment includes, as shown in FIGS. 85 to 87, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 87:
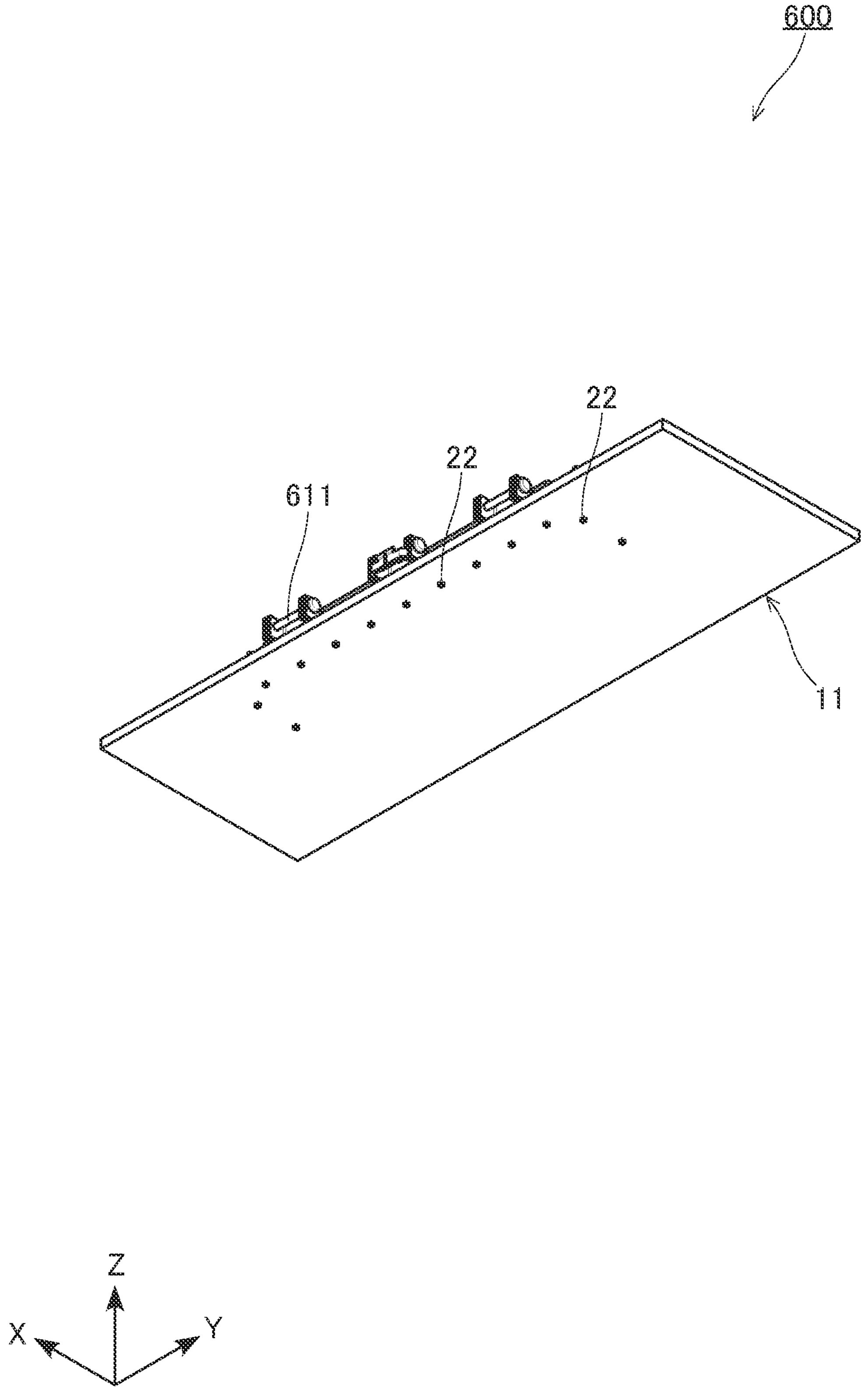
FIG. 87 is an exterior perspective view of the connector with substrate according to the seventh embodiment viewed from the front lower right.

A plurality of attachment holes (not shown) are formed in the substrate 11 (see FIG. 87). The plurality of leg sections 22 included in the cage 21 explained below are inserted into the plurality of (in the seventh embodiment, assumed to be thirteen) attachment holes (not shown) to fix the cage 21 to the substrate 11.

As shown in FIGS. 95 to 97A and 97B, the cage 21 according to the seventh embodiment is configured by two members including a cage base 621 and a cage cover 631.

The plurality of (in the seventh embodiment, thirteen) leg sections 22 are formed on the cage base 621. The leg sections 22 are formed as shaft-like members extending downward from the bottom surface side of the cage base 621. The plurality of leg sections 22 are inserted into the plurality of attachment holes (not shown) formed in the substrate 11, whereby secure fixing of the substrate 11 and the cage base 621 is implemented. As a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

The cage cover 631 is installed on, via three attachment shafts 611, the cage base 621 fixed to the substrate 11. The cage cover 631 rotates with respect to the cage base 621 and is fixed to the cage base 621. In a state in which the cage cover 631 is opened with respect to the cage base 621 (see a state shown in FIG. 97A), the compression connector 31 explained below can be installed in and taken out from the substrate 11. In a state in which the cage cover 631 is closed with respect to the cage base 621 (see a state shown in FIG. 97B), the compression connector 31 can be housed and installed in a region surrounded by the cage cover 631, the cage base 621, and the upper surface of the substrate 11.

A plurality of (in the seventh embodiment, six) pressing springs 633 curving in the direction of the substrate 11 and having a spring property are formed on a cage top surface 631*a* of the cage cover 631. Curving portions of the pressing springs 633 project from the cage top surface 631*a* in the state in which the cage cover 631 is opened, that is, when external force is not applied to the pressing springs 633. When the compression connector 31 is housed in the cage base 621 fixed to the substrate 11 and the cage cover 631 is closed from that state, the six pressing springs 633 presses the top surface 34*a* of the cover shell 34 configuring the upper surface side of the compression connector 31 in the direction of the substrate 11. Since the six pressing springs 633 included in the cage 21 in the seventh embodiment are formed side by side in the left-right direction of the cage top surface 631*a*, the pressing springs 633 can press the entire region of the top surface 34*a* of the cover shell 34 configuring the upper surface side of the compression connector 31 explained below.

Further, in the positions of the left and right ends of the cage cover 631, two lock holes 637 in total are formed one each on the left and the right. On the other hand, in the positions of the left and right ends of the cage base 621, two lock claws 625 in total formed in lock pieces 624 having spring property that enters the lock holes 637 formed in the cage cover 631 to fix the cage cover 631 to the cage base 621 are formed one each on the left and the right. The two lock holes 637 and the two lock claws 625 formed in the lock pieces 624 are configured such that the lock claws 625 enter the lock holes 637 in two positions when the cage cover 631 is closed with respect to the cage base 621.

Figure 96:
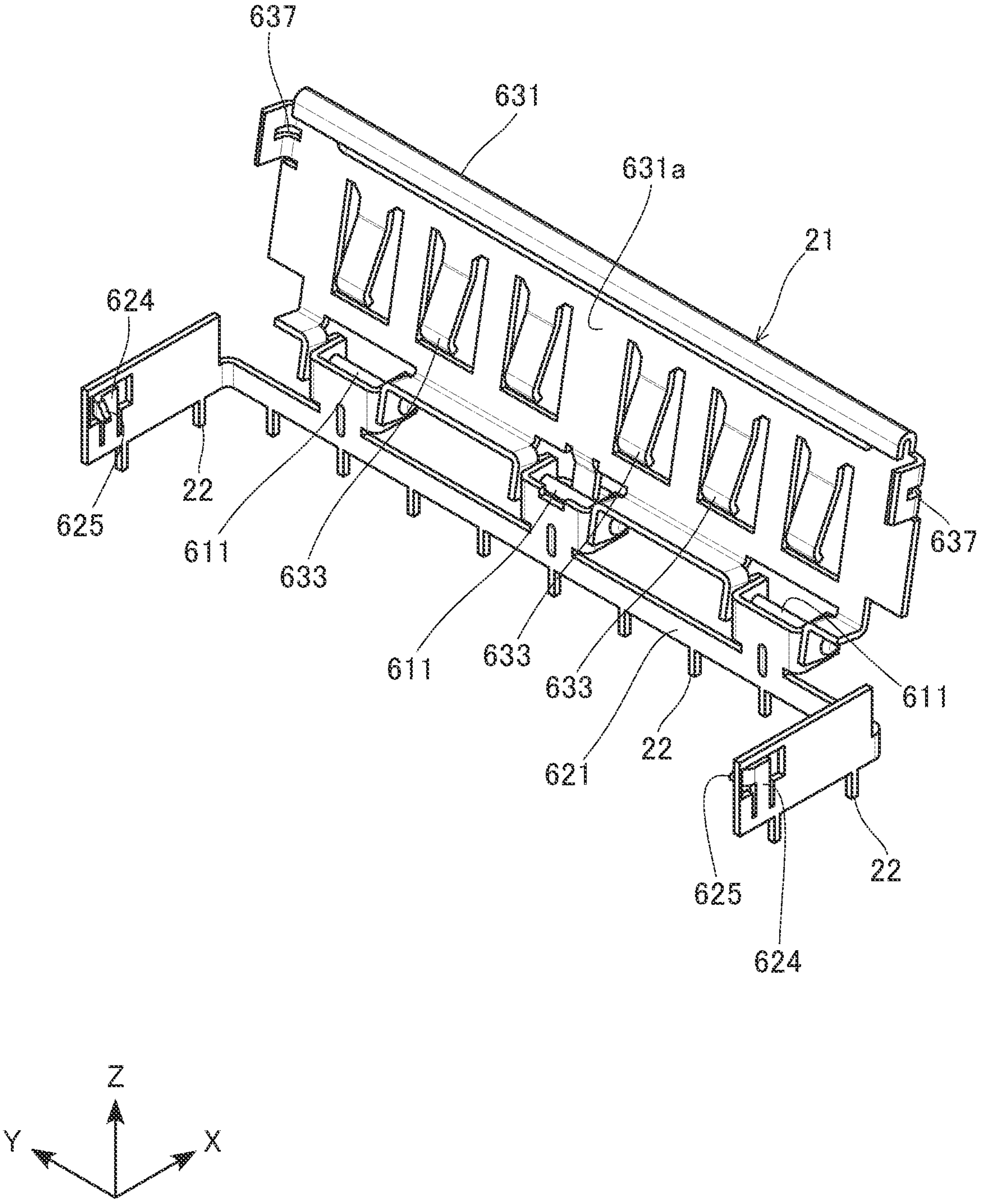
FIG. 96 is an exterior perspective view of the cage included in the connector with substrate according to the seventh embodiment viewed from the rear upper left.
Figure 97A:
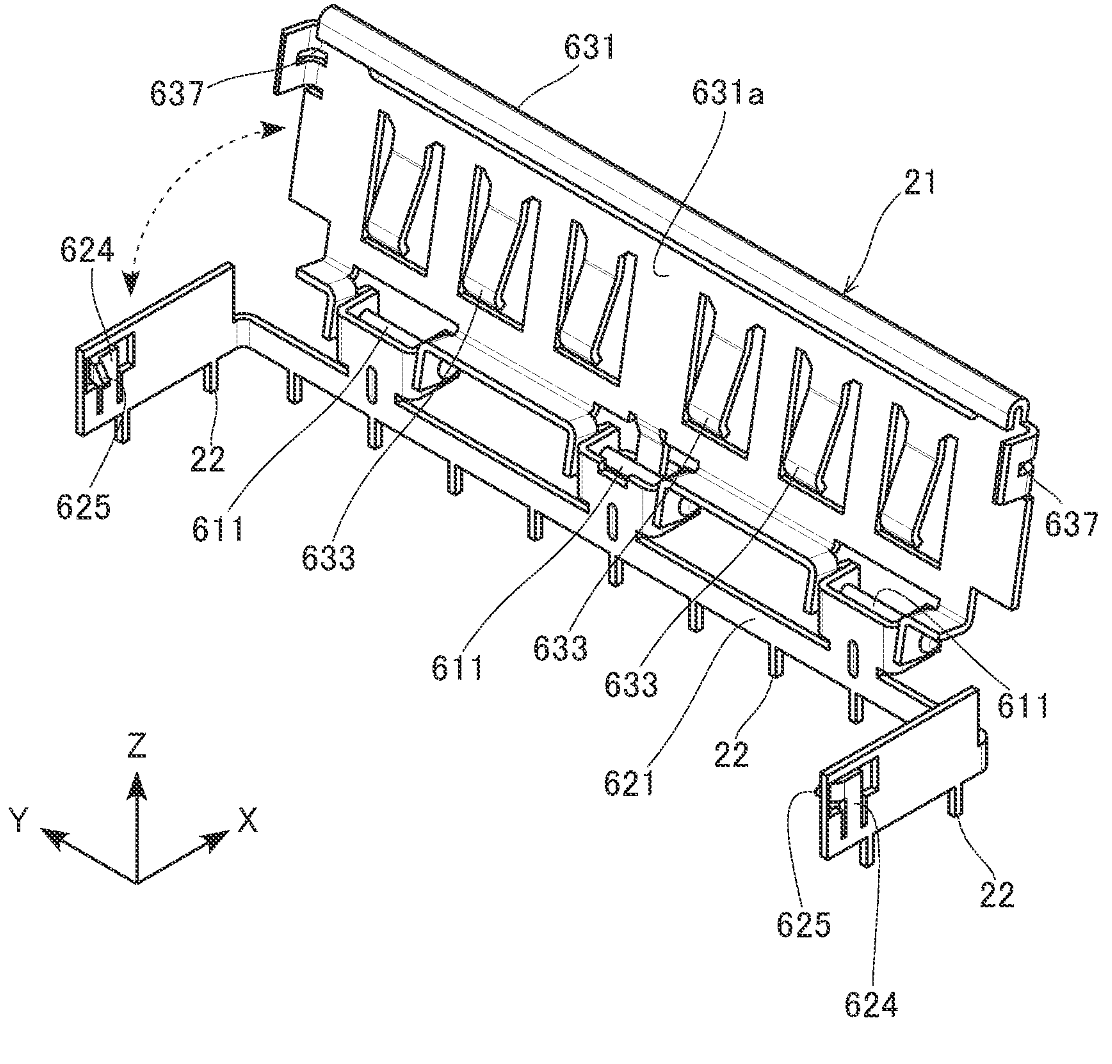
FIGS. 97A and 97B are diagrams for explaining an operation state of the cage included in the connector with substrate according to the seventh embodiment, FIG. 97A showing, about a cage base and a cage cover configuring the cage, a state in which the cage cover is opened and FIG. 97B showing, about the cage base and the cage cover configuring the cage, a state in which the cage cover is closed.
Figure 97B:
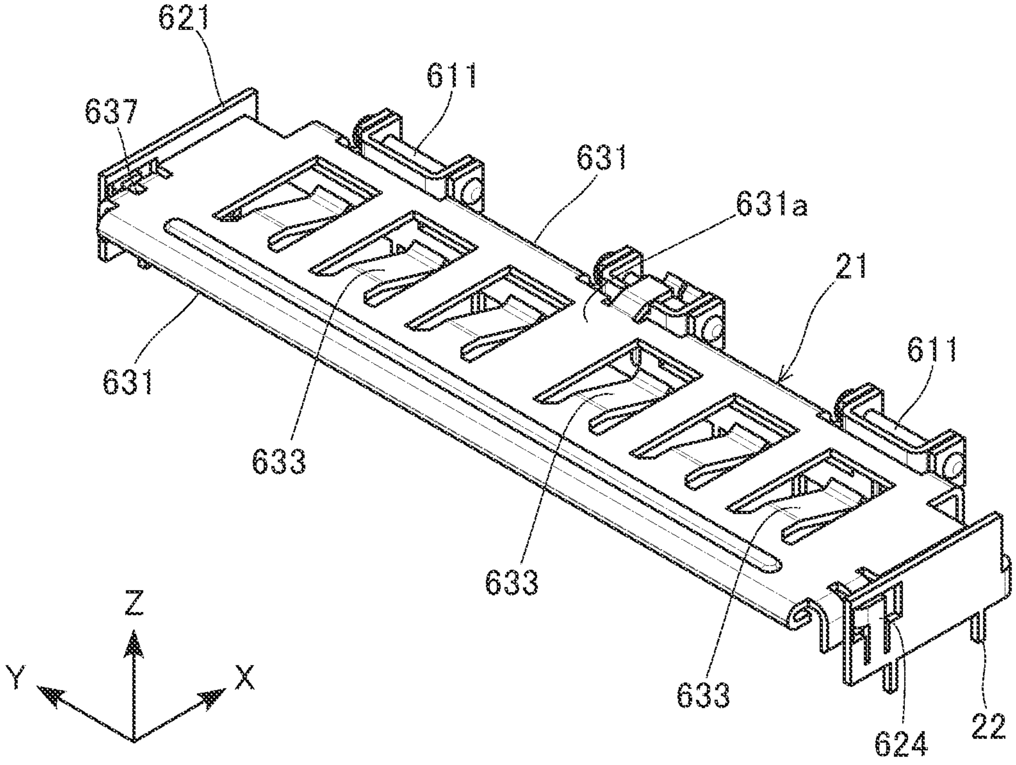

Further, as shown more in detail in FIGS. 96 and 97A and the like, the lock claws 625 have an exterior shape having a slope shape and are formed to gradually change to a wedge shape having a slope projecting to the left and right inner sides from the upper side toward the lower side. The wedge shape of the lock claws 625 is a shape for not hindering an inserting motion in fitting the lock claws 625 in the lock holes 637. Once the lock claws 625 fit in the lock holes 637, the lock claws 625 exert a function of slip-off prevention for preventing the lock claws 625 from slipping off the lock holes 637.

The compression connector 31 includes, as shown in FIGS. 90 to 94, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 91:
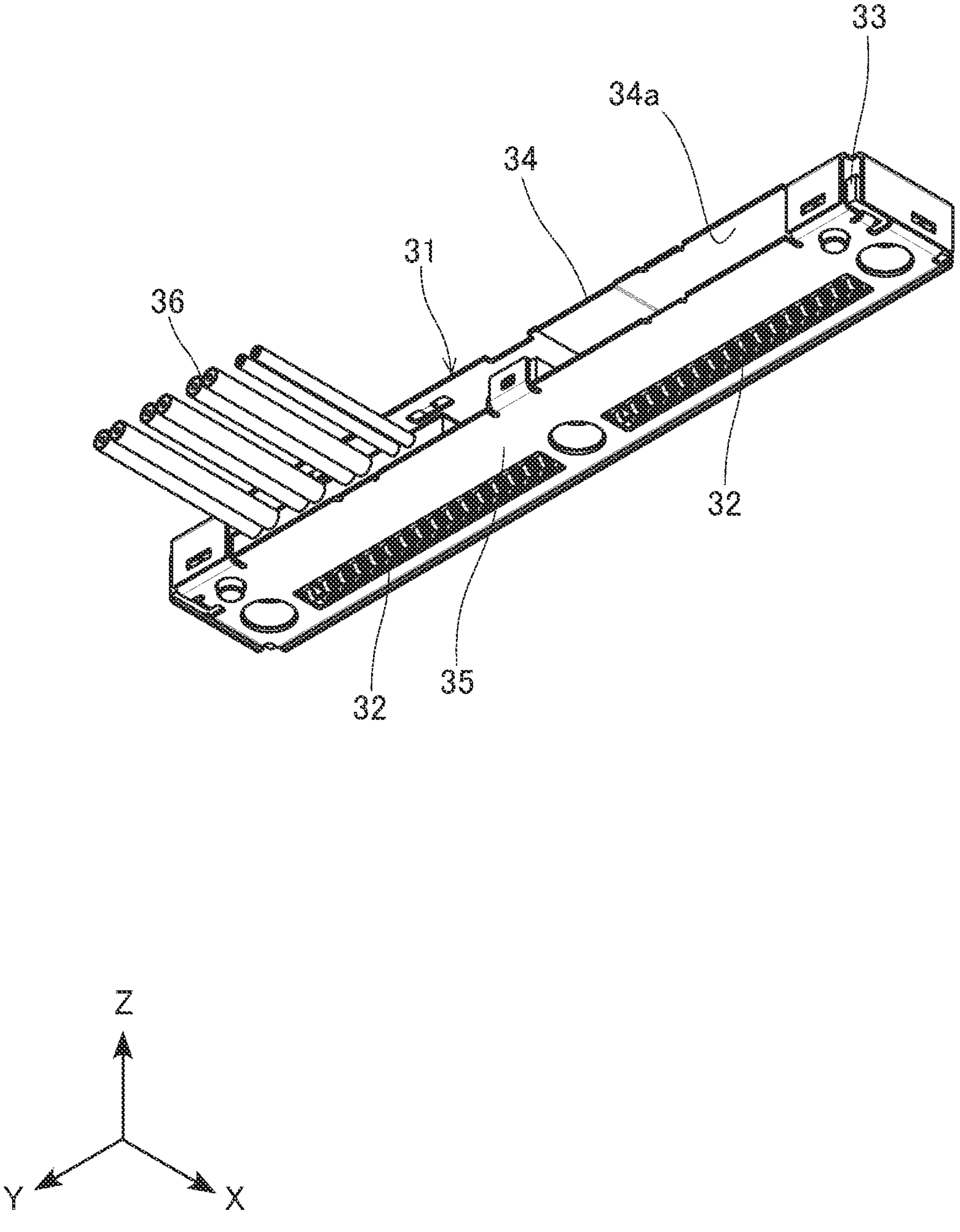
FIG. 91 is an exterior perspective view of the compression connector according to the seventh embodiment viewed from the rear lower left.
Figure 92:
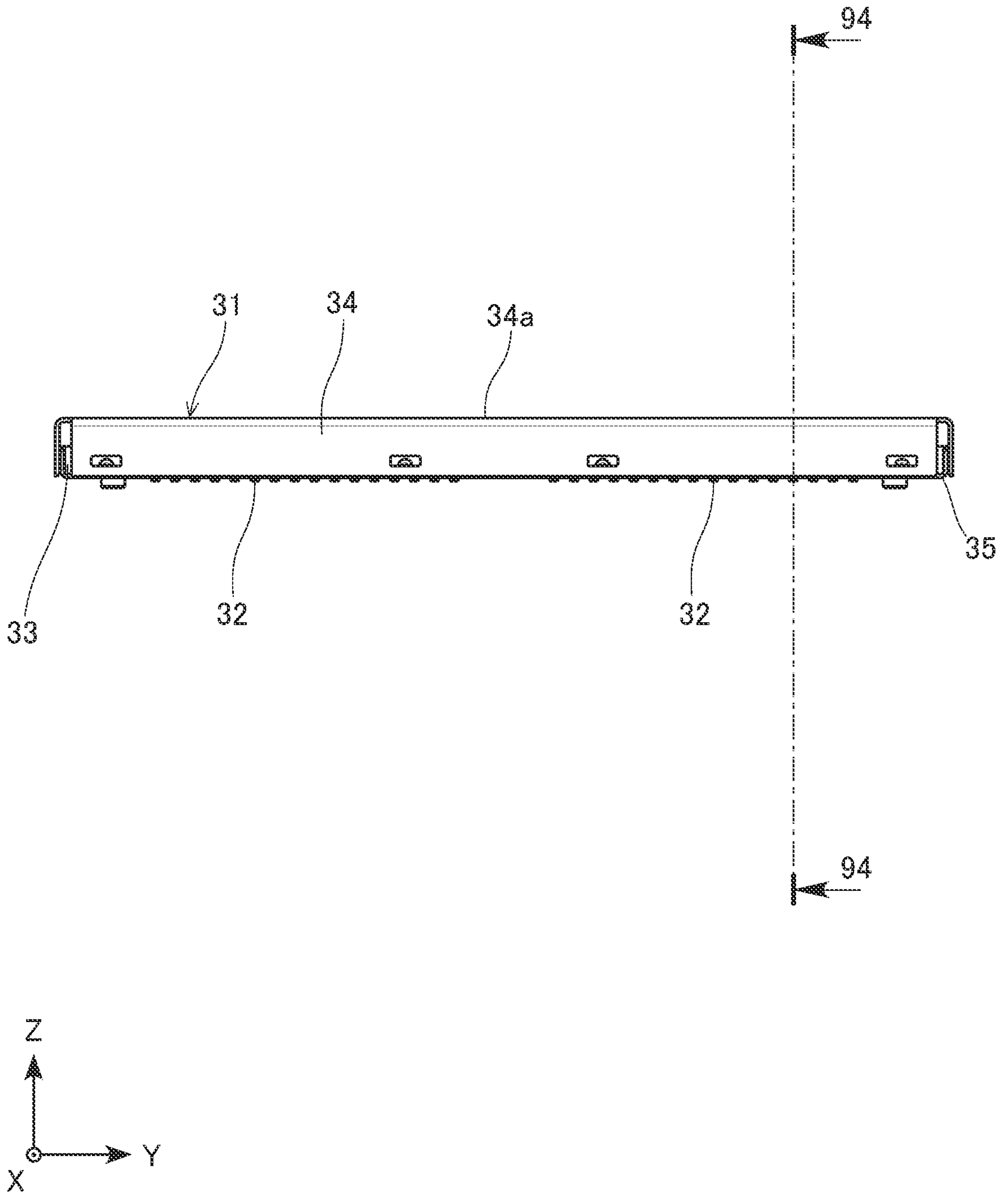
FIG. 92 is a front view of the compression connector according to the seventh embodiment.
Figure 93:
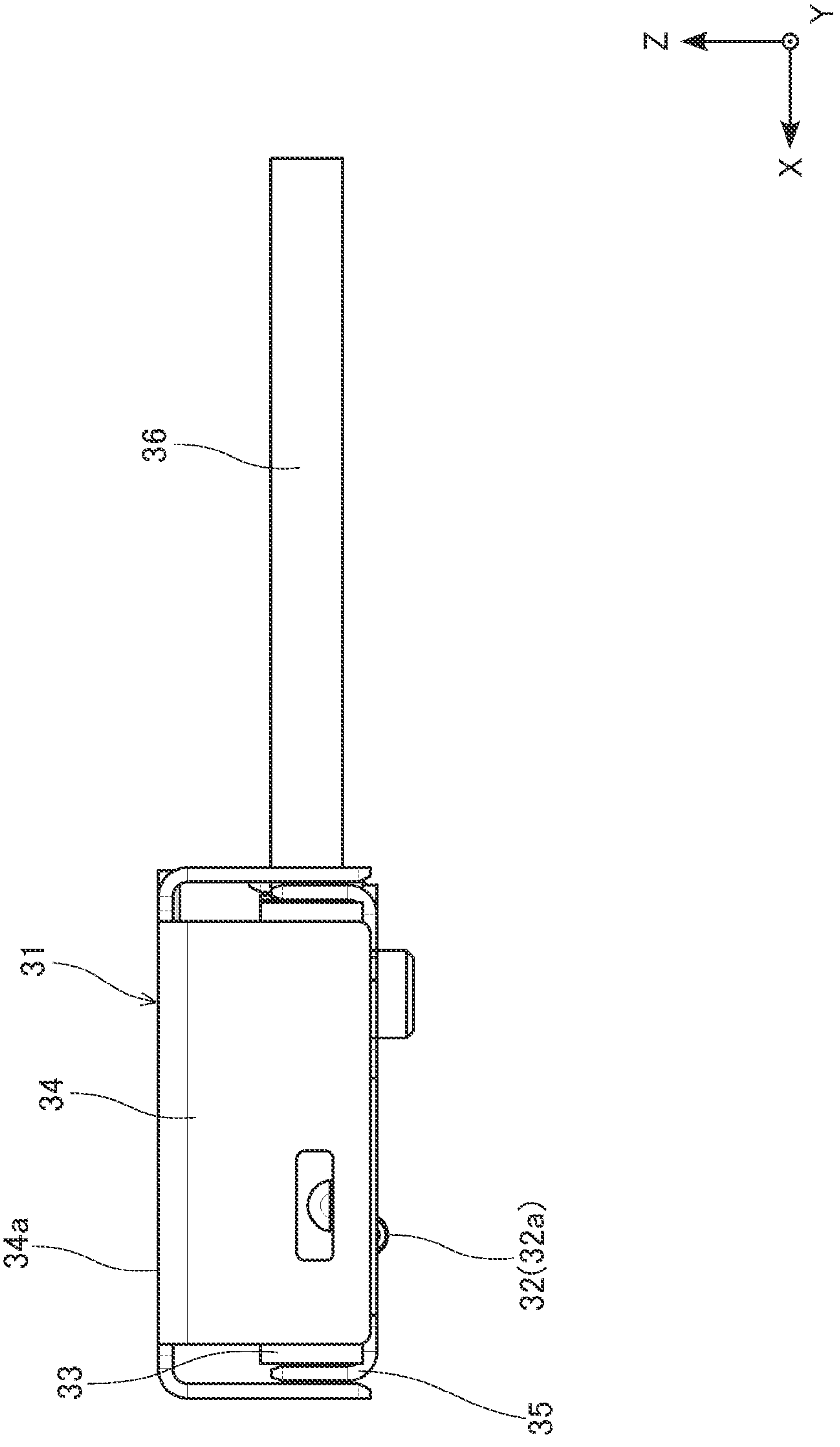
FIG. 93 is aright side view of the compression connector according to the seventh embodiment.

As shown in, in particular, FIGS. 91 and 92, a plurality of contacts 32 are disposed to be laterally arranged in the left-right direction.

Figure 94:
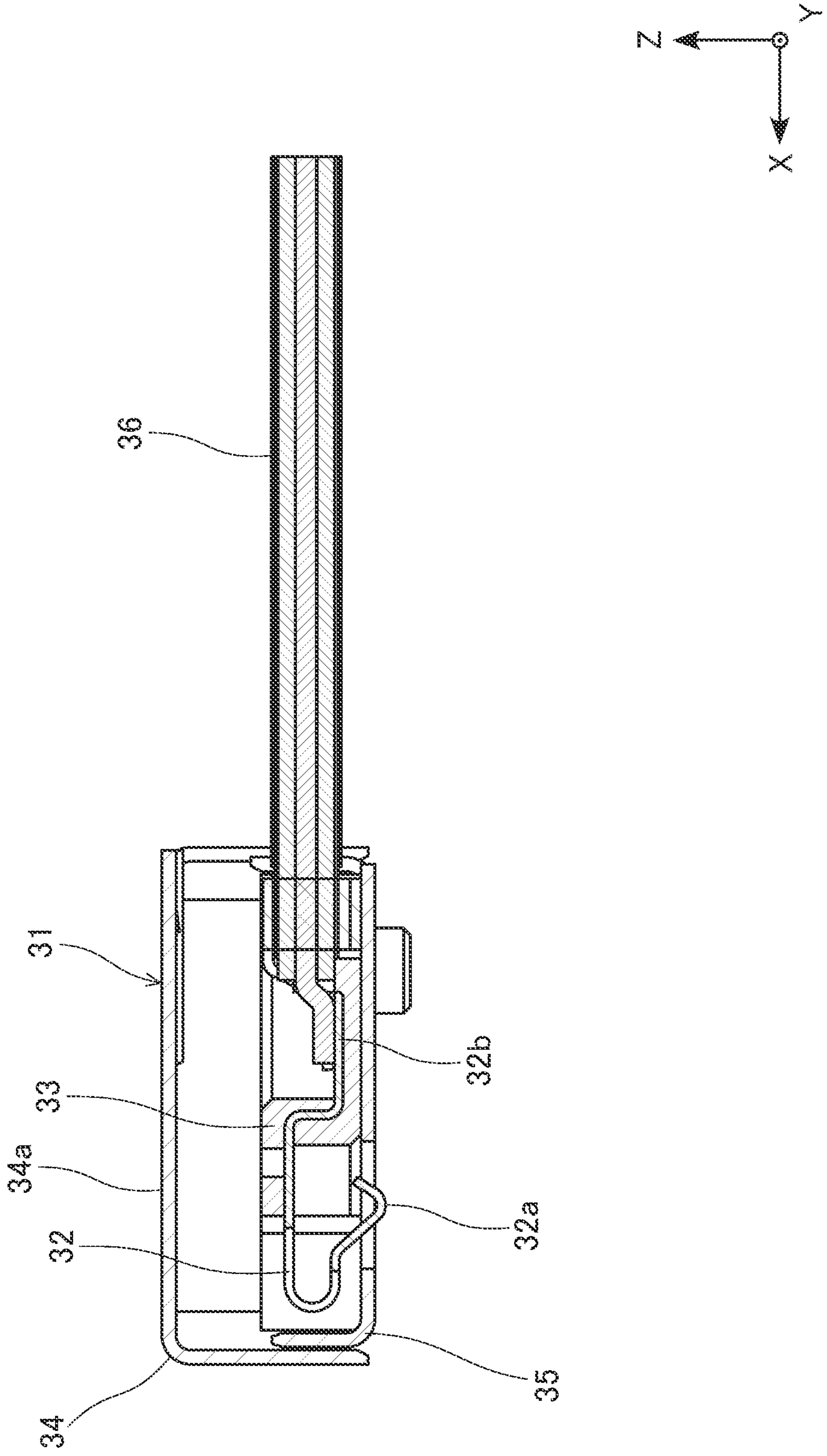
FIG. 94 is a longitudinal sectional view taken along line 94-94 in FIG. 92.
Figure 95:
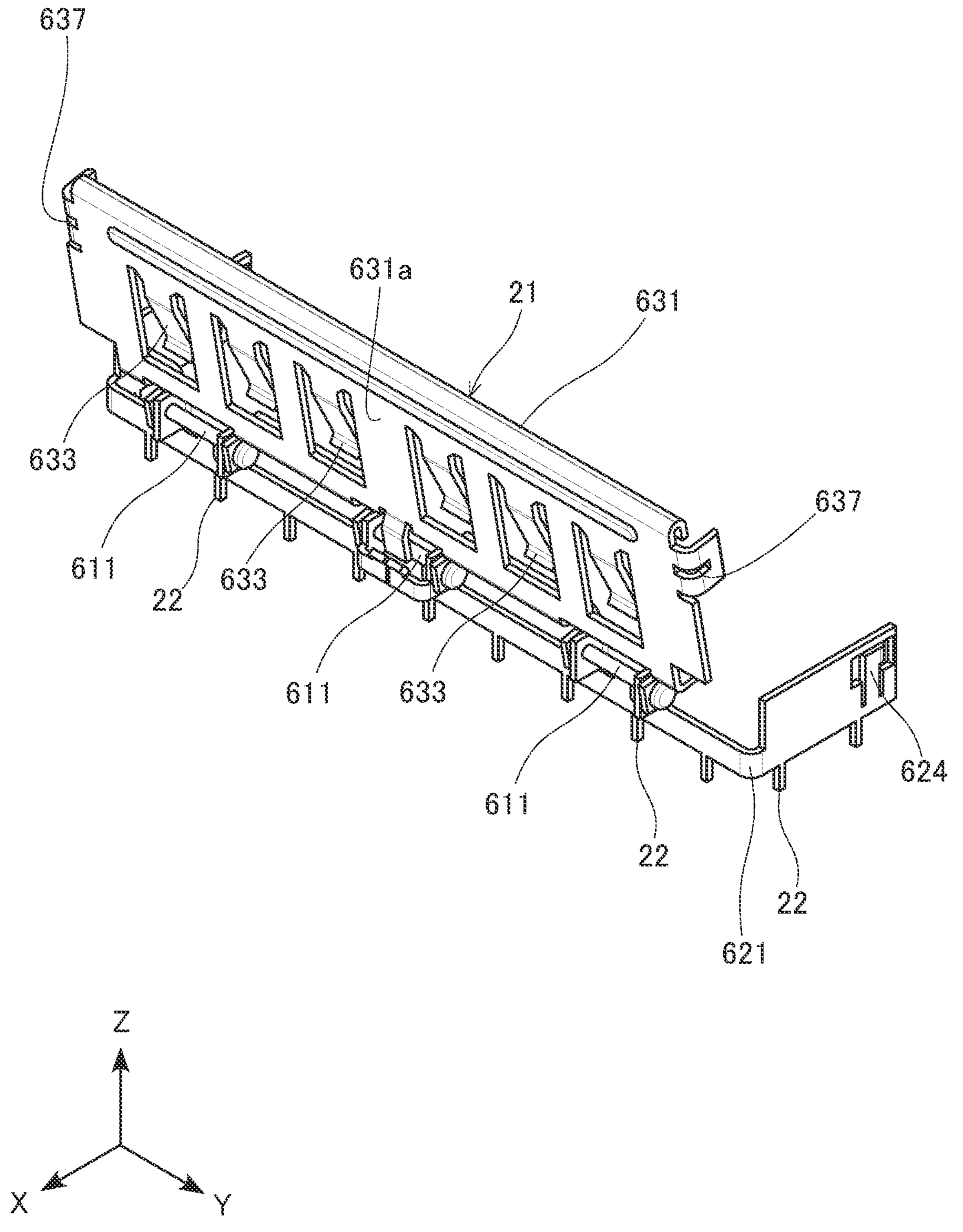
FIG. 95 is an exterior perspective view of the cage included in the connector with substrate according to the seventh embodiment viewed from the front upper right.

Each of the plurality of contacts 32 is fixed to the housing 33 as shown in FIG. 94. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 94). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 94, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the seventh embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 600 according to the seventh embodiment is explained above. Subsequently, a method of attaching the compression connector 31 to and a method of detaching the compression connector 31 from the substrate 11 attached with the cage 21 configuring the connector with substrate 600 according to the seventh embodiment are explained.

Figure 88:
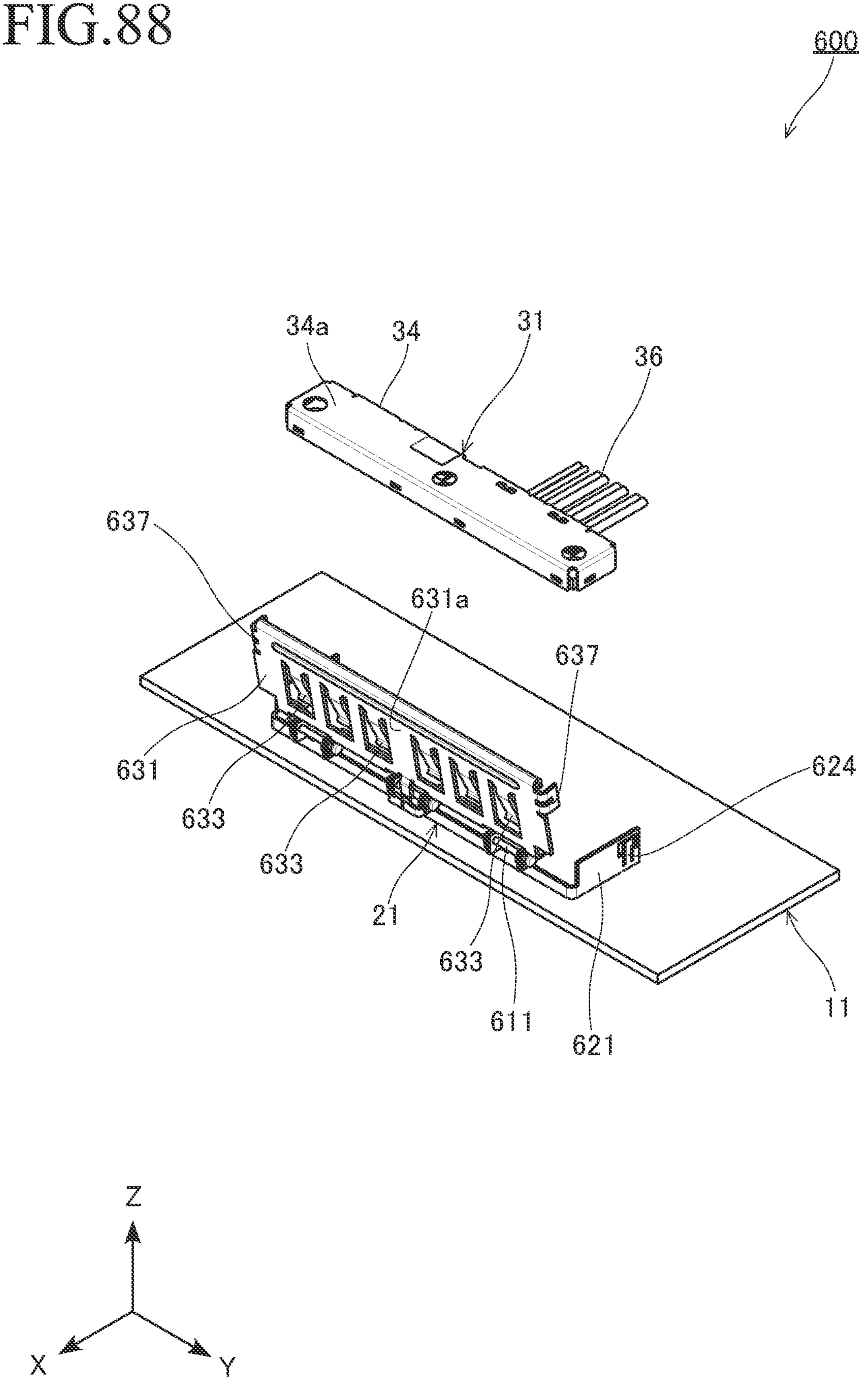
FIG. 88 is an exterior perspective view of a state in which a compression connector is detached from a substrate attached with a cage in the connector with substrate according to the seventh embodiment, the state being viewed from the front upper right.
Figure 89:
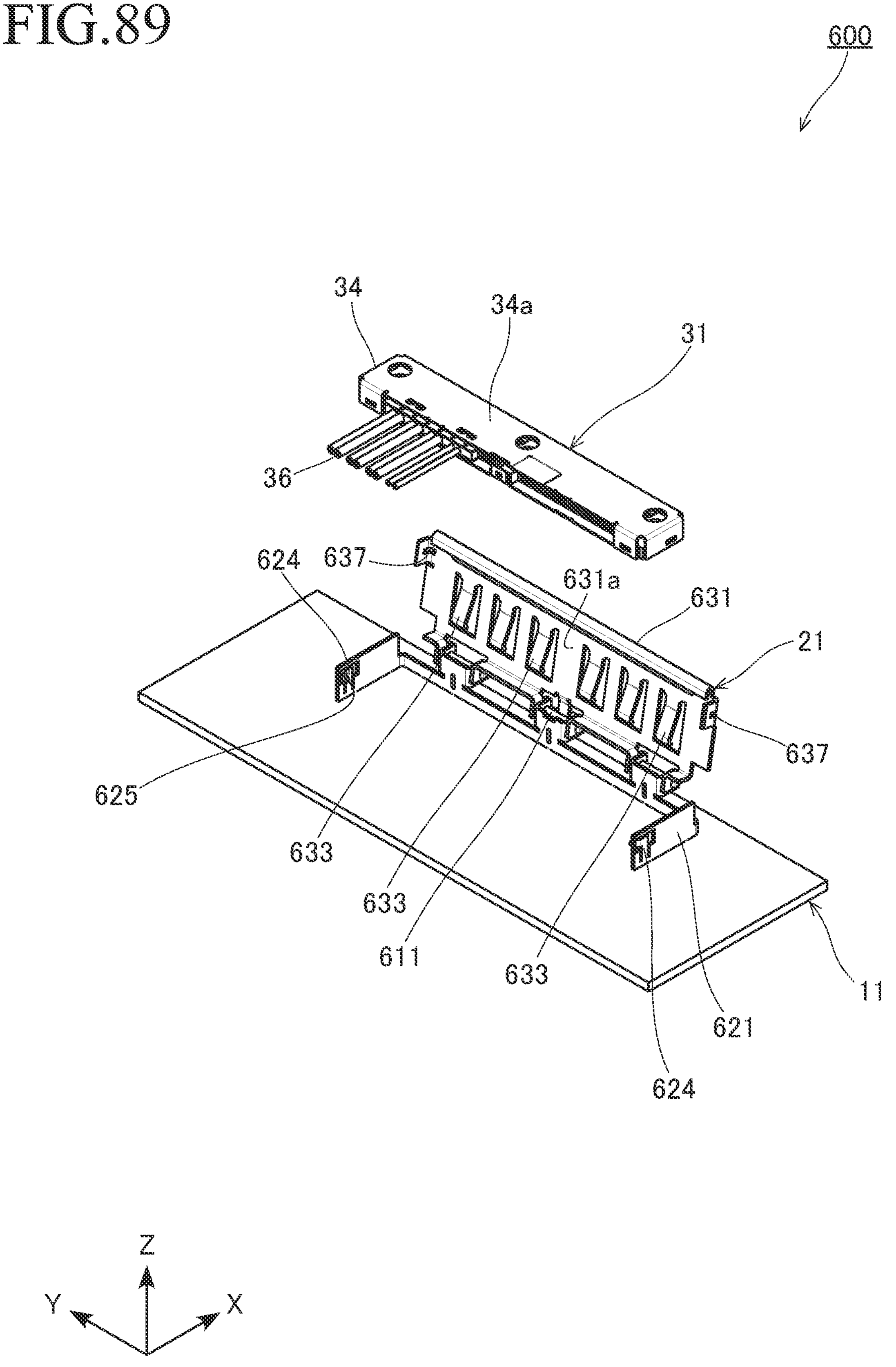
FIG. 89 is an exterior perspective view of the state in which the compression connector is detached from the substrate attached with the cage in the connector with substrate according to the seventh embodiment, the state being viewed from the rear upper left.
Figure 90:
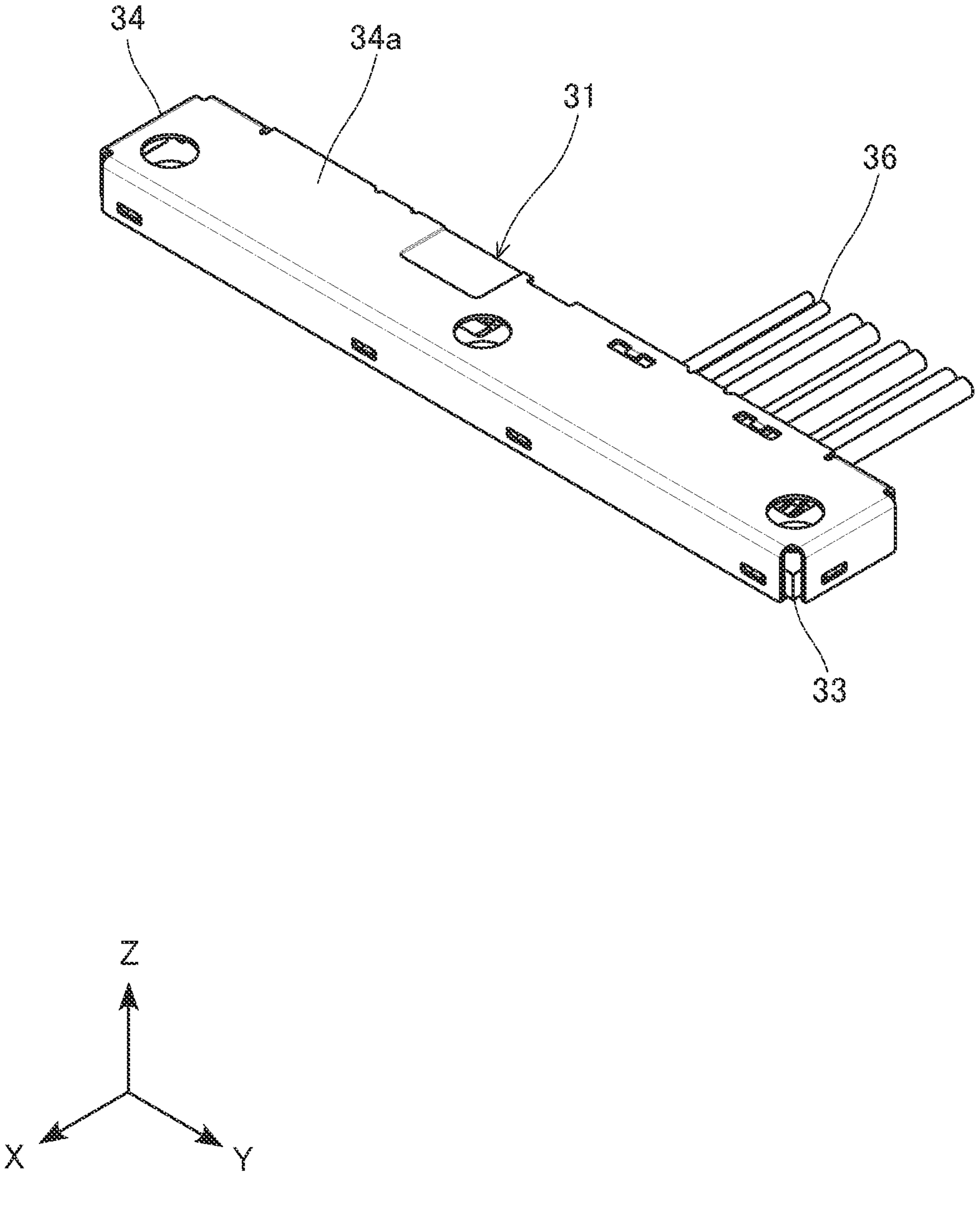
FIG. 90 is an exterior perspective view of the compression connector according to the seventh embodiment viewed from the front upper right.

When the compression connector 31 is attached to the substrate 11 attached with the cage 21, the compression connector 31 is moved in the vertical direction to be directed in the downward direction (the −Z direction) from a state shown in FIGS. 88 and 89, that is, a state in which the cage cover 631 is opened with respect to the cage base 621. After the compression connector 31 is disposed in the position of the cage base 621, the cage cover 631 is rotated to close the upper surface of the cage base 621 fixed to the substrate 11. At this time, the two lock holes 637 also rotate and move according to a rotating motion of the cage cover 631 and respectively receive the two lock claws 625. When the lock claws 625 enter the lock holes 637, a closing motion of the cage cover 631 with respect to the cage base 621 is completed. The compression connector 31 is housed in the region surrounded by the cage cover 631, the cage base 621, and the upper surface of the substrate 11.

In a state in which the compression connector 31 is housed in the region surrounded by the cage cover 631, the cage base 621, and the upper surface of the substrate 11, the six pressing springs 633 formed on the cage top surface 631*a* of the cage cover 631 exert force based on the spring elasticity in the downward direction (the −Z direction). Therefore, the six pressing springs 633 press the top surface 34*a* of the cover shell 34 configuring the upper surface side of the compression connector 31 in the direction of the substrate 11.

At this time, the compression connector 31 inserted into the substrate 11 attached with the cage 21 applies, to the substrate 11, contact reaction in the vertical direction applied by the plurality of contacts 32 included in the compression connector 31. However, the contact reaction in the vertical direction applied by the plurality of contacts 32 is offset by force based on the spring elasticity exerted by the six pressing springs 633 and is received by, in particular, the cage top surface 631*a* of the cage cover 631 configuring the upper surface of the cage 21 in the cage 21 that houses the compression connector 31. Therefore, the stable fixed state of the compression connector 31 to the substrate 11 is maintained.

Note that the six pressing springs 633 included in the cage cover 631 in the seventh embodiment are formed side by side in the left-right direction of the cage top surface 631*a*. This disposition configuration is the same direction as the arranging direction of the plurality of contacts 32. Therefore, since the six pressing springs 633 can exert the force based on the spring elasticity uniformly against the contact reaction applied from the plurality of contacts 32, it is possible to suitably press the entire region of the top surface 34*a* of the cover shell 34 configuring the upper surface side of the compression connector 31.

Further, the contact reaction is finally received by the cage base 621 fixed to the upper surface of the substrate 11, the lock claws 625 formed in the lock pieces 624 included in the cage base 621, and the cage cover 631 fixed via the lock holes 637 in which the lock claws 625 fit. Therefore, a secure fixed state of the compression connector 31 to the substrate 11 attached with the cage 21 is realized.

On the other hand, when the compression connector 31 is detached from the substrate 11 attached with the cage 21, a user bends the lock pieces 624 included in the cage base 621 in the left and right outward directions using an exclusive jig to release the fit state of the lock claws 625 in the lock holes 637. The constraint state of the cage cover 631 with respect to the cage base 621 is released by realizing such a release state. The cage cover 631 is rotated to open the upper surface of the cage base 621 fixed to the substrate 11. That is, by opening the cage cover 631 with respect to the cage base 621 (see a state shown in FIG. 97A), it is possible to detach the compression connector 31 as shown in FIGS. 88 and 89.

As explained above, in the connector with substrate 600 according to the seventh embodiment, the connector with substrate 600 includes the cage cover 631 that rotates with respect to the cage base 621 fixed to the substrate 11 and, the lock claws 625 included in the lock pieces 624 formed in the cage base 621 fit in the lock holes 637 formed in the cage cover 631, whereby the compression connector 31 disposed in the region surrounded by the cage cover 631, the cage base 621, and the upper surface of the substrate 11 can be securely fixed. In the cage cover 631, the plurality of pressing springs 633 that press the top surface 34*a* of the cover shell 34 in the direction of the substrate 11 are formed in the same direction as the arranging direction of the contacts 32. Therefore, when the compression connector 31 is inserted into and installed in the region surrounded by the cage cover 631 and the cage base 621 configuring the cage 21 and the upper surface of the substrate 11, the pressing springs 633 can press the entire region of the top surface 34*a* of the cover shell 34 configuring the upper surface side of the compression connector 31 in the direction of the substrate 11. Therefore, with the connector with substrate 600 according to the seventh embodiment, a stable fixed state of the compression connector 31 to the substrate 11 is maintained. That is, with the connector with substrate 600 according to the seventh embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the seventh embodiment. Various changes or improvements can be added to the seventh embodiment.

For example, in the seventh embodiment explained above, as an example, the six pressing springs 633 are formed in the cage cover 631 configuring the cage 21. However, as the number of pressing springs according to the present invention, any number can be selected if the number is equal to or larger than one.

For example, in the seventh embodiment explained above, as an example, the two lock holes 637 in total are formed one each in the positions of the left and right ends of the cage top surface 631*a* configuring the cage cover 631 and the two lock pieces 624 in total including the lock claws 625 are formed one each in the left and right positions of the cage base 621. However, positions where the lock hole and the lock piece including the lock claw according to the present invention are formed may be opposite. That is, the lock piece including the lock claw may be formed on the cage cover side and the lock hole may be formed on the cage base side. Further, the number of each of lock holes and lock pieces including lock claws according to the present invention can be optionally selected if the number is equal to or larger than one.

The configuration of the connector with substrate 600 according to the seventh embodiment is explained above with reference to FIGS. 85 to 97A and 97B. Subsequently, a connector with substrate 700 according to an eighth embodiment, which is another form example that the connector with substrate according to the present invention can take, is explained with reference to FIGS. 98 to 112A, 112B, and 112C. Note that, in the following explanation, members that are the same as or similar to the members explained in the first to seventh embodiments above are denoted by the same reference numerals and signs and explanation of the members is sometimes omitted.

Eighth Embodiment

Figure 98:
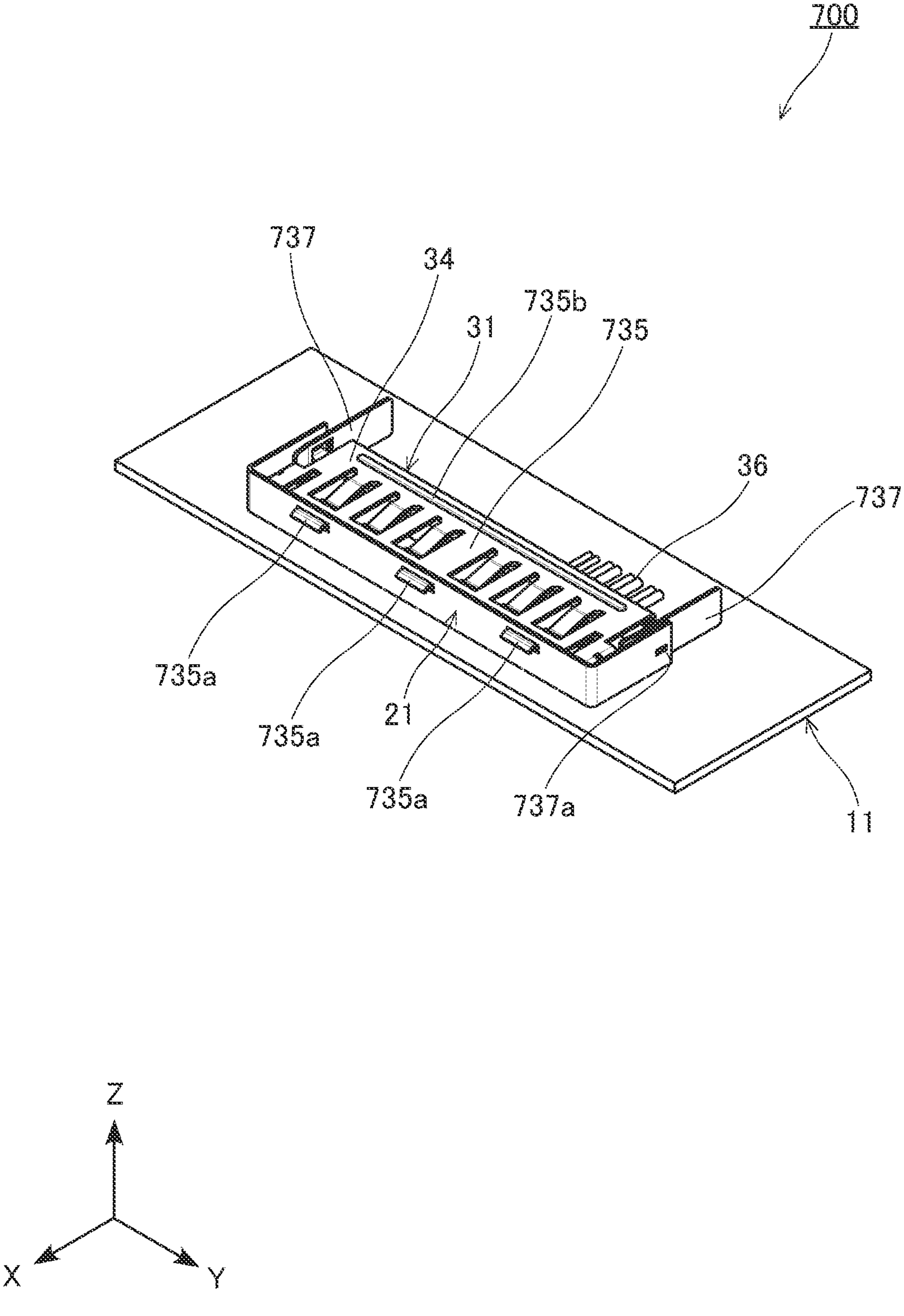
FIG. 98 is an exterior perspective view of a connector with substrate according to an eighth embodiment viewed from the front upper right.
Figure 99:
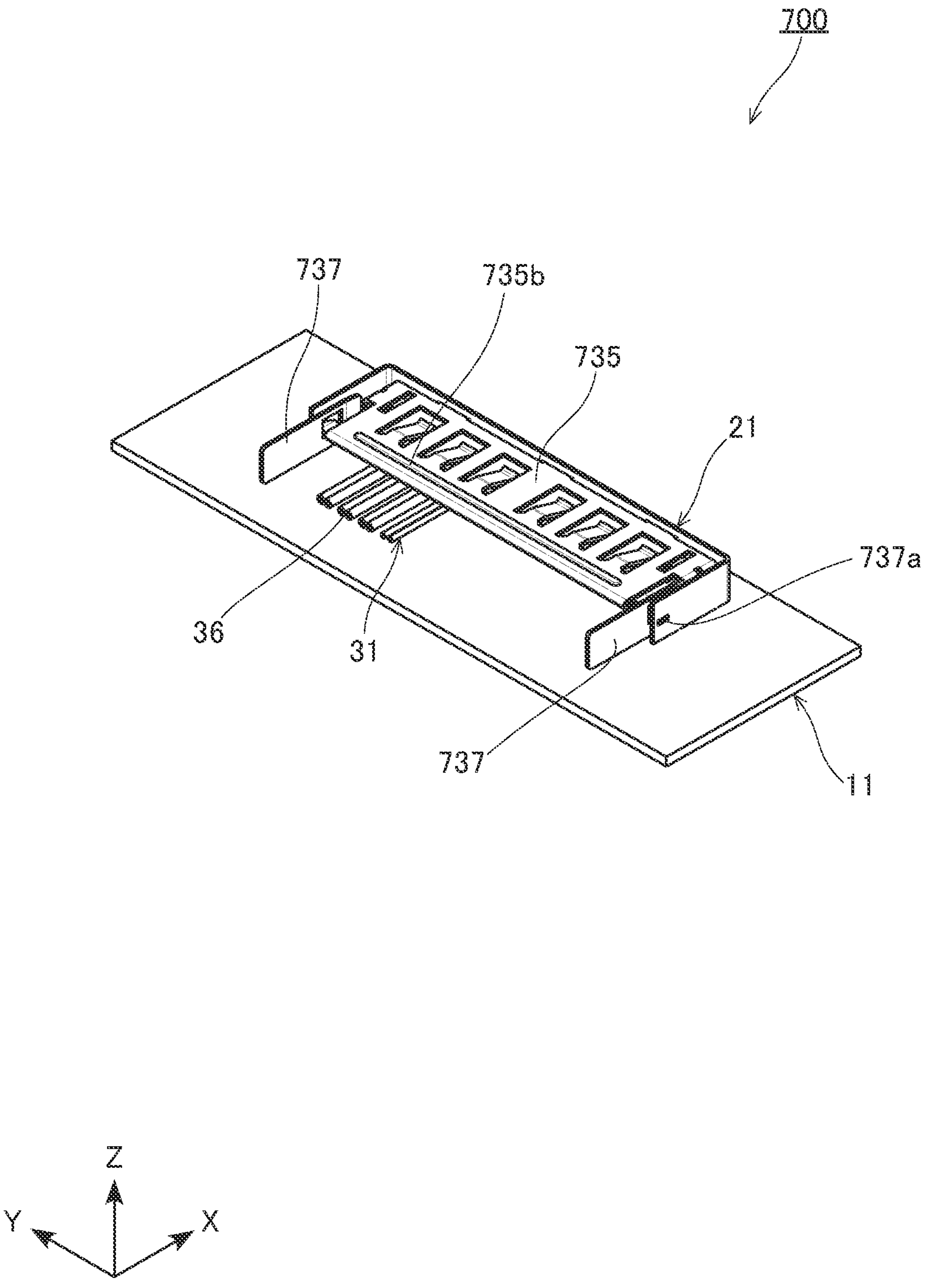
FIG. 99 is an exterior perspective view of the connector with substrate according to the eighth embodiment viewed from the rear upper left.

A configuration of the connector with substrate 700 according to the eighth embodiment is explained with reference to FIGS. 98 to 112A, 112B, and 112C. The connector with substrate 700 according to the eighth embodiment includes, as shown in FIGS. 98 to 100, the substrate 11, the cage 21 installed on the upper surface of the substrate 11, and the compression connector 31 attached to the substrate 11 via the cage 21.

The substrate 11 includes a not-shown printed circuit and the like. The substrate 11 is electrically connected to the compression connector 31 attached to the upper surface of the substrate 11 to be configured to be able to deliver an electric signal, power supply power, and the like.

Figure 100:
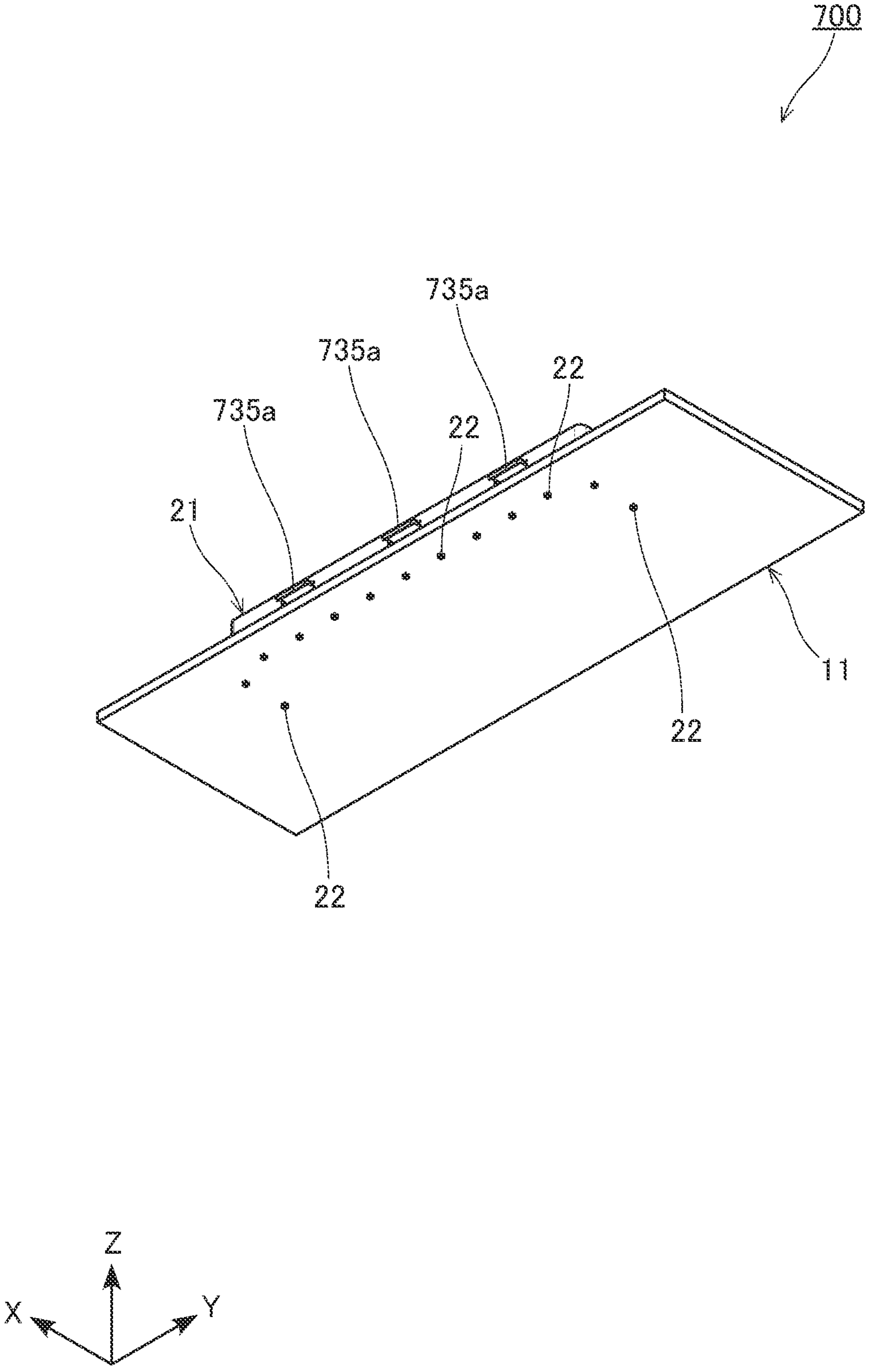
FIG. 100 is an exterior perspective view of the connector with substrate according to the eighth embodiment viewed from the front lower right.
Figure 101:
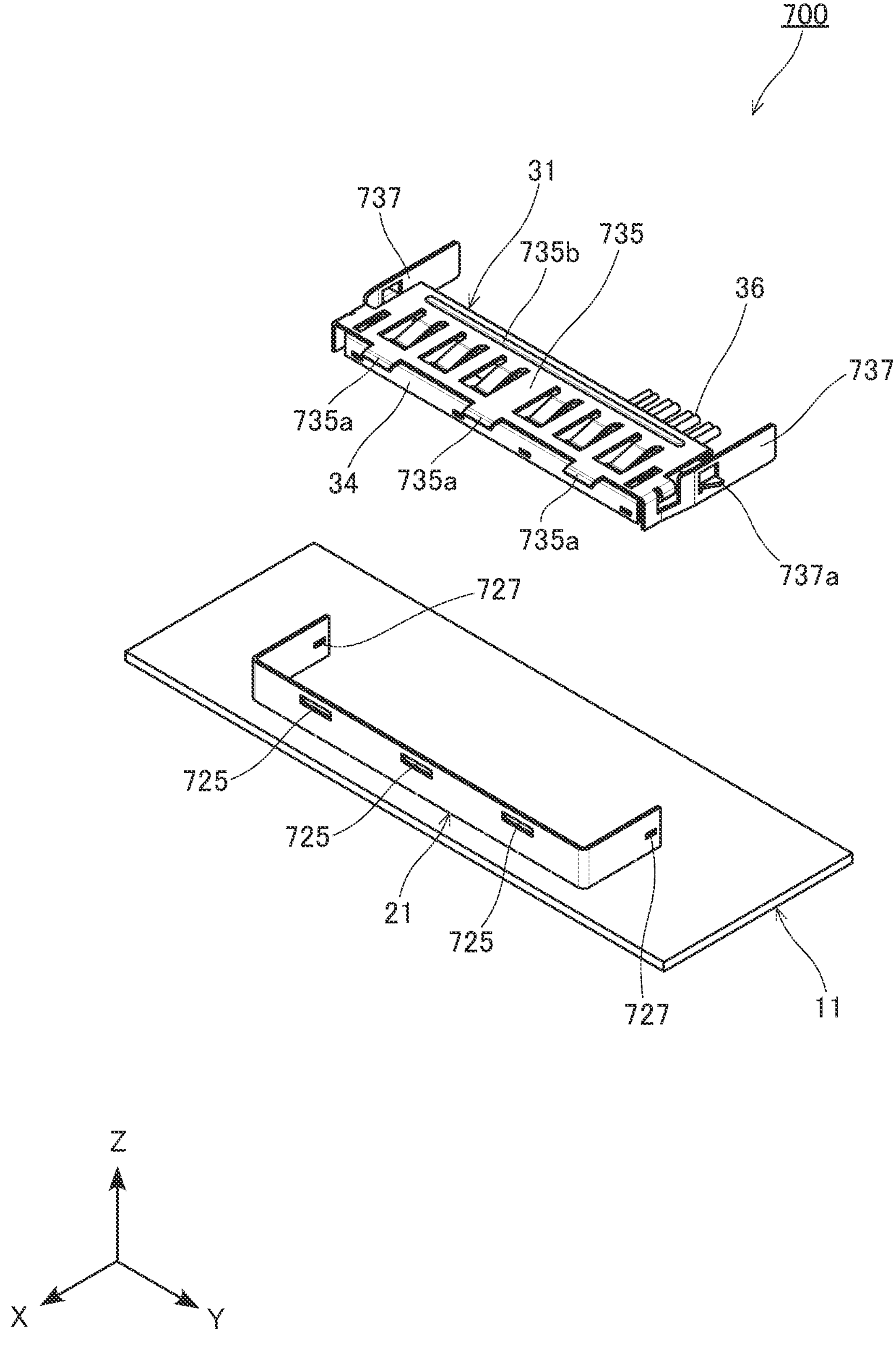
FIG. 101 is an exterior perspective view of a state in which a compression connector is detached from a substrate attached with a cage in the connector with substrate according to the eighth embodiment, the state being viewed from the front upper right.
Figure 102:
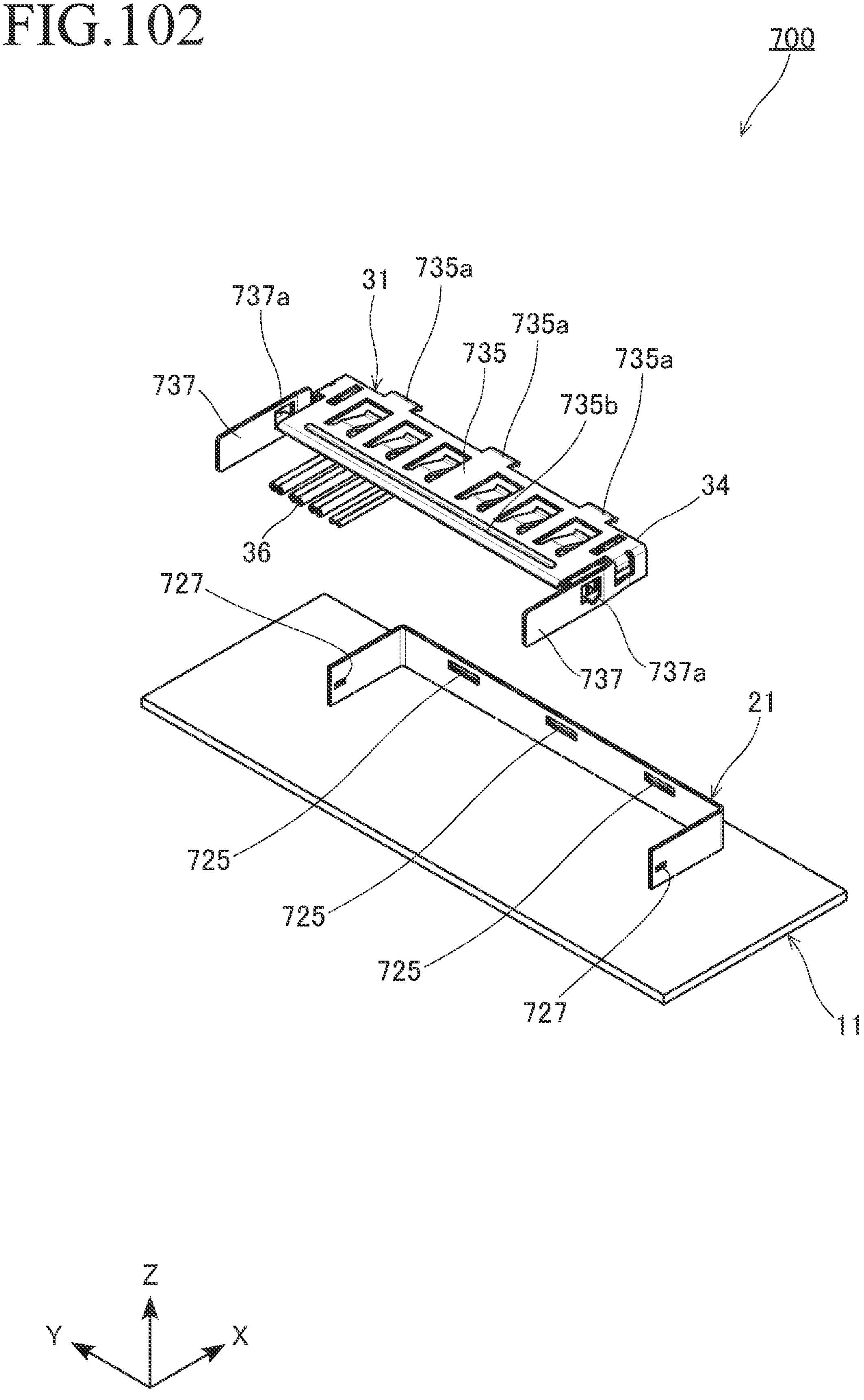
FIG. 102 is an exterior perspective view of the state in which the compression connector is detached from the substrate attached with the cage in the connector with substrate according to the eighth embodiment, the state being viewed from the rear upper left.

As shown in, in particular, FIG. 100, a plurality of attachment holes (not shown) are formed in the substrate 11. The plurality of leg sections 22 included in the cage 21 explained below are inserted into the plurality of (in the eighth embodiment, assumed to be thirteen) attachment holes (not shown) to fix the cage 21 to the substrate 11.

Figure 110:
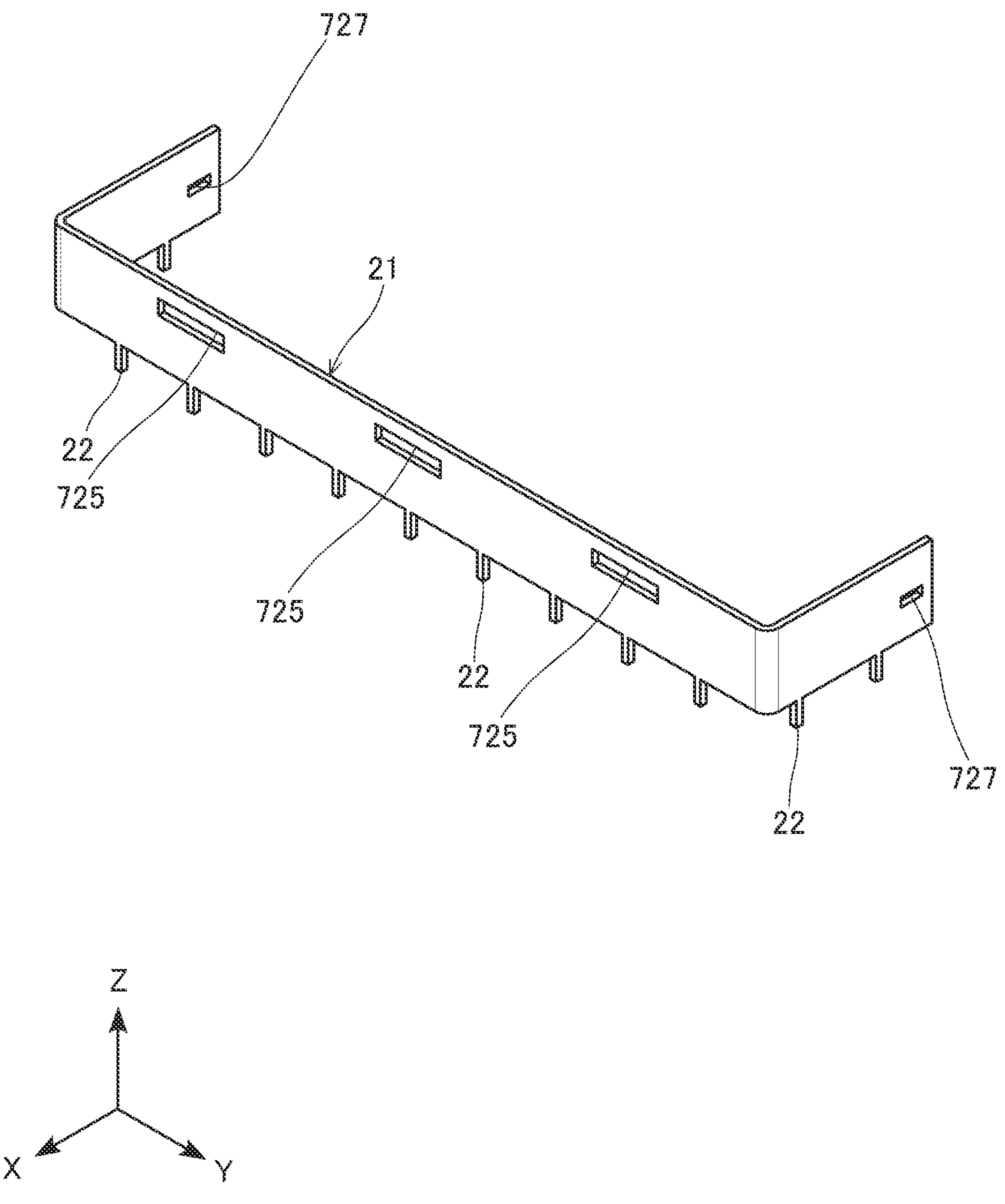
FIG. 110 is an exterior perspective view of the cage included in the connector with substrate according to the eighth embodiment viewed from the front upper right.
Figure 111:
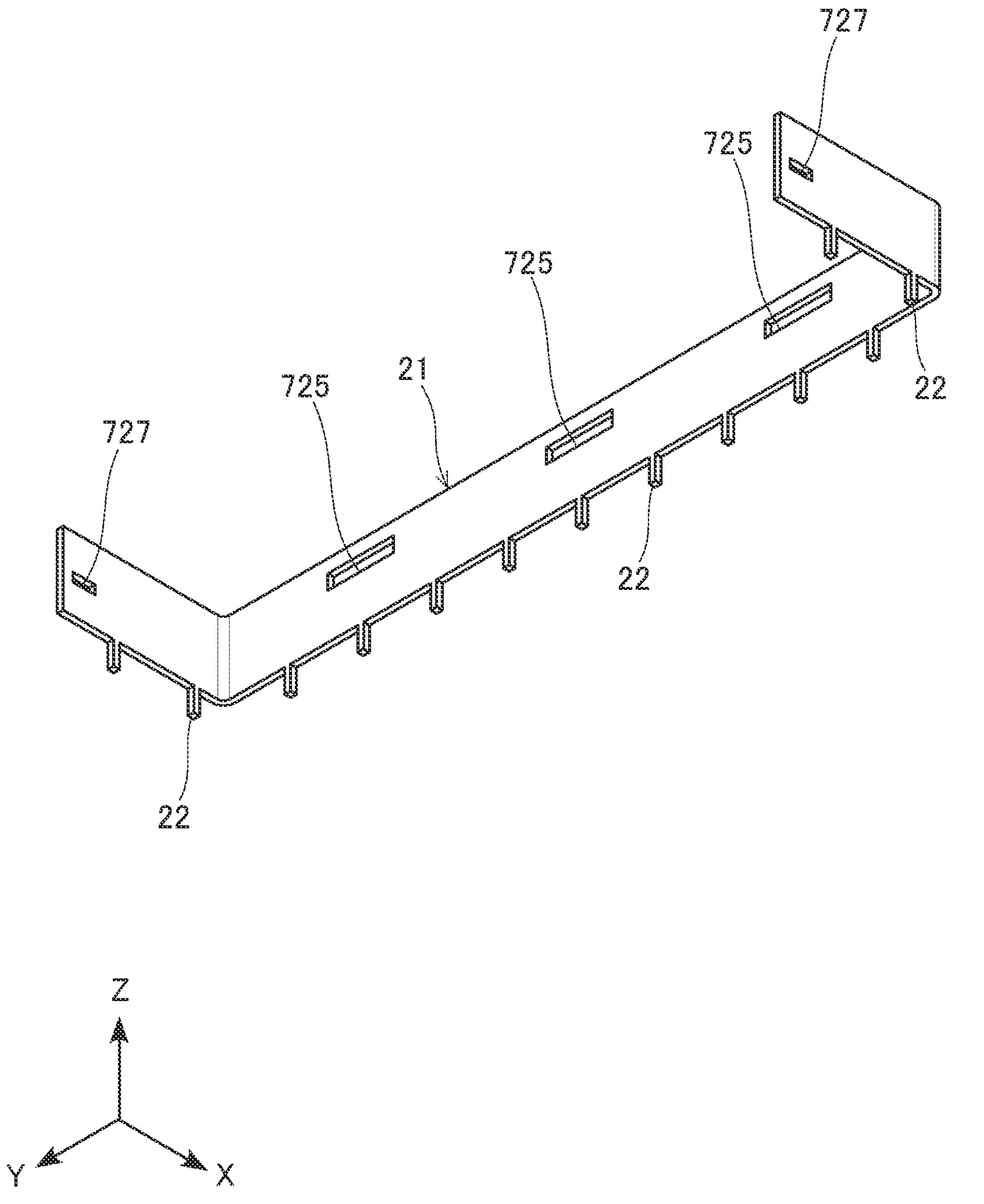
FIG. 111 is an exterior perspective view of the cage included in the connector with substrate according to the eighth embodiment viewed from the rear lower left.

The cage 21 is a member obtained by bending a flat metal member to be formed in a substantially channel-like shape as shown in FIGS. 110 and 111. Thirteen leg sections 22 are formed to extend downward on the bottom surface side of the cage 21. As explained above, the cage 21 is fixed to the substrate 11 by inserting the thirteen leg sections 22 into the plurality of attachment holes (not shown) formed in the substrate 11.

In the cage 21, five lock holes 725 and 727 in total are formed one each in each of three parts in the front and in the left and right directions. Three lock holes 725 formed in the front and two lock holes 727 in total formed one each on the left and right side surfaces are parts used to fix and hold the compression connector 31.

The compression connector 31 includes, as shown in FIGS. 103 to 109, the contact 32 that is in contact with the substrate 11, the housing 33 to which the contact 32 is fixed, the cover shell 34 that covers the upper surface portion of the housing 33, and the bottom shell 35 that covers the lower surface portion of the housing 33.

Figure 104:
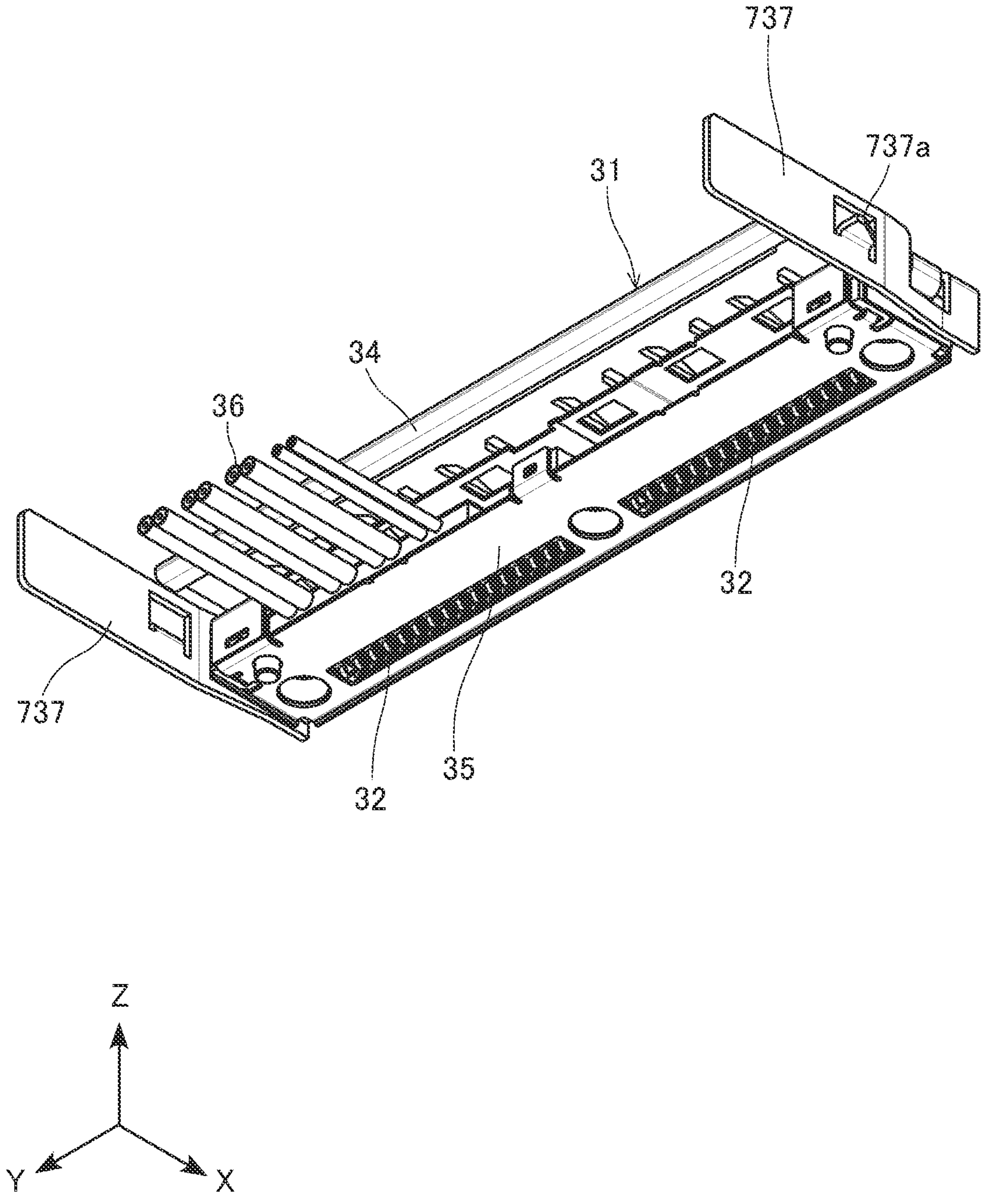
FIG. 104 is an exterior perspective view of the compression connector according to the eighth embodiment viewed from the rear lower left.
Figure 105:
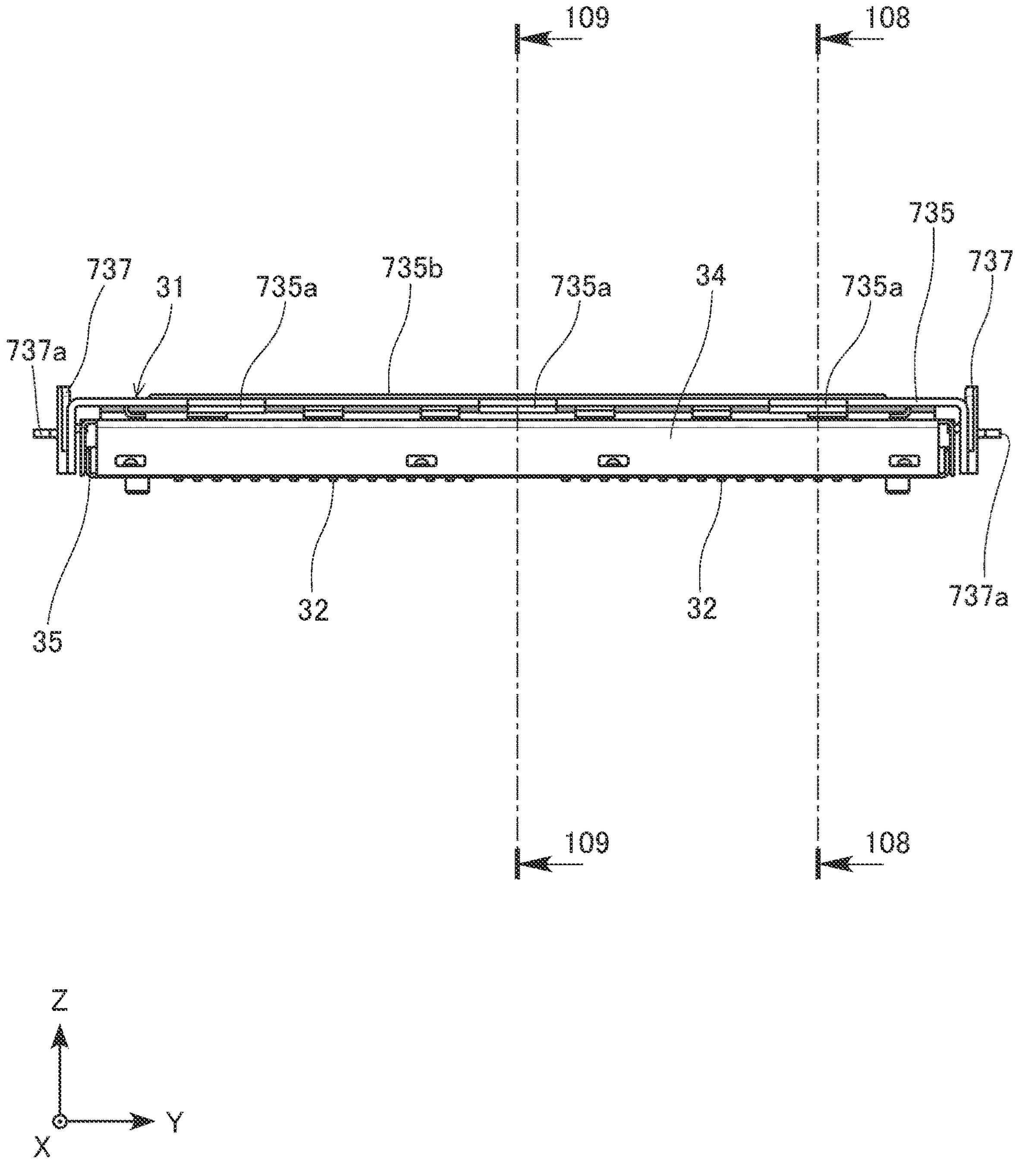
FIG. 105 is a front view of the compression connector according to the eighth embodiment.
Figure 106:
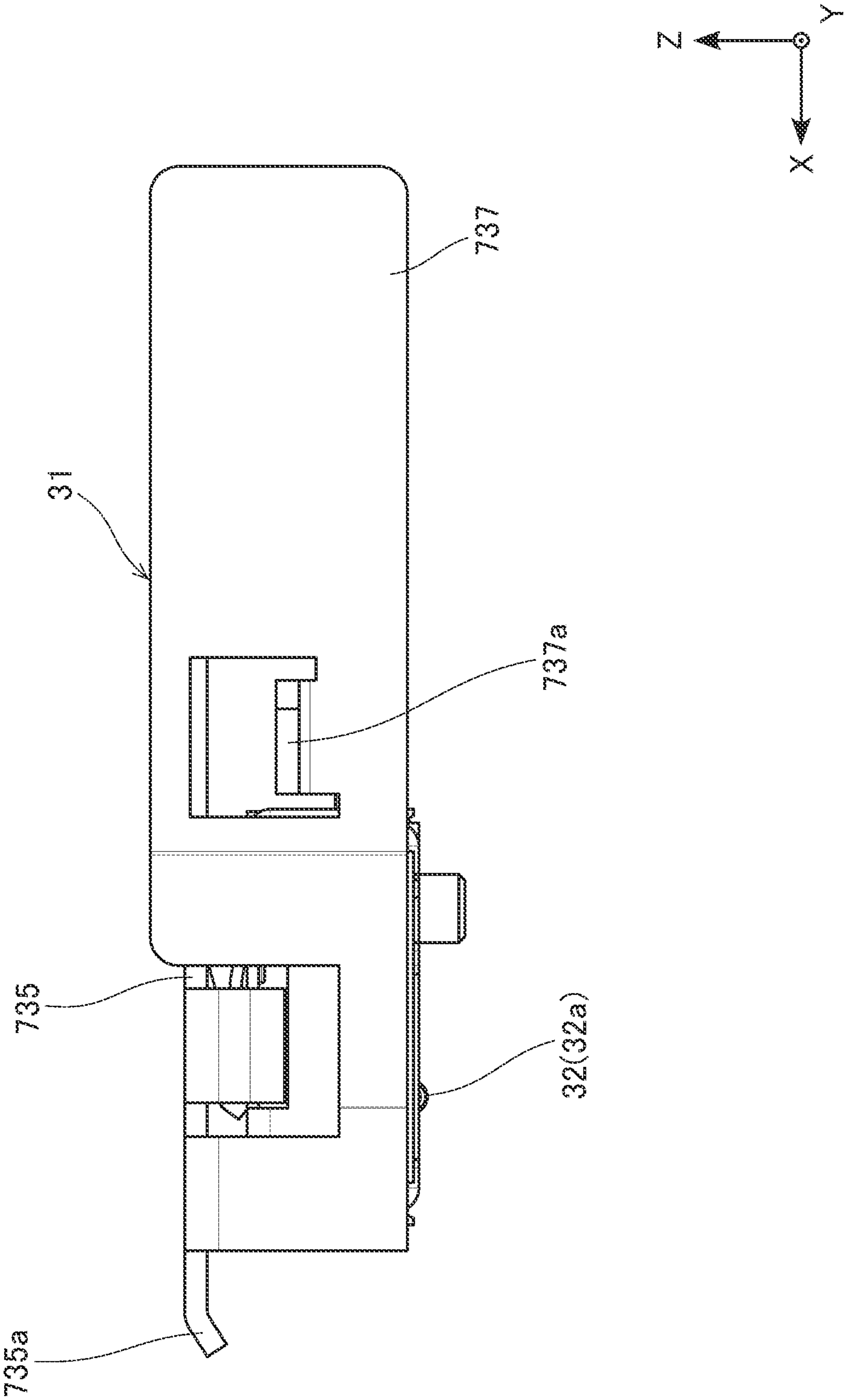
FIG. 106 is a right side view of the compression connector according to the eighth embodiment.

As shown in, in particular, FIGS. 104 and 105, the plurality of contacts 32 are disposed to be laterally arranged in the left-right direction.

Figure 108:
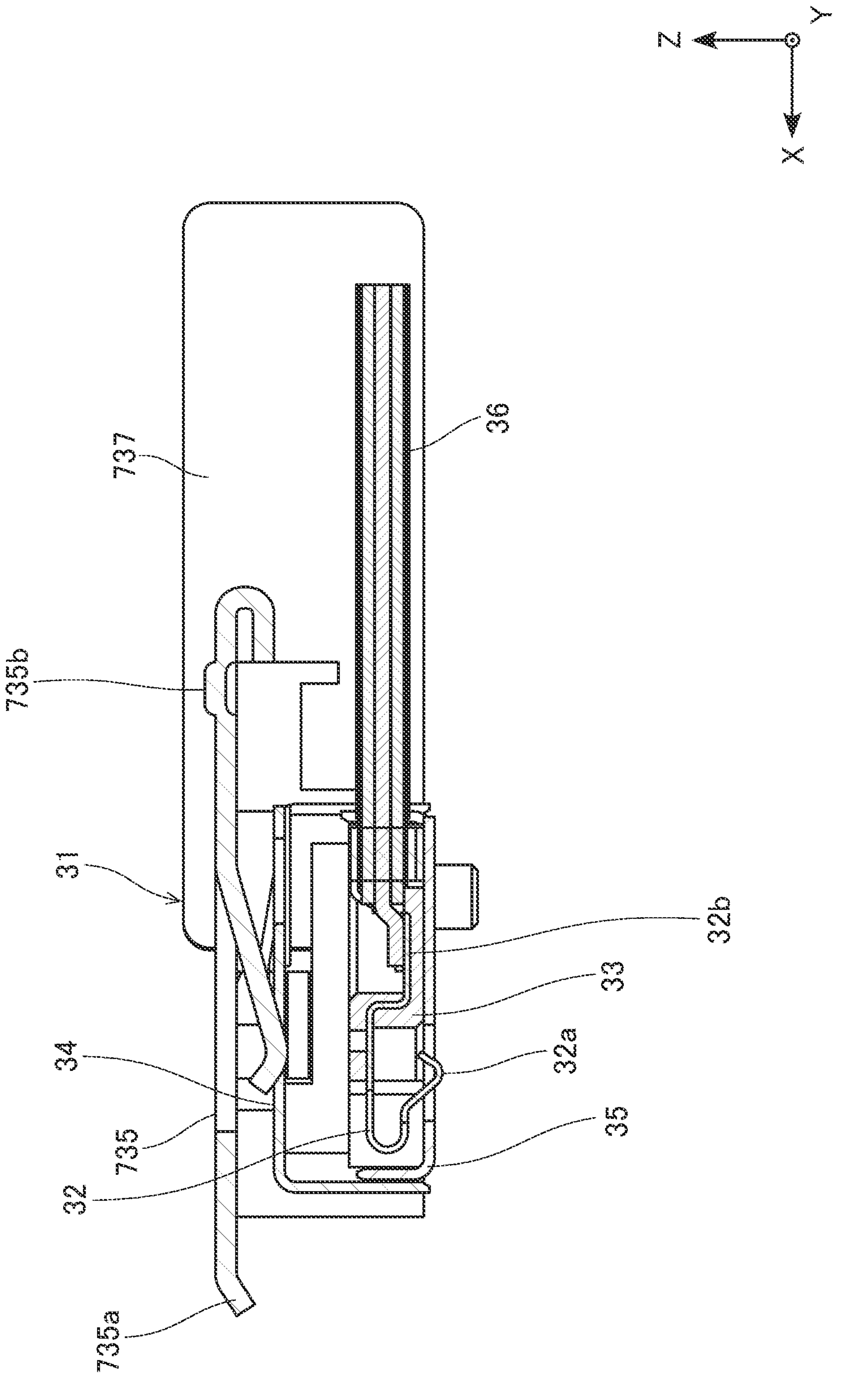
FIG. 108 is a longitudinal sectional view taken along line 108-108 in FIG. 105.

Each of the plurality of contacts 32 is fixed to the housing 33 as shown in FIG. 108. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 108). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 108, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the eighth embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

In the cover shell 34 in the eighth embodiment, as shown in FIGS. 103 to 109 and the like, one lock piece 735 is formed above and two lock pieces 737 in total are formed one each on each of the left and right side surfaces.

Figure 109:
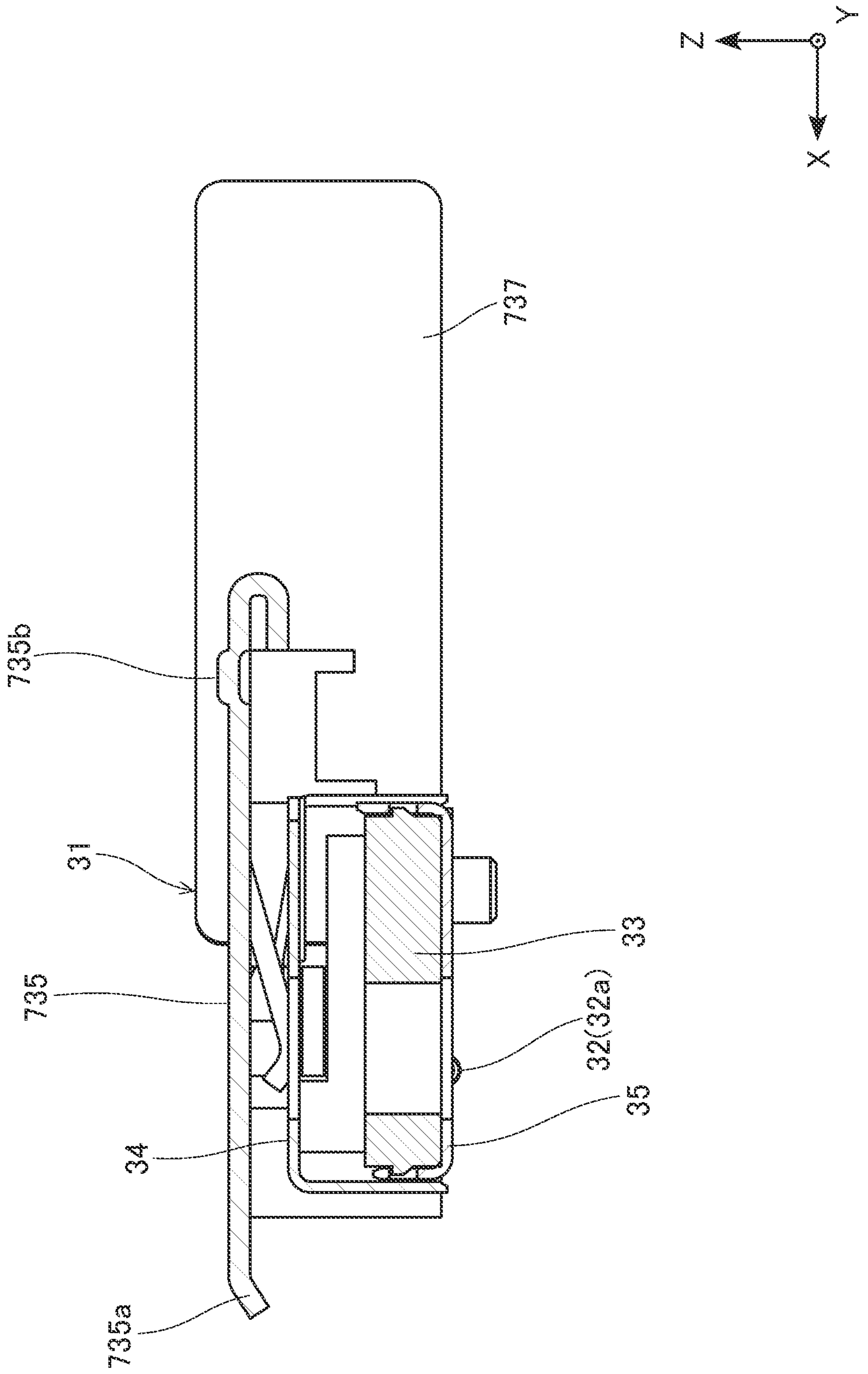
FIG. 109 is a longitudinal sectional view taken along line 109-109 in FIG. 105.

As shown in, in particular, FIGS. 108 and 109 and the like, the one lock piece 735 disposed above has a substantially inverse J shape in a side view bent in a substantially U shape, in a part extending further rearward from the upper surface rear of the cover shell 34, and thereafter extending forward. In the position of the distal end portion extending forward of the lock piece 735, three lock claws 735*a* projecting outward are formed. The three lock claws 735*a* are formed in a shape curving to slight fall on the front side (see, in particular, FIGS. 103, 106, 108, and 109 and the like). The three lock claws 735*a* are disposed in positions corresponding to formation positions of the three lock holes 725 formed on the front side of the cage 21 explained above. Therefore, when the compression connector 31 is slid in the +X direction, which is the first direction, toward the cage 21 disposed on the upper surface of the substrate 11, the lock claws 735*a* gradually enter the lock holes 725, with the lock piece 735 being pushed to the substrate 11 side, with force by the spring elasticity by the shape bent in the substantially inverse J shape in the side view of the lock piece 735 and action by the shape curving to fall of the lock claws 735*a*. Finally, an upward pressing force by the spring elasticity exerted by the lock piece 735 and a frictional force exerted by the lock claws 735*a*, which enter in the lock holes 725, in concert with the lock holes 725 act and the lock claws 735*a* are completely fit in the lock holes 725.

Figure 103:
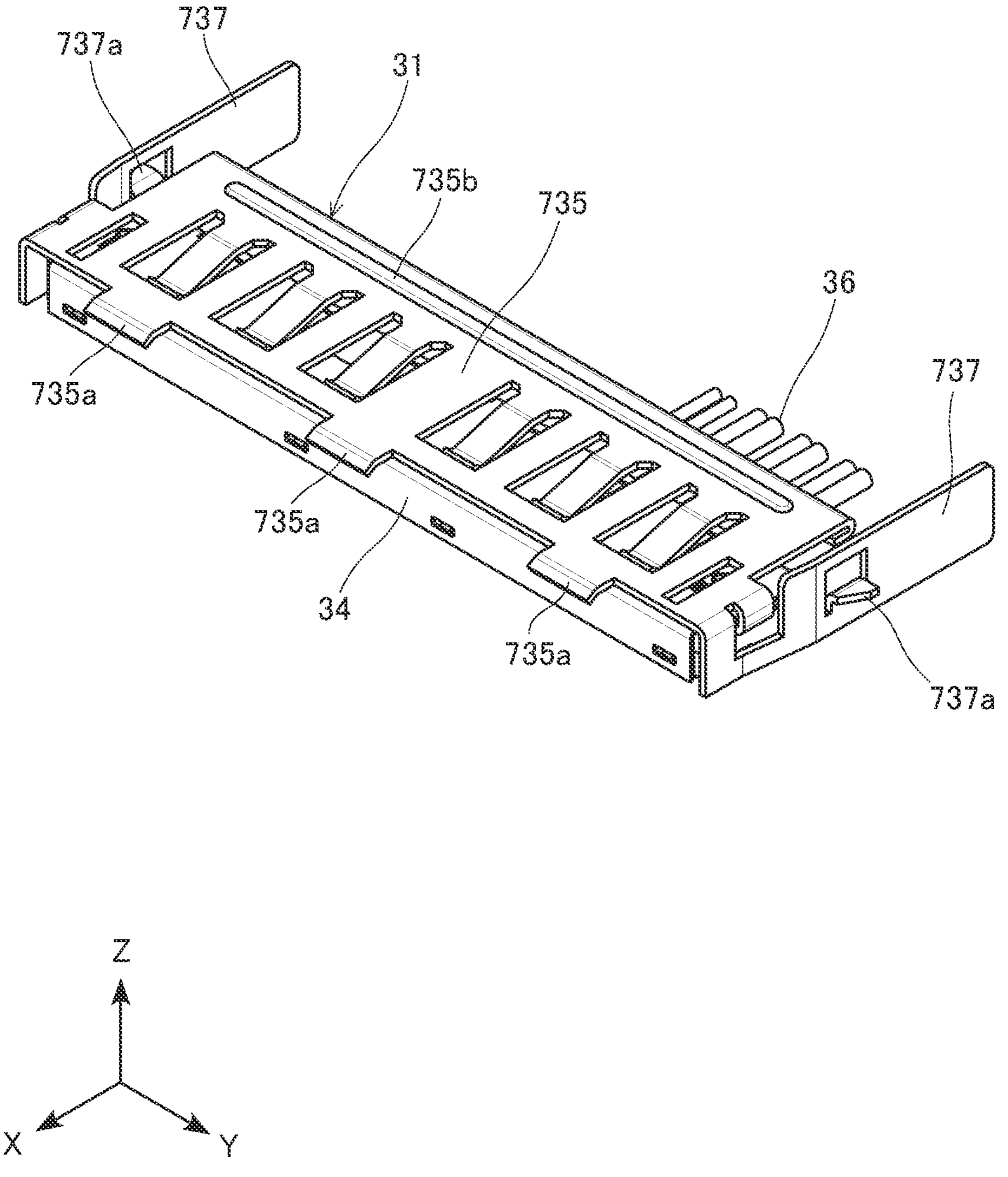
FIG. 103 is an exterior perspective view of the compression connector according to the eighth embodiment viewed from the front upper right.
Figure 107:
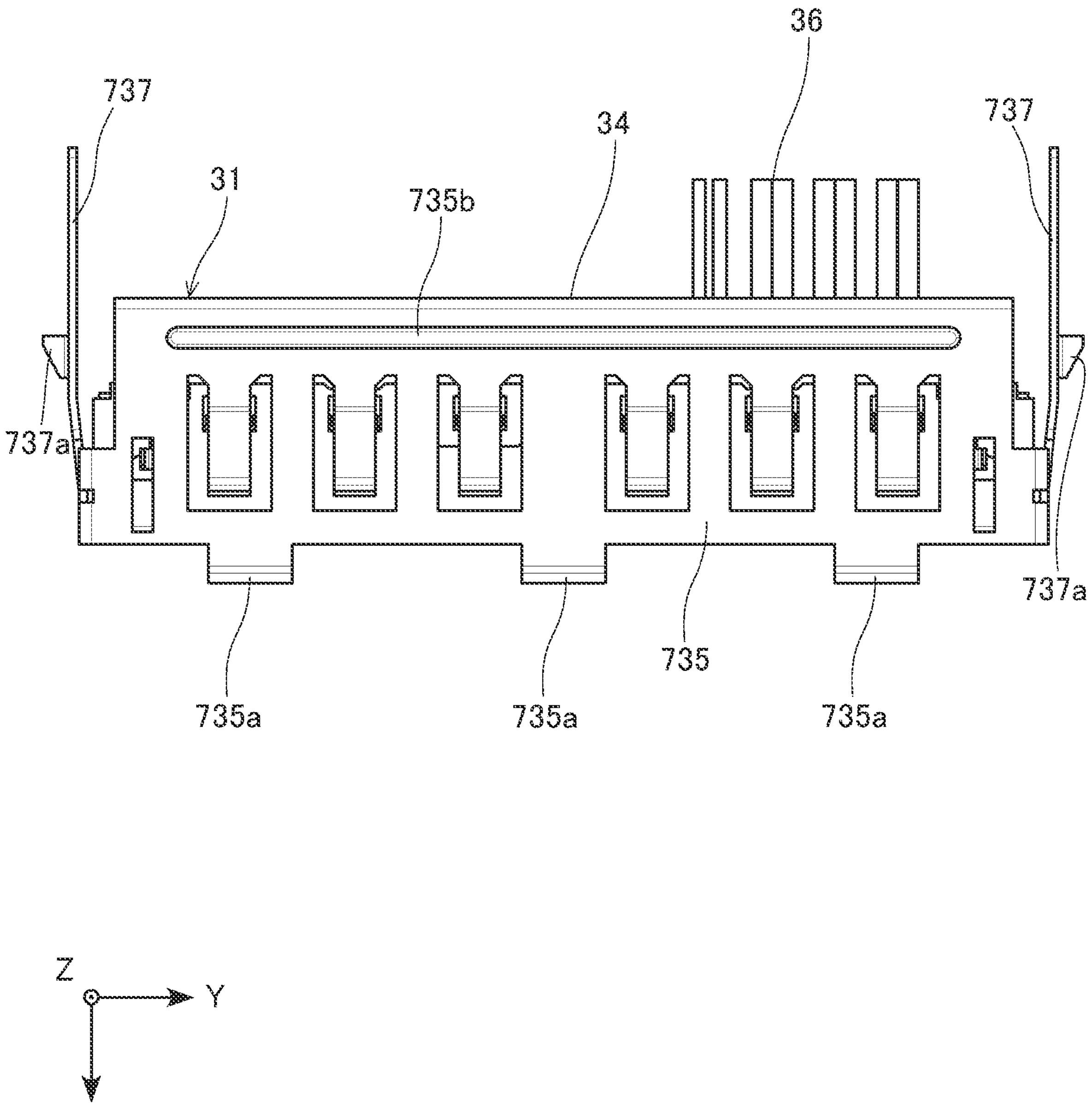
FIG. 107 is a top view of the compression connector according to the eighth embodiment.

As shown in, in particular, FIGS. 103 and 107 and the like, the two lock pieces 737 disposed on the left and right side surface sides have a flat shape bent from the front side to the left and right side surfaces of the cover shell 34 and extending from the front to the rear of the left and right side surfaces. Lock claws 737*a* projecting outward of the respective left and right side surfaces are formed in substantially center positions of the lock pieces 737 extending rearward. The front sides of the lock claws 737*a* are formed as slopes and the rear sides of the lock claws 737*a* are formed in a cubic shape (see, in particular, FIG. 107). That is, the lock claws 737*a* are formed to gradually project from the surfaces of the lock pieces 737 rearward from the frontmost positions. The two lock claws 737*a* are disposed in positions corresponding to the formation positions of the two lock holes 727 formed in the cage 21 explained above. Therefore, when the compression connector 31 is slid in the +X direction, which is the first direction, toward the cage 21 disposed on the upper surface of the substrate 11, the lock claws 737*a* gradually enter the lock holes 727, with the lock pieces 737 being pushed to the cover shell 34 side, that is, the inward side, with force by the spring elasticity by the flat shape of the lock pieces 737 and action by the shape of the slopes on the front sides of the lock claws 737*a*. Finally, an outward pressing force by the spring elasticity exerted by the lock pieces 737 acts, the lock claws 737*a* are completely fit in the lock holes 727, and engagement of the cover shell 34 with the gage 21 is realized. A state in which the fitting of the three lock claws 735*a* in the three lock holes 725 explained above and the fitting of the two lock claws 737*a* in the two lock holes 727 are realized is a state in which the compression connector 31 is firmly fixed to and held on the substrate 11.

Note that, in the eighth embodiment, when the compression connector 31 is fixed to and held on the substrate 11 attached with the cage 21, force in connection is applied to the cover shell 34. In particular, since the lock piece 735 disposed above the cover shell 34 is formed by a thin metal plate having a shape long in the left-right direction, the lock piece 735 desirably has a structure for preventing deformation of the lock piece 735 itself when receiving force for connection fixing. Therefore, in the lock piece 735 according to the eighth embodiment, one line of a projection 735*b* extending in the left-right direction is formed on the upper surface. Strength against deformation of the lock piece 735 itself can be achieved and a state in which the lock piece 735 can appropriately exert force by the spring elasticity can be maintained by action of the shape of the one line of projection 735*b*.

The configuration of the connector with substrate 700 according to the eighth embodiment is explained above. Subsequently, a method of attaching the compression connector 31 to and a method of detaching the compression connector 31 from the substrate 11 attached with the cage 21 configuring the connector with substrate 700 according to the eighth embodiment are explained.

Figure 112A:
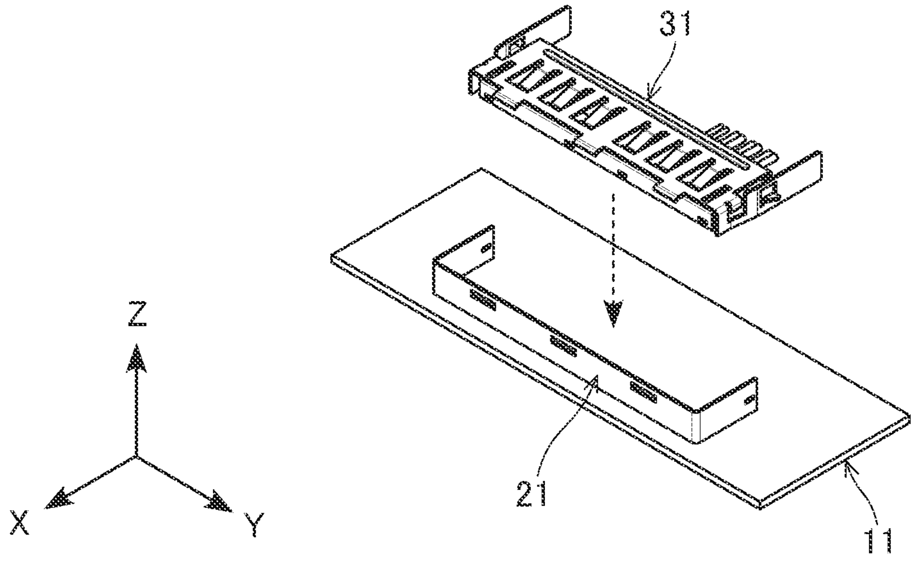
FIGS. 112A to 112C are diagrams for explaining an assembly method for the connector with substrate according to the eighth embodiment, FIG. 112A showing a state in which the compression connector is detached from the substrate attached with the cage, FIG. 112B showing a state in which the compression connector is vertically lowered in a substrate direction from a position obliquely rearward above the substrate attached with the cage, and FIG. 112C showing a state in which the compression connector is slid toward the front from the state shown in FIG. 112B to fix the compression connector to the substrate attached with the cage.
Figure 112B:
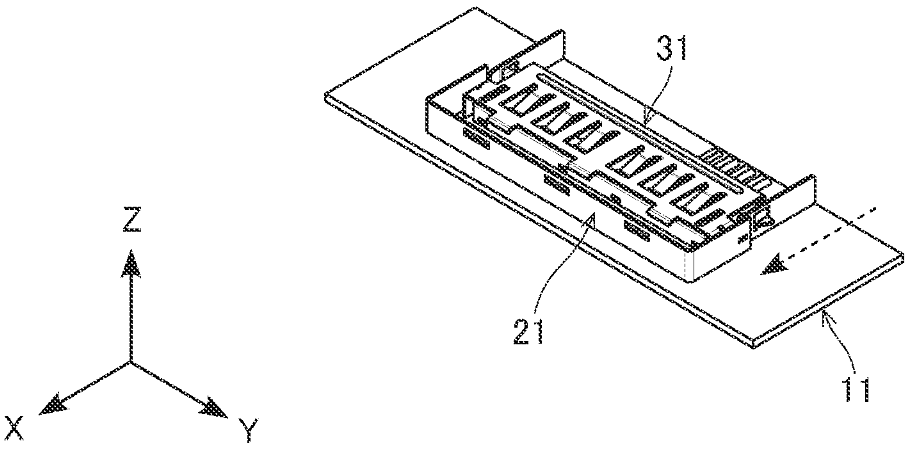
Figure 112C:
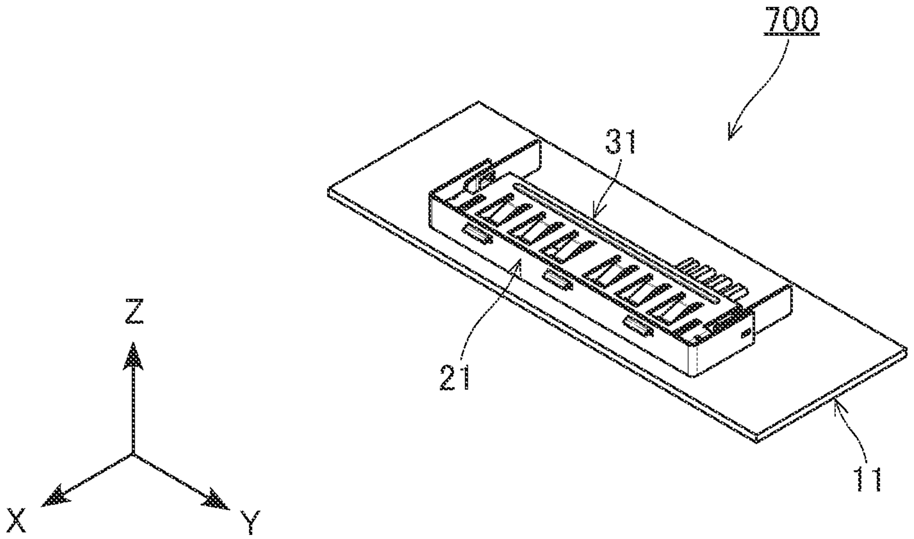
Figure 113:
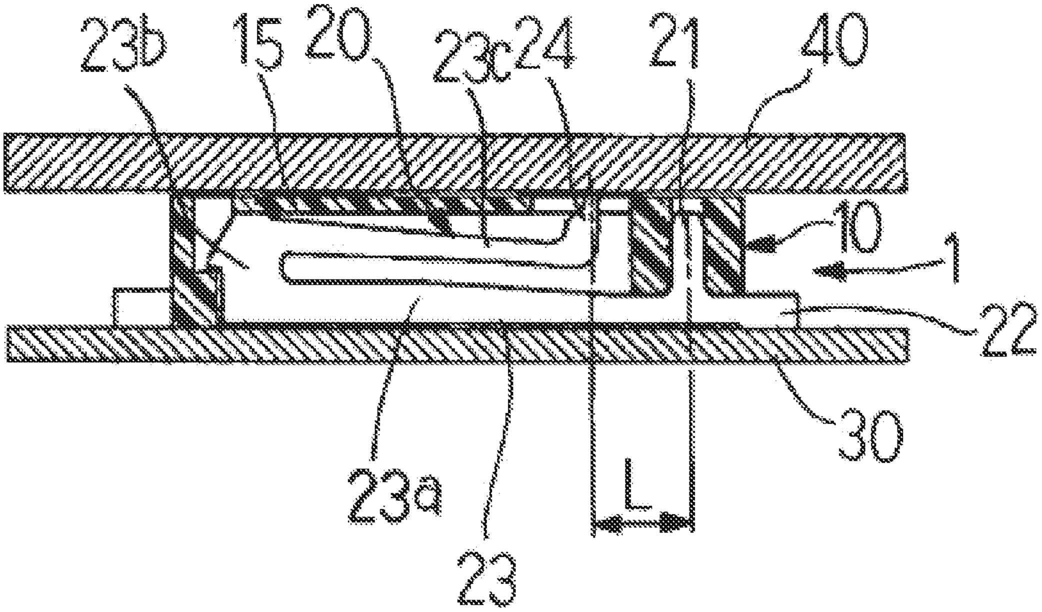
FIG. 113 is a sectional view showing a state in which a connector of a compression type of the related art is disposed between circuit boards.

When the compression connector 31 is attached to the substrate 11 attached with the cage 21, as shown in FIG. 112A, the compression connector 31 is disposed in a position obliquely rearward above the substrate 11 attached with the cage 21. The compression connector 31 is moved in the vertical direction to be directed in the downward direction (the −Z direction), which is the third direction, from this state to change to a state shown in FIG. 112B.

The compression connector 31 is slid toward the inside of the cage 21 having the substantially channel-like shape in the top view, that is, in the forward direction (the +X direction), which is the first direction. In the sliding, a state in which the compression connector 31 is pressed against the upper surface of the substrate 11 is maintained. In the pressing operation in the downward direction (the −Z direction) and the sliding operation in the forward direction (the +X direction), on the front side of the cover shell 34, the lock claws 735*a* gradually enter the lock holes 725, with the lock piece 735 being pushed to the substrate 11 side, with force by the spring elasticity by the shape bent in the substantially inverse J shape in the side view of the lock piece 735 and action by the shape curving to fall of the lock claws 735*a*. Finally, an upward pressing force by the spring elasticity exerted by the lock piece 735 and a frictional force exerted by the lock claws 735*a*, which enter the lock holes 725, in concert with the lock holes 725 act and the lock claws 735*a* are completely fit in the lock holes 725. At the same time, on the left and right side surface sides of the cover shell 34, the lock claws 737*a* gradually enter the lock holes 727, with the lock pieces 737 being pushed to the cover shell 34 side, that is, the inward side, with the force by the spring elasticity by the flat shape of the lock pieces 737 and the action by the shape of the slopes on the front sides of the lock claws 737*a*. Finally, an outward pressing force by the spring elasticity exerted by the lock pieces 737 acts and the lock claws 737*a* are completely fit in the lock holes 727. A state in which the lock claws 735*a* and 737*a* are completely fit in the lock holes 725 and 727 is securely maintained by a frictional force exerted by the lock holes 725 and 727 and the lock claws 735*a* and 737*a* in concert, force by the spring elasticity exserted by the lock pieces 735 and 737, and force by material plasticity for maintaining a shape. Engagement of the cover shell 34 with the cage 21 is easily realized by pushing the compression connector 31 into the cage 21 as explained above. This state is a state in which the compression connector 31 is firmly fixed to and held on the substrate 11 attached with the cage 21.

Note that, in the state in which the compression connector 31 is fixed to and held on the substrate 11 attached with the cage 21, the compression connector 31 applies, to the substrate 11, contact reaction in the vertical direction applied by the plurality of contacts 32 included in the compression connector 31. However, since the lock holes 725 and 727 and the lock claws 735*a* and 737*a* fit in the lock holes 725 and 727 receive the contact reaction in concert, the compression connector 31 is securely fixed to and held on the substrate 11 attached with the cage 21.

On the other hand, when the compression connector 31 is detached from the substrate 11 attached with the cage 21, the user pushes the one lock piece 735 disposed above downward and tilts the one lock piece 735 to the downward side and pushes the two lock pieces 737 disposed on the left and right side surface sides inward and tilts the two lock pieces 737 to the inner side, whereby the fit state of the lock claws 735*a* and 737*a* in the lock holes 725 and 727 is released. When the compression connector 31 is slid in the rearward direction (the −X direction), which is the first direction, (a state shown in FIG. 112B) after creating such a release state and further vertically moved in the upward direction (the +Z direction), which is the third direction, (a state shown in FIG. 112A), the compression connector 31 can be smoothly detached from the substrate 11 attached with the cage 21.

As explained above, in the connector with substrate 700 according to the eighth embodiment, the lock holes 725 and 727 that house the lock claws 735*a* and 737*a* formed in the lock pieces 735 and 737 included in the compression connection 31 are formed in the cage 21 and the lock claws 735*a* and 737*a* are fit in the lock holes 725 and 727 to fix the positions in the horizontal direction and the vertical direction of the compression connection 31 with respect to the cage 21. At this time, since the lock holes 725 and 727 and the lock claws 735*a* and 737*a* fit in the lock holes 725 and 727 can receive contact reaction in concert, a stable fixed state of the compression connector 31 to the substrate 11 attached with the cage 21 is maintained. That is, with the connector with substrate 700 according to the eighth embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the eighth embodiment. Various changes or improvements can be added to the eighth embodiment.

For example, in the eighth embodiment explained above, the three lock pieces 735 and 737 are provided in the cover shell 34 configuring the compression connector 31, the three lock claws 735*a* are formed in the one lock piece 735 disposed above, and the two lock claws 737*a* in total are formed one each in the two lock pieces 737 disposed on the left and right side surface sides. Further, in the cage 21, the three lock holes 725 and the two lock holes 727 are formed to correspond to the formation positions of the three lock claws 735*a* and the formation positions of the two lock claws 737*a*. The five sets of the lock claws 735*a* and 737*a* and the lock holes 725 and 727 are fit with each other, whereby the stable fixed state of the compression connector 31 to the substrate 11 attached with the cage 21 is realized. However, the scope of the present invention is not limited to the form illustrated in the eighth embodiment. One or more sets of the lock claw and the lock hole of the present invention only have to be present. Further, the lock claw and the lock hole may be formed in any positions. That is, in the present invention, the numbers and disposition positions of lock pieces in which lock claws are formed and lock holes can be optionally changed.

It is evident from the description of the claims that such changed or improved forms can also be included in the technical scope of the present invention.

The specific configuration examples of the connector with substrate according to the present invention are explained above with reference to the first to eighth embodiments. All of the connectors with substrate according to the present invention explained in the first to eighth embodiments are a connector with substrate in which a connector of a compression type pressed against and connected to a connection target object and a substrate are attached via a cage, the connector with substrate including a compression connector including a contact that is in contact with the substrate, a housing to which the contact is fixed, and a cover shell that covers an upper surface portion of the housing, wherein the compression connector is inserted into the cage fixed to the substrate, and a lock hole and a lock piece that enters the lock hole to fix a position of the compression connector with respect to the cage are formed in the compression connector or the cage. In the connector with substrate according to the present invention, the lock hole and the lock piece that enters the lock hole are fitting and fixing means based on a so-called latch mechanism and can firmly and easily perform attachment (fixing) of the compression connector to the substrate attached with the cage. In this way, the connector with substrate according to the present invention can exert action effects that cannot be realized by the related art in the technical field of connectors.

REFERENCE SIGNS LIST

10 Connector with substrate (in first embodiment)
100 Connector with substrate (in second embodiment)
200 Connector with substrate (in third embodiment)
300 Connector with substrate (in fourth embodiment)
400 Connector with substrate (in fifth embodiment)
500 Connector with substrate (in sixth embodiment)
600 Connector with substrate (in seventh embodiment)
700 Connector with substrate (in eighth embodiment)
11 Substrate
13 Opening section
21 Cage
21*a* Cage top surface
21*b* Vertical front surface (Vertical surface)
21*c* Vertical right side surface (Vertical surface)
21*d* Vertical left side surface (Vertical surface)
22 Leg section
23 Pressing spring
24 Lock piece
31 Compression connector (Connector of compression type)
32 Contact
32*a* Front end portion
32*b* Rear end portion
33 Housing
34 Cover shell
34*a* Top surface (of cover shell)
35 Bottom shell
36 Electric cable
37 Lock hole
121 Cage base
127 Lock hole
131 Cage cover
131*a* Cage top surface
133 Pressing spring
134 Lock piece
223 Lock hole
237 Lock piece
238 Lock claw
321*a* Cage bottom surface (Bottom surface)

321*b* Vertical front surface (Vertical surface)
321*c* Vertical right side surface (Vertical surface)
321*d* Vertical left side surface (Vertical surface)
321*e* Vertical rear surface (Vertical surface)
326 Contact housing hole (Hole)
327 Lock hole
337 Lock piece
338 Lock claw
421 Cage base
421*b* Vertical front surface (Vertical surface)
421*c* Vertical right side surface (Vertical surface)
421*d* Vertical left side surface (Vertical surface)
431 Cage cover
431*a* Cage top surface
431*c* Cover right side surface
431*d* Cover left side surface
432 Rotating shaft (Rotating section)
433 Lock hole
437 Lock piece
438 Lock claw
523 Lock hole
534*a* Projection
537 Lock piece
537*a* Lock claw
611 Attachment shaft
621 Cage base
624 Lock piece
625 Lock claw
631 Cage cover
631*a* Cage top surface
633 Pressing spring
637 Lock hole
725 Lock hole
727 Lock hole
735 Lock piece
735*a* Lock claw
735*b* Projection
737 Lock piece
737*a* Lock claw

What is claimed is:

1. A connector with substrate, comprising:
a substrate including terminals;
a cage fixed to the substrate; and
a compression connector inserted into the cage and including
contacts that are in contact with the terminals on the substrate,
a housing to which the contacts are fixed, and
a cover shell that covers an upper surface portion of the housing, wherein
the cage includes a lock hole and a lock piece that enters the lock hole to fix a position of the compression connector with respect to the cage, and
the cage includes, as two members,
a cage base that is fixed to the substrate and that includes the lock hole; and
a cage cover that rotates with respect to the cage base and that includes
at least one pressing spring that is arranged in a direction same as an arranging direction of the contacts and that presses a top surface of the cover shell, and
the lock piece having a spring property that enters the lock hole formed in the cage base to fix the cage cover to the cage base.

2. A connector with substrate, comprising:
a substrate including terminals;
a cage fixed to the substrate; and
a compression connector inserted into the cage and including
contacts that are in contact with the terminals on the substrate,
a housing to which the contacts are fixed, and
a cover shell that covers an upper surface portion of the housing, wherein
the cage includes a lock hole and the compression connector includes a lock piece that enters the lock hole to fix a position of the compression connector with respect to the cage, and
the cage includes
a cage top surface that receives contact reaction in a vertical direction applied from the compression connector in concert with the substrate, and
the lock hole that receives a lock claw formed in the lock piece included in the compression connector.

3. The connector with substrate according to claim 2, wherein the compression connector includes a bottom shell that covers a lower surface portion of the housing.

4. The connector with substrate according to claim 2, wherein each of the contacts includes a spring portion having spring elasticity at an end thereof and projecting downwardly from a bottom surface of the housing, and
the spring portion is pushed into the housing and spring force is applied to press against the substrate when the compression connector is inserted into the cage.

5. A connector with substrate, comprising:
a substrate including terminals;
a cage fixed to the substrate; and
a compression connector inserted into the cage and pressed against the substrate to be connected to the substrate, the compression connector including
contacts that are in contact with the terminals on the substrate,
a housing to which the contacts are fixed, and
a cover shell that covers an upper surface portion of the housing, wherein
one of the cage and the compression connector includes a lock hole and another of the cage and the compression connector includes a lock piece that enters the lock hole to fix a position of the compression connector with respect to the cage, and
the compression connector includes
the lock piece having a pair of lock piece members that is formed at two sides, each of the pair of lock piece members having a lock claw; and
the cage includes
a bottom surface that has a hole for housing the contacts,
two surfaces that are erected from the bottom surface and that face the pair of lock piece members, and
the lock hole that is formed in each of the two surfaces and that houses the lock claw formed in each of the pair of lock piece members.

6. A connector with substrate, comprising:
a substrate including terminals;
a cage fixed to the substrate; and
a compression connector inserted into the cage and including
contacts that are in contact with the terminals on the substrate,
a housing to which the contacts are fixed, and
a cover shell that covers an upper surface portion of the housing, wherein the cage includes a lock hole and the compression connector includes a lock piece that enters the lock hole to fix a position of the compression connector with respect to the cage, and the cage includes, as two members, a cage base that is fixed to the substrate, and a cage cover that is rotatably attached to the case base and that includes a cage top surface that receives contact reaction in a vertical direction applied from the compression connector in concert with the substrate, a rotating section that rotates with respect to the cage base, and the lock hole that receives a lock claw formed in the lock piece included in the compression connector.

7. A connector with substrate, comprising a substrate including terminals;

a cage fixed to the substrate; and a compression connector inserted into the cage and including contacts that are in contact with the terminals on the substrate, a housing to which the contacts are fixed, and a cover shell that covers an upper surface portion of the housing, wherein the cage includes a lock hole and a lock piece that enters the lock hole to fix a position of the compression connector with respect to the cage, and the cage includes, as two members, a cage base that is fixed to the substrate and that includes the lock piece; and a cage cover that rotates with respect to the cage base to be fixed to the cage base and that includes at least one pressing spring that is arranged in a direction same as an arranging direction of the contacts and that presses a top surface of the cover shell, and the lock hole into which a lock claw formed in the lock piece included in the cage base enters.

* * * * *